April 7, 1959 I. MOLNAR 2,881,261

CALL DISTRIBUTION FOR TOLL TELEPHONE SWITCHBOARDS

Filed April 5, 1956 42 Sheets-Sheet 1

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 2

INCOMING CALL DISTRIBUTION

*INVENTOR.*
IMRE MOLNAR
*BY* C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 3

INVENTOR.
IMRE MOLNAR
BY C. R. Sipe
ATTY.

*INVENTOR.*
IMRE MOLNAR
*BY* C. R. Sipe
ATTY.

CALL DISTRIBUTION FOR TOLL TELEPHONE SWITCHBOARDS

Filed April 5, 1956 42 Sheets-Sheet 5

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 7

INVENTOR.
IMRE MOLNAR
BY C. R. Sipe
ATTY.

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 10

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 12

INVENTOR.
IMRE MOLNAR
BY C. R. Sipe
ATTY.

*INVENTOR.*
IMRE MOLNAR
BY C. R. Sipe
ATTY

INVENTOR.
IMRE MOLNAR
BY C. R. Sipe
ATTY.

April 7, 1959 I. MOLNAR 2,881,261
CALL DISTRIBUTION FOR TOLL TELEPHONE SWITCHBOARDS
Filed April 5, 1956 42 Sheets-Sheet 15

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 17

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 18

INVENTOR.
IMRE MOLNAR

BY C. R. Sipe

ATTY.

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 21

*INVENTOR.*
IMRE MOLNAR
*BY* C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 22

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 23

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 24

INVENTOR.
IMRE MOLNAR

BY C. R. Sipe

ATTY.

April 7, 1959 I. MOLNAR 2,881,261

CALL DISTRIBUTION FOR TOLL TELEPHONE SWITCHBOARDS

Filed April 5, 1956 42 Sheets-Sheet 25

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 27

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 28

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 30

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 31

INVENTOR.
IMRE MOLNAR
BY C. R. Sipe
ATTY.

INVENTOR.
IMRE MOLNAR
BY C. R. Sipe
ATTY.

INVENTOR.
IMRE MOLNAR
BY C. R. Sipe
ATTY.

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 35

INVENTOR.
IMRE MOLNAR

BY C. R. Sipe

ATTY.

April 7, 1959 I. MOLNAR 2,881,261

CALL DISTRIBUTION FOR TOLL TELEPHONE SWITCHBOARDS

Filed April 5, 1956 42 Sheets-Sheet 36

INVENTOR.
IMRE MOLNAR
BY C. R. Sipe
ATTY.

April 7, 1959 I. MOLNAR 2,881,261

CALL DISTRIBUTION FOR TOLL TELEPHONE SWITCHBOARDS

Filed April 5, 1956 42 Sheets-Sheet 37

INVENTOR.
IMRE MOLNAR

BY C. R. Sipe

ATTY.

April 7, 1959 I. MOLNAR 2,881,261

CALL DISTRIBUTION FOR TOLL TELEPHONE SWITCHBOARDS

Filed April 5, 1956 42 Sheets-Sheet 38

INVENTOR.
IMRE MOLNAR

BY C. R. Sipe

ATTY.

April 7, 1959 I. MOLNAR 2,881,261

CALL DISTRIBUTION FOR TOLL TELEPHONE SWITCHBOARDS

Filed April 5, 1956 42 Sheets-Sheet 39

INVENTOR.
IMRE MOLNAR
BY C. R. Sipes
ATTY.

| SW. STEP | NO. OF POS. | EXT. NETWORK | RESISTOR LEV. A | | CALLS WTG. | EXT. NETWORK | RESISTOR LEV. B | |
|---|---|---|---|---|---|---|---|---|
| | | | DESIG. | RES. | | | DESIG. | RES. |
| 1 | 1 | 10000 | RA-1 | 10000 1W | 2 | 5000 | RB-1 | 9200 1W |
| 2 | 2 | 5000 | RA-2 | 5000 " | 4 | 2500 | RB-2 | 3550 " |
| 3 | 3 | 3330 | RA-3 | 3500 " | 5 | 2000 | RB-3 | 2650 " |
| 4 | 4 | 2500 | RA-4 | 2700 " | 6 | 1670 | RB-4 | 2100 " |
| 5 | 5 | 2000 | RA-5 | 2200 " | 7 | 1430 | RB-5 | 1750 5W |
| 6 | 6 | 1670 | RA-6 | 1600 5W | 8 | 1250 | RB-6 | 1540 " |
| 7 | 8 | 1250 | RA-7 | 1250 " | 9 | 1110 | RB-7 | 1350 " |
| 8 | 10 | 1000 | RA-8 | 870 " | 10 | 1000 | RB-8 | 1200 " |
| 9 | 14 | 710 | RA-9 | 660 " | 11 | 910 | RB-9 | 1100 " |
| 10 | 18 | 550 | RA-10 | 500 " | 13 | 770 | RB-10 | 930 " |
| 11 | 24 | 420 | RA-11 | 390 10W | 17 | 588 | RB-11 | 710 " |
| 12 | 30 | 333 | RA-12 | 300 " | 21 | 475 | RB-12 | 570 " |

INVENTOR.
IMRE MOLNAR

BY C. R. Sipe
ATTY.

INVENTOR.
IMRE MOLNAR
BY C. R. Sipe
ATTY.

INVENTOR.
IMRE MOLNAR
BY C. R. [signature]
ATTY.

United States Patent Office 2,881,261
Patented Apr. 7, 1959

2,881,261

CALL DISTRIBUTION FOR TOLL TELEPHONE SWITCHBOARDS

Imre Molnar, Chicago, Ill., assignor to General Telephone Laboratories, Incorporated, a corporation of Delaware Application April 5, 1956, Serial No. 576,262

59 Claims. (Cl. 179—27)

The invention relates to telephone systems in general and, more particularly, to improvements in automatic switching apparatus provided in conjunction with toll switchboards to enable toll operators to accept, complete and supervise toll calls over the links at the various operator positions more efficiently.

In handling toll switching at a centrallized local toll switchboard in a toll network, incoming toll calls from distant exchanges may be routed by way of the interconnecting toll lines, inward operator trunks, and ring-down trunks, to a toll operator position and completed therefrom directly to local subscriber substations through the local office area, or they may be routed over dial trunks through the local office switching apparatus to subscriber substations in other exchange areas without the assistance of the local office toll operator. Outgoing toll calls originated by local subscribers, commonly known as CLR toll calls (combined line and recording) are routed over CLR trunks to an operator position at the local exchange and then completed by way of toll lines to distant exchanges. A record is made of all toll calls so that the charge for the call may be assessed against the calling subscriber. If the call cannot be immediately completed by an operator, a record containing the necessary call information is made and passed on to a TX, or delayed, operator who will later attempt to complete the desired connection.

The present invention is in the nature of an improvement over toll switching systems of the type disclosed in the Thomas F. Crocker Patent 2,167,710, granted August 1, 1939, the Imre Molnar Patent 2,361,313, granted October 24 1944, and the Harvey W. Balzer Patent 2,697,134, granted December 14, 1954.

The main object of the present invention is the provision of an improved primary and partial secondary call distribution arrangement for distributing incoming toll calls to operator positions in a toll switching system of the character described. In this arrangement the CLR trunks, the inward operator trunks, and the ring-down trunks are grouped together and divided into a plurality of primary trunk groups. Each primary trunk group is subdivided into as many primary trunk sub-groups as there are links in each operator position. Each trunk has a primary rotary line switch which has direct primary access over primary paths to predetermined links at the operator positions. In addition, the primary line switches have secondary access to secondary rotary line switches which have access to all links at all operator positions. Each link is accessible over two paths, one, a direct primary path over primary rotary switches, and second, a secondary path over primary and secondary switches in series. Primary control circuits are provided whereby trunk calls are taken care of over direct primary paths to idle operator links if such links are available over direct primary paths. In case direct primary paths are not available, then the primary switches hunt for secondary switches which have preselected the available operator links. The trunk calls which have direct primary paths to idle links are given preference over the trunk calls which have only secondary access to the available links. The secondary switches are divided into as many groups as there are links in each position and each secondary group has access to one link in each operator's position. A control circuit for each secondary group closes the start circuits for the secondary switches of its group when idle links are available to trunk calls only through secondary switches.

Another object of the invention is the provision of an improved gate controlling circuit network for controlling the distribution of calls to the operator links. In this arrangement incoming trunk calls are taken care of either directly over primary paths or over secondary paths until there are no available links. Calls in existence at the time no links are available cause a gate control circuit to be closed so that these calls are admitted within the gate and are taken care of before any subsequent calls. After all existing calls within the gate have been taken care of, the gate is opened to allow all calls waiting outside the gate to be taken care of, and as soon as no links are available, the gate is again closed.

A further object of the invention is the provision of means whereby certain types of calls, such as operator trunk calls and ring-down trunk calls are given preference over CLR trunk calls. In this preference arrangement, incoming calls on operator and ring-down trunks are immediately entered into the gate and are not held outside the gate when the gate is closed. In addition, an incoming call on any one of these preferred trunks automatically closes the gate even though a plurality of links are available at the time of such a trunk call in order to give preference to the preferred trunks by closing the gate to CLR trunk calls.

A still further object of the invention is the provision of a gate timing means for automatically admitting calls waiting outside the gate to enter into the gate if the gate remains closed for a predetermined time.

An additional object of the invention is the provision of improved universal operator positions and link circuits to work in conjunction with the above mentioned call distribution arrangement.

One of the features of the present invention relates to the provision of three different sender disconnect buttons at each operator position to give the operator three choices to disconnect the sender and sender control from her position after sending has been completed; one, a sender disconnect button which causes the sender and sender control to be disconnected from her position, but which maintains her position connected to the link so that she can perform additional operations; two, a sender disconnect with automatic ring button which causes the sender to send an automatic ring signal after sending and then causes the disconnection of the sender and sender control from the operator position; and three, a position and sender disconnect with automatic ring button which, in addition to sending an automatic ring signal after sending is completed, also causes the disassociation of the operator position from the link.

Another feature of the present invention is the provision of two different positions disconnect buttons at each operator position for operatively disassociating the operator position from one of its links, one, a position disconnect button which releases the position from the link connection and retains the automatic answering of incoming calls, and two, an answer disconnect button which releases the position from the link connection and which controls the position to block further incoming calls until the operator performs some operation to nullify the block, such as re-entering a connection or operating the accept call button, after which the position is automatically restored to automatic answering of incoming calls.

Another feature relates to the improved sender control and sender circuits, and to the novel testing circuits in a sender finder of a sender control circuit which prevents two sender finders from seizing the same idle sender.

Another feature relates to the provision of training trunks for simulating different types of toll calls and the provision of means in certain operator positions for converting such positions into trainee and teacher positions to train new operators to handle toll calls when such positions are not required to handle toll traffic.

A further feature relates to improved trunk checking circuit arrangements common to all operator positions for enabling the operators to determine the group and trunk number of a toll trunk in an established connection.

A still further feature relates to a call waiting circuit arrangement which periodically compares the number of toll calls awaiting service with the number of operators on duty to determine if sufficient positions are staffed to handle the toll traffic.

*Description of drawings*

The invention, both as to its organization and method of operation, together with further objects and features not specifically mentioned, will best be understood by reference to the specification taken in connection with the accompanying drawings, in which

Referring now to Fig. 1 of the drawings, the telephone system illustrated therein comprises a local office 100, distant automatic exchanges 110 and 120, and a manual exchange 130. The distant automatic exchanges 110 and 120 are connected to the local office 100 over a plurality of two-way dial trunks DT which terminate in incoming toll selector IS in their respective exchanges for incoming calls, and for outgoing calls, these two-way dial trunks DT also terminate in the banks of the intermediate toll selectors ITS in their respective exchanges. The distant manual exchange 130 is connected to local office 100 over a plurality of two-way trunks which terminate in ring-down trunks 2500. The local office 100 also includes local automatic switching apparatus for serving the local subscribers. All of the automatic switching apparatus is of the well-known Strowger step-by-step type. Toll calls may be extended to the local subscriber substations, such as S1, directly from the distant automatic exchanges or from the distant exchanges through the medium of the operator toll board in the local office 100. Toll calls originated by local subscribers may be extended to the toll operator switchboard for completion.

Figure 1:
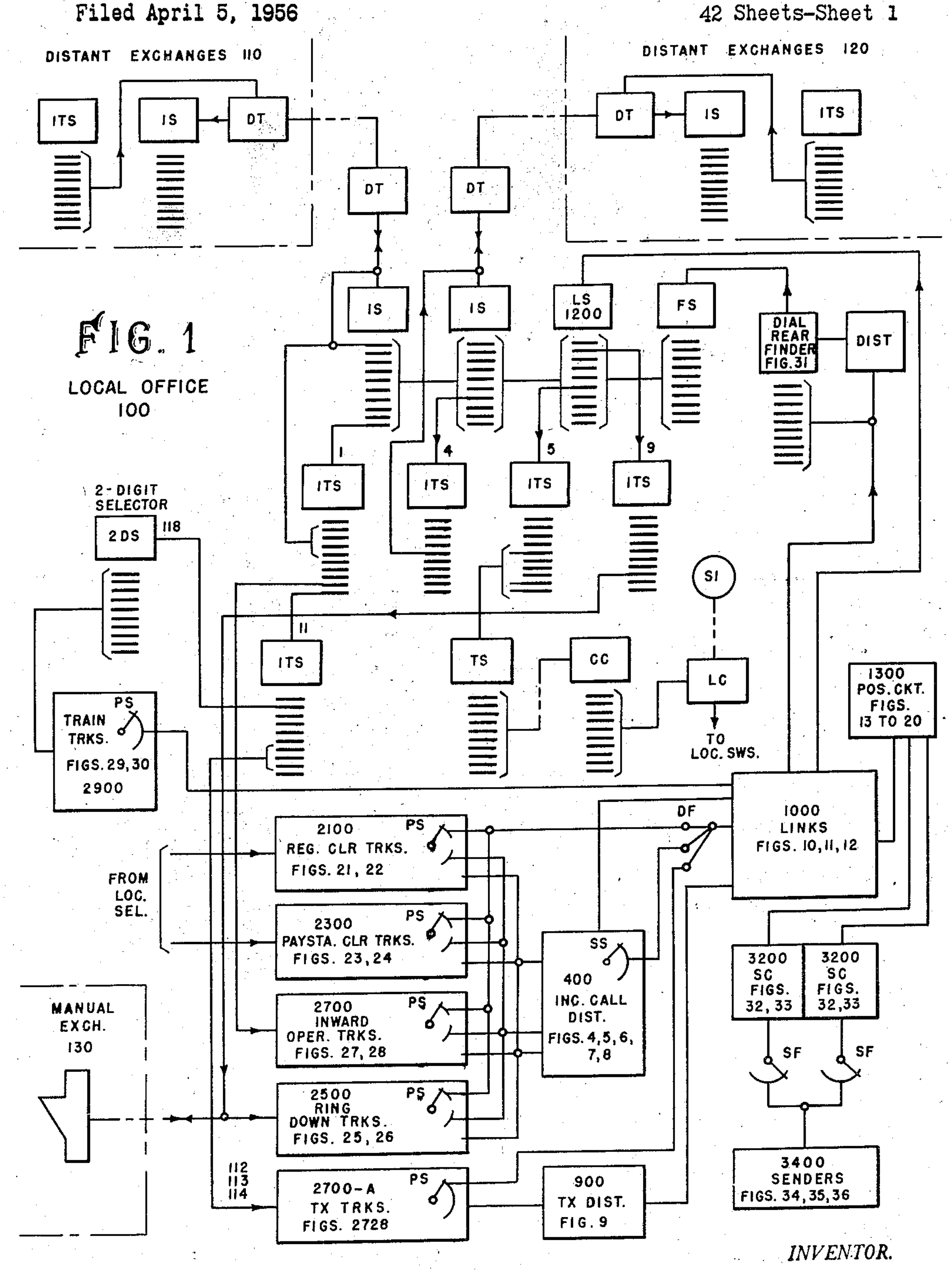
Fig. 1 illustrates the trunking plan and general arrangement of a telephone system embodying the invention.

The toll switchboard provided in the local office 100 is illustrated by one operator position 1300 and it will be understood that any number of positions may be provided. Each position of the switchboard constitutes a universal position having facilities for handling either CLR (combined line and recording), inward and ring-down, and TX (delay) calls or any combination of these services. Each operator position of the toll switchboard is provided with a plurality of links, such as link 1000. Each link 1000 includes a link selector, such as link selector LS, which is utilized to extend connections from the operator position over the front end of the link to local subscribers in local office 100 or to a called subscriber in any of the distant exchanges. The rear end of the links 1000 are accessible over two paths, one, a direct primary path from the banks of primary rotary line switches which are individually associated with the trunk circuits, and second, a secondary path which includes the banks of preselecting secondary rotary line switches and the other bank contacts of the above mentioned primary line switches.

A call distribution control circuit 400 is provided to distribute incoming toll calls to the various operator positions by controlling the start circuits for the primary and secondary rotary line switches in accordance with whether the available idle links 1000 are accessible over direct primary or secondary paths, and, if no links are available, to close a gate to lock subsequent calls outside the gate until links are available. For example, the CLR trunks 2100 and 2300, the inward operator trunks 2700, and the ring-down trunks 2500 each are provided with a primary line switch PS which has direct primary access to links 1000 and also has secondary access to links 1000 through secondary line switches SS in the call distribution circuit 400. The call distribution circuit 400 first gives preference to all waiting calls which can be completed over direct primary paths and after all these calls have been extended to links 1000, then the remaining calls are completed over secondary paths. All links 1000 are accessible to all trunk circuits. The primary line switches PS of the TX, or delay, trunks 2700–A have only direct access to links 1000 and these primary line switches are controlled by a TX distribution control circuit 900.

Each operator position is provided with a pair of sender control circuits 3200 for connecting such position to common senders 3400 by means of sender finders SF. A keyset is provided at each position to enable the operator to register the keyed digits in the sender which then transmits these digits to the automatic switching apparatus to extend the desired connection.

When a local subscriber initiates a tool call, the local switching apparatus (not shown) is operated in the well-known manner to seize a CLR trunk, such as 2100. The call is then routed over a direct primary path or a secondary path under control of the call distribution circuit 400 to an idle link 1000 at an operator's position 1300. When the link is seized one of the sender control circuits 3200 connects a sender 3400 to the operator position 1300. The operator now keys up the digits and the sender transmits the digits over the EC conductor to operate the automatic switching apparatus to extend the desired connection. In case the calling local subscriber is calling from a paystation, then the call is routed to a CLR paystation trunk, such as 2300, and the call is completed in the same manner as described above. Incoming toll calls from the distant exchanges 110 and 120 may be automatically completed to local office subscriber lines directly in the well-known manner, or such calls may be completed by the toll operator in local office 100 if desired. In case the toll operator at the local office 100 is called by a distant toll operator the call is routed over the dial trunks DT, incoming selectors IS, and intertoll selectors ITS to the inward operator trunks 2700, and the call is completed by the local office toll operator in the same manner. Incoming calls from the manual exchange are received by the ring-down trunks 2500 and are similarly completed by the toll operator in the local office 100. Incoming TX trunk calls, originated by either a local operator or a distant operator, are received on the TX trunks 2700–A and are extended to the positions conditioned to receive TX calls under control of the TX distribution control circuit 900.

In case an operator desires to extend a connection over the rear of one of her links she will operate a dial rear key to cause a link at her position to be found by a dial rear finder, after which she keys up the required digits to cause a sender to operate the associated finder selector FS and switching apparatus to complete the desired connection.

Certain of the operator positions may be converted to training positions to train operators to handle toll calls, and a plurality of training trunks, such as 2900, are provided which enables a trainee operator to simulate different types of toll calls under instructions from an adjacent teacher position. The training trunks 2900 are accessible from different levels of a two-digit selector DS and are each seized over different access paths in each level for simulating different types of toll calls. Each training trunk has access to the rear of links 1000 at certain positions through primary rotary line switches PS, but these line switches are not controlled by the call distribution control circuits 400.

Figure 2A:
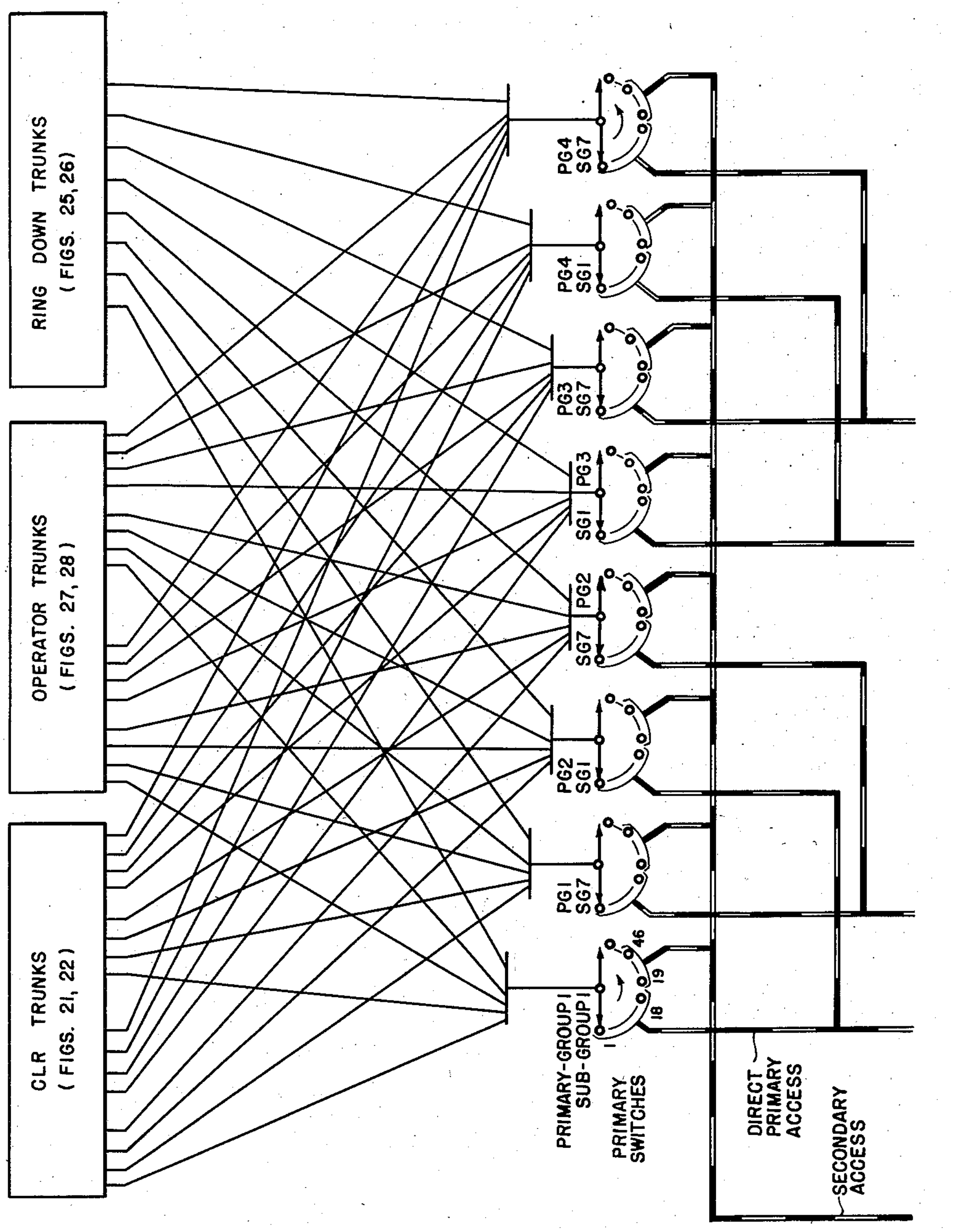
Figs. 2A, 2B, 3A, 3B and 3C diagrammatically illustrate the call distribution arrangement, and Figs. 4 to 39, inclusive, when assembled in the manner shown in Fig. 40, illustrate the detail circuits of the system.
Figure 2B:
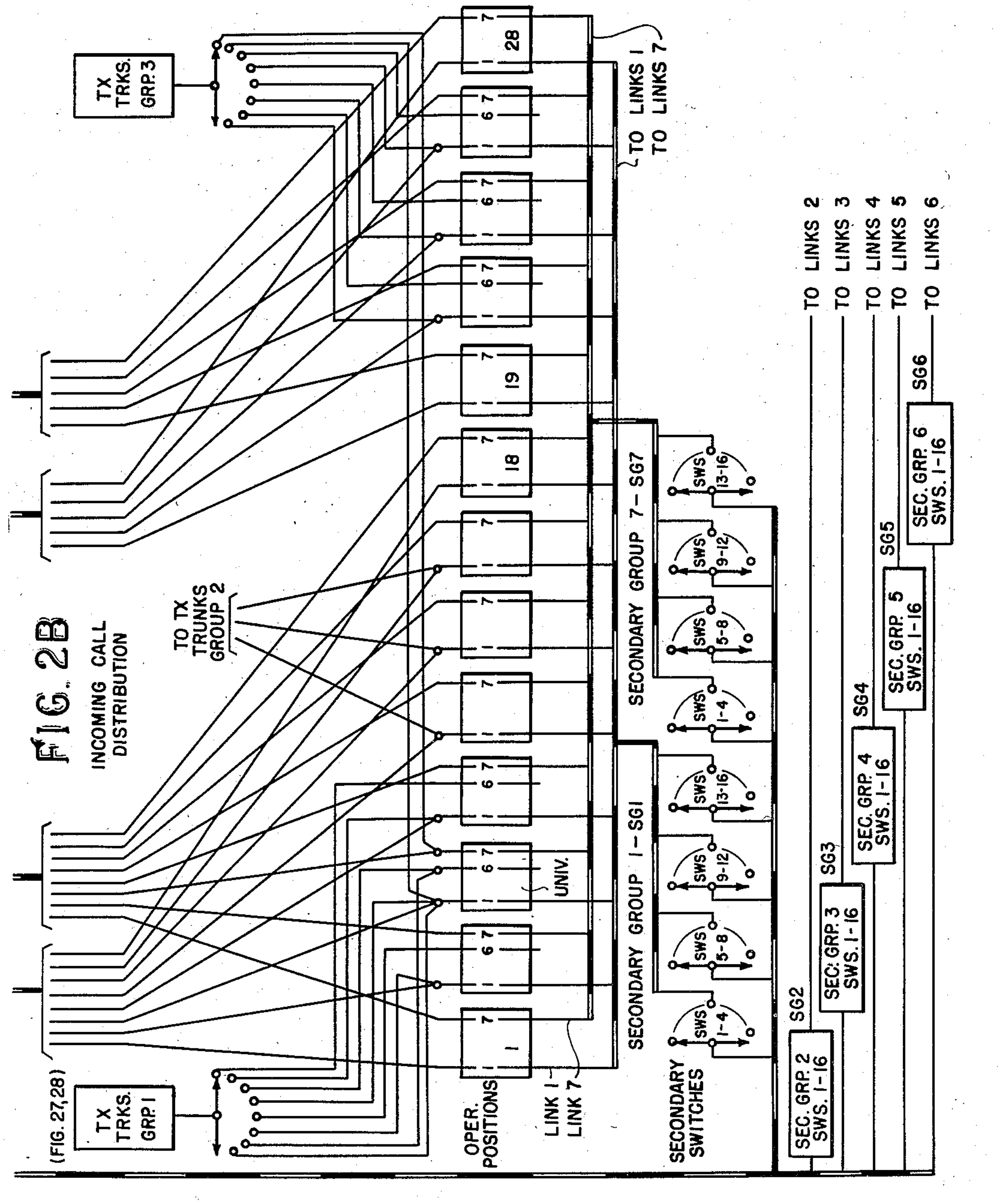
Figure 3A:
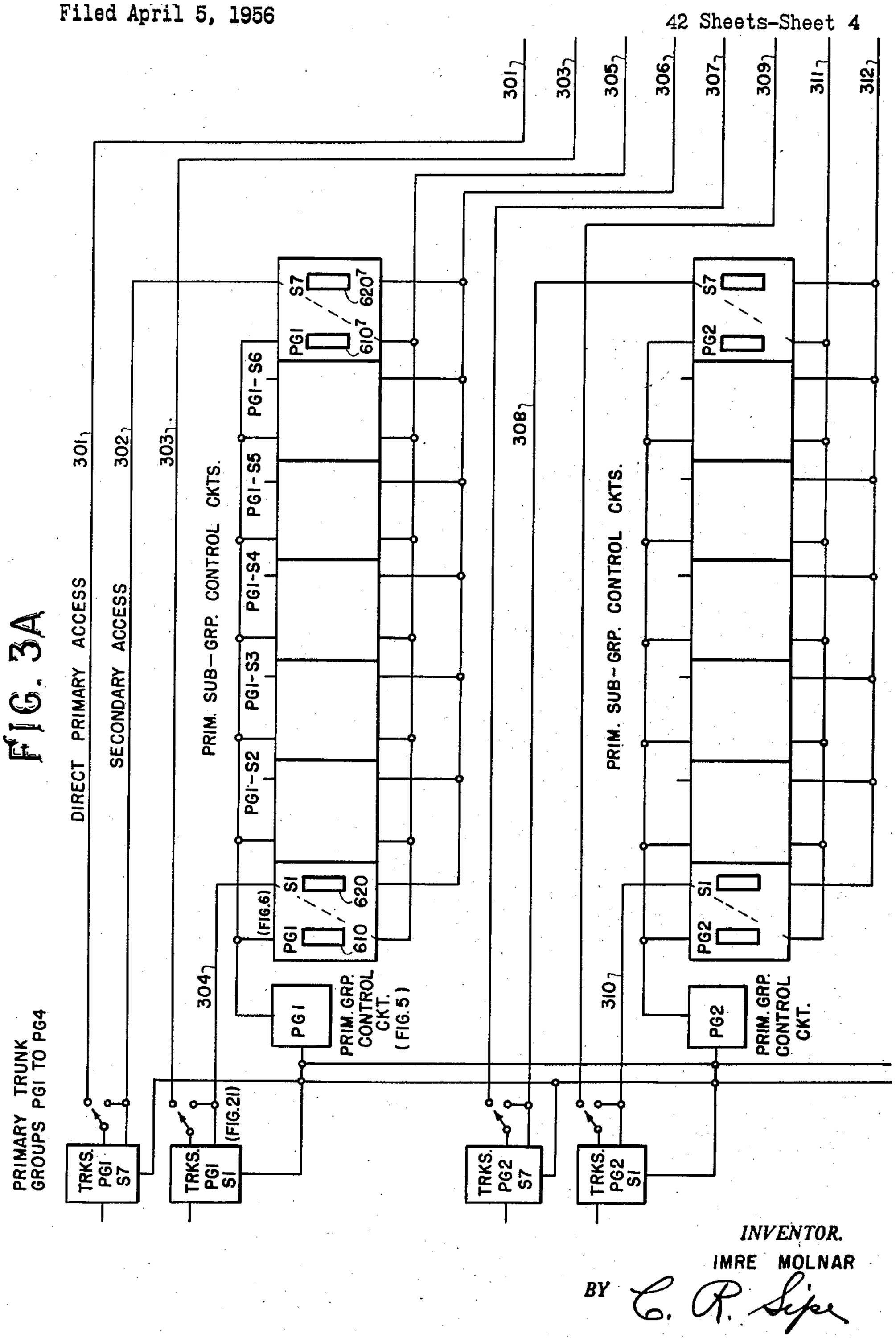
Figure 3B:
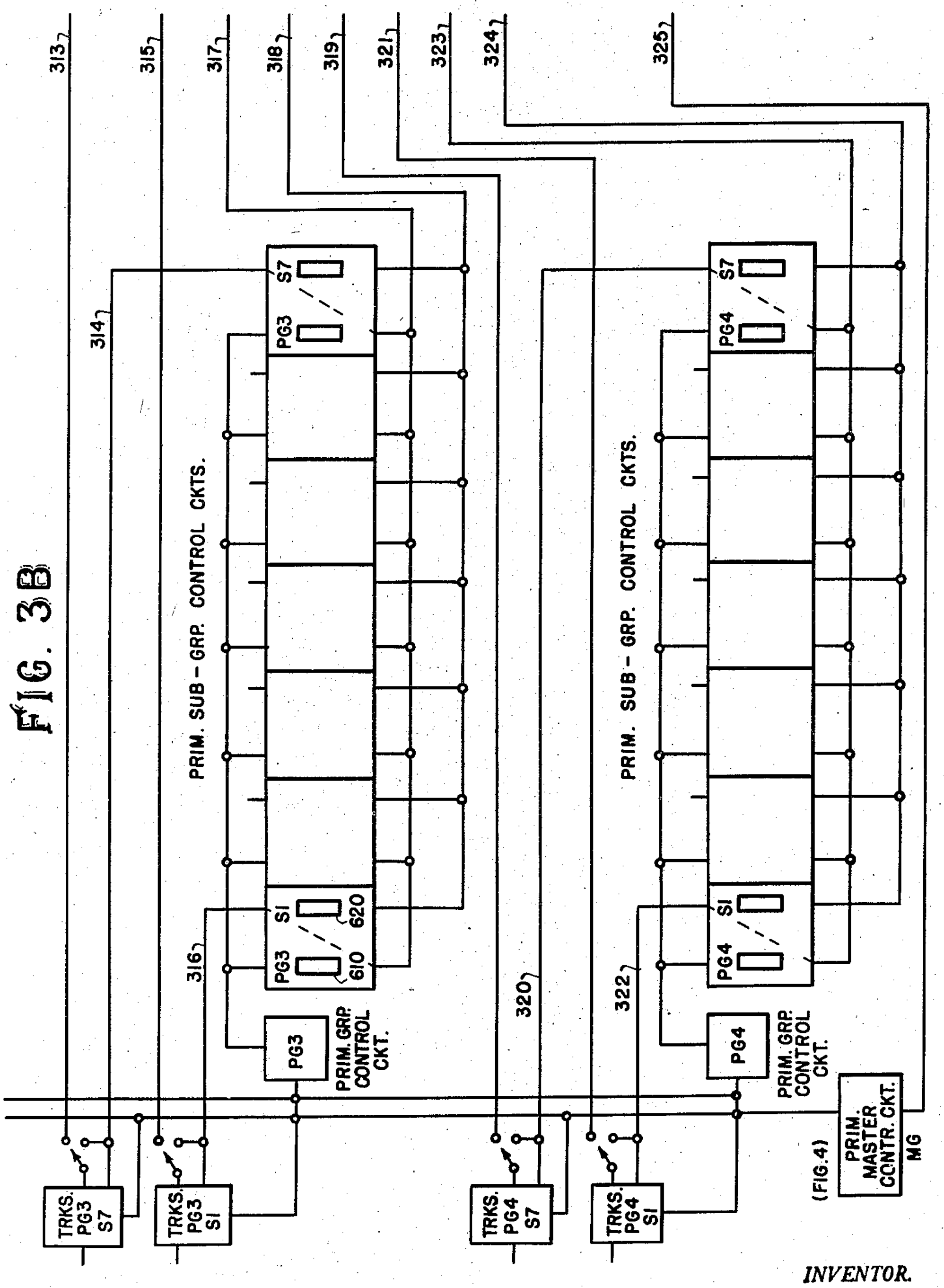
Figure 3C:
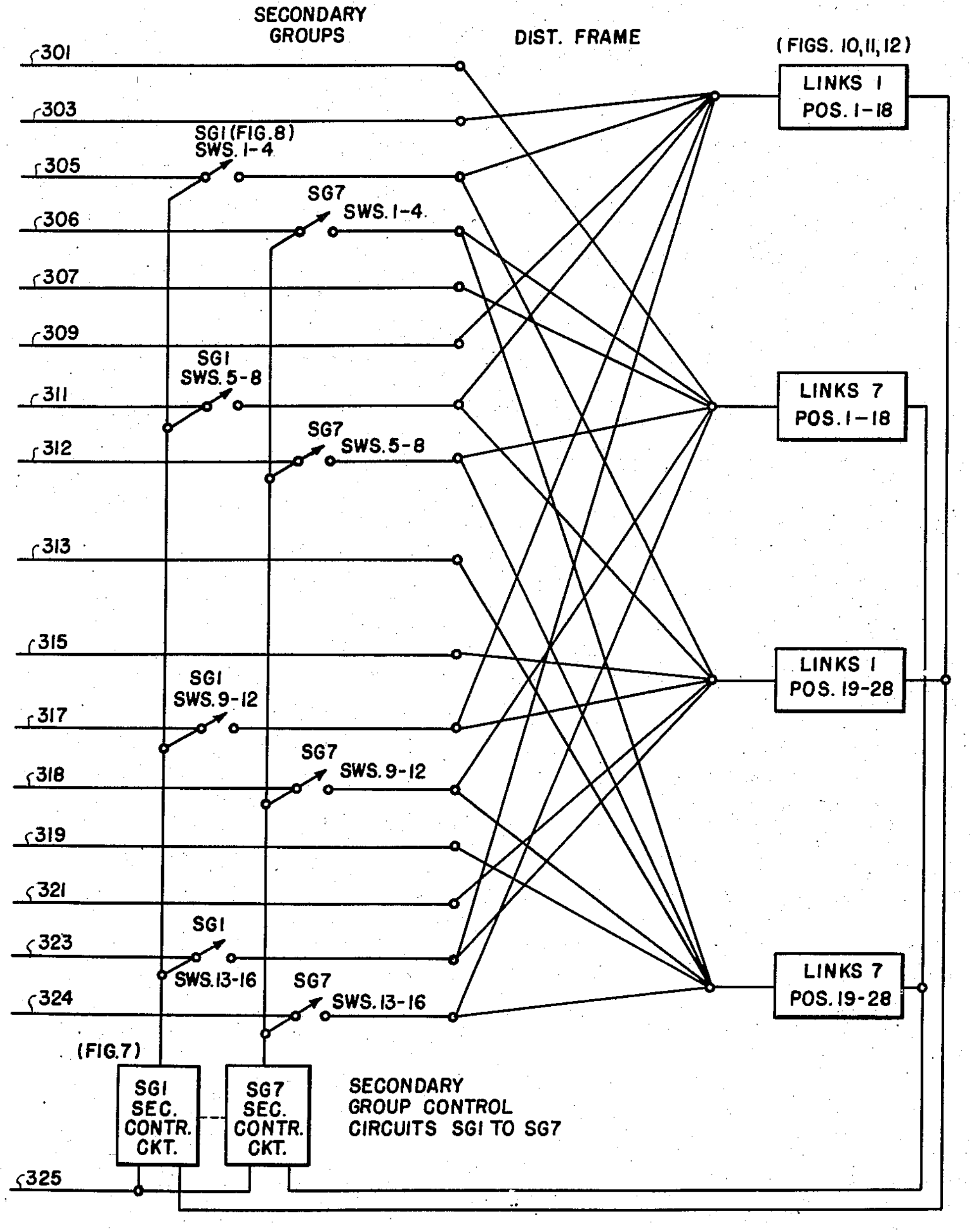
Figure 8:
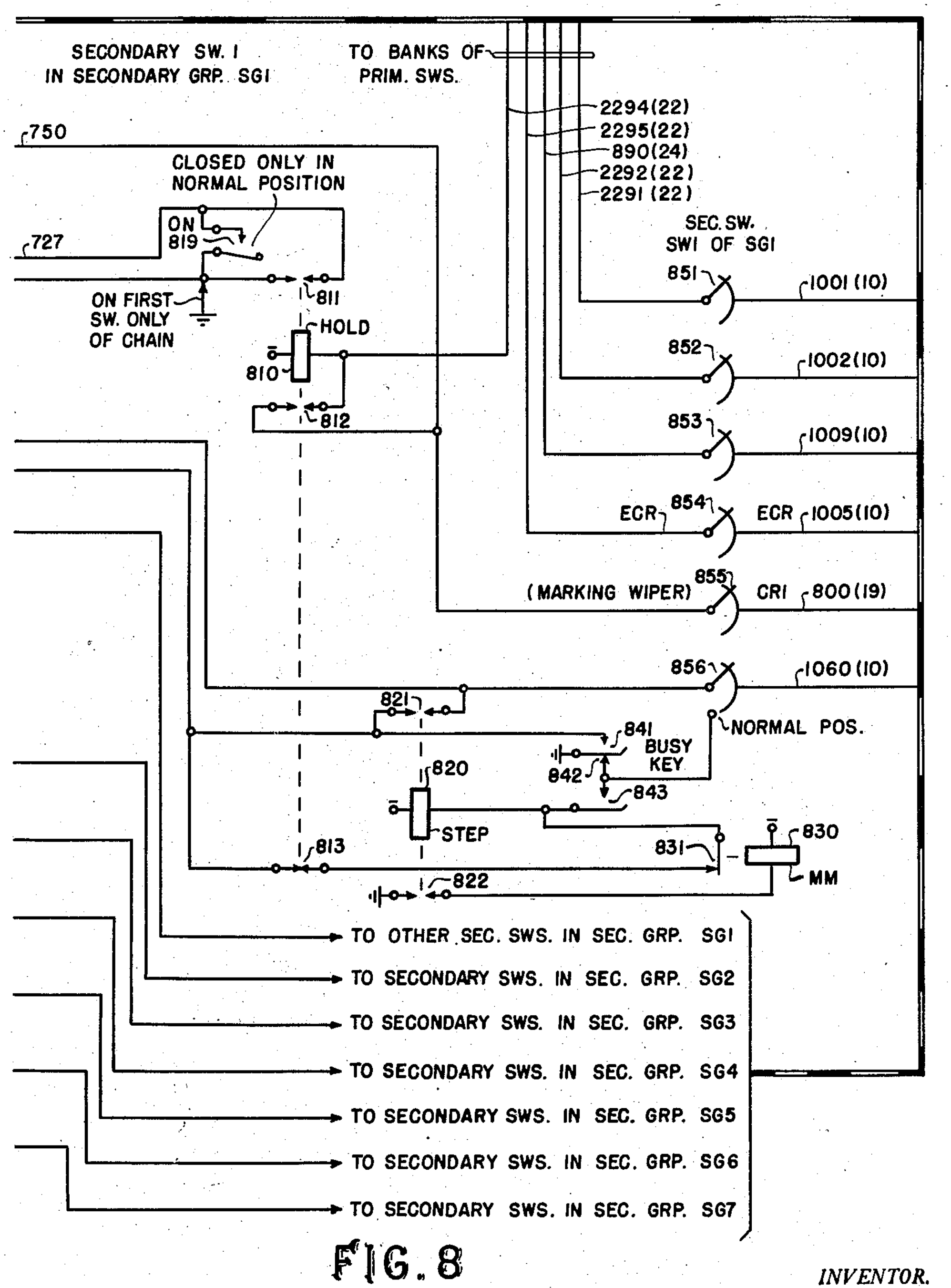
Figure 9:
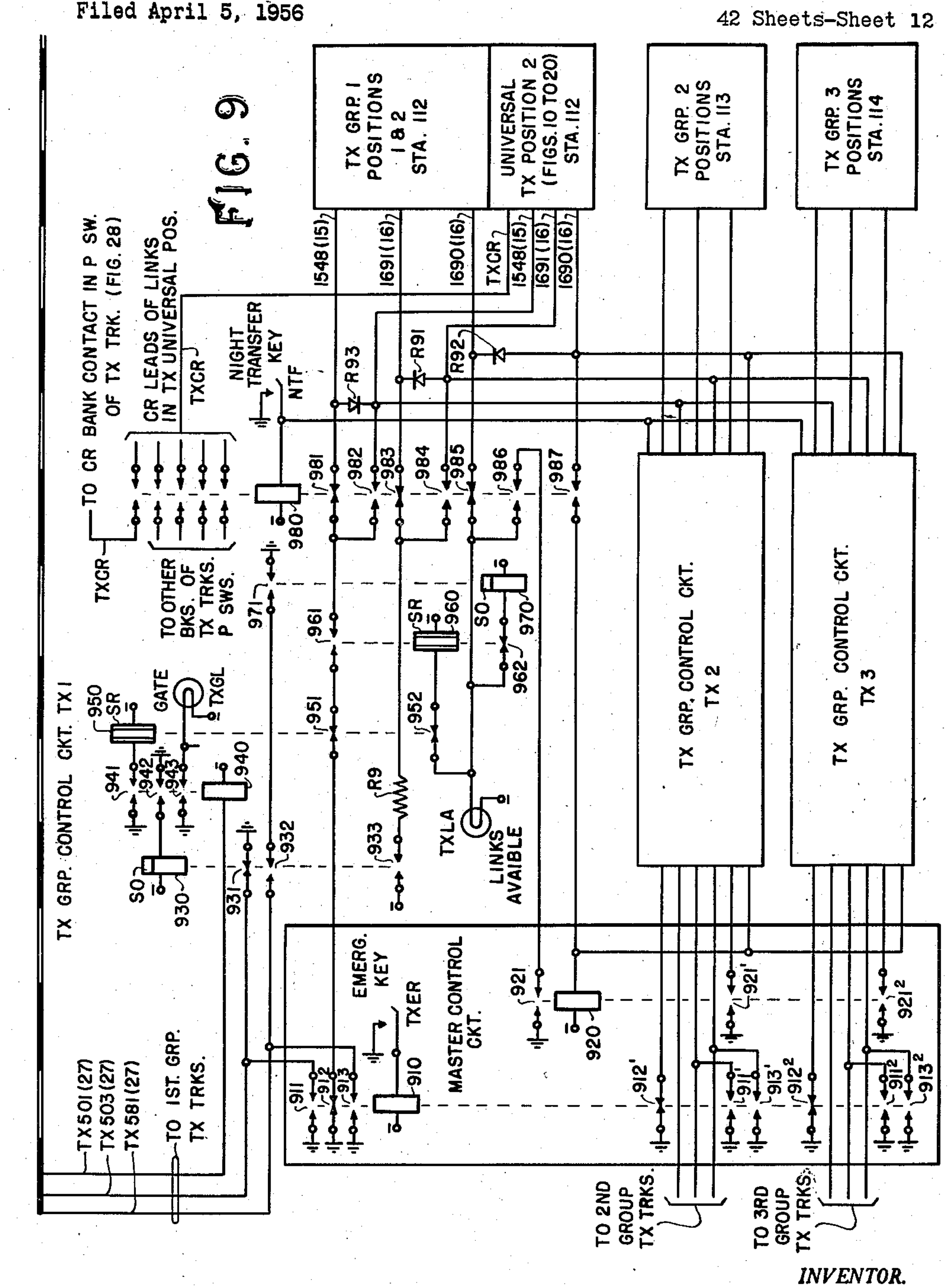

The call distribution system is diagrammatically illustrated in Figs. 2A and 2B and in Figs. 3A, 3B and 3C. Figs. 4, 5, 6, 7 and 8 show the detail circuits for part of the distribution system, and Fig. 9 shows the detail circuits of part of the TX call distribution system. The rectangles, shown in the upper portion of Fig. 2A, diagrammatically illustrate the CLR trunks, the operator trunks and the ring-down trunks which terminate in the local exchange. The rotary switches, shown in the lower portion of Fig. 2A, illustrate the primary switches which are part of these trunks. These trunks are divided into four primary trunk groups PG1, PG2, PG3 and PG4, and each primary trunk group has seven primary sub-groups, each sub-group including six or more trunks. In Fig. 2A, only the switches for sub-groups 1 and 7 of each primary trunk group have been illustrated, and it will be understood that similar switches are provided for the other sub-groups.

The operator positions are illustrated near the center of Fig. 2B, there being a total of twenty-eight such operator positions with each position having at least seven links, as illustrated by the numerals 1 and 7 at each position. The operator positions are divided into two groups, the first group including positions 1 to 18, and the second group including positions 19 to 28. Three groups of TX trunks are also illustrated having access to certain operator positions which are assigned for use by the TX operators. The lower portion of Fig. 2B diagrammatically illustrates the secondary switches, which also have access to the links at the operator positions, and which are divided into as many secondary groups as there are links in any one position. In this case, since each operator position has seven links, the secondary switches are divided into seven groups hereinafter designated SG1, SG2, SG3, SG4, SG5, SG6, and SG7.

The primary switches of the trunk groups each have two paths for seizing an idle, or available, link at an operator position. One path, being a direct primary path, extending from the primary access bank contacts of the primary switches direct to the operator links. The second path, being a secondary path, extending from the secondary access bank contacts of the primary switches to secondary switches and then to the operator links.

The primary switches in sub-group 1 of primary trunk group PG1 have their respective bank contacts connected in the usual multiple; and their first eighteen bank contacts individually connected to links 1 in the first eighteen operator positions. For example, the first bank contacts of each switch are connected to link 1 of the first operator position, the second bank contacts of each switch are connected to the link 1 of the second operator position, etc., and the eighteenth bank contacts are connected to link 1 of the eighteenth operator position. The primary switches in sub-group 2 (not shown) of primary trunk group PG1 have their respective bank contacts connected in the usual multiple and their first eighteen bank contacts individually connected to links 2 in the first eighteen operator positions. In a similar manner the primary switches of sub-groups 3, 4, 5, 6 and 7 of PG1 have their first eighteen bank contacts connected respectively to links 3, 4, 5, 6 and 7 of the first eighteen operator positions. With this arrangement, the primary switches of the respective sub-groups have direct primary access to correspondingly numbered links in the operator positions.

The primary switches in sub-groups 1 to 7 (S1–S7) of primary group 2 (PG2) have their first eighteen bank contacts connected in multiple with the bank contacts of the sub-groups of primary group PG1 so that the primary switches in primary group PG2 have direct primary access to the same links as the switches in primary group PG1.

The primary switches of primary groups PG3 and PG4 are multipled in a manner similar to that described for primary groups PG1 and PG2, except that the primary switches have direct primary access to the links in positions 19 to 28 instead of to the links in the first eighteen operator positions.

The remaining, or secondary access, bank contacts, except the test bank contacts, of the primary switches are connected directly to secondary switches; while the secondary access test bank contacts are connected through contacts (when operated) of a secondary access relay (620) to the marking wipers of the secondary switches. The first four (or the nineteenth, twentieth, twenty-first and twenty-second) secondary access bank contacts of the primary switches of all seven sub-groups of primary group PG1 are respectively connected to secondary switches 1 to 4 of secondary group SG1; the next four secondary access bank contacts of all these seven sub-groups are respectively connected to secondary switches 1 to 4 of secondary group SG2, the next four to switches 1 to 4 of SG3, etc., and the last four secondary access bank contacts (forty-third, forty-fourth, forty-fifth and forty-sixth) to secondary switches 1 to 4 of secondary group SG7. The secondary access bank contacts of the primary switches in the second primary group PG2 are connected to the secondary switches 5 to 8 in all seven secondary sub-groups SG1 to SG7 in a similar manner. The secondary switches 9 to 12 in all seven secondary groups are connected to the secondary access bank contacts of the primary switches in primary group PG3, and the secondary switches 13 to 16 in all seven secondary groups are similarly connected to the secondary access bank contacts of the primary switches in primary group PG4.

The secondary switches 1 to 16 of secondary group SG1 have access to links 1 of all twenty-eight operator positions; the switches of secondary group SG2 have access to all links 2; etc.; and the switches of secondary group SG7 have access to all links 7. The number of the secondary group indicates which numbered link in each operator position is accessible from such secondary group. From the foregoing, it will be seen that any link in any position is accessible over secondary paths through secondary switches from any trunk in any sub-group; that links 1 of positions 1 to 18 are accessible over direct primary paths from sub-groups 1 of primary groups PG1 and PG2; that links 1 of positions 19 to 28 are accessible over direct primary paths from sub-groups 1 of primary groups PG3 and PG4, that links 2, 3, 4, 5, 6 and 7 of positions 1 to 18 are respectively accessible over direct primary paths from sub-groups 2, 3, 4, 5, 6 and 7 of primary groups PG1 and PG2, and that links 2, 3, 4, 5, 6 and 7 of positions 19 to 28 are respectively accessible over direct primary paths from sub-groups 2, 3, 4, 5, 6 and 7 of primary groups PG3 and PG4.

The switches of the TX trunks, shown in Fig. 2B, have direct access to the TX operator positions which are assigned to handle delayed toll calls. Three groups of TX trunks are shown, each group normally having access to certain predetermined operator positions, normally termed a TX station which is assigned a code call number to reach such a station. During light traffic, all of the TX stations will not be staffed by operators, and under these conditions a TX call to any TX station will be routed to the universal TX operator's position as indicated by the third shown operator position.

Figs. 3A, 3B and 3C show a somewhat more detailed trunking arrangement of the call distribution system than that shown in Figs. 2A and 2B. The trunk groups and a portion of their sub-groups along with their primary switches are illustrated on the left-hand side of Figs. 3A and 3B. A master group control circuit, a primary group control circuit, corresponding to each primary trunk group, and a primary sub-group control circuit, corresponding to each sub-group of primary trunks, are also indicated in Figs. 3A and 3B for controlling the distribution of calls to the idle, or available, links at the operator positions.

Each primary group control circuit controls the start circuits for the primary switches of its respective trunk group when an idle link is available. Trunk calls are taken care of either directly over the direct primary path or through secondaries until there are no available links. Calls in existence, but not extended to links, at the time no links are available, cause gate control circuits to be closed so that these existing calls are admitted into the gate and are taken care of before any subsequent calls. The start circuits of the calls existing within the gate are held open by the gate control circuits in the primary group and sub-group control circuit until subsequent links become available. After all these existing calls within the gate are extended to subsequent available links, the gate is opened to allow all the calls waiting outside the gate to be taken care of; and as soon as no links are available the gate is again closed.

Each sub-group control circuit has a direct primary access relay, such as 610, which is operated when any link in its group of operator positions is idle or available for use. Each sub-group control circuit also has a secondary access relay, such as 620, which is operated when no direct primary access to the idle link is provided. This secondary access relay closes test-stop circuits between the primary and secondary switches to permit the primary switches to seize one of the secondary switches which has preselected the idle link.

Conductors 301, 303, 307, 309, 313, 315, 319 and 321 diagrammatically illustrate the direct primary path from the primary switches of the trunks to the links at the operator positions. Conductors 302, 304, 308, 310, 314, 316, 320 and 322 diagrammatically illustrate the secondary access path of the test-stop circuits from the primary switches to contacts of their respective sub-group secondary access relays. Conductors 305, 306, 311, 312, 317, 318, 323 and 324 diagrammatically illustrate the continuation of the secondary access test-stop circuits through operated contacts of the secondary access relays to the marking wipers of the secondary switches shown in Fig. 3C.

The secondary group control circuits are diagrammatically illustrated in the lower portion of Fig. 3C. There are seven secondary group control circuits SG1 to SG7 for controlling the preselecting operation of the secondary switches when a link is idle and available for use.

Referring now to Figs. 4, 5, 6, 7 and 8, detail circuits are shown of the master group control circuit MG, (Fig. 4) of one of the primary group control circuits PG1 (Fig. 5), of one of the primary sub-group control circuits PG1—S1 (Fig. 6), of one of the secondary group control circuit SG1 (Fig. 7), and of one of the secondary switches SW1 (Fig. 8) of secondary group SG1. The other primary group control circuits, the other primary sub-group control circuits, and the other secondary group control circuits are illustrated but not shown in detail. Four chain circuits, including predetermined secondary switches in each group of secondary switches, are diagrammatically illustrated in Fig. 7.

The master gate control circuit MG has a relay 450 which is operated, when any sub-group of primary trunk switches do not have direct primary access to an available link, to control start circuits for the secondary switches. Other relays in the master gate control circuit are provided for controlling timing circuits which are effective in case all trunk calls within the gate are not cleared out within a predetermined time.

Each primary group control circuit has a plurality of relays, which control the opening and closing of the gate in order to control the start circuits of the associated trunk primary switches.

Each primary sub-group control circuit has a direct primary access relay, such as relay 610 for closing start circuits for the preliminary trunk switches of this sub-group of trunks in case the gate is not closed. Relay 610 is operated if any link, which is directly accessible from the primary switches of this sub-group of trunks, is marked idle and available for use. Each primary sub-group control circuit also has a secondary access relay, such as 620, which is operated only when no direct primary path is available to an idle link from the primary switches of the associated sub-group of trunks. The secondary access relays are so-called "gang relays," which have a large number of contacts for extending the stop-test conductors from the marking wipers of the secondary switches to the secondary access bank contacts of the primary switches. The marking wipers (such as wiper 855) of the secondary switches 1 to 4 of all seven secondary groups SG1 to SG7 are connected to contacts of the secondary access relays in all seven sub-group control circuits PG1—S1 to PG1—S7 so that any trunk in any sub-group of primary trunk group PG1 has access through secondaries to any idle link at any operator position. Similar connections, between the marking wipers of the remaining secondary switches and the contacts of the secondary access relays of the remaining sub-groups of primary group control circuits PG2, PG3 and PG4, are provided, respectively, for the secondary switches 5 to 8, 9 to 12, and 13 to 16 of all seven secondary groups.

Each secondary access relay 620, in each of the seven sub-groups of primary group control circuit PG1, is operated only when no direct primary path is available to an idle link from their respective sub-groups, and at a time when one or more secondary paths are available to this idle link through secondary switches. When no direct primary path from a trunk sub-group is available to an idle link, then the corresponding direct primary access relay 610 is not operated, and if an idle link is available at this time, then the secondary access relay 620 of this sub-group is operated by way of the unoperated contacts 616 of the direct primary access relay 610. When any link is idle and any secondary switch, included in the chain circuit individual to this primary group control circuit, is available for use, then the relay 540 of this primary group control circuit is normal, or not operated. Under the above mentioned conditions, the circuit for the secondary access relay 620 of sub-group 1 of primary group control circuit PG1 extends from ground, contacts 543, conductor 582, contacts 616, and winding of relay 620 to battery. Similar circuits are closed to the secondary access relays of the other sub-groups in case their direct access relays 610 are not operated.

Secondary access relay 620 of sub-group 1 connects the test leads from the secondary access test bank contacts of the primary switches of the trunks included in sub-group 1 of primary trunk group PG1 to marking wipers in secondary switches 1 to 4 in each group of secondary switches SG1 to SG7. One such connection may be traced from the secondary access bank contact 19 shown in Fig. 22, conductor 2293 extending to Fig. 6, contacts 619 of secondary access relay 620, contacts 711, conductor 750 to marking wiper 855 of secondary switch 1 in secondary group SG1. Similar connections, over contacts 620', 621, and 622, connect the twentieth, twenty-first, and twenty-second secondary access test bank contacts to similar marking wipers of secondary switches 2, 3 and 4 of secondary group SG1. In a similar manner, the remaining contacts of relay 620 individually connect the remaining secondary access test bank contacts to a marking wiper in each of the switches 1 to 4 in each secondary group SG2 to SG7. Since the secondary switches preselect idle or available links, the marking wipers, such as wiper 855, extend stopping battery of the preselected idle links to the secondary access test bank contacts of the primary switches when the secondary access relay, such as 620, is operated.

Each secondary group control circuit has a link available relay, such as 720, which is connected over a conductor, such as conductor 700, to its correspondingly numbered link in all positions. For example, all links #1 in all positions are connected in multiple over conductor 700 to the link available relay 720 of the first secondary group control circuit SG1. Each link available relay is in restored position when no links are available. However, if any link #1 is idle and available for use and the associated operator position is idle and in condition to receive a call, then relay 720 is operated. The circuit for operating relay 720 may be traced from ground, contacts 1672 of any idle operator position in condition to receive a call, link conductors such as conductors 1069 connected to links #1 at these conditioned positions, through link contacts 1015 of the idle links #1 which are available for use, link #1 conductors such as conductors 1007, over position contacts such as contacts 1913, to common conductor 700 and the link available relay 720.

Figure 7:
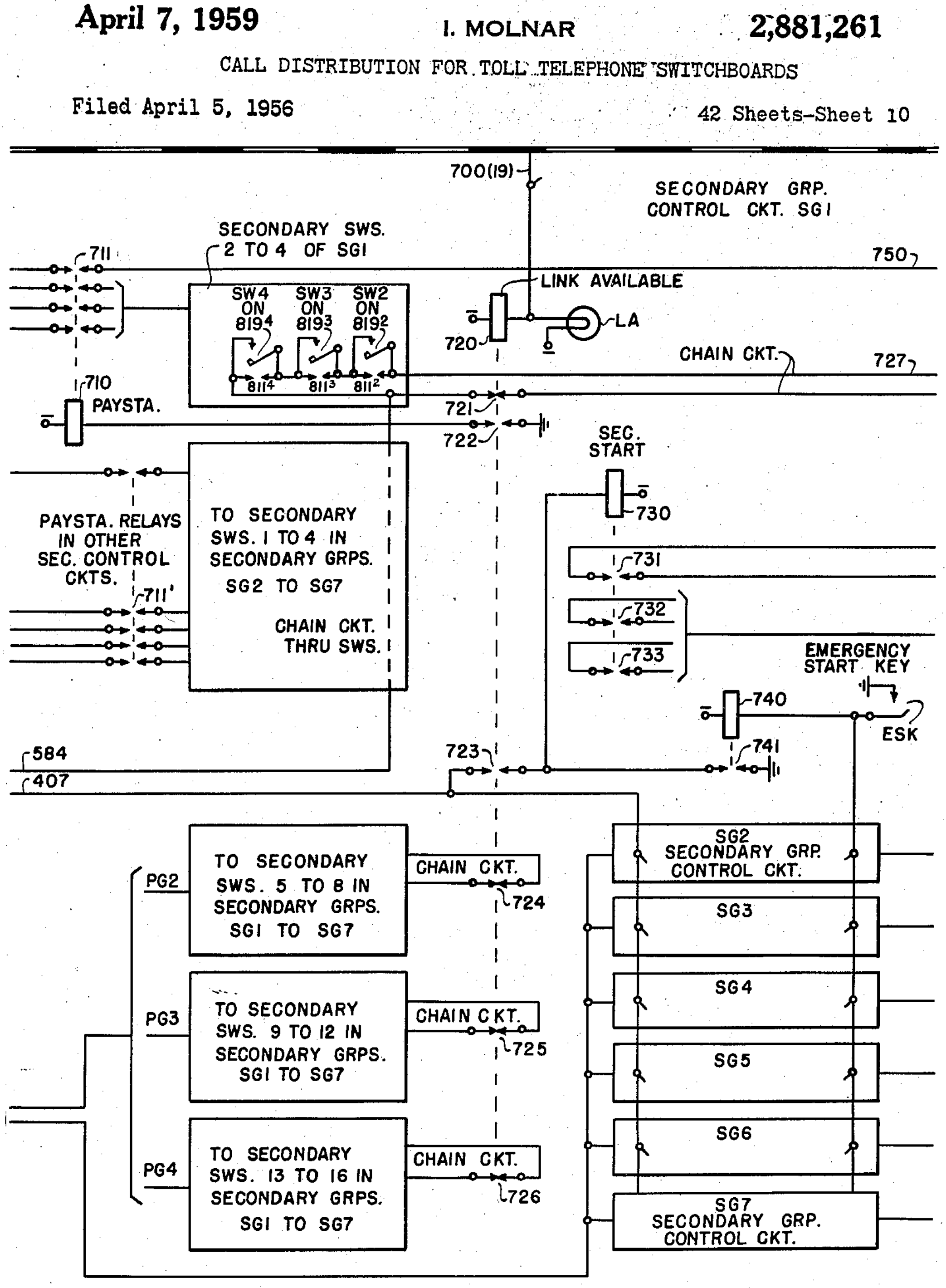

There are four secondary switch chain circuits, one for each primary group control circuit diagrammatically shown in Fig. 7. The first secondary switch chain circuit for the first primary group control circuit includes the secondary switches 1 to 4, inclusive, in all seven secondary groups SG1 to SG7; the second secondary switch chain circuit for the second primary group control circuit includes the secondary switches 5 to 8, inclusive, in all seven secondary groups; the third chain circuit includes the secondary switches 9 to 12, inclusive, of all seven secondary groups; and the fourth chain circuit includes the secondary switches 13 to 16, inclusive, of all seven secondary groups. Each chain circuit controls the operation of a relay, such as relay 540, in its corresponding primary group control circuit when no idle links are available to the secondary switches of its respective chain circuit. Each chain circuit may be closed over one path by contacts of the link available relays, such as relay 720, in each of the seven secondary group control circuits when no links are available to the secondary switches. The first chain circuit extends from ground at the first switch of the chain, or switch SW1 of secondary group SG1, over a series circuit including normally closed contacts 721 of link available relay 720 of secondary group control circuit SG1, similar normally closed contacts of the similar link available relays (not shown) of the remaining secondary group control circuits SG2 to SG7, and over conductor 584 to relay 540. Contacts 724, 725 and 726 are contacts controlled by relay 720 for the second, third and fourth chain circuits; it being understood that each secondary group control circuit has a link available relay, similar to relay 720, which has similar contacts included in series connections in these chain circuits.

Each chain circuit is also divided into seven sections, each section including four secondary switches as indicated in Fig. 7. For example, the seven sections of the first chain circuit for the first primary group control circuit (PG1) includes the four switches 1 to 4, inclusive, of all secondary groups SG1 to SG7. The busy or idle condition of the secondary switches in each section also controls another path in the chain circuit, so that if all the switches in one section are busy, either in use in an established connection or artificially made busy, that section of the chain circuit is closed irrespective of the operated condition of the link available relay. When a secondary switch is busy in an established connection, contacts, such as contacts 811, of the hold relay (810) are closed; and when a secondary switch is made artificially busy the switch off normal contacts, such as ON819, are closed. By referring to the drawings it will be seen that the first section of the first chain circuit may be grounded over one path through normally closed contacts 721 of link available relay 720; and that this first section may also be grounded over the other path through a series circuit including contacts 811, or ON819, of secondary switch SW1 (Fig. 8), conductor 727, contacts $811^2$, or $ON819^2$, of secondary switch SW2, contacts $811^3$, or $ON819^3$, of secondary switch SW3, and contacts $811^4$, or $ON819^4$, of secondary switch SW4, irrespective of the closed or open condition of contacts 721. Similar circuits are provided for each section of each chain circuit. From the foregoing, it will be seen that these secondary chain circuits for controlling the relays, such as relay 540, of the primary group control circuits are each controlled over two paths in each section; one path by the link available relays, and the other path by the busy condition of the secondary switches in their respective sections.

The secondary switches 1 to 4, inclusive, of secondary group SG1 are included in the first section of the first chain circuit for the first primary group control circuit PG1 so that any trunk call from the first primary trunk group has success over these secondary switches to any link 1 at any position. The secondary switches 5 to 8, inclusive, of secondary group SG1 are included in the first section of the second chain circuit for the second primary group control circuit PG2 so that any trunk call from the second primary trunk group has access over these secondary switches to any link 1 of any position. The secondary switches 9 to 12, inclusive, of secondary group SG1 are included in the first section of the third chain circuit for the third primary group control circuit PG3 so that any trunk call from the third primary trunk group has access over these secondary switches to any link 1 of any position. The secondary switches 13 to 16, inclusive, of secondary group SG1 are included in the first section of the fourth chain circuit for the fourth primary group control circuit PG4 so that any trunk call from the fourth primary trunk group has access over these switches to any link 1 of any position. Secondary switches of secondary group SG2 are included in the second sections of these secondary chain circuits in a similar manner so that any trunk call from any primary trunk group has access over these secondary switches to any link 2 of any position. In a similar manner the secondary switches of the third, fourth, fifth, sixth, and seventh secondary groups are included in their respective sections of these secondary chain circuits so that any trunk call from any primary trunk group has access over these secondary switches to links 3, 4, 5, 6 or 7 of any position.

The link available relay; such as 720, associated with each section of a chain circuit, and the busy condition of the secondary switches associated with each section of a chain circuit, control the "no link available" relays, such as 540, in the primary group control circuits. Relays, such as relay 540, initiate the closing of the gate control circuits for the primary trunk groups in a manner to be described more fully hereinafter.

Each secondary group control circuit has a secondary start relay 730, which is controlled by its associated link available relay 720 at contacts 723, to close start circuits for its group of secondary switches when no direct primary paths are available to idle links. The closure of these start circuits cause the secondary switches to preselect the idle links. When secondary switches preselect idle links, marking wipers 855 extend stopping battery from the preselected links over conductors, such as conductor 750, and over contacts, such as contacts 711 and 619, to conductors, such as conductor 2293, terminating in secondary access bank contacts in the primary trunk switches, thereby enabling the primary switches to select idle preselected links through secondary switches.

The groups of secondary switches, which do not have their link available relays 720 operated, are not operated because the circuits to the start relays 730 for these groups of secondary switches are open at contacts, such as contacts 723. For example, if a single link, say link 3 of any position, was the only available idle link then the link available relay 720 of secondary group control circuit SG3 would be the only link available relay operated with the result that only start relay 730 of secondary group control circuit SG3 would be operated and only the secondary switches of group SG3 would be operated to preselect this idle link 3.

Fig. 9 discloses the detail circuits of the TX group control circuit TX–1 for controlling the distribution of incoming TX trunk calls to TX station 112 comprising three operator positions. The TX group control circuits TX–2 and TX–3 for controlling the distribution of TX trunk calls to TX stations 113 and 114 are illustrated by rectangles and are similar to TX group control circuit TX–1. TX control leads, such as TX501, TX503 and TX581 extend from each TX group control circuit and terminate in the respective TX trunk groups. Other control conductors, such as conductors 1548, 1691 and 1690, connect the TX group control circuit to the TX operator positions. One of the TX operator positions is a universal TX position and is capable of handling all incoming TX calls when the night transfer key NTF is operated. The operation of the night transfer key NTF operates relays, such as relay 980, which close the marking CR leads from the banks of the TX trunk primary line switches to the links of the universal TX position so that all TX trunk calls are handled by the universal TX position when the other TX positions are not staffed. An emergency key TXEK is also provided for controlling relay 910 which disables the gate control circuits of the TX group control circuits.

Figure 10:
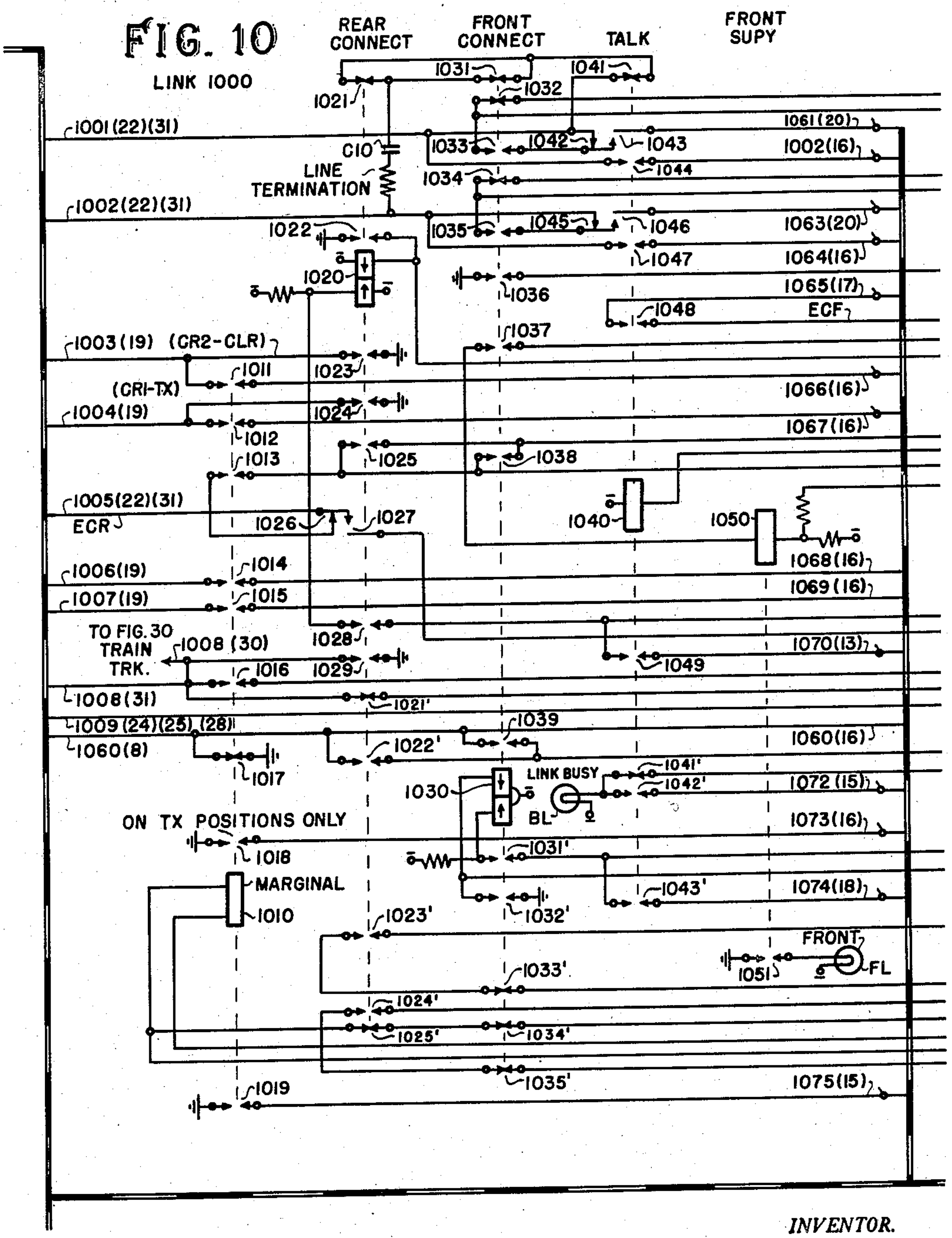
Figure 11:
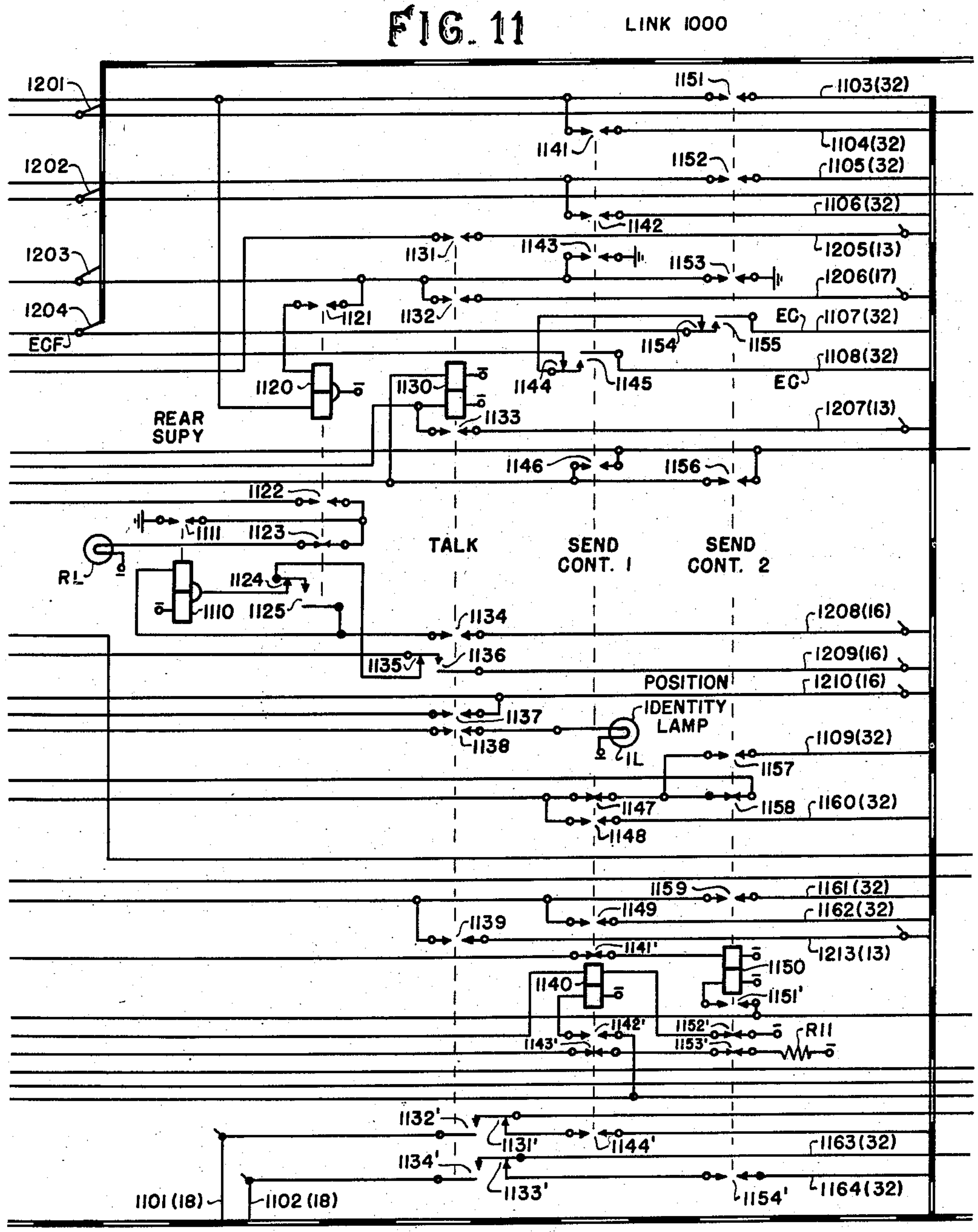
Figure 12:
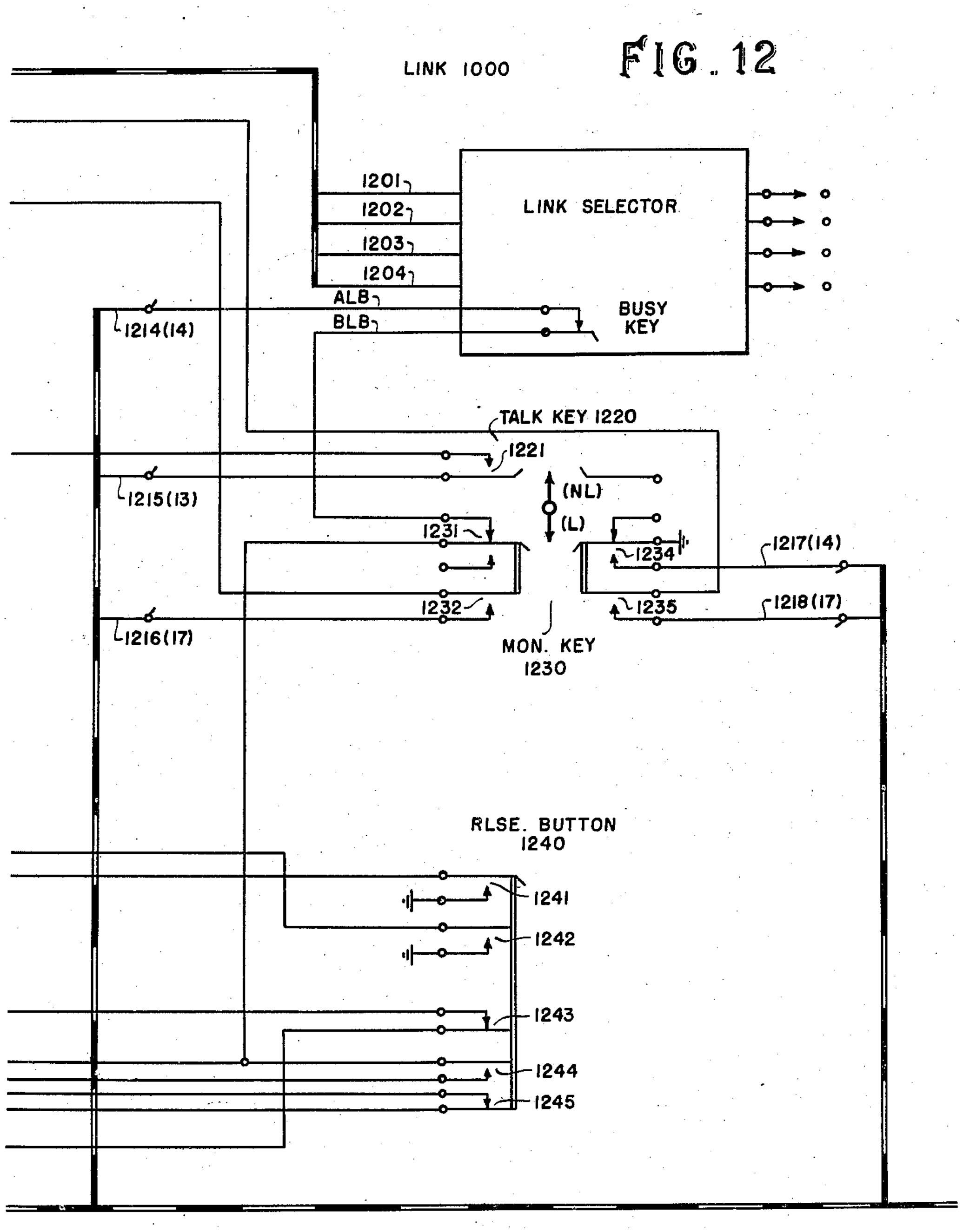

Figs. 10, 11 and 12 illustrate one of the plurality of links at each operator position to enable the operator thereat to receive calls over the rear and to extend calls over the front to the link selector 1200. Each link is provided with a talk key 1221 which may be actuated to cause the position equipment to be connected thereto. Each link is provided with a monitor key 1230 to enable the operator to monitor a connection, and each link is also provided with a release key 1240 to enable the operator to release a connection established through the link circuit.

Figure 17:
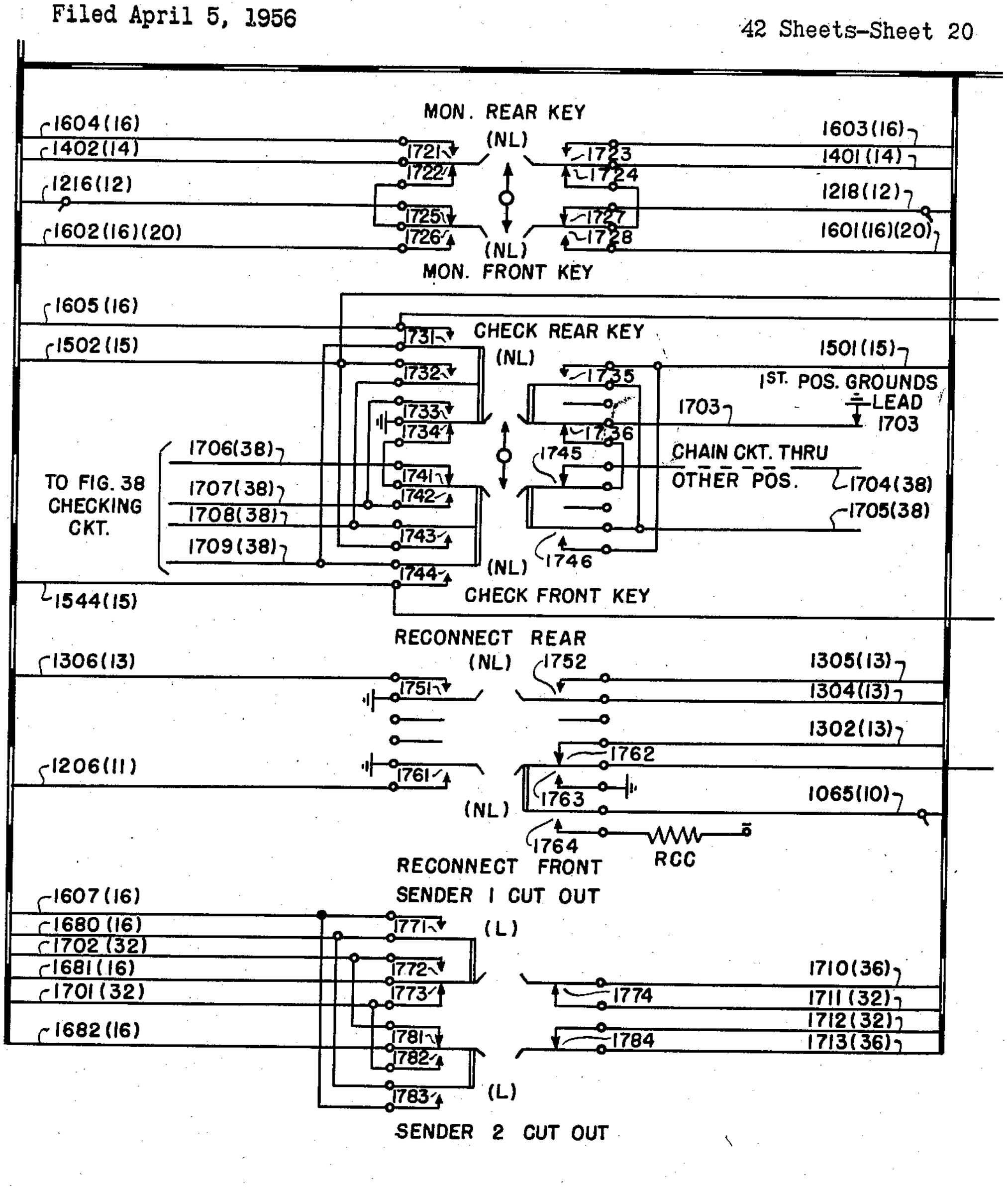
Figure 18:
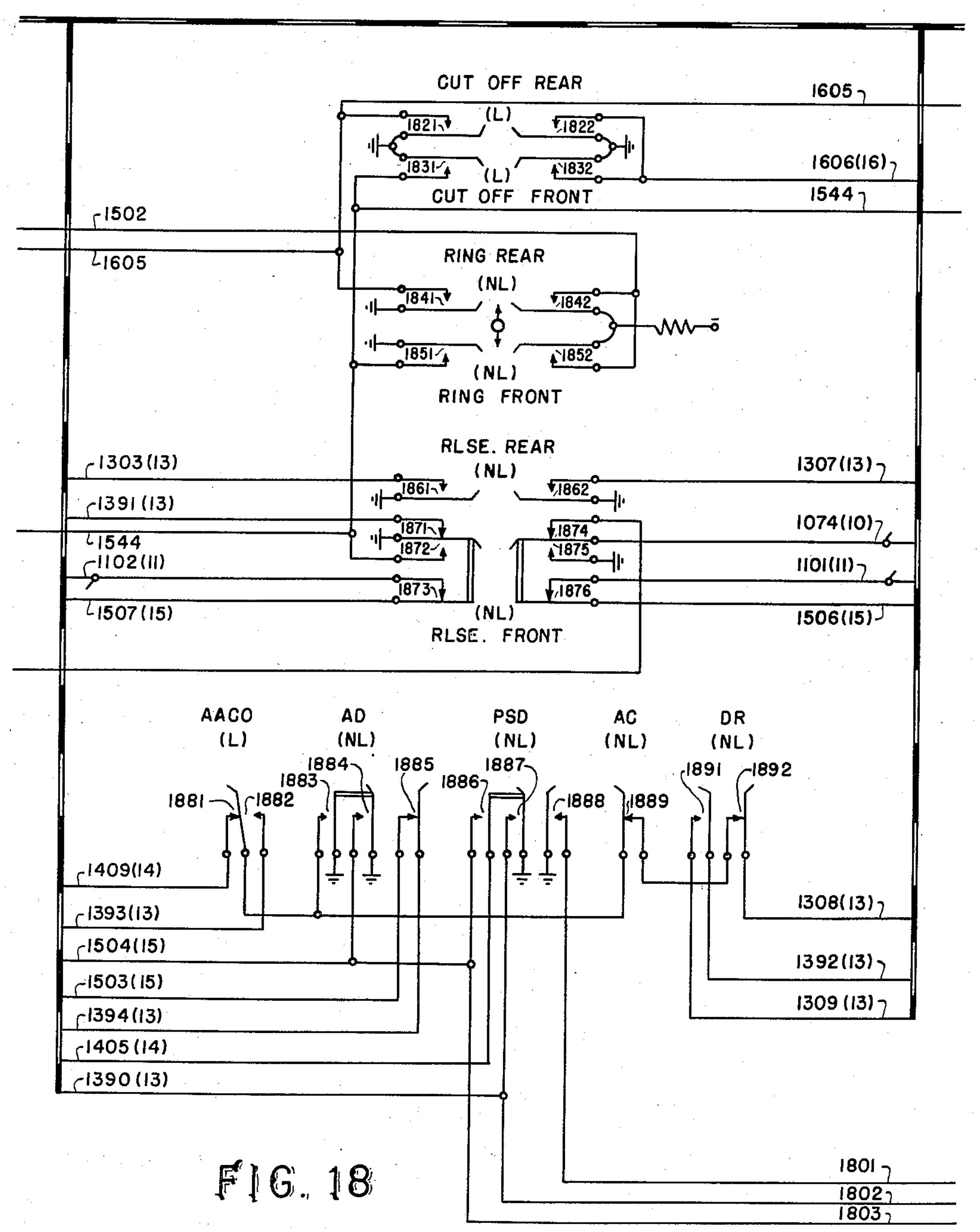
Figure 19:
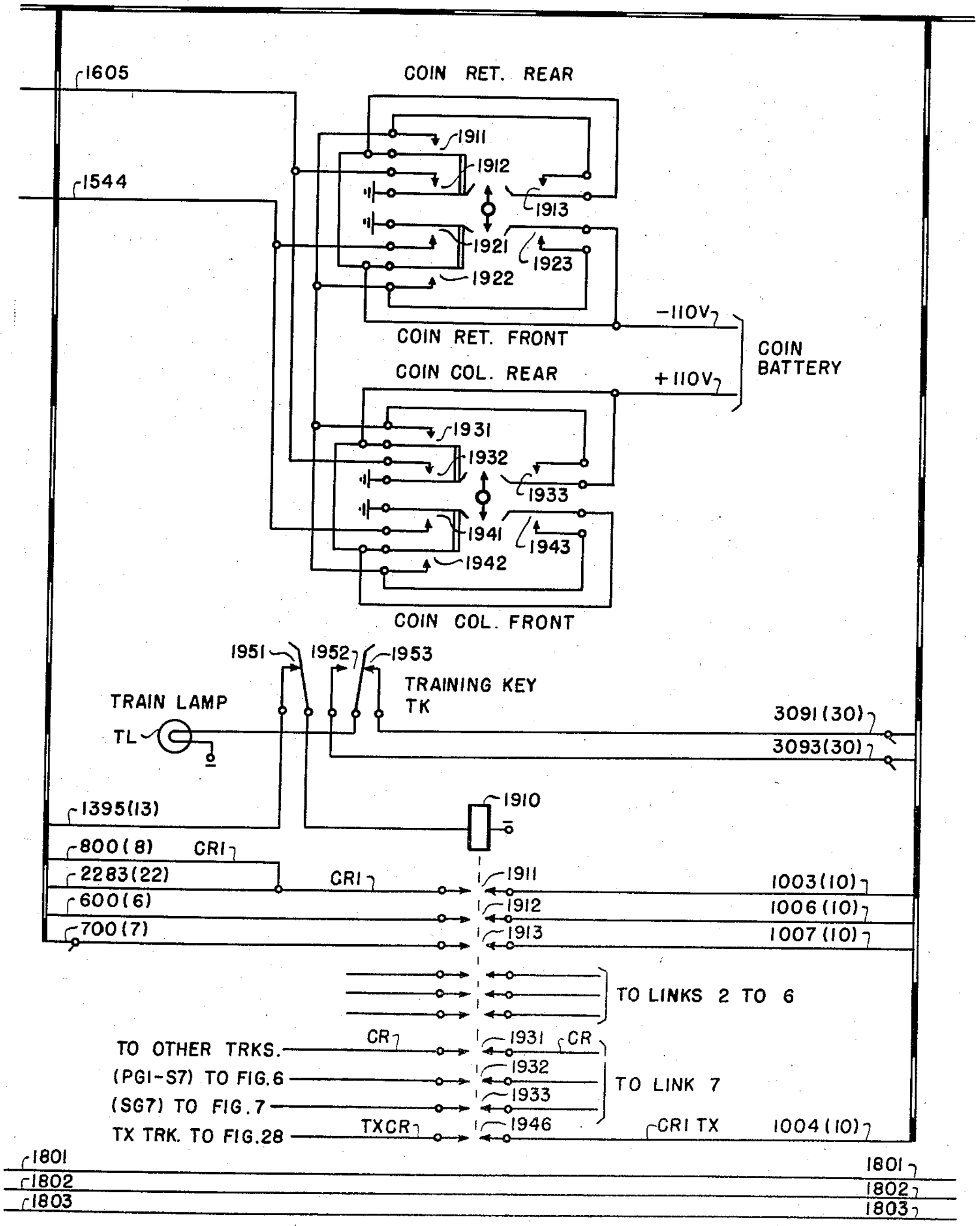
Figure 20:
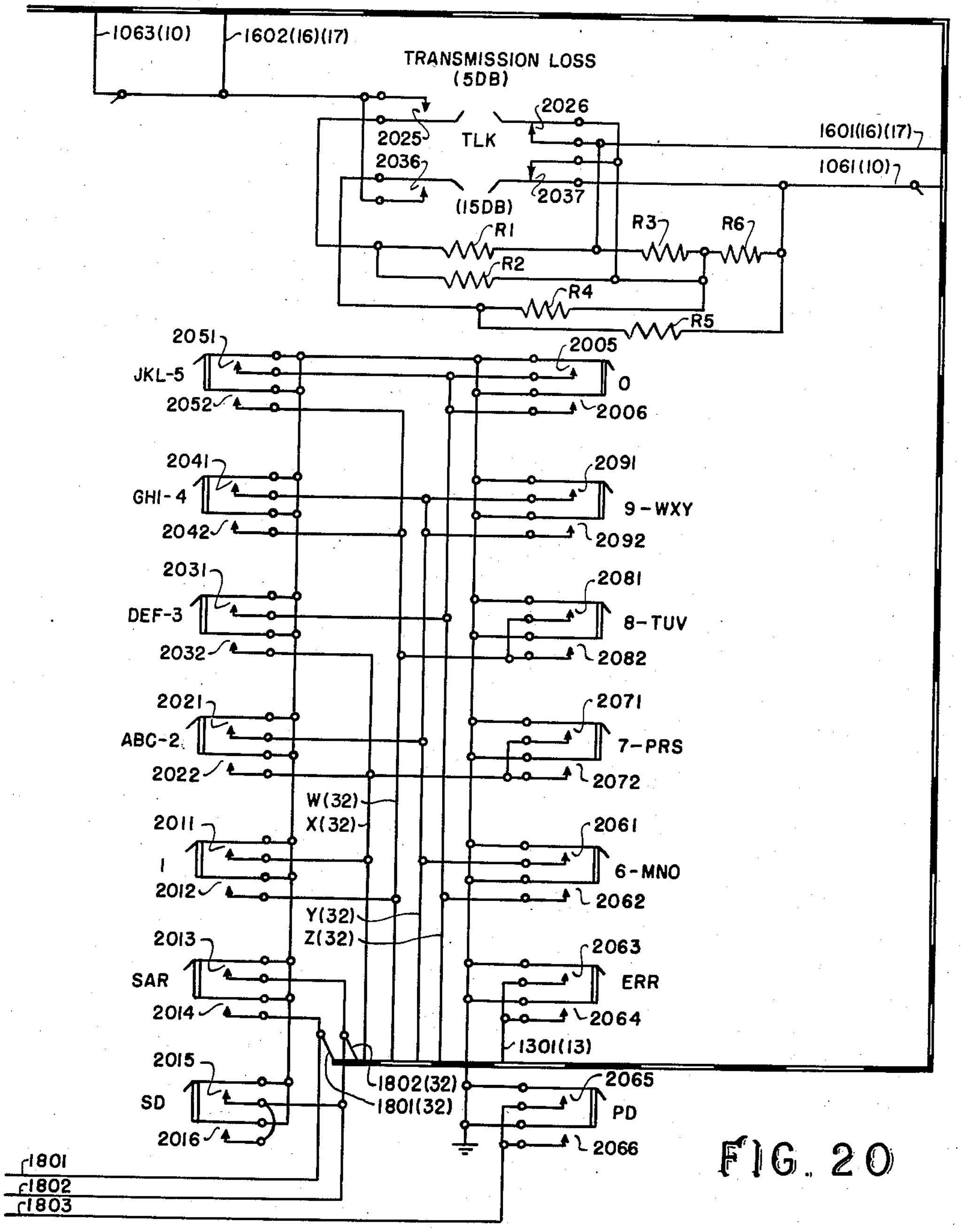

Figs. 13 to 20, inclusive, disclose one of the operator positions 1300 and includes relays and apparatus common to all the links 1000 at such a position. Each position includes a digit key set, for controlling the registration of keyed digits in a sender 3400, and a plurality of other keys and buttons for controlling various desired operations. In addition certain of the operator positions are provided with a training key TK and a gang relay 1910 which enables the position to be used for regular service when key TK is operated to control relay 1910 as shown in Fig. 19. Gang relay 1910, when operated, controls marking and control circuits to permit the position to handle regular service. When the training key TK is restored, the circuit to gang relay 1910 is opened and the position is then available for use only as a trainee or a teacher position. A transmission loss key TLK is shown in Fig. 20 to enable the operator at the teacher position to insert various decible losses so that a trainee operator can observe such effects on the transmission circuit.

Figure 21:
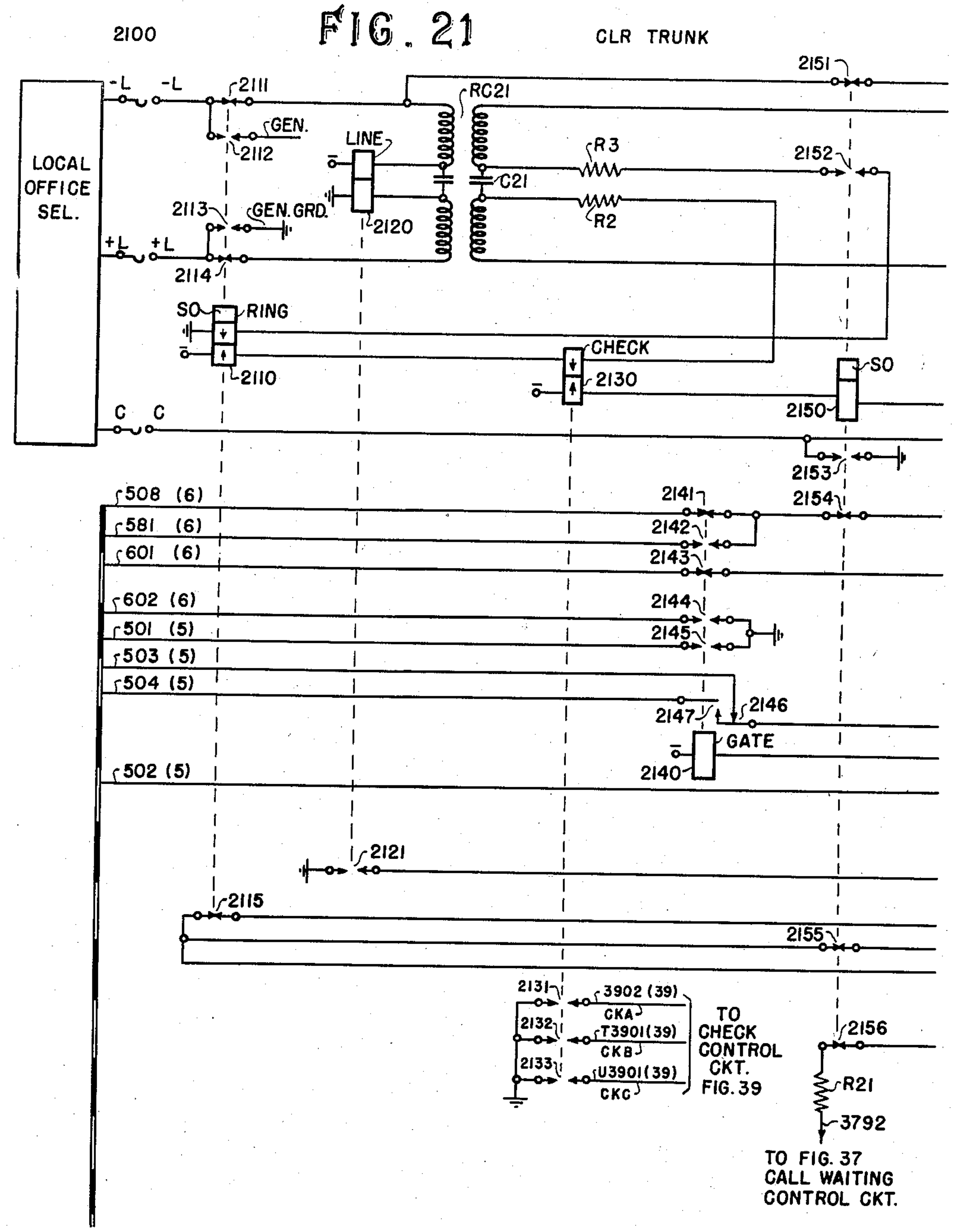
Figure 22:
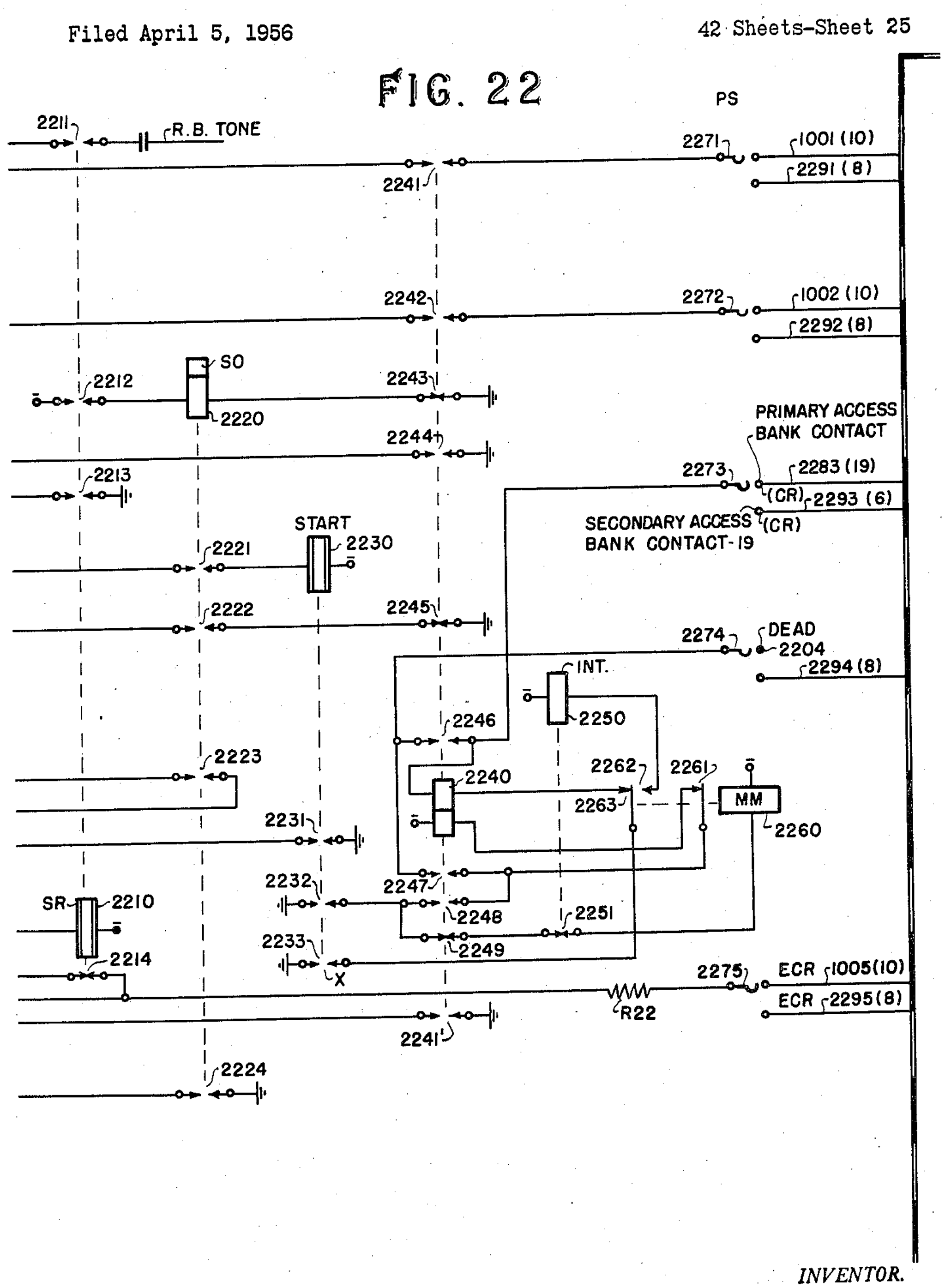

Figs. 21 and 22 disclose the detail circuits of one of the regular CLR trunks 2100 which are seized over the local office selectors. Each CLR trunk has a primary rotary line switch PS which has access to the various operator links over two paths, one a direct primary path from some of its bank contacts direct to some of the links, and second, a secondary path through the remainder of its bank contacts to secondary rotary line switches SS and thence to any one of the links at all operator positions. Each trunk is also connected over start and control conductors to the call distribution group control circuits as previously described. In addition, each trunk is connected to trunk checking circuit shown in Figs. 38 and 39 to enable the operator to determine the group and trunk number of each trunk in response to a trunk checking operation. Each trunk is also connected to a call waiting control circuit which enables a supervisory operator to determine if enough operators are on duty to properly handle the number of trunk calls waiting service.

Figure 23:
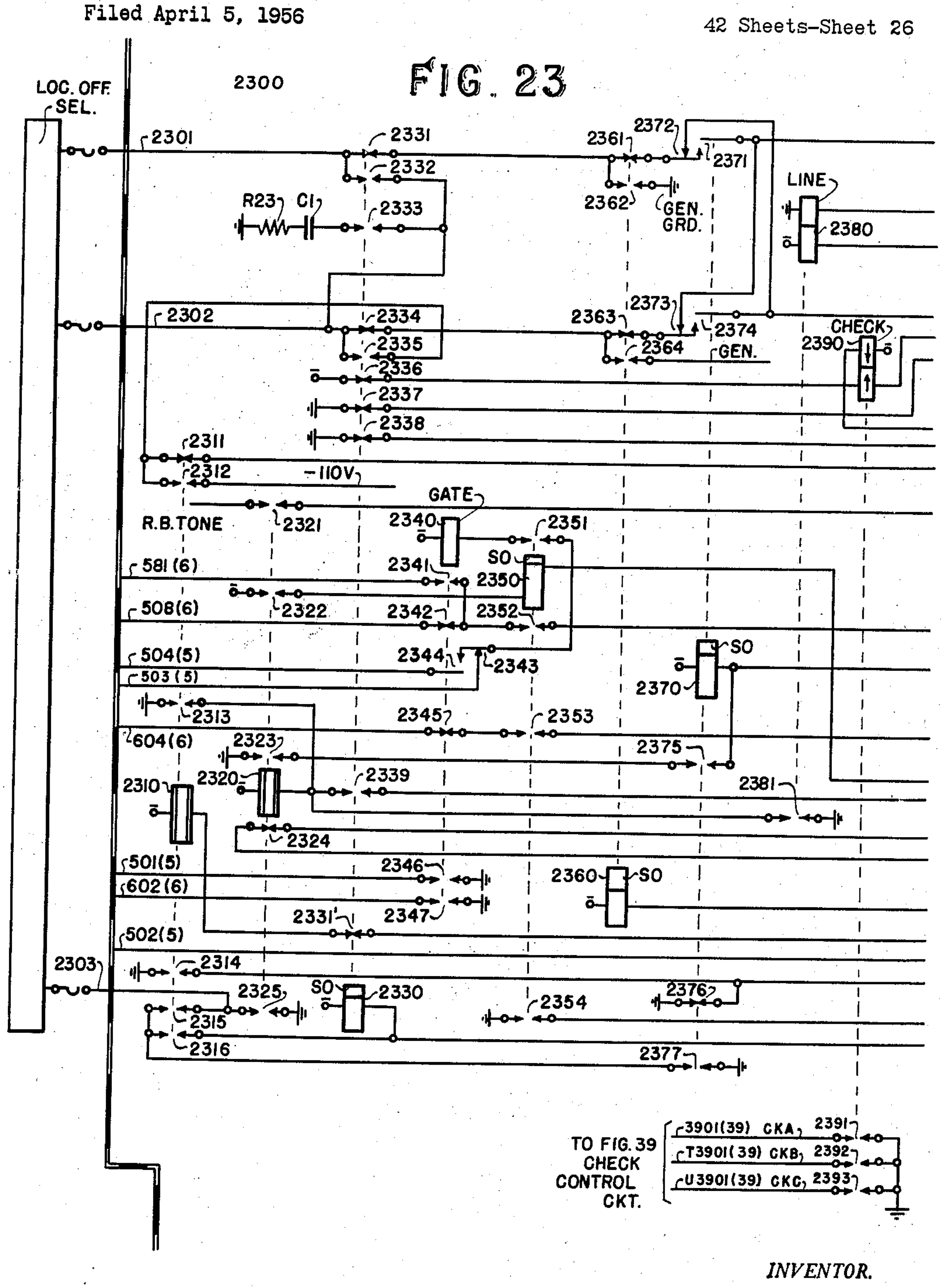
Figure 24:
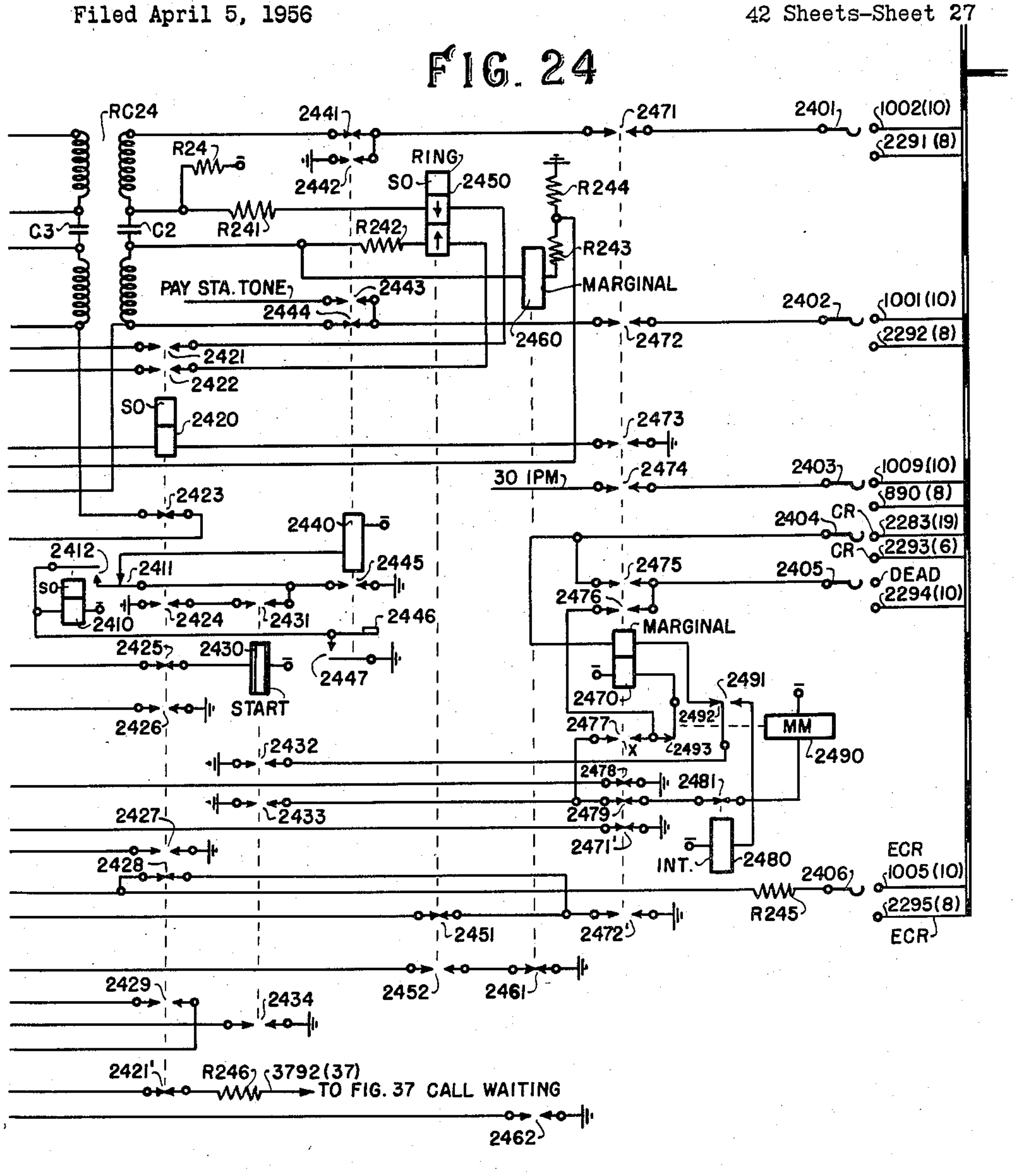

Figs. 23 and 24 disclose the detail circuits of one of the CLR paystation trunks 2300 which are seized over local office selectors from calling paystations and is connected in a manner similar to that described for regular CLR trunks.

Figure 25:
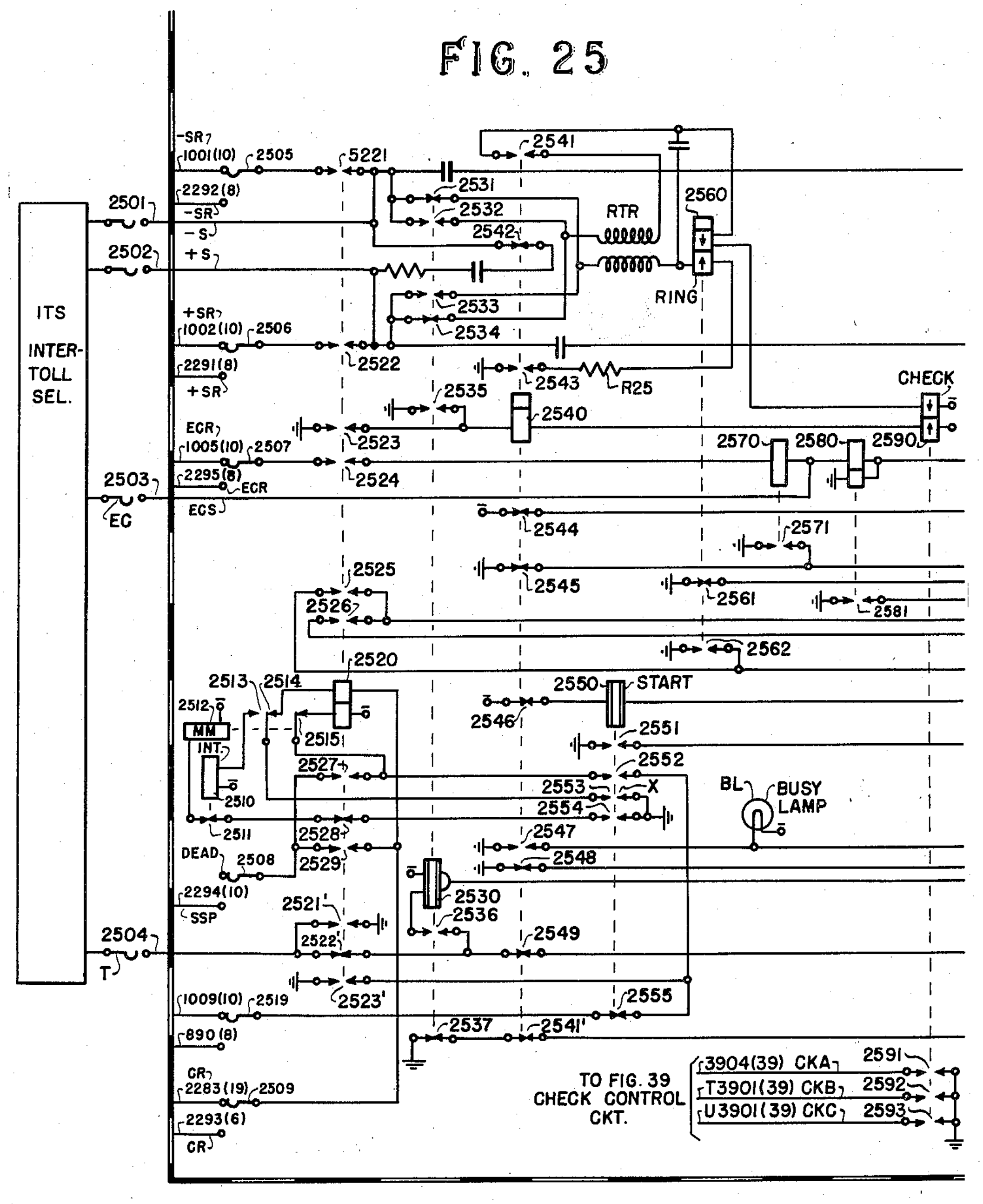
Figure 26:
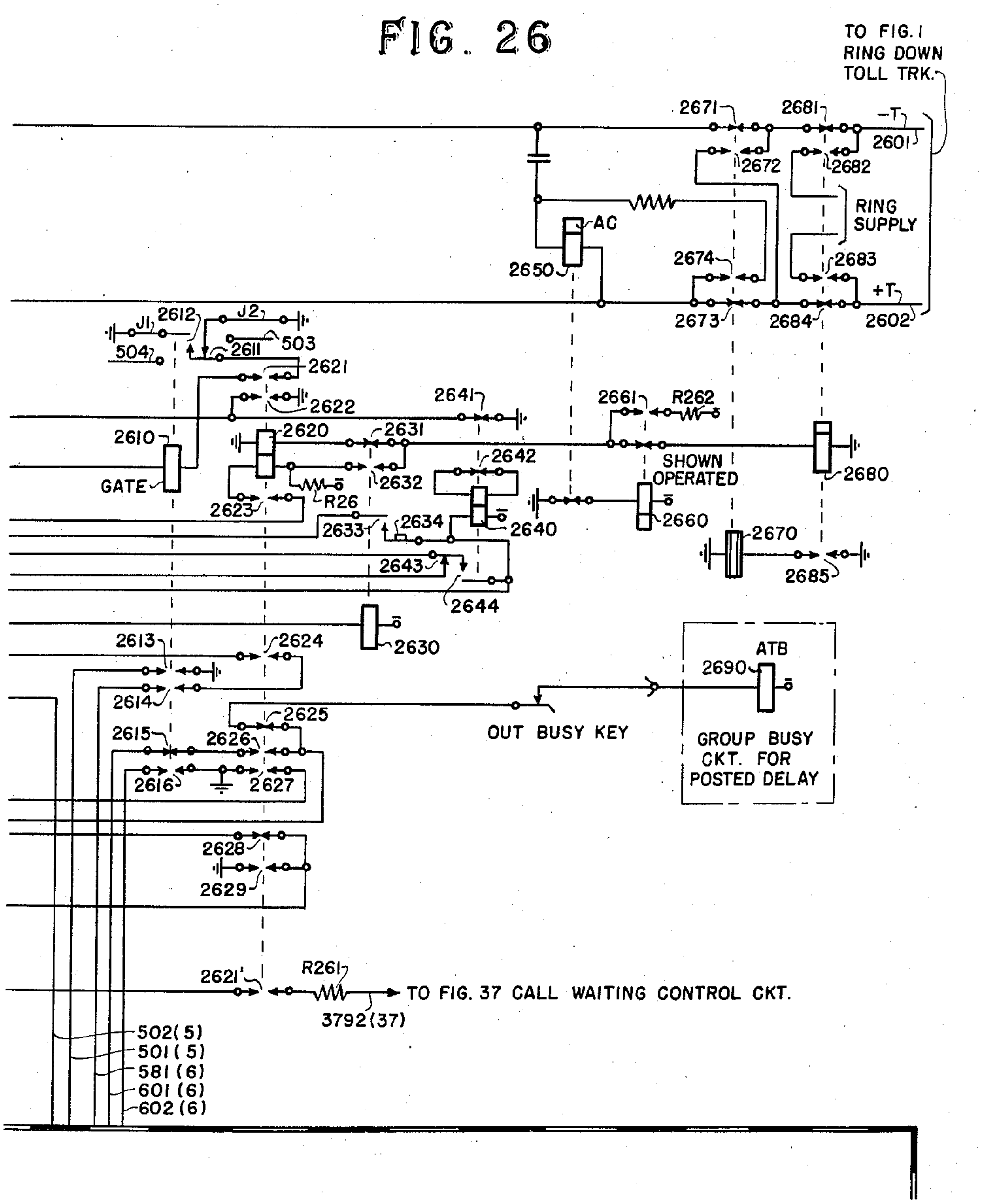

Figs. 25 and 26 disclose the detail circuits of one of the two-way ring-down toll trunks 2500 which is seized for outgoing calls from the banks of the inter-toll selectors ITS and which is seized on incoming calls from the manual exchange over the two conductors 2601 and 2602. On incoming calls the various operator links are seized by the associated primary line switch PS over direct primary or secondary paths under control of the call distribution control circuits.

Figure 27:
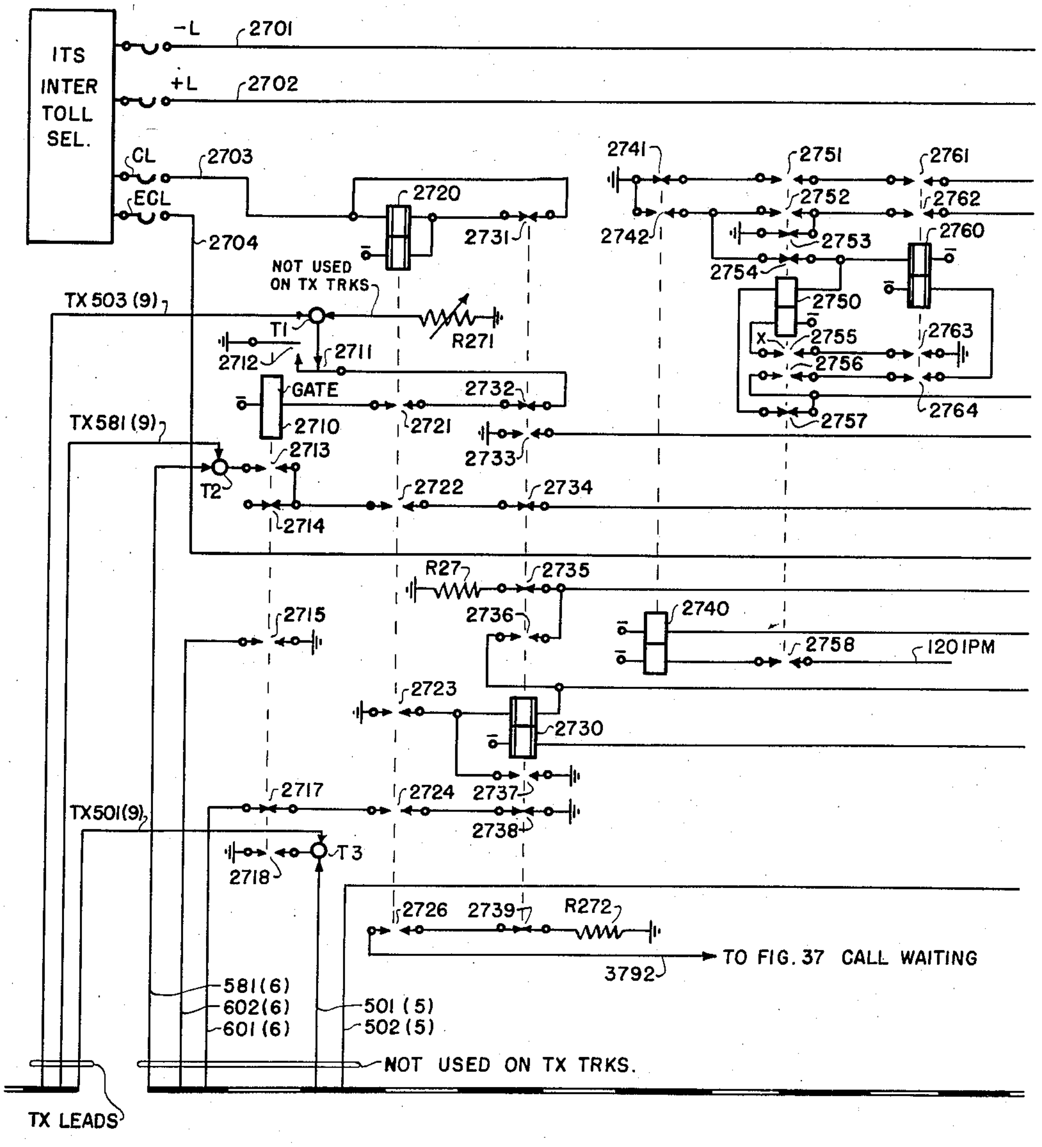
Figure 28:
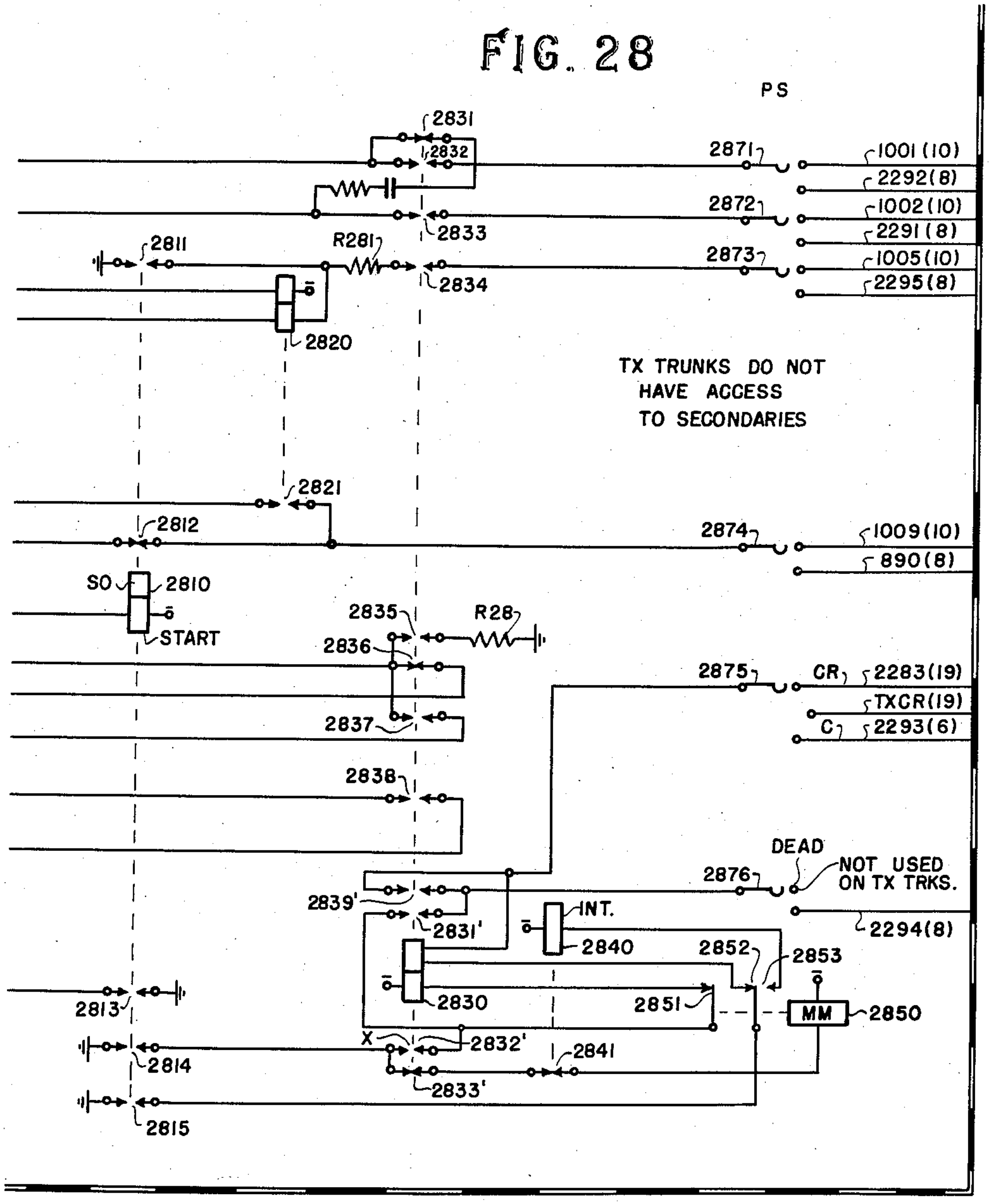

Figs. 27 and 28 disclose the detail circuits of one of the inward operator trunks 2700 and one of the TX trunks 2700–A. These trunks are seized over the inter-toll selectors ITS and each have a primary rotary line switch PS. The primary line switches of the inward operator trunks 2700 have both primary and secondary access to the operator positions; while the primary line switches of TX trunks 2700–A have only primary access to the TX operator positions. The inward operator trunks 2700 are connected to the call distribution group control circuits 400 for controlling the distribution of calls to the operator positions, while the TX trunks 2700–A are connected to the TX call distribution group control circuits 900 for controlling the distribution of TX toll calls to the TX operator positions.

Figure 29:
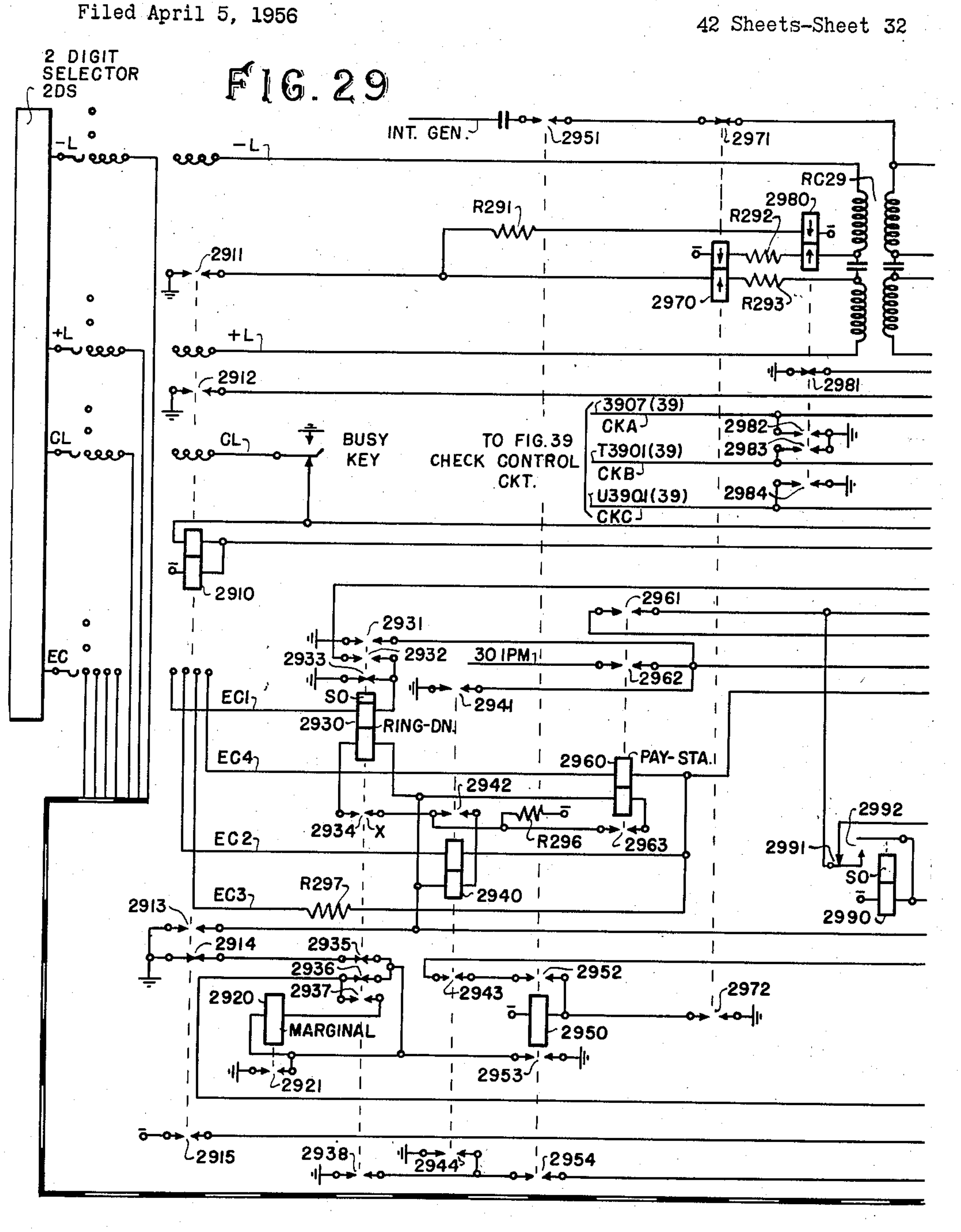
Figure 30:
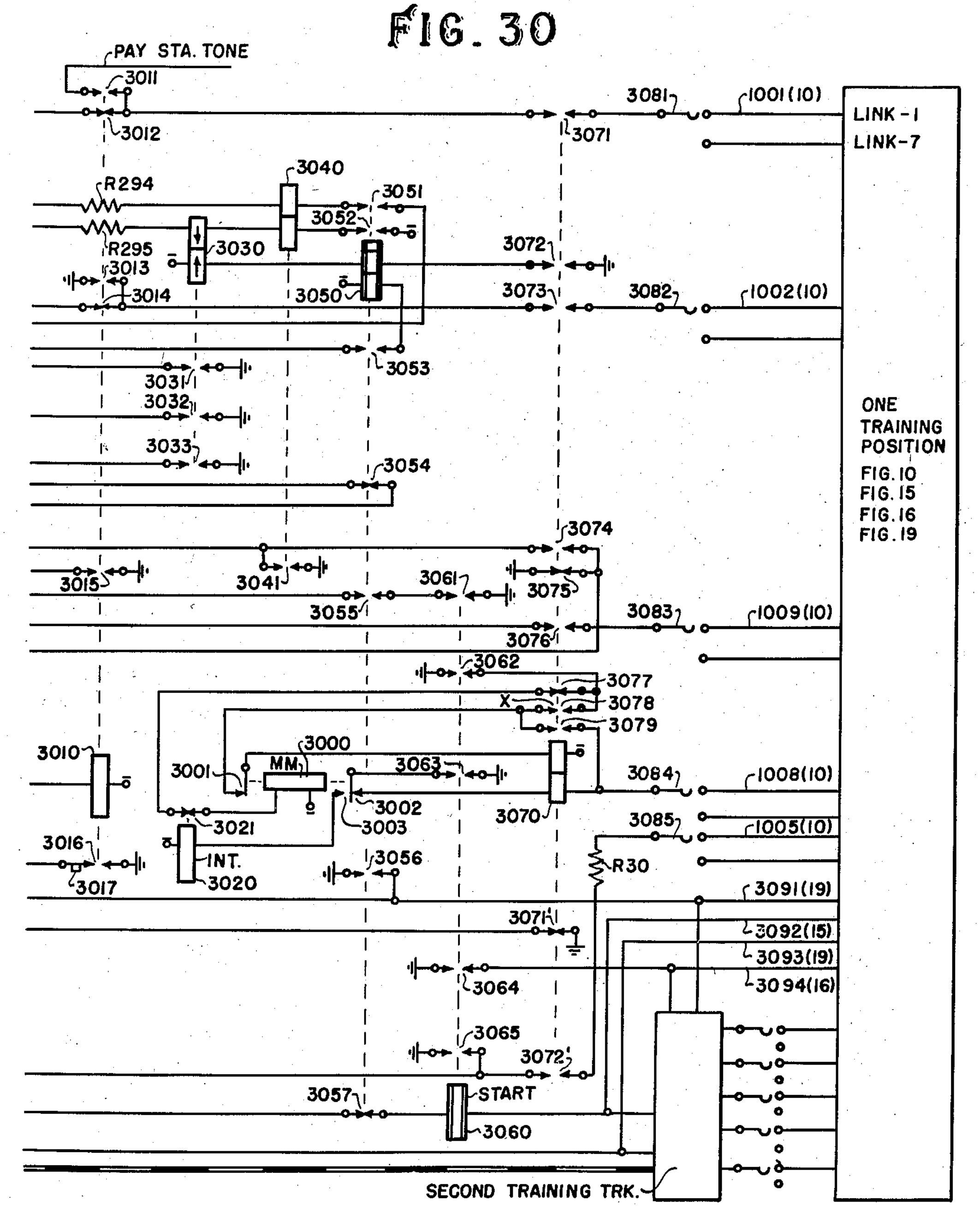

Figs. 29 and 30 disclose one of the training trunks 2900 which is seized over the banks of a two-digit selector 2DS and which has access to the training positions over rotary line switches. These line switches are operated to seize marked links at either one of the trainee or teacher positions.

Figure 31:
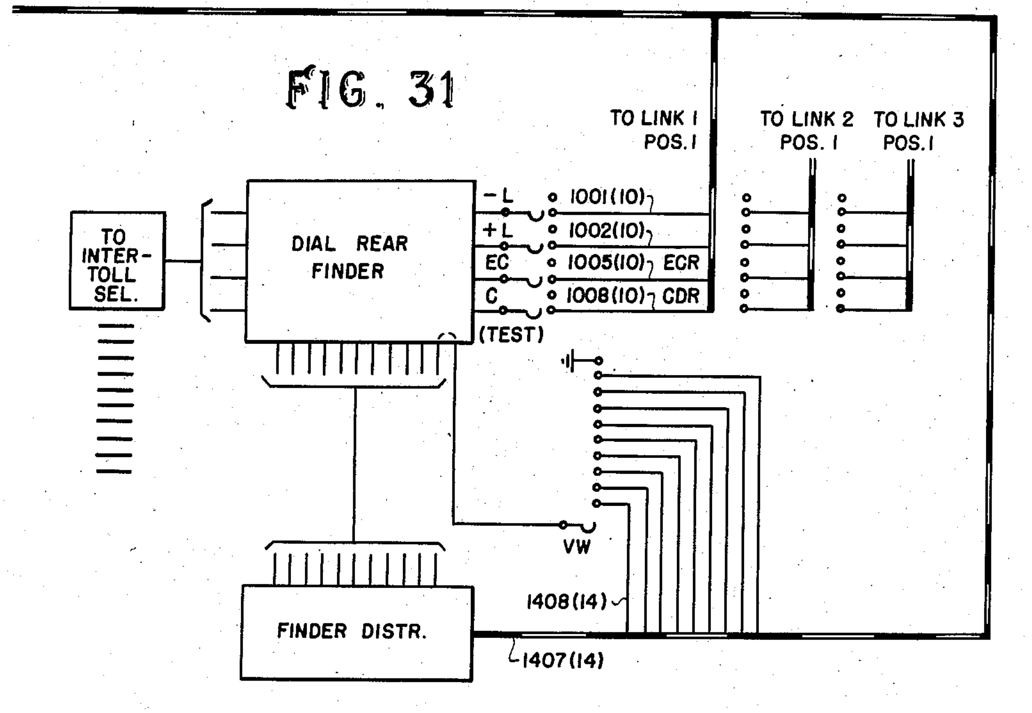

Fig. 31 diagrammatically discloses a dial rear finder which is a vertical and rotary Strowger step-by-step switch of the well-known type, having wipers which are first moved in a vertical direction and then in a rotary direction to find an idle marked link. The banks of this finder are divided into ten levels with ten bank contacts in each level. Each level is assigned to a particular one operator position and each bank contact in that level is individual to one of the links at that operator position. A finder distributor is associated with a plurality of these dial rear finders to control these finders to find an idle marked link at an operator position. Each operator position is provided with a common start conductor, such as conductor 1407, which terminates in the finder distributor to start an idle one of the dial rear finders, and each operator position is provided with an individual vertical level marking conductor, such as 1408, to mark the level in which the links of this operator position terminate. Each link is individually connected by a pair of talking conductors, such as 1001 and 1002, a pulsing and supervisory conductor, such as conductor 1005 (ECR), and a test or marking conductor, such as conductor 1008 (CDR), to a set of bank contacts. Each marking conductor, such as conductor 1008, is marked with battery potential when its individual link is to be used in a dial rear operation. When an operator wishes to perform a dial rear operation, conductors 1407 and 1408 are grounded and one or all idle links at this operator connects battery potential to conductors 1008.

Grounding conductor 1407 initiates the vertical operation of an idle finder in a well-known manner. When the vertical wiper VW encounters the vertical bank contact marked over conductor 1408, the vertical movement stops and the wipers are then rotated into this level until the C, or test, wiper finds an individual link bank contact marked with battery potential. When the marked link is found, the wipers stop and the finder then switches through in the well-known manner to connect the link to the associated inter-toll selector.

Figure 32:
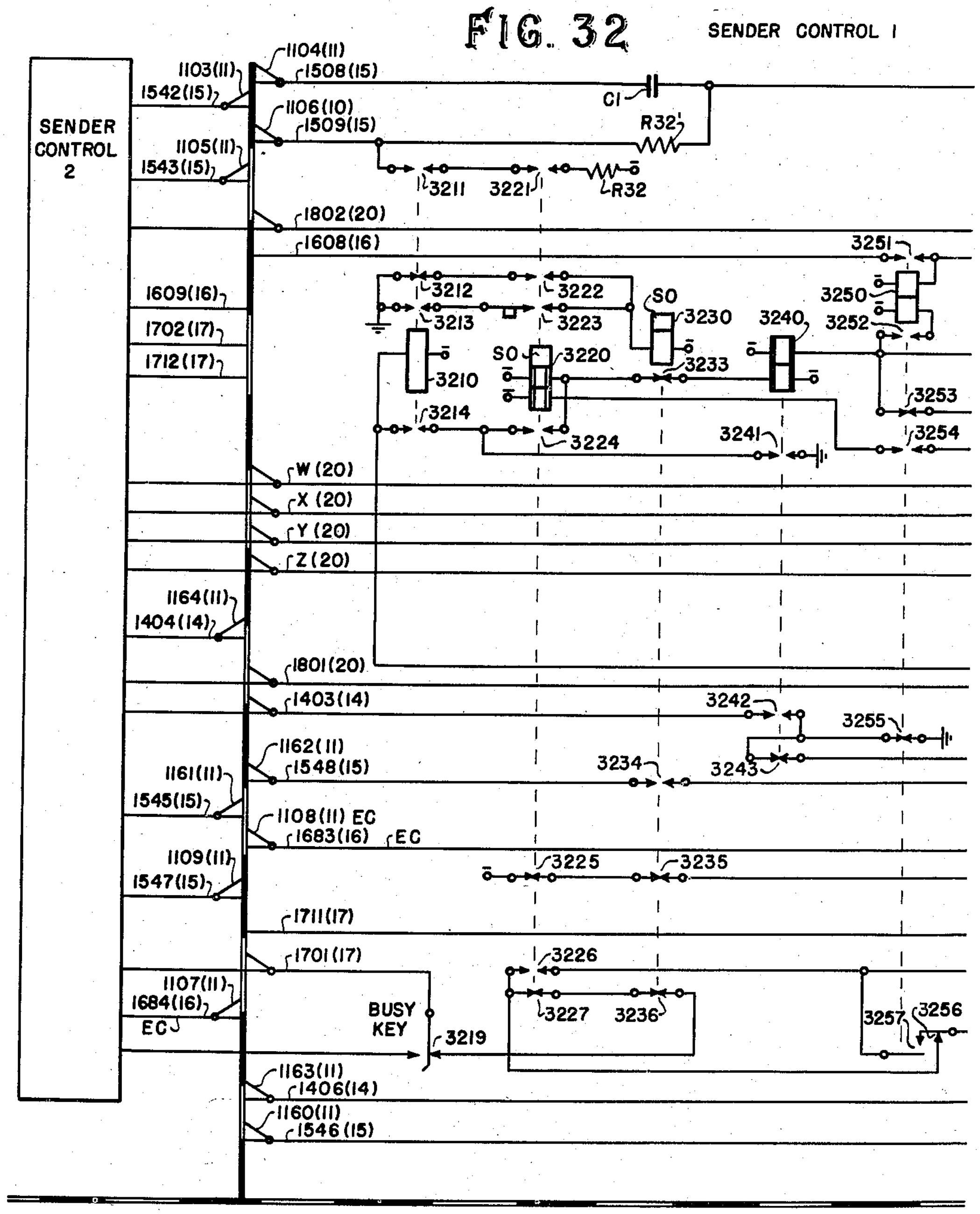
Figure 33:
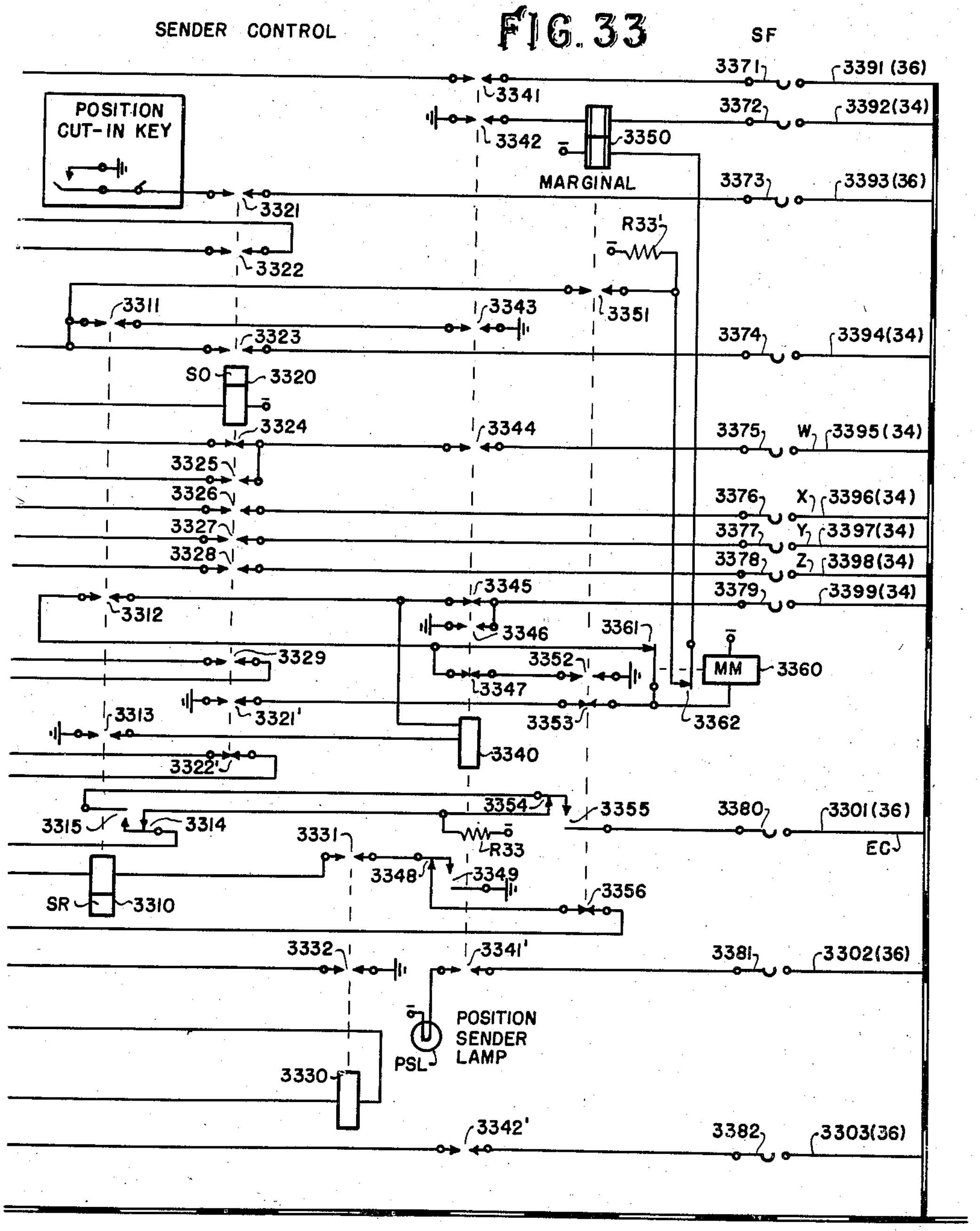

Figs. 32 and 33 show one of the sender control circuits 3200 which may be automatically associated with the link selector 1200 or, in the case of a dial rear connection, with the dial rear finder through the operator's position. Seizure of a sender control circuit causes the sender finder SF to connect an idle sender 3400 to the sender control circuit so that the operator may control the extension of a connection by way of the link selector 1200 or the dial rear finder.

Figure 34:
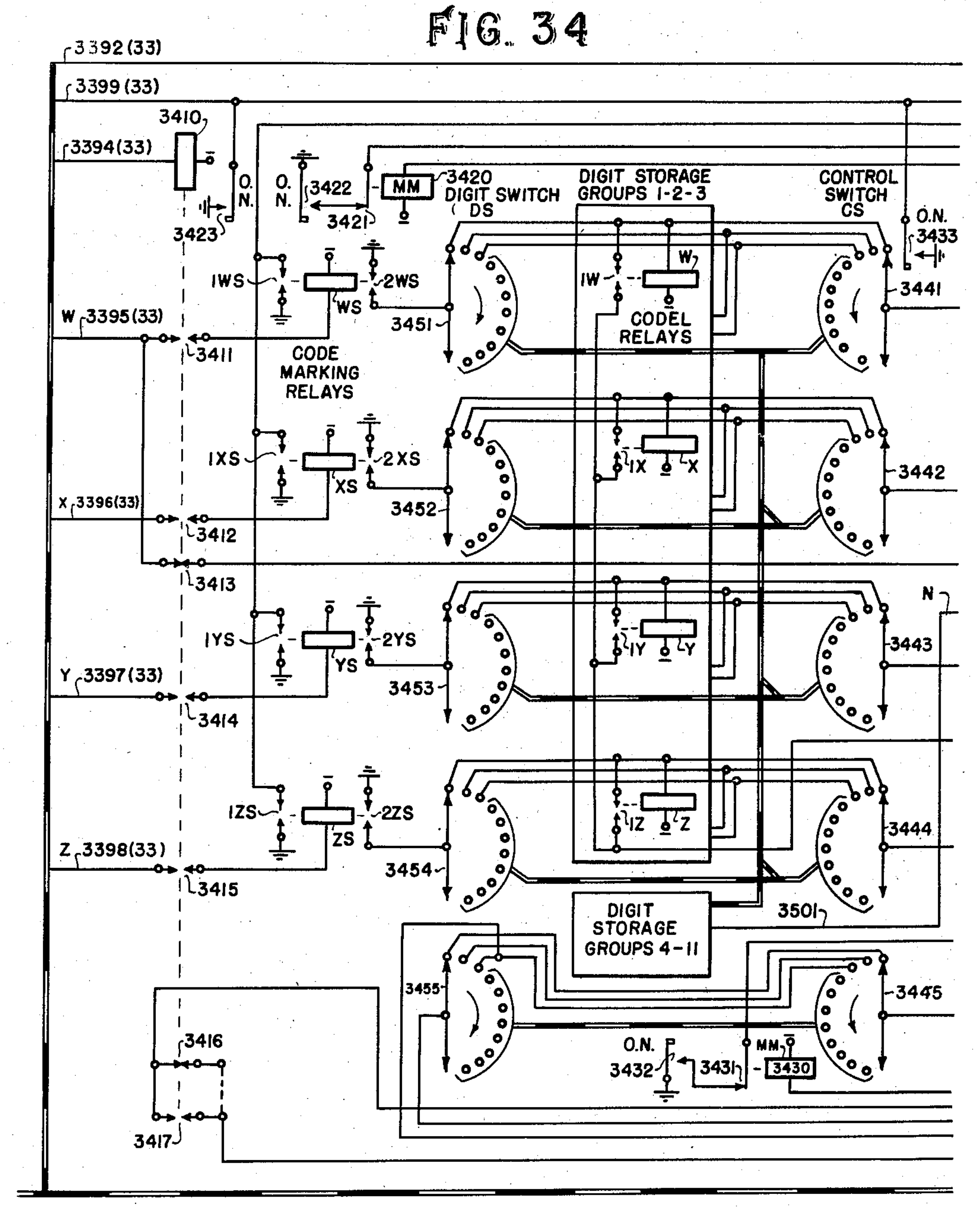
Figure 35:
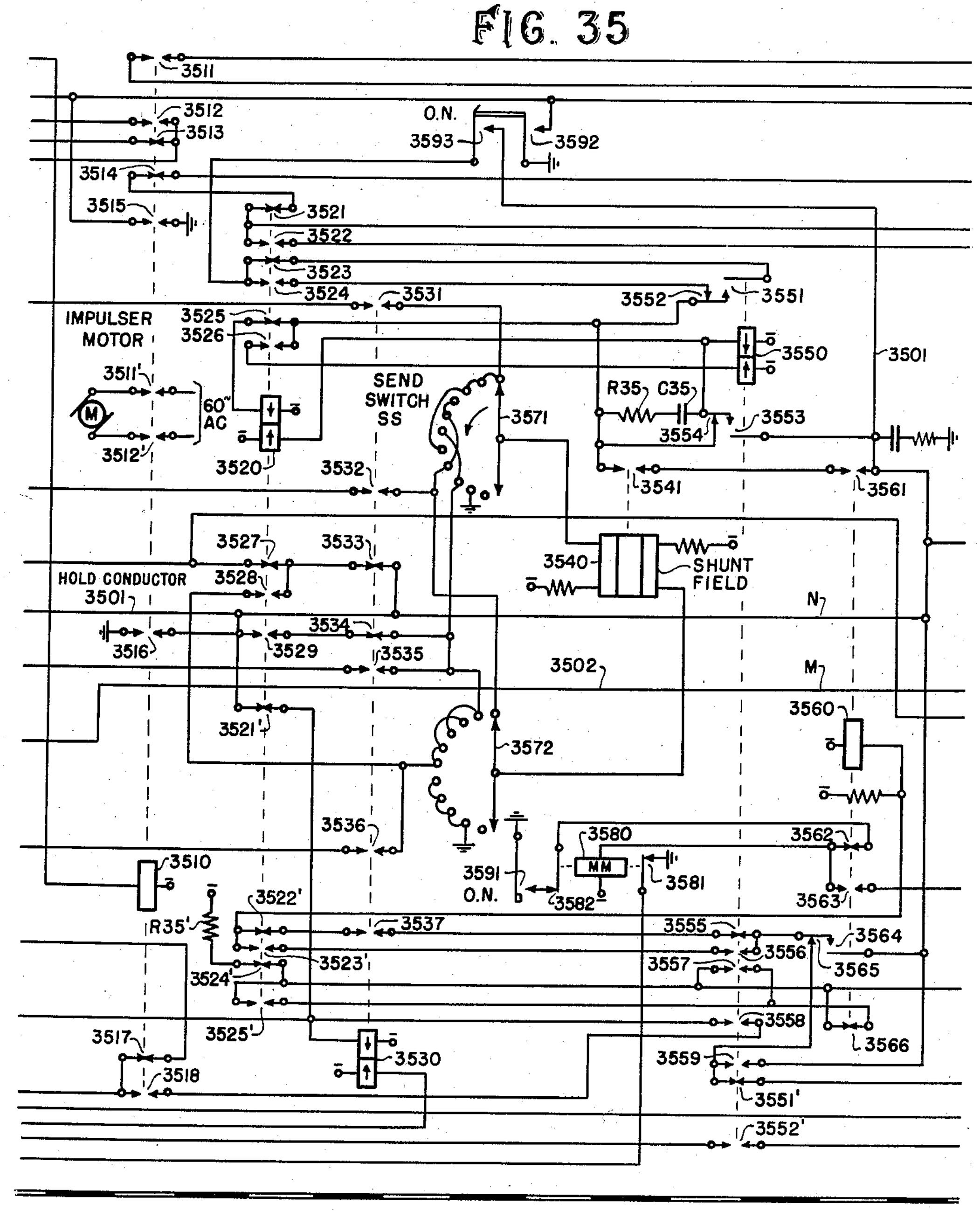
Figure 36:
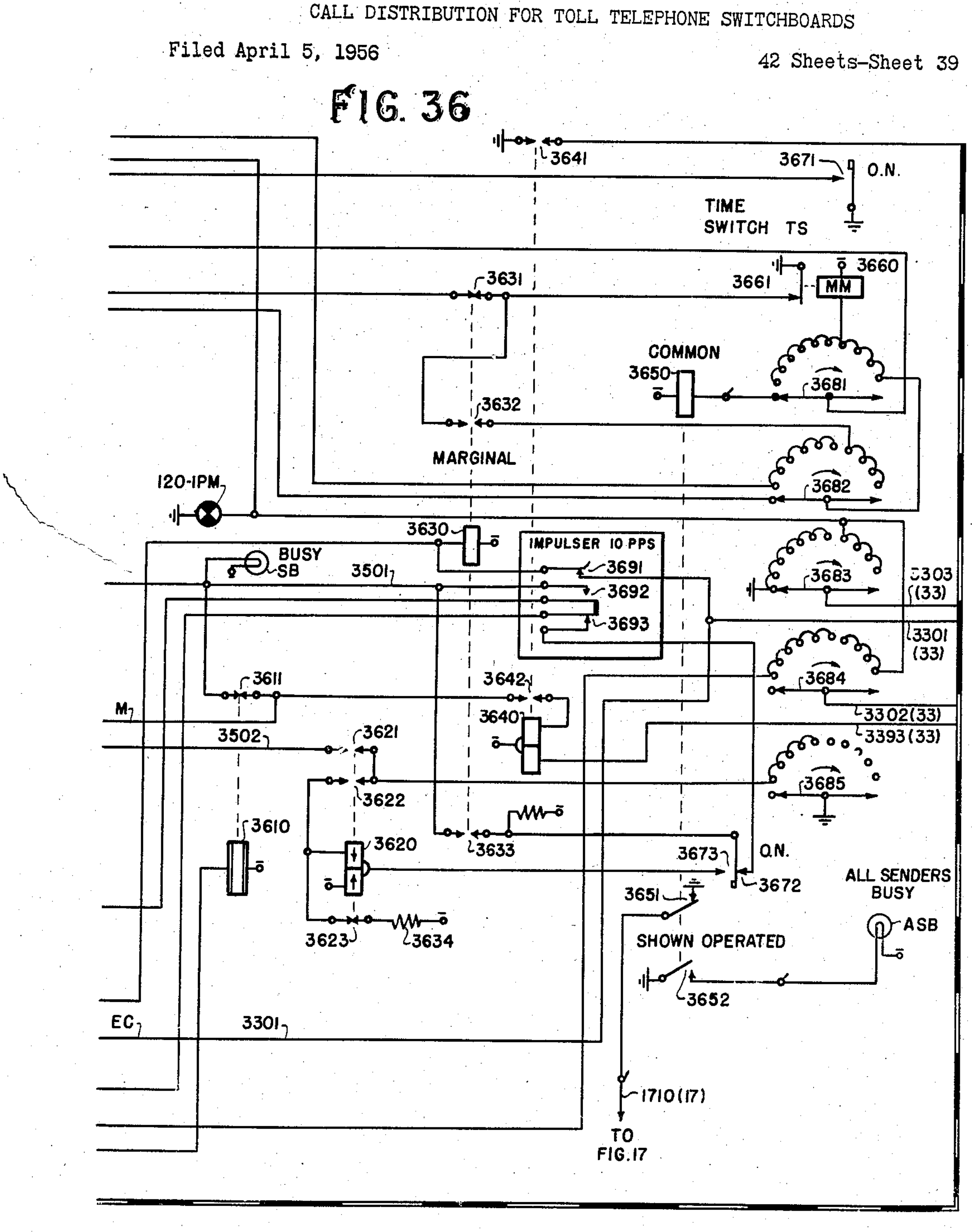

Figs. 34, 35 and 36 disclose the detail circuits of one of the senders 3400. Each sender includes a digit switch DS of the rotary step-by-step type which receives the coded keyed digits transmitted from the operator's key set and successively stores these digits on successive codel relay digits storage groups. Only the first of eleven codel relay storage groups are shown in detail. A control switch CS has successive access to these storage relays groups for marking the banks of the sender switch SS in accordance with the successive readings stored on the relay storage groups. The sender also includes a motor driven spring contact interrupter for transmitting pulses at the rate of ten pulses per second, and a time switch TS which is a rotary step-by-step switch of the well-known type.

Figures 37, 37A:
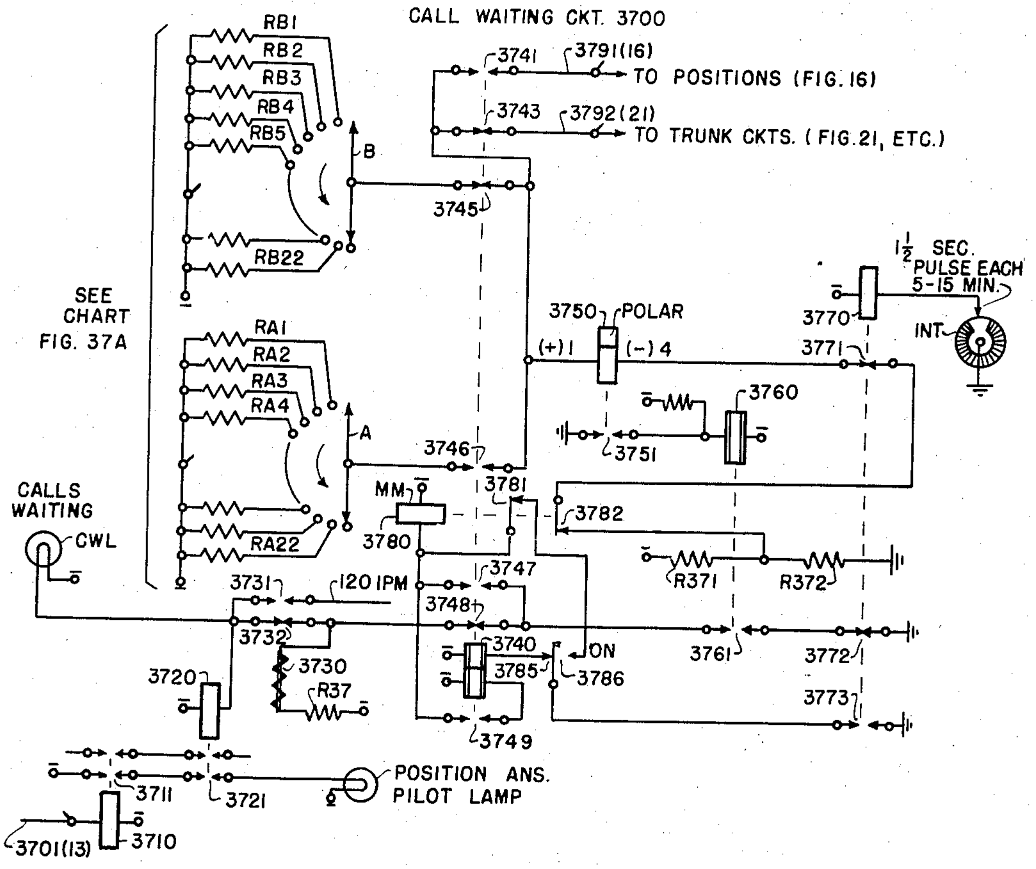

Fig. 37 shows the call waiting circuit 3700 which compares the number of calls waiting service with the number of operators on duty to enable a supervisory operator to determine if enough operator positions are staffed to handle the traffic, while Fig. 37A shows a chart having data for use with the calling waiting circuit.

Figure 38:
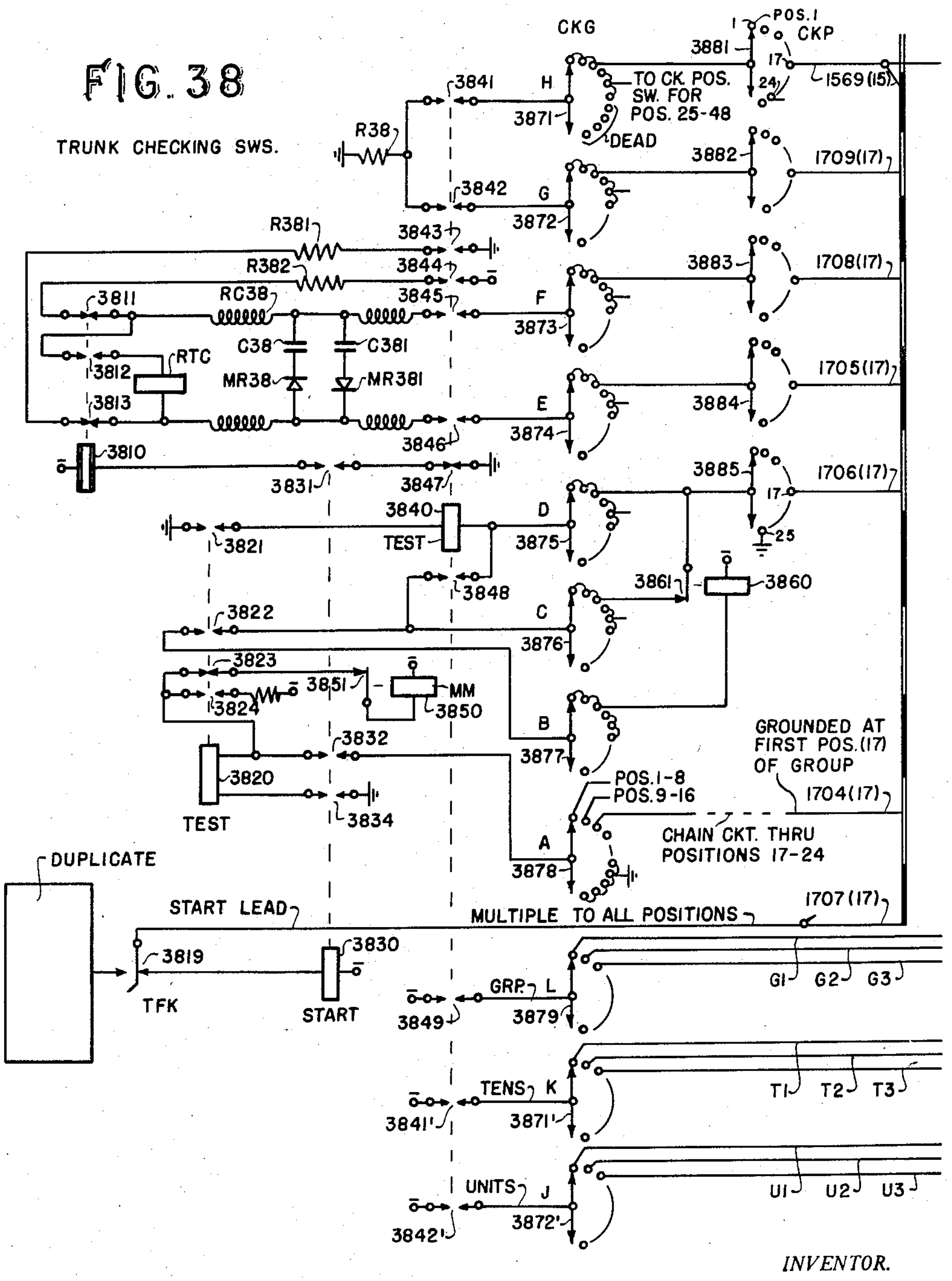
Figure 39:
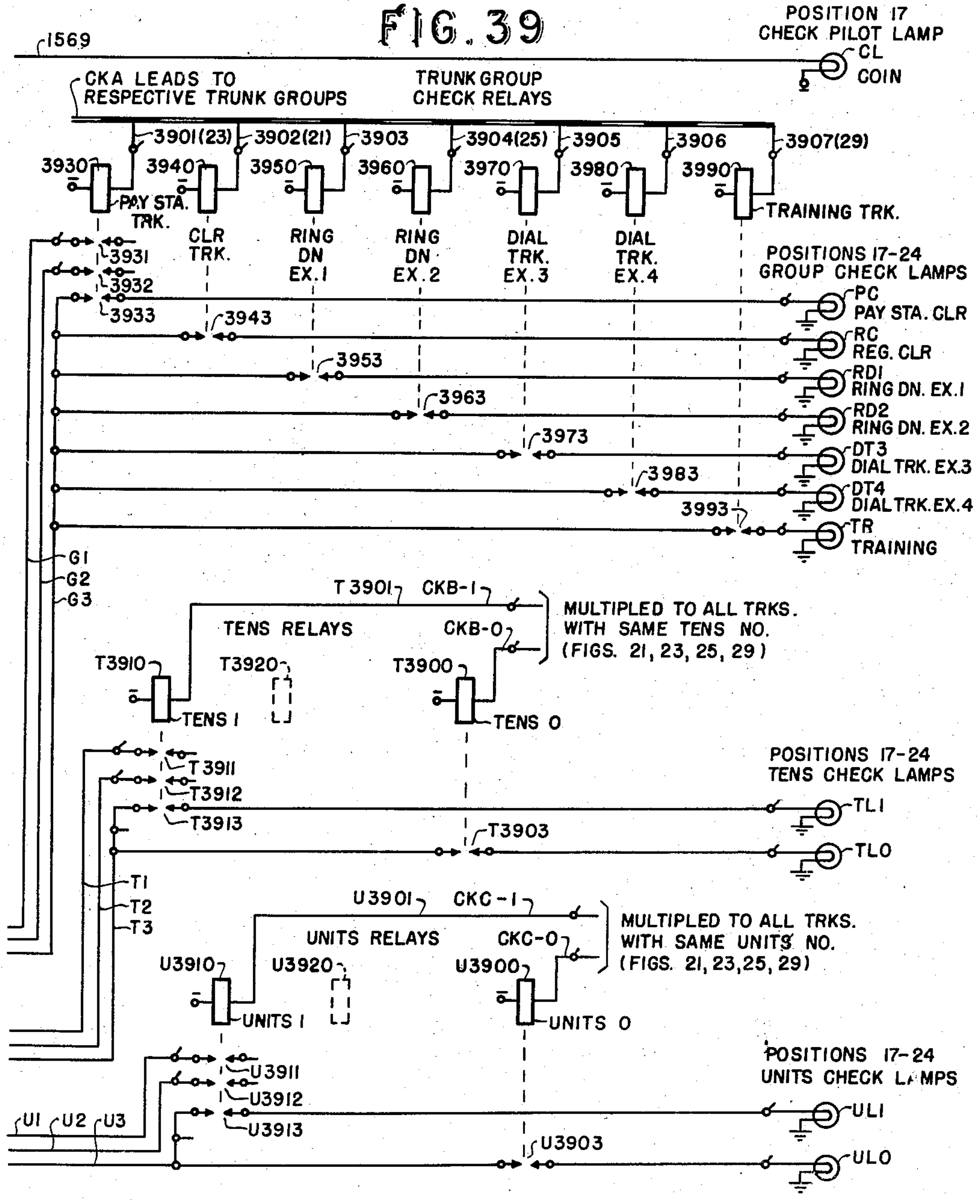

Figs. 38 and 39 show the detail circuits of the trunk checking switches and checking lamp relays for enabling an operator to check the group and trunk number of a trunk circuit included in a connection. The group checking switch CKG is a well-known rotary step-by-step switch which has access to similar rotary switches, such as CKP. The switch CKG has access to a plurality of switches CKP of which only one is shown, and is operated to find a group of operator positions and thereafter operate one of the switches CKP to find the particular one position in the selected group which desires to check the group and trunk number of a trunk circuit. The trunk group check relays are connected over conductors to the respective trunk groups for controlling the group check lamps, the tens relays are connected over conductors to all the trunk circuits having the same tens designations for controlling the tens check lamps, and the units relays are connected to all trunk circuits having the same units designations.

Figure 40:
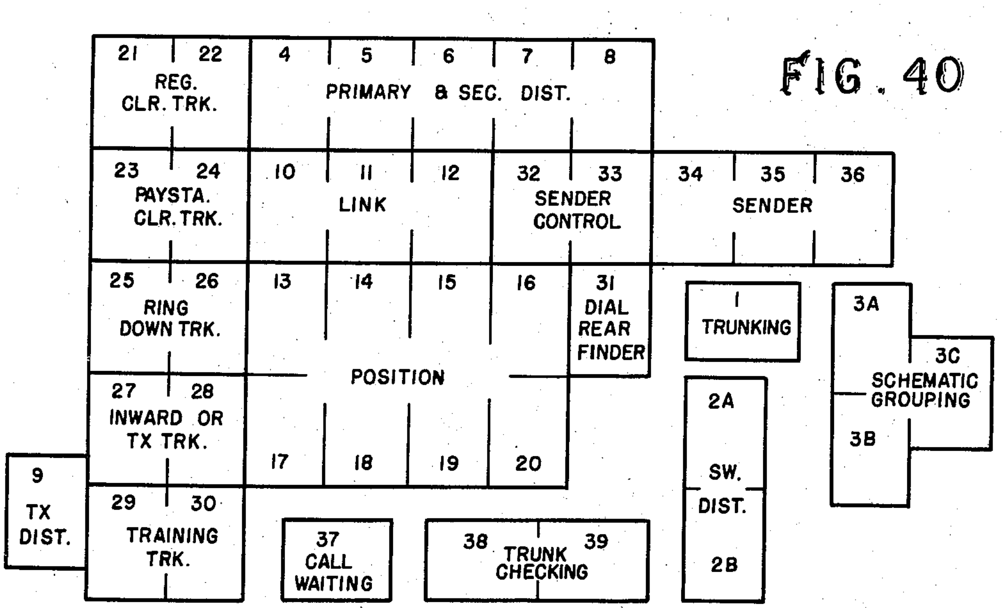

Fig. 40 is a layout drawing showing how the various sheets of drawings should be arranged to be best understood.

*Preparing an operator's position to receive calls*

Each operator's position is arranged to handle several classes of toll calls, such as regular CLR and paystation CLR toll calls, inward and ring-down toll calls, and TX, or delayed, toll calls. The operator position equipment may be arranged to automatically answer calls when they are distributed over the call distribution system to available, or idle, links associated with the position; or the automatic answering facilities may be disconnected so that calls will only be brought into the links at the position by operation of the Accept Call button (Fig. 18) after operation of the automatic answer cut-out key shown in Fig. 18.

Figure 16:
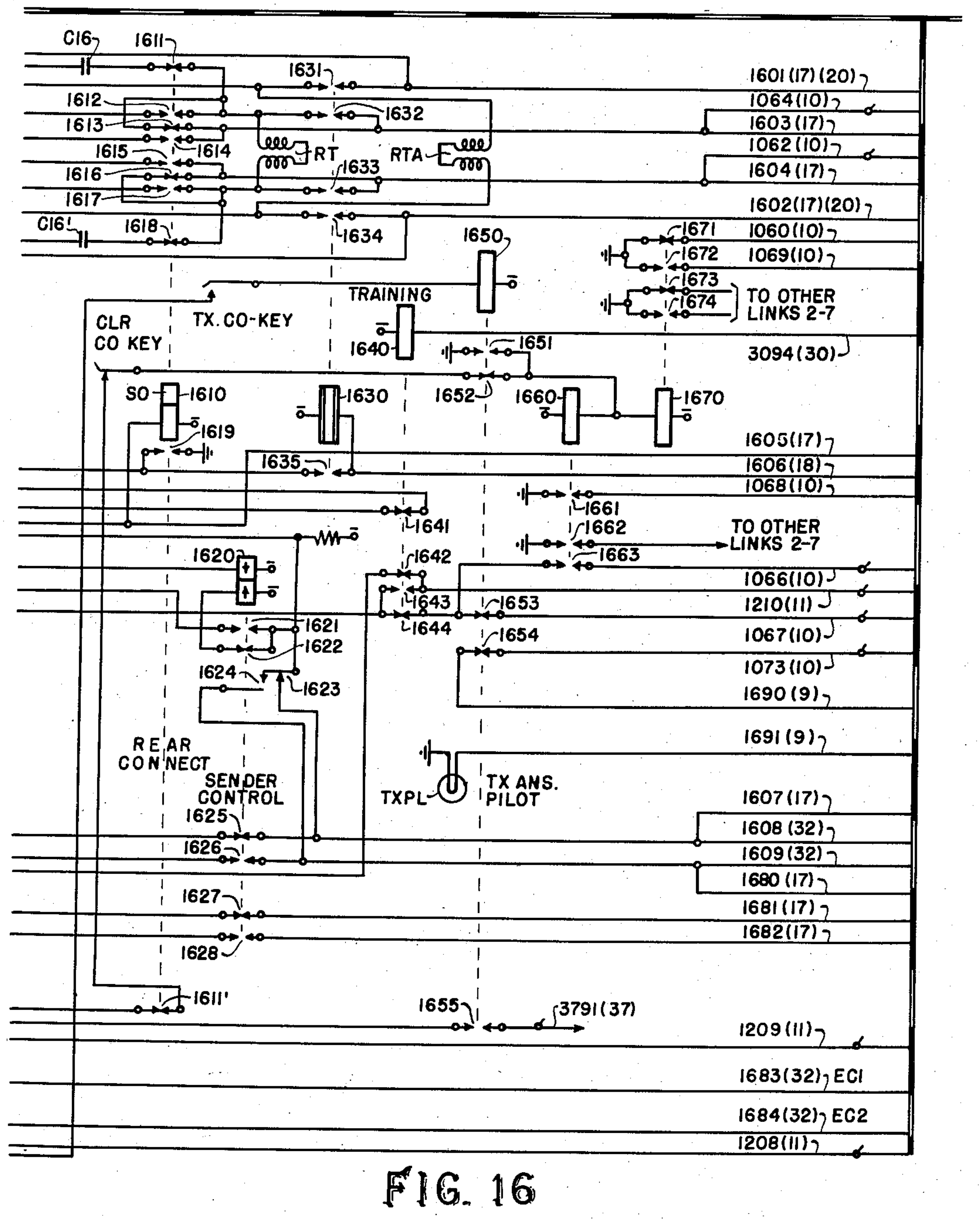

The operator position is provided with a CLR cut-off key, Fig. 16, which in normal position enables the position to receive regular and paystation CLR toll calls and inward and ring-down toll calls. When the CLR cut-off key is operated, the position rejects CLR, inward and ring-down toll calls. A TX cut-off key, Fig. 16, is also provided at the operator position and this key in its normal position enables the operator position to receive TX toll calls, but in its operated position, conditions the operator position to reject TX toll calls. With both the CLR cut-off key and the TX cut-off key in their normal positions the operator position gives preference to TX toll calls as long as the TX toll calls are waiting; and when no TX toll calls are waiting then this operator position is available to accept CLR, inward and ring-down toll calls.

Assuming now that it is desired to condition the operator position to answer regular and paystation CLR, inward and ring-down toll calls and to reject TX toll calls, in which case the TX cut-off key Fig. 16 is operated to prepare a circuit for relay 1650, which relay, when operated, prevents the operator position from receiving TX toll calls.

The operator now inserts her headset plug into the position jack (Fig. 13) at her position. The operator's transmitter T receives battery-feed through both windings of relay 1350 and the receiver R is connected across the noise suppressing varistor MR1. The transmitter T is inductively connected to the transmission circuit through the repeating coil RC2; while the receiver is connected to the talking circuit through the right-hand windings of repeating coil RC2. Relay 1350 is operated over the plug and jack connections and transmitter T.

Relay 1350 operates relay 1490 over the following circuit: ground, contacts 1354, winding of relay 1490, resistance R14, conductor 1214 (Fig. 12) which is multipled through the busy keys of the link selectors associated with each link at this operator position, the monitor key contacts 1231 of the links at this position, and over similar link circuits including the windings of marginal relays 1010, contacts 1025′, 1034′, 1143′, and 1153′ through the resistance R11 to battery. Due to the high resistance of the winding of relay 1490 and resistance R14, the link relays 1010, being marginal, do not operate in series with relay 1490. Relay 1350 completes a circuit for operating gang relay 1910 as follows: grounded contacts 1357, conductor 1395, training key contacts 1951 (Fig. 19) and winding of gang relay 1910 to battery. Relay 1350 completes a circuit for operating the TX cut-off relay 1650 as follows: grounded contacts 1358, TXCO key (Fig. 16), and winding of relay 1650 to battery. At contacts 1351′, relay 1350 completes a circuit extending over conductor 3701 to Fig. 37 for operating relay 371, which is common to a plurality of operator positions.

Gang relay 1910 and the training key (Fig. 19) are provided on all operator positions which, in addition to answering toll calls, are arranged to be used for training new operators in a manner to be more fully described hereinafter. With the training key in the position shown in Fig. 19, the position is able to answer toll calls since relay 1910 is operated when this position is conditioned to receive calls. Relay 1910 closes circuits connecting the various test leads of the toll trunks and the control leads of the call distribution circuits to the links of this position for a purpose apparent from the following description. At contacts 1911, relay 1910 connects the link lead 1003 of link 1 of this position to the test lead 800 which is multipled to the bank contacts of the secondary switches in secondary group SG1, as illustrated in Figs. 2B, 3C and Fig. 8. Contacts 1911 also connect link lead 1003 to the test lead 2283 which is multipled to the bank contacts of the primary switches associated with the toll trunks in sub-groups 1 of primary groups 1 and 2 (PG1—S1 and PG2—S1), as illustrated in Figs. 2A and 2B, 3A and 3C, and Fig. 22. At contacts 1912, relay 1910 connects link lead 1006 of link 1 to call distribution lead 600 to control the direct primary access relay 610 of sub-group 1 of primary group 1 (PG1—S1) in order to indicate to the trunks that direct access is available over the primary switches of this sub-group of trunks. At contacts 1913, relay 1910 connects link lead 1007 to call distribution lead 700 to control the link available relay 720 of secondary group SG1 in order to indicate that one or more links are available to the secondary switches of secondary group SG1.

Contacts 1931, 1932 and 1933 respectively connect the leads of link 7 (not shown) of this position to primary and secondary trunk bank contacts, to the direct primary access relay (not shown) of sub-group 7 of primary group 1 (PG1—S7), and to the link available relay (not shown) of secondary group SG7 in a manner similar to that described for link 1. The unnumbered contacts of relay 1910 indicate similar connections to the link leads of links 2 to 6, inclusive.

At contacts 1946, relay 1910 connects the link lead 1004 to the TXCR test lead which is multipled to the banks of the primary switches of the TX trunks indicated in Fig. 28.

The operator positions which are never used as training positions do not have a training key or a gang relay, such as relay 1910, and the trunk test leads and the control leads connect directly to the link leads instead of through relay contacts.

Relay 1490, at contacts 1491, completes an obvious circuit for operating the slow-to-release relay 1510. Relay 1650, at contacts 1651, completes an obvious circuit for operating relays 1660 and 1670; at contacts 1653 opens the test, or stopping, circuit to prevent a TX trunk call from seizing any available idle link at this position; at contacts 1654 opens the circuit from link conductor 1073 to conductor 1690 extending to the TX group control circuit (Fig. 9); and at contacts 1655 prepares a point in the circuit to the call waiting circuit of Fig. 37.

Relay 1660, at contacts 1661, grounds the individual link lead 1068 extending to link 1, Fig. 10, in order to control the direct primary access relay 610 (Fig. 6) in the distribution control circuit of sub-group 1 of primary group 1. The operation of relay 610 indicating that a direct primary path is available to an idle link by way of the primary switches of the trunk circuits included in trunk group PG1—S1 (Figs. 2A and 3A). Since the direct primary access to links 1 of positions 1 to 18 are multiplied between the primary switch banks of trunk groups PG1—S1 and PG2—S1, as indicated in Figs. 2A and 2B and 3A and 3C, a relay similar to relay 610 in the distribution control circuit of primary sub-group S1 of primary group PG2 (Fig. 4) is also controlled by contacts 1661 to indicate to the trunk circuits included in trunk group PG2—S1 that a direct primary path to an idle link is available directly over the banks of the primary switches of such trunk group. Relay 1660 also closes similar circuits to each of the remaining links at this position to control the direct primary access relays at the respective subgroups of the primary group control circuits. One of these similar circuits is indicated at contacts 1662 which close a circuit from link 2 of this positoin to control the direct primary access relays, similar to relay 610, in the group control circuits of the sub-groups 2 in both primary groups PG1 and PG2. Correspondingly numbered links are, therefore, accessible over direct primary paths from the correspondingly numbered trunk sub-groups. At contacts 1663, relay 1650 closes the test, or stopping, lead 1066 to all links at this position to enable a calling trunk to seize this position over one of its links.

Relay 1670, at contacts 1671, disconnects one of the multiple grounds from the individual link lead 1060 of link 1 to enable this link to be preselected by a secondary switch in secondary group SG1 of Fig. 8 when the ground at link 1 is removed at contacts 1017 by link relay 1010. Similar circuits, indicated at contacts 1673, remove ground from similar individual link leads of the other links of this position to enable these other links to be preselected by secondary switches in the secondary groups. At contacts 1672, relay 1670 grounds individual link conductor 1069 for the purpose of controlling the link available relay 720 of the secondary group control circuit SG1 to thereby indicate that at least one link is available to the secondary switches of secondary group SG1. Other links 1 in positions 1 to 28 also control this link available relay 720 in a similar manner. Similar circuits, indicated at contacts 1674, are closed to ground the individual link conductors to the remaining links of this position for the purpose of controlling the link available relays of the other secondary group control circuits, such as SG2, SG3, SG4, SG5, SG6, and SG7 diagrammatically illustrated in Fig. 7. For example, the similar circuit grounded for link 2 controls the link available relay of secondary group control circuit SG2 to indicate an available link accessible to the secondary switches of secondary group SG2.

Figure 13:
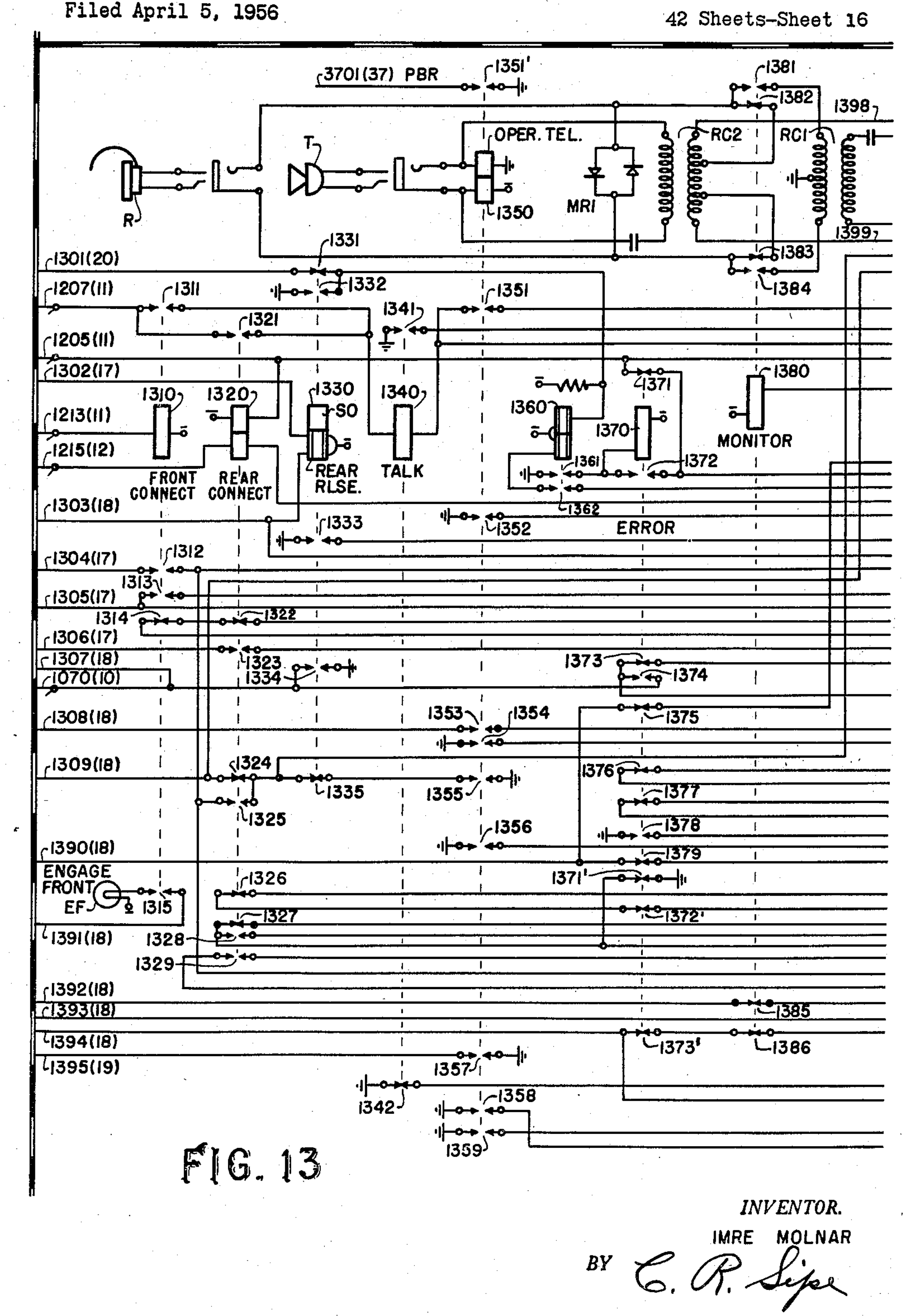
Figure 14:
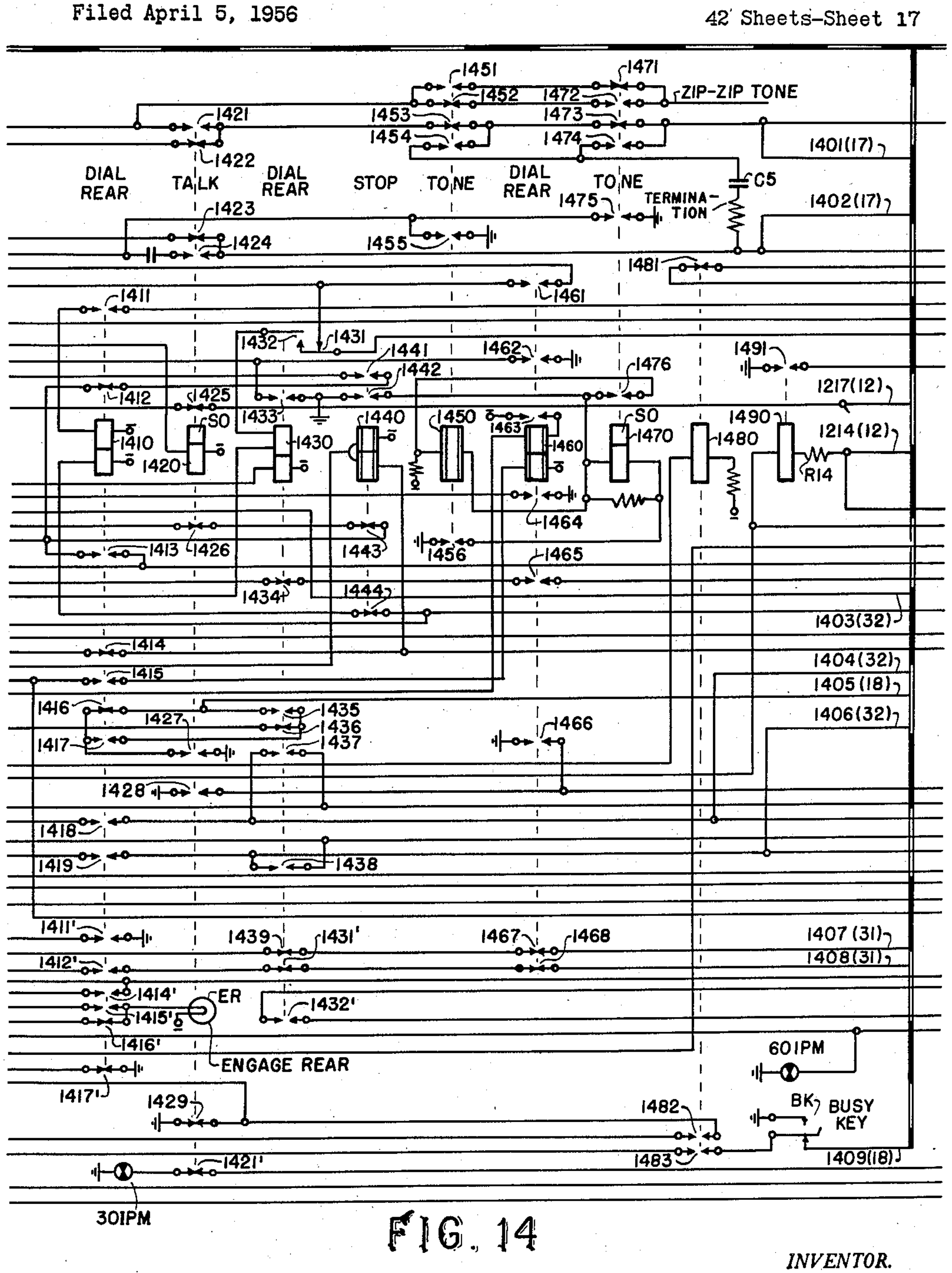
Figure 15:
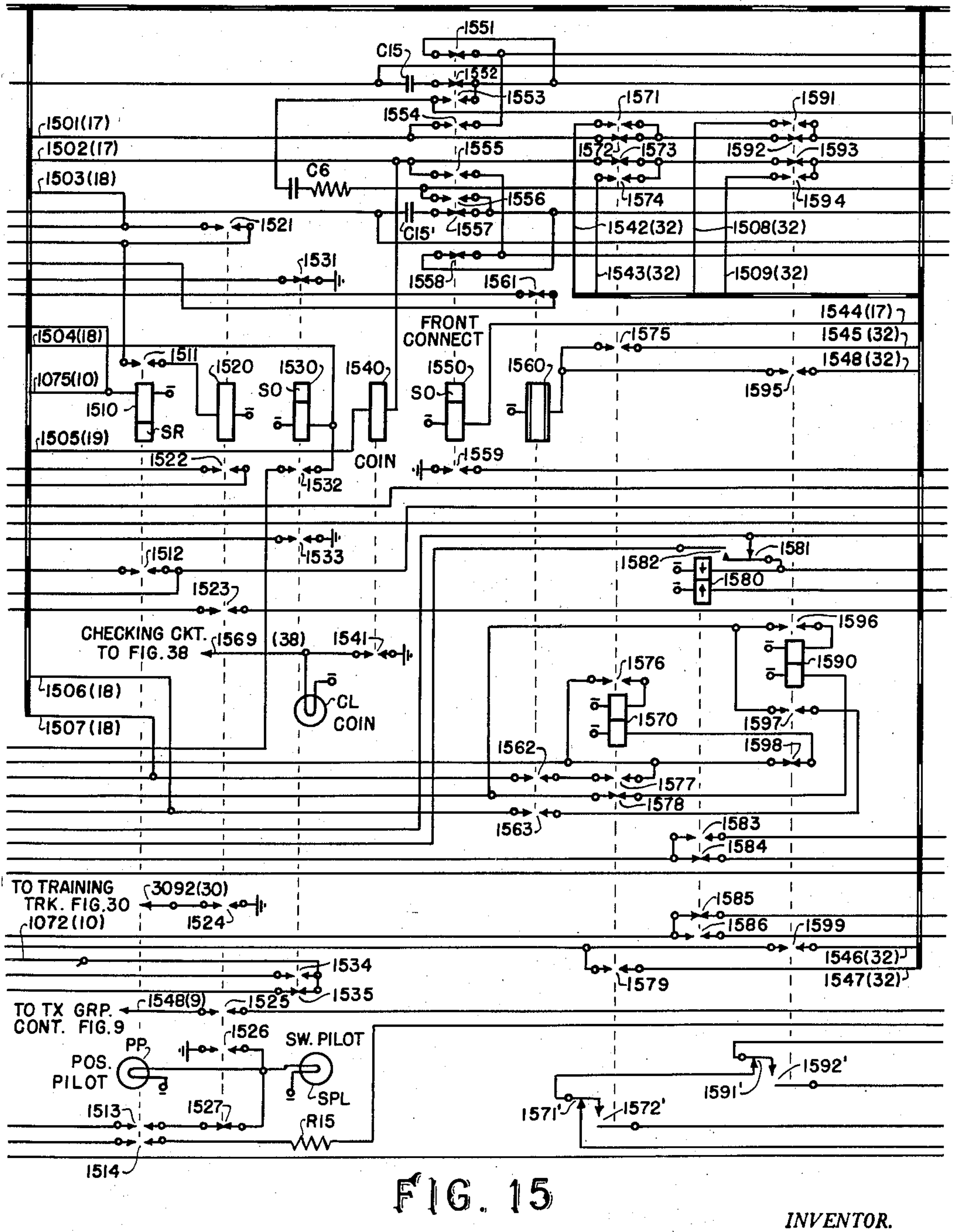

Relay 1510 operates in response to the operation of relay 1490, and at contacts 1511 completes a circuit for operating relay 1520 from battery, winding of relay 1520, contacts 1511 and 1481, conductor 1503 extending to Fig. 18, contacts 1885 of the answer disconnect button AD, conductor 1394 extending to Fig. 13, contacts 1373', 1386 and ground at contacts 1429. At contacts 1512, relay 1510 prepares a circuit for the dial rear relay 1410, at contacts 1513 momentarily closes a circuit from an interrupted ground source (30 IPM) to the position pilot lamp, which circuit is quickly opened when relay 1520 operates and opens contacts 1527 an instant later, and at contacts 1514 connects ground through 10,000 ohms resistance R15 by way of contacts 1359, 1514, and 1655 to conductor 3791, which is common to all operator positions, to the call waiting circuit Fig. 37.

Relay 1520 completes a locking circuit for itself over contacts 1511 and 1521 and grounded conductor 1503. At contacts 1522, relay 1520 short-circuits the winding of relay 1490 and the associated high resistance R14 to operate the marginal link relays 1010 in the idle links of this position; and at contacts 1523 connects stopping battery through the upper low resistance winding of relay 1440 to the stopping conductor 1066 by way of contacts 1314, 1322, 1414, 1523, 1644 and 1663. At contacts 1526, relay 1520 steadily lights the position pilot lamp PP at the operator's position and the switch pilot lamp SPL; and at 1527 opens the interrupted ground circuit to this lamp.

Relay 1490 restores, shortly after it is short-circuited by contacts 1522, to open the original energizing circuit of relay 1510 at contacts 1491. Relay 1510, being slow-to-release, does not restore because the link relays, such as 1010, operate and hold relay 1510 operated over conductor 1075 before relay 1510 can fully restore.

Referring now to link 1, shown in Figs.10 to 12, inclusive, and in order for a link to be considered idle, or available, not only must the link itself be idle, but the associated position must also be idle and set up in call answering condition. When a link is idle, and its associated link selector 1200 (Fig. 12) is not busied out by the operation of the selector busy key, battery through relay 1010 is closed to conductor 1214. When the position is idle and the operator is prepared to receive a call, direct ground is closed over the following circuit by the operation of position relay 1520 as follows: ground, contacts 1354 (Fig. 13), contacts 1522, conductor 1214 extending to the links at this position, can by way of the busy keys of the associated link selectors 1200, contacts 1231 of the link monitor key 1230, winding of relays 1010, contacts 1025', 1034', 1143' and 1153' through the resistance R11 to battery.

The link relays 1010 in the idle links operate over the above traced circuits, and at contacts 1019 return ground over conductor 1075 to maintain slow-to-release relay 1510 in operated position as previously described. At contacts 1011, relays 1010 close stopping battery through the upper winding of position stop relay 1440 and through the operated contacts 1911 of relay 1910 to the bank contacts of the primary and secondary call distribution switches, which have access to these links over conductors 2283 and 800 to mark these links idle and available to such call distribution switches. This position stopping battery for link 1 of this position extends as follows: battery, upper winding of relay 1440, contacts 1314, 1322, 1414, 1523, 1644, 1663, common conductor 1066, contacts 1011, conductor 1003, contacts 1911 (Fig. 19), where the circuit divides, one branch extending by way of conductor 800 to the test bank contacts of all secondary switches in secondary group SG1, the other branch extending by way of conductor 2283 to the bank contacts of the primary switches associated with the toll trunks in sub-groups 1 of primary groups 1 and 2 (PG1—S1 and PG2—S1). In a similar manner, this position stopping battery for link 2 of this position extends from the common conductor 1066 to the test bank contacts of all secondary switches in secondary group SG2 and to the bank contacts of the primary switches associated with the toll trunks grouped in sub-groups 2 of primary groups 1 and 2 (PG1—S2 and PG2—S2). In a similar manner, this position stopping battery is extended from the remaining links of this position to correspondingly numbered secondary groups and to correspondingly numbered sub-groups of primary groups 1 and 2. From the foregoing, it will be seen that links 1 are selectable from sub-groups 1, links 2 from sub-groups 2, etc. and links 7 from sub-groups 7 of the primary groups 1 and 2. It will also be seen that all links 1 are selectable from the secondary switches of secondary group SG1, links 2 from secondary group SG2, etc., and links 7 from secondary group SG7.

Relay 1010, at contacts 1012, connects stopping lead 1067 to lead 1004, which, by way of operated contacts 1946, is connected to the TXCR test lead and the test bank contacts of the primary switches of the TX trunk group, one of which is shown in Fig. 28. However, in this instance, the stopping circuit to the TX primary switches is opened at contacts 1653 by the operation of relay 1650 thereby denying access from the TX primary switches to the links at this operator's position.

Figure 6:
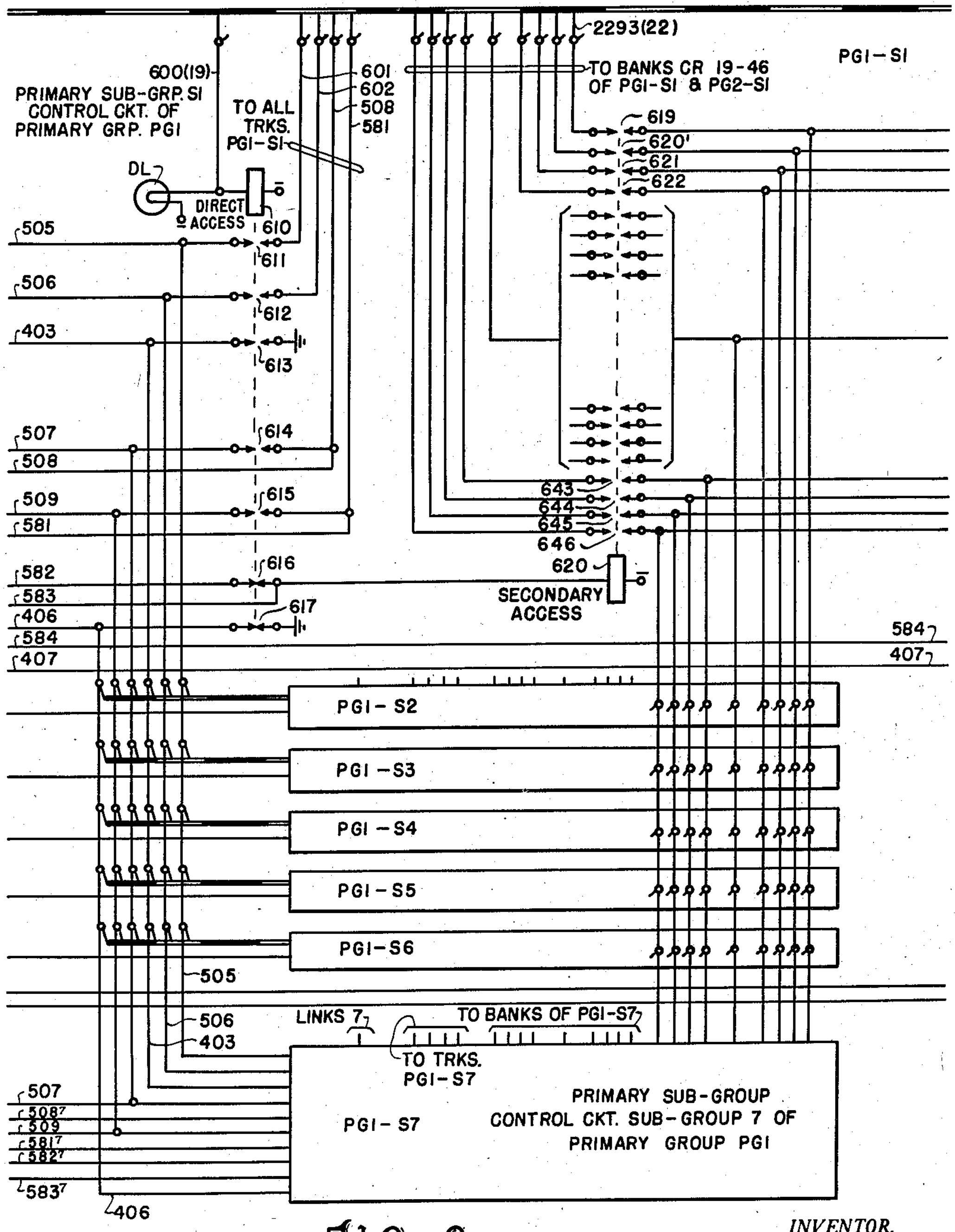

Relay 1010 completes a circuit for operating the primary direct access relay 610, Fig. 6, of sub-group 1 of primary group 1 (PG1—S1) of the call distribution circuits as follows: ground, contacts 1661 (Fig. 16), conductor 1068, contacts 1014 (Fig. 10), conductor 1006, contacts 1912 (Fig. 19), conductor 600 extending to relay 610 (Fig. 6) and battery. A direct access relay (similar to relay 610 and not shown) of distribution circuit sub-group 1 of primary group 2 (PG2—S1) is connected in multiple with relay 610 and operates simultaneously. The other links at this position, by the operation of their respective 1010 relays, complete similar circuits to their respective primary direct access relays in their correspondingly numbered distribution sub-groups of primary groups 1 and 2. For example, the relay 1010 of link 2 (not shown) completes the circuit for operating the primary direct access relay (similar to relay 610) in distribution sub-groups 2 of primary groups 1 and 2 (PG1—S2 and PG2—S2). Each idle link at this position therefore operates the primary direct access relay in the correspondingly numbered sub-groups of the primary distribution groups 1 and 2.

Relay 1010 completes a circuit for operating the link available relay 720 (Fig. 7) of secondary distribution group SG1 as follows: from ground, contacts 1672 (Fig. 16), conductor 1069, contacts 1015 (Fig. 10), conductor 1007, contacts 1913 (Fig. 19), conductor 700 extending to link available relay 720 and battery. The other links of this position, by the operation of their 1010 relays, complete similar circuits to their respective link available relays (similar to relay 720) in their correspondingly numbered distribution secondary group circuits. For example, relay 1010 of link 2 (not shown) completes a circuit for operating the link available relay (similar to relay 720) in the distribution secondary group SG2. Each link therefore operates the link available relay in the correspondingly numbered distribution secondary group circuit.

Relay 1010, at contacts 1016, prepares a circuit for connecting stopping battery to conductors 1008 extending to the test bank contacts of the training trunk switches and the dial rear finders. At contacts 1017, relay 1010 disconnects the last multiple ground from conductor 1060 to enable the secondary switches (Fig. 8) of SG1 to preselect this link. In a similar manner, the other links remove ground from the test bank contacts to enable the secondary switches to preselect such links. For example, link 2 removes ground from its test bank contacts of the secondary switches in secondary group SG2, link 3 removes ground from the test bank contacts of the secondary switches in secondary group SG3, etc., and link 7 removes ground from the test bank contacts of the secondary switches in secondary group SG7. Each link is, therefore, respectively made preselectable from its respective group of secondary switches. Relay 1010, at contacts 1018, grounds conductor 1073 which is inffective at this time since contacts 1654 open the circuit to the TX distribution circuit to deny TX trunk calls to this position.

Referring now to the call distribution circuits shown in Figs. 4 to 8, inclusive, it will be remembered that direct access relay 610 of sub-group 1 of the primary group control circuit PG1 was operated when link 1 of position 1 is marked idle and available for use. The direct access lamp DL is illuminated, when relay 610 is operated, to indicate that one or more links are available over direct primary paths for the primary switches of the trunks of the trunk group PG1—S1.

Relay 610, at contacts 611, prepares a circuit for shunting down relay 550 of primary group control circuit PG1 when no calls are in the gate. At contacts 612, relay 610 prepares a circuit for shunting down relay 560 when waiting calls are in the gate and direct primary paths to links are available. At contacts 613, relay 610 completes a circuit for operating relay 430 of the master group control circuit over conductor 403, which is multiplied to all primary sub-group control circuits. At contacts 614, relay 610 prepares a start circuit for the start relays of calling trunk circuits in sub-group 1 of primary trunk group PG1 in case no calls are in the gate. At contacts 615, relay 610 prepares a start circuit for the start relays of this sub-group of trunks in case calls are waiting inside the gate. At contacts 616, relay 610 opens the circuit to the secondary access relay 620 of this sub-group control circuit, so that relay 620 will not close stopping circuits between the primary switches of this trunk sub-group to the secondary switches. At contacts 617, relay 610 opens one of the multiple ground connections connected to conductor 406, which is common to all sub-group control circuits. The direct access relay (not shown), similar to relay 610, of sub-group 1 of the second primary group control circuit PG2 is also operated to close similar circuits for the trunk group PG2—S1.

It will also be remembered, that link available relay 720 in the secondary group control circuit SG1 operated, when link 1 of position 1 is marked idle and available for use. In fact, this relay 720 is operated when any link 1 in any operator's position is marked idle and available for use. The link available lamp LA is lighted when relay 720 operates to indicate that one or more links are available to the secondary switches of secondary group SG1. It might be advisable at this time to again mention that relays, similar to relay 720, are provided for each group of secondary switches and that such relays are operated when any correspondingly numbered link in any operator's position is marked idle and available for use.

At contacts 721 relay 720 opens a portion of a double chain circuit for controlling relay 540 of primary group control circuit PG1. This chain circuit includes secondary switches 1 to 4, inclusive, of all secondary groups SG1 to SG7, and therefore include a total of twenty-eight secondary switches in which only the first secondary switch of the chain is connected to ground as shown in Fig. 8. This chain circuit may be closed over two paths, the first path over a series circuit including the normally closed contacts, such as contacts 721, of the link available relays (similar to relay 720) of each secondary group control circuit; and the second path over contacts, such as contacts 811, $811^2$, $811^3$, $811^4$ of the secondary hold relays, such as 810, or through the off-normal contacts 819 and ON, if the corresponding secondary switches have been operated to their normal positions by the operation of their busy keys to take such switches out of service. As will be seen, the contacts 721, when normally closed, by pass or shunt that portion of the chain circuit which includes the contacts 811, $811^2$, $811^3$ and $811^4$, or the off-normal contacts ON of the respective switches. Contacts, similar to contacts 721 on the similar link available relays (not shown) for secondary switches 1 to 4 of secondary groups SG2 to SG7, inclusive, are included in this first chain circuit for controlling relay 540 of the first primary group control circuit PG1. Contacts 724, 725 and 726 of relay 720 control similar portions of the chain circuits for the relays (not shown), corresponding to relay 540, in the primary group control circuits PG2 to PG4. Due to this chain circuit for the first primary group control circuit PG1, the relay 540 is operated at a time when no secondary switches are available to the trunk primary switches of the trunks of the trunk primary group PG1.

At contacts 722, relay 720 completes a circuit for operating the paystation relay 710, which closes the test conductors through to the secondary switches to enable completion of trunk calls from paystation lines by way of the secondary switches. Contacts 723 complete a circuit for operating the secondary start relay 730, in case relay 450 of the master control circuit is operated. Relay 450 is operated over common conductor 406 in case any one of the primary sub-group control circuits has its direct access relay, such as relay 610, in non-operated position. For example, assuming that all links 1 of operator's positions 1 to 18, inclusive, are unavailable, because some of these positions are not staffed or because the links at the staffed positions are busy, then, the direct access relay 610 of sub-group 1 of primary group PG1 is not operated; and contacts 617 complete a circuit for operating relay 450 over common conductor 406. Similar circuits from each sub-group grounds conductor 406 in case the corresponding direct access relay at such subgroups is not operated. Relay 450, in operated position, grounds common conductor 407 for operating the secondary start relays (not shown), corresponding to relay 730, at all secondary group control circuits, which have their link available relays (720) operated.

Secondary start relays 730 of the respective secondary group control circuits are so-called "gang" relays having a large number of contacts, and when operated, close circuits to start the secondary switches in their preselecting operations. For example, start relay 730 of secondary group control circuit SG1, at contacts 731, completes a circuit for operating stepping relay 820 of secondary switch SW1 of secondary group SG1 in case test wiper 856 is engaging a grounded bank contact indicating a busy or unavailable link. The circuit for operating stepping relay 820 extends from ground at contacts 1671 (Fig. 16), or from ground at contacts 1017 (Fig. 10), conductor 1060, bank contact and wiper 856 (Fig. 8), contacts 731, 813 and 831, and winding of relay 820 to battery. Similar circuits, indicated at contacts 732 and 733, close circuits to the remaining secondary switches in this secondary group SG1 to also cause these secondary switches to preselect available links.

Stepping relay 820, at contacts 821, completes a locking circuit for itself from grounded wiper 856 by way of contacts 813 and 831, and, at contacts 822, completes a circuit for operating motor magnet 830. Magnet 830, at contacts 831, interrupts the circuit of relay 820 which now restores to open the operating circuit of magnet 830 at contacts 822. Magnet 830 restores to step the wipers of the switch to the next set of bank contacts and, if wiper 856 again engages a grounded bank contact, the stepping relay 820 is again operated to again operate motor magnet 830 to cause the wipers to take another step. This operation continues until wiper 856 engages a non-grounded bank contact indicating an available link to thereby preselect such link. The other secondary switches in secondary group SG1 are similarly operated to preselect idle, or available, links.

As previously mentioned, relay 430 of the master group control circuit (Fig. 4) is operated when any direct access relay (such as relay 610) in any sub-group control circuit is operated. Relay 430 at contacts 431 opens one of the parallel circuits which normally maintain differential relay 410 operated. Relay 410 is normally operated from ground through the low resistance LR, over contacts 431 and 421 in parallel, and the upper winding of relay 410 to battery. The condenser C1, connected in series with the lower winding of relay 410, is fully charged with the result that at this time no current is flowing in the lower winding of relay 410. The differential relay 410, together with its condenser C1 and its controlling circuits, provide a timing device of approximately six or seven seconds delay before calls are again admitted into the gate in case all calls within the gate are not disposed of within the allotted delay period of six or seven seconds.

As previously mentioned, the relays 540 in each primary group control circuit are operated only at a time when no links are available to the secondary switches included in its respective secondary chain circuit. That is, the relay 540 for primary group control circuit PG1 is operated by the first chain circuit only when the secondary switches 1 to 4, inclusive, in each of the secondary groups SG1 to SG7 have no access to an idle or available link. In a similar manner the relay (not shown), for primary group control circuit PG2, and similar to relay 540, is operated by the second secondary chain circuit only when the secondary switches 5 to 8, inclusive, in each of the secondary groups SG1 to SG7 have no access to idle or available links.

When idle links are accessible to the secondary switches of the first secondary switch chain circuit for primary group control circuit PG1, relay 540 remains in its restored position; and when these idle links are not accessible over direct primary paths from the primary switches of primary group PG1, then the direct primary access relay 610 is also in its restored position. With both relays 540 and 610 restored a circuit may be traced for operating the secondary access relay 620 by way of contacts 543 and 616. Relay 620 closes the stopping circuits from the preselected links by way of marking wipers 855 of the secondary switches to the secondary access bank contacts of the primary switches in subgroup 1 of primary group PG1.

Before describing the operation of the system when trunk calls are in progress, it is believed advisable to explain the operated condition of the call distribution system at a time when no trunk calls are in progress in primary trunk group PG1 and when no calls are waiting in the call distribution gate. Under this assumed condition, the distributor gate relays 510, 520, 530, and 560 are normal, while gate relay 550 is operated from ground, contacts 541 and 530, winding of relay 550 and through the resistance R5 to battery in case the relay 540 is not operated. Relay 540 is operated only at a time when the secondary switches accessible from this primary group of trunks (PG1) do not have access to an idle or available link. Relay 550, at contacts 551, connects ground through contacts 536, 523 and 551 to start conductor 508 which is common to all the trunks in sub-group 1 of primary group 1 (PG1—S1). Relay 550 also closes contacts, similar to contacts 551, for grounding the start conductors, similar to conductor 508, extending to each of the trunks in the respective sub-groups 2 to 7, inclusive, of primary trunk group PG1. For example, ground extends by way of contacts 536 and 523, over conductor 507 to the respective contacts, similar to contacts 551 and 551$^7$, over the respective start conductors, similar to conductors 508 and 508$^7$, to the trunks in all seven sub-groups of the primary trunk group PG1. Start conductor 508 of trunk PG1—S1 is also grounded in case the direct access relay 610 for this sub-group of trunks is operated; it being remembered that relay 610 is operated if any link, which is directly accessible from the primary direct access bank contacts of the primary switches of this sub-group of trunks, is marked idle and available for use. The circuit for grounding start conductor 508 extends from ground by way of contacts 536, 523 and 614. Similar circuits ground the start conductors, similar to conductor 508, extending to the other sub-groups of trunks in primary trunk group PG1 in case the sub-group control circuits of this primary group have their respective direct access relays operated. The start conductors 508, when grounded, prepare circuits for operating the start relays of the trunks. From the foregoing, it will be seen that the direct access relay 610 of the respective sub-group control circuits close primary access start circuits by grounding start conductors 508 when direct primary access is possible to idle or available links from its corresponding sub-group of trunks when no calls are waiting within the gates. It will also be seen that the gate relay 550, at its contacts such as 551–551$^7$, close secondary access start circuits by grounding start conductors, such as 508, when no calls are in the gate and when secondary access through secondary switches is possible to an idle or available link. Therefore, those primary trunk switches, which do not have direct primary access to a particular one link which is idle and available at the time, are provided with a secondary access start circuit in the primary group control circuit PG1 to enable such primary trunk switches to hunt for a secondary switch which has preselected this particular one link.

The call distributing circuits are now conditioned to control the routing of trunk calls directly over the trunk primary switches to available links or over the primary and secondary switches in series to the available links dependent upon whether the calling trunks have direct primary access or only secondary access to the links which are marked idle and available for use.

In the present system, the toll switchboards handle both regular and paystation CLR toll calls, inward and ring-down toll calls, and TX, or delayed, operator calls. The CLR toll calls originated by the local subscribers are extended over local selectors to the regular CLR trunks 2100, or to the paystation CLR trunks 2300 in case the calls originated at paystation lines. The inward toll calls originated at distant exchanges are extended over toll selectors to the inward, or operator, trunks 2700. The ring-down toll calls originated at distant manual exchanges are extended directly to the ring-down trunks 2500, or over toll selectors to the ring-down trunks. The TX calls, originated either from distant exchange toll operators or from local toll operators, are extended through selector switches to the TX trunks 2700, which are similar to the inward trunks.

In describing the operation of the system it will first be assumed, that direct primary paths to idle or available links are provided through the direct link access bank contacts of the trunk primary switches. Under this assumed condition, the direct access relay, such as relay 610, and the link available relay, such as relay 720, are operated while the relays 540 and 620 are not operated for the reasons previously described. The links 1000, the operator position equipment 1300, and the call distribution apparatus 400 are now conditioned to receive CLR trunk calls, inward trunk calls, or ring-down trunk calls.

*CLR trunk call*

In order to describe the manner in which regular CLR trunk calls are extended to the operator position 1300, it will be assumed that a local subscriber dials the digit "0" and operates a local selector in the well-known manner to seize the regular CLR trunk 2100 shown in Figs. 21 and 22. When the local office selector seizes the CLR trunk, line relay 2120 is operated over the calling subscriber's loop, contacts 2111 and 2114, the left hand windings of the repeat coil RC, and the windings of line relay 2120 to ground and battery. At contacts 2121, relay 2120 completes a circuit for operating slow-to-release relay 2210. At contacts 2211, relay 2210 connects ring-back tone by way of contacts 2151 and 2111, and wiper of the local office selector to the negative line conductor to inform the calling subscriber that the toll operator is being signalled. Contacts 2212 complete a circuit for operating slow-to-operate relay 2220, and contacts 2213 ground the test, or C, conductor to mark this trunk busy to other local office selectors and to hold the connected local selector in operated position. It will further be assumed that this seized CLR trunk is located in sub-group 1 of the trunk primary group PG1; and, since this sub-group of trunks has direct primary access to link 1, the direct access relay 610 is operated in the manner previously described.

Slow-to-operate relay 2220, at contacts 2221, closes a circuit from grounded start conductor 508 by way of contacts 2141 and 2154 for operating slow-to-release start relay 2230. This start circuit for relay 2230 is closed, only in case the distribution gate for this group of primary trunks (PG1) is open, over the primary access start circuit extending by way of contacts 536, 523 and 614 when the direct sub-group access relay 610 is operated. At this point it may be advisable to explain, that the secondary access start circuit for grounding start conductor 508 by way of contacts, such as contacts 551–551$^7$, effectively controls the trunk start relays, such as relay 2230, when the direct access relay, such as 610, is not operated, to thereby enable the operation of the trunk primary switch when no direct primary bath is available and when a secondary path to a marked link is available only through a secondary switch.

Relay 2220, at contacts 2222, grounds conductor 601 to short-circuit relay 550 of primary group control circuit PG1 to cause relay 550 to restore and open the secondary access start circuits to all trunks in primary trunk group PG1, thereby opening all the secondary access start circuits to all sub-groups of the primary trunk group PG1. This opening of the secondary access start circuits gives preference to the trunk calls in the sub-groups having direct primary access to the available link so that the direct primary paths are first choice while the secondary paths are used only when no direct paths are available. If there is a trunk call in sub-group 7 of primary trunk group PG1 at a time when only link 1 of Figs. 10–12 is marked available for use then the secondary access start circuit for the calling trunk in sub-group 7 extends from ground, contacts 536 and 523, conductor 507, contacts 551$^7$ of relay 550, to start conductor 508$^7$ to operate the start relay, similar to relay 2230, in the calling trunk circuit of sub-group 7. Another example of the above described preference may be shown by assuming that there is substantially simultaneous trunk calls in both sub-groups 1 and 7 and that only link 1 of Figs. 10–12 is marked available for use. In this last assumed example, and when relay 550 is shunted down as previously described by the operation of relay 2220 grounding conductors 601 and 505, the secondary access start circuit is opened at contacts 551$^7$ to prevent the operation of, or to release, the start relay of the calling trunk in sub-group 7 to thereby give preference to the calling trunk in sub-group 1.

Returning now to when relay 2220 is operated, said relay, at contacts 2223, prepares a circuit for operating the trunk gate relay 2140, which is operated at a time when no links are available and before the gate is closed in the call distribution circuit to allow the call to enter inside the gate and wait for an available link. The conditions under which the trunk gate relays 2140 are operated will be described hereinafter. At contacts 2224, relay 2220 grounds conductor 3792 by way of contacts 2156 and 10,000 ohm resistance R21 for a purpose to be subsequently described.

Figure 4:
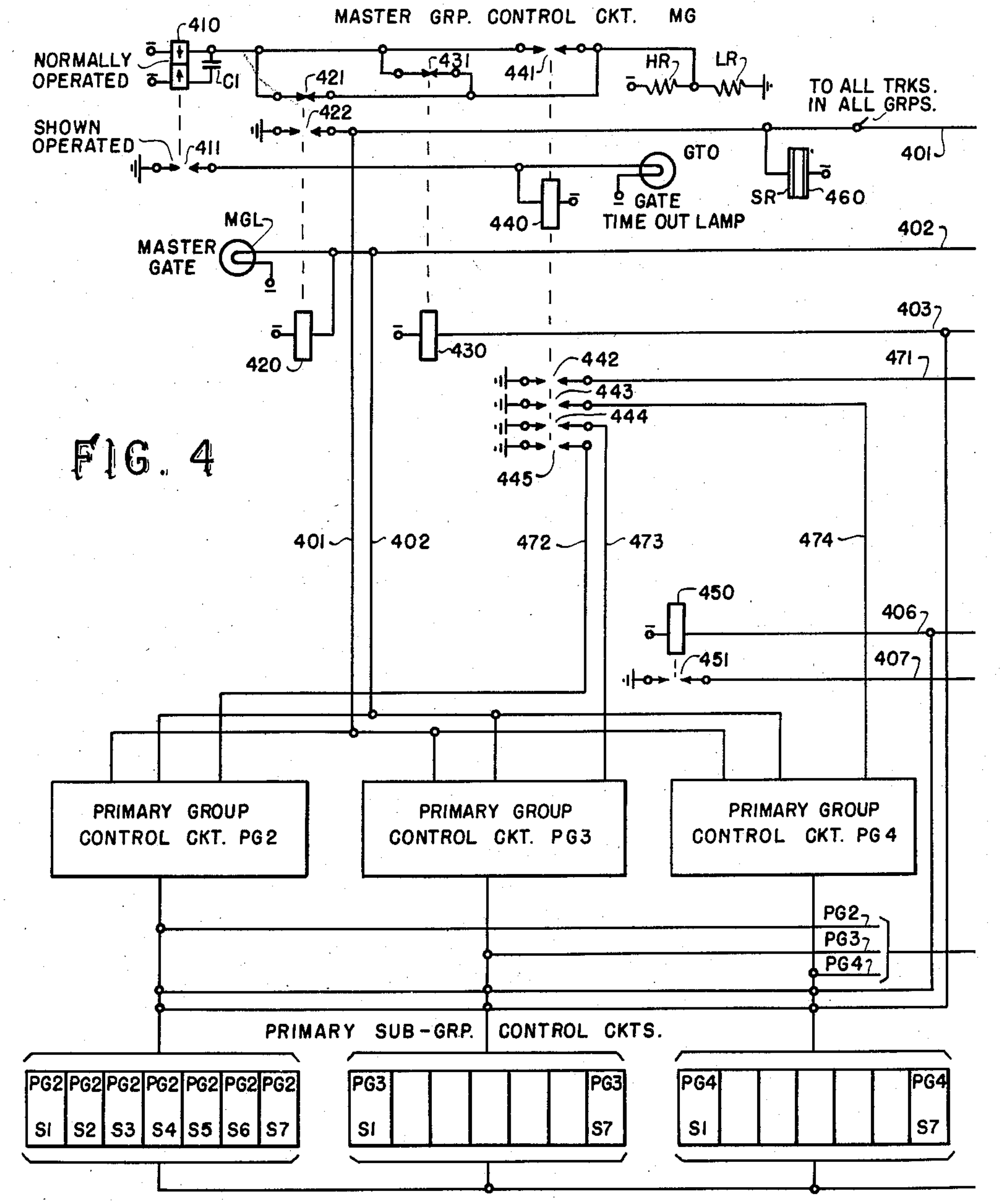
Figure 5:
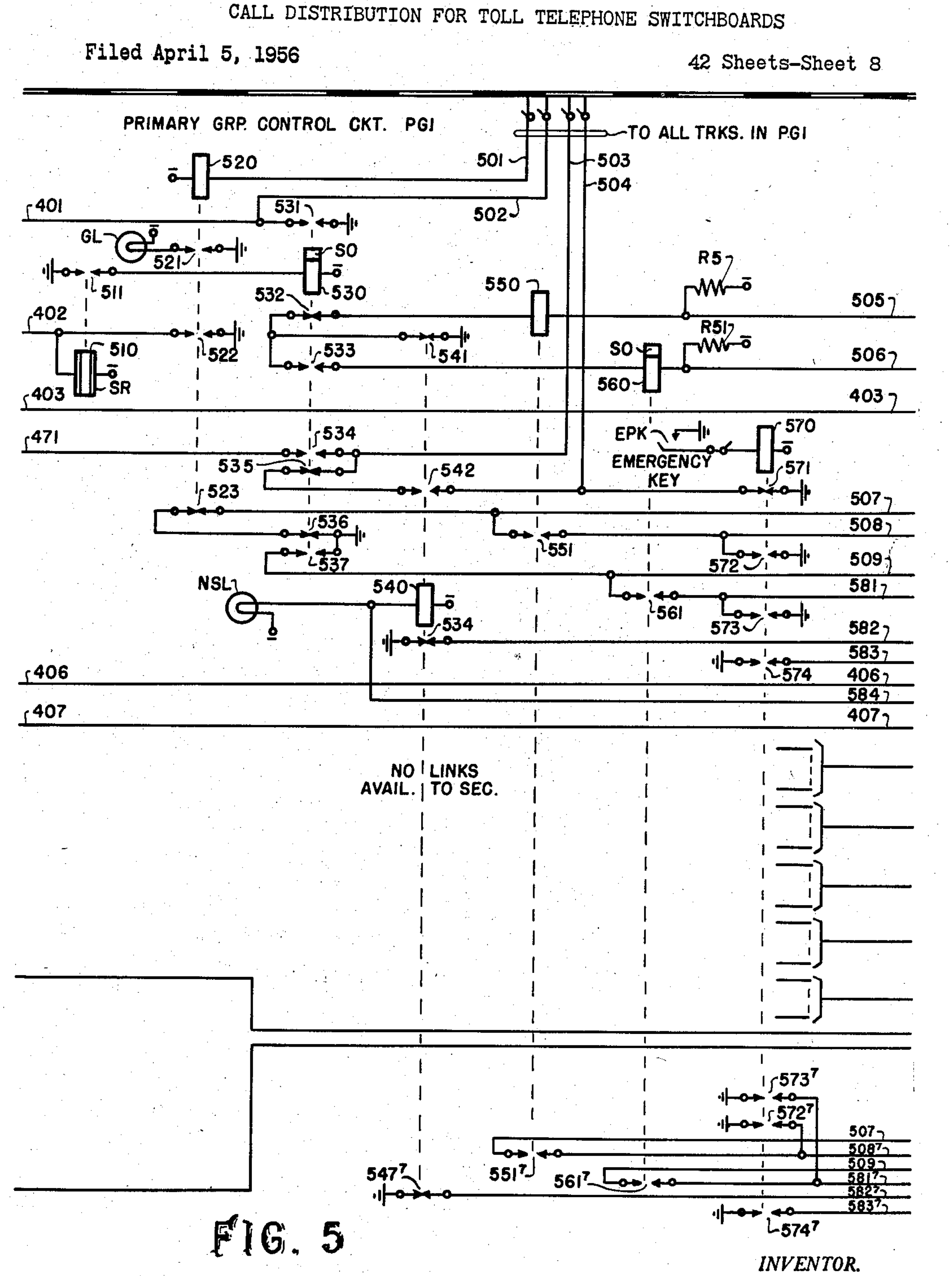

The operation of the trunk start relay 2230 first closes its X contacts 2233 to close a test circuit through the upper low resistance winding of marginal cut-off relay 2240 to test wiper 2273; at contacts 2232, subsequently closes a circuit through contacts 2249 and 2251 for operating motor magnet 2260; and at contacts 2231, grounds conductor 502 to operate relay 460 in the master group control circuit MG, Fig. 4.

The operation now depends upon whether the test wiper 2273 is resting on a bank contact having stopping battery potenital thereon, indicating a marked idle or available link. If the bank contact engaged by wiper 2273 is connected to an idle link marked with stopping battery potential, then cut-off relay 2240 operates to open the circuit to the motor magnet 2260 at contacts 2249 before the magnet can fully operate. In case the test wiper 2273 is resting on a bank contact not marked with stopping battery, then the cut-off relay 2240 is not operated and the motor magnet 2260 is fully operated to open the test circuit to relay 2240 at interrupter contacts 2263. Motor magnet 2260, at contacts 2262, closes a circuit by way of contacts 2233 for operating interrupter relay 2250, and positions its stepping pawl preparatory to stepping the wipers of this trunk primary switch. The interrupter relay 2250, at contacts 2251, opens the circuit to magnet 2260 which now restores to step the wipers to engage their next set of bank contacts. Magnet 2260 also interrupts the circuit to interrupter relay 2250 at contacts 2262, and at contacts 2263 again completes the test circuit through the upper winding of cut-off relay 2240. The above described stepping operation continues until test wiper 2273 engages a bank contact marked with stopping battery.

Assuming now that test wiper 2273 is in engagement with the bank contact terminating conductor 2283 and that conductor 2283 is marked with stopping potential, then cut-off relay 2240 is operated over the following circuit: ground, contacts 2233 and 2263, upper low resistance winding of relay 2240, wiper 2273, primary access bank contact terminating conductor 2283 and said conductor, contacts 1911 (Fig. 19), conductor 1003, contacts 1011 (Fig. 10), stop conductor 1066, contacts 1663 (Fig. 16), contacts 1644, 1523, 1414, 1322, and 1314, and through the upper winding of position stop relay 1440 to battery.

The upper winding of cut-off relay 2240 is designed to prevent double seizures by two switches simultaneously attempting to seize the same idle link. In case two primary switches simultaneously engage primary access bank contacts multipled to conductor 2283, then ground through the upper windings of the cut-off relays of both switches reduces the battery potential marked on conductor 2283 to a point where neither cut-off relay will operate, thereby causing both switches to continue their stepping operations. In a similar manner double connections to the same position are prevented if two primary switches simultaneously connect with two different idle links of the same position. The stopping battery potential, supplied from this position through these two different links, is reduced below the operating potential of the switch cut-off relays by the ground potential through the upper windings of these cut-off relays. Under certain operating conditions the above is also true if one primary switch engages a direct primary access bank contact at the same time that another primary switch engages its secondary access bank contact which is marked by stopping battery by a secondary switch which has preselected the same idle link. In this latter case, ground through the cut-off relay of the other primary switch is extended over a wiper of such switch to the secondary access bank contact, over a conductor, such as conductor 2293, over contacts, such as contacts 619 and 711, over a conductor, such as conductor 750, over a marking wiper, such as marking wiper 855, to conductor 800 which is multipled to conductor 2283 engaged by the first primary switch, and through the upper winding of cut-off relay 2240 to ground at contacts 2233.

In case of a single connection, cut-off relay 2240 energizes in series with position stop relay 1440 over the above traced circuit when the test wiper 2273 finds an idle link marked by battery potential. Relay 2240 first closes its X contacts 2248 to complete a circuit by way of contacts 2232 and 2261 through the lower winding of relay 2240 for fully operating its remaining contacts. At contacts 2246, 2247 and 2248, relay 2240 completes a circuit from grounded contacts 2232 for grounding test wiper 2273 and for short-circuiting the upper winding of relay 2240 during the slow release period of start relay 2230. Contacts 2249 open the circuit to motor magnet 2260 before contacts 2251 close in response to the interrupter relay 2250 restoring. Contacts 2241 and 2242 connect the link talking conductors 1001 and 1002 to the right-hand windings of repeat coil RC. Contacts 2243 open the circuit of relay 2220 which slowly restores. Contacts 2244 close a circuit through the high resistance winding of supervisory relay 2150 in series with the low resistance lower winding of check relay 2130 to cause the supervisory relay 2150 alone to slowly operate. Contacts 2245 disconnect ground from conductor 601, and contacts 2241′ connect ground, by way of contacts 2155, resistance R22, and wiper 2275, to the link supervisory conductor 1005, before slow-to-operate supervisory relay 2150 opens contacts 2155, to complete an energizing circuit for the link talk relay 1130. The circuit for operating link relay 1130 may be traced as follows: ground, contacts 2241′ and 2155, resistance R22, wiper 2275, supervisory link conductor 1005, contacts 1026 and 1013 (Fig. 10), and upper winding of talk relay 1130 to battery.

Relay 2220 slowly restores, after its circuit is opened by the cut-off relay 2240, and at contacts 2221 open the circuit to the start relay 2230. Contacts 2223 open the circuit prepared for gate relay 2140, and contacts 2224 disconnect ground from conductor 3792 of the call waiting control circuit. After a short interval, slow-to-release start relay 2230 restores to disconnect ground at contacts 2232 and 2233 from the cut-off relay 2240 after a locking circuit has been completed for cut-off relay 2240 from the link.

Supervisory relay 2150 operates slowly when its circuit is completed by the cut-off relay, and contacts 2153 connect a multiple ground over the local office selector test bank and test wiper to hold the selector operated. Contacts 2154 open another point in the circuit of start relay 2230, and contacts 2155 disconnect ground from link supervisory conductor 1005. Contacts 2151 disconnect ring-back tone to advise the calling party that a link at an operator position has been seized, and contacts 2152 prepare a circuit for subsequently operating the ring relay 2110 in case the operator desires to ring the calling party.

It will now be assumed that the primary switch of the calling CLR trunk does not have direct primary access to the available idle link. In addition, since no direct primary path to an idle link is available, the direct access relay 610 is restored and the secondary access relay 620 is operated over contacts 616 of relay 610 when secondary access to the idle link is available. Under this condition the CLR primary switch hunts until test wiper 2273 encounters a secondary access bank contact marked with stopping battery through one of the secondary switches which has preselected the idle link. When test wiper 2273 engages a secondary bank contact marked with stopping battery, then relay 2240 is operated over conductor 2293, over contacts 619 and 711, conductor 750, marking wiper 855 of secondary switch SW1, bank contact and conductor 800, contacts 1911, conductor 1003, contacts 1011, stop conductor 1066, contacts 1663, 1644, 1523, 1414, 1322 and 1314 to battery through the upper winding of stop relay 1440. Relay 2240 operates and performs the same functions as previously described and connects the calling line to the idle link and operator position by way of the primary and secondary switches in series. In addition, relay 2240, at contacts 2246, grounds wiper 2274 and conductor 2294 to operate hold relay 810 which locks itself over contacts 812 to maintain wiper 2273 and conductor 2293 grounded from the seized link in case relay 620 should restore. Contacts 811 ground its portion of the chain circuit, and contacts 813 open the circuit to relay 820.

Referring now to the link circuit shown in Figs. 10, 11 and 12, it will be remembered that link relay 1010 is operated, and that relay 1130 is operated as soon as this link is seized by the primary switch of the calling CLR trunk. Relay 1130, at contacts 1131, prepares circuits for rear connect link relay 1020 and position relay 1320; which circuits are completed by the operation of position stop relay 1440. Contacts 1132 prepare a circuit for a reconnect operation, and contacts 1133 prepare an operating circuit for link talk relay 1040 and a locking circuit for link relay 1130. Relay 1130, at contacts 1134 and 1136, prepares circuits to connect the link rear supervisory relay 1110 to supervisory conductor 1005. Contacts 1138 connect the position identity lamp to the identity conductor 1009 for identifying the type of calling trunk; contacts 1139 prepare circuits for front connect link relay 1030 and position relay 1310; and contacts 1132′ and 1134′ prepare circuits for link sender control connect relays 1140 and 1150.

When the call distribution primary switch of the calling CLR trunk seizes the marked idle link, the position stop relay 1440 is operated as previously described. Contacts 1441 of stop relay 1440 complete a circuit for operating position relay 1320 and rear connect link relay 1020 in multiple; the latter relay returning ground back over conductor 1205 to lock relay 1320 operated. The circuit for operating relays 1320 and 1020 may be traced as follows: ground, contacts 1352, 1412 and 1441, one branch extending through the upper winding of relay 1320 to battery; and the other branch extending over conductor 1205, contacts 1131, and upper winding of link rear connect relay 1020 to battery. Contacts 1442 close an obvious circuit to operate slow-to-release tone relay 1450.

Contacts 1321 of relay 1320 close a circuit to operate position relay 1340 in series with link talk relay 1040, and in addition, close a locking circuit through the lower winding of link relay 1130. The circuit for relays 1340 and 1040 may be traced as follows: ground, contacts 1531 and 1351, winding of relay 1340, contacts 1321, conductor 1207, contacts 1133, and winding of relay 1040 to battery. The locking circuit for relay 1130 includes the grounded conductor 1207, contacts 1133 and the lower winding of relay 1130. Contacts 1322 open the original energizing circuit of stop relay 1440 but this relay now remains operated through both its windings in series, and reduces the battery potential of the stopping circuit to a point where a second test relay, such as relay 2240, is unable to operate. Contacts 1325 light the engaged rear lamp ER over the following circuit: ground, contacts 1355, 1335, 1325 and 1416′, and the engaged rear lamp ER to battery. Contacts 1328 connect ground, at contacts 1371′, to conductor 1681 or 1682, dependent upon the operated condition of alternator relays 1580 and 1620, to seize one of the sender control circuits associated with this position and to operate one of the link relays 1140 or 1150. When both relays 1580 and 1620 are at normal, sender control #1 (Figs. 32 and 33) is seized, and when both relays 1580 and 1620 are operated, sender control #2, diagrammatically shown in Fig. 32, is seized. The method of alternating between sender controls will be described later. In the present instance, and since both relays 1580 and 1620 are at normal, the sender control #1 is seized over the following circuit: ground, contacts 1371′, 1328, 1585 and 1627, conductor 1681, contacts 1773 of sender #1 cut-out key, conductor 1701, contacts 3219 of the sender control busy key, contacts 3236, 3227, and 3256, winding of seizure relay 3330, conductor 1406, conductor 1506, contacts 1876 of the position release front key, conductor 1101, contacts 1132′, contacts 1245 of the link release button 1240, contacts 1035′, and 1024′, upper winding of relay 1140, and contacts 1152′ to battery. Sender control #2 is seized over the following circuit in case both relays 1580 and 1620 are operated: ground, contacts 1371′, 1328, 1586 and 1628, conductor 1682, contacts 1781 of sender #2 cut-out key, conductor 1702 to sender control #2, through contacts and a relay similar to that described for sender #1 to conductors 1404 and 1507, contacts 1873 of position release front key, conductor 1102, contacts 1134′, contacts 1243 of link release button 1240, contacts 1033′, 1023′, and 1141′, and upper winding of relay 1150 to battery.

When the position relay 1340 is operated as previously described, contacts 1341 complete an obvious circuit for operating slow-to-operate talk relay 1420. Relay 1420, at contacts 1421 and 1424, prepares to place the operator's telephone circuit across the talking conductors. Contacts 1429 open the locking circuit of relay 1520, which now restores. Contacts 1421′ disconnect interrupted ground, designated 30–IPM, to prevent the flashing of the position pilot lamp PL after relay 1520 restores. When relay 1520 opens contacts 1522, the high resistance R14 and the winding of relay 1490 are included into the circuits of the marginal link relays, such as relay 1010, at this position to cause such marginal relays to restore. Contacts 1522 also removes the shunt from around relay 1490 to allow this relay to reoperate. Contacts 1526 extinguish the position pilot lamp PP, and contacts 1523 open the stopping circuit for the call distribution switches and the circuit of the position stop relay 1440 which now restores.

When the position tone relay 1450 operates, "zip-zip" tone is connected to the operator's headset over the following circuit: from the "zip-zip" tone source, contacts 1471 and 1451, upper right-hand winding of repeat coil RC2, contacts 1382, through the jack, plug and receiver R, contacts 1383, lower right-hand winding of repeat coil RC2, and contacts 1455 to ground. Contacts 1453 open to prevent transmission of this tone to the link. Contacts 1456 short-circuit relay 1470 until contacts 1442 of stop relay 1440 open.

Position stop relay 1440 restores shortly after its circuit is opened at contacts 1523, and contacts 1442 remove the short-circuit from around relay 1470. Contacts 1441 open the original energizing circuit of relay 1320, but this relay is now held by ground fed back over conductor 1205. Contacts 1442 remove the short-circuit from slow-to-operate relay 1470 to permit this relay to operate slowly in series with relay 1450 from ground at contacts 1456. When slow-to-operate tone relay 1470 operates, contacts 1471 open the "zip-zip" tone circuit, and contacts 1472 and 1475 close to subsequently connect the "zip-zip" tone when relay 1450 restores. Contacts 1476 short-circuit relay 1450 to cause relay 1450 to slowly release. Relay 1450, restores after an interval, and again connects "zip-zip" tone to the operator's headset; this time over contacts 1472 and 1452, through the receiver R, and back to contacts 1475. Contacts 1473 prevent the transmission of this tone to the link. Contacts 1456 open the circuit to relay 1470 which slowly restores. The tone circuit is disconnected from the operator's headset when relay 1470 restores and opens contacts 1472 and 1475. The "zip-zip" tone provides an audible indication to the operator of the call waiting for service. During the application of "zip-zip" tone to the operator's headset, a line termination, comprising the condenser C5 and its associated resistance, is bridged across the talking conductors extending to the link.

When the link rear connect relay 1020 is operated in multiple with position relay 1320, contacts 1022 close a locking circuit for its upper winding, and contacts 1022 also ground conductor 1205 to maintain position relay 1320 operated as previously mentioned. Contacts 1023 ground test conductor 1003 thereby grounding both conductors 2283 and 800 to mark this link busy to the primary and secondary call distribution switches. In case the call was completed through a secondary switch, then the grounding of conductor 800 maintains hold relay 810 operated over contacts 812 and grounds conductor 2294 which holds relay 2240 operated over wiper 2274, and contacts 2247 and 2261; and contacts 2246 ground wiper 2273 and conductor 2293 to busy the secondary access to this link independent of the operated condition of relay 620. Contacts 1024 ground test conductor 1004 to mark this link busy to the primary switches of the TX trunks. Contacts 1027 connect the rear supervisory relay 1110 to supervisory lead 1005. Contacts 1028 prepare a release circuit for itself, since relay 1020 is differential. Contacts 1029 ground conductor 1008 to busy this link to the training trunk switches and to the dial rear finders. Contacts 1023′ connect the upper winding of sender control relay 1150 to conductor 1102, and contacts 1024′ connect the upper winding of sender control relay 1140 to conductor 1101. Contacts 1025′ open the circuit to relay 1010.

Relay 1010 restores and contacts 1011 open another point in the stopping circuit and the circuit to the stop relay 1440. Contacts 1012 open a further point in the stopping circuit for the TX trunks; and contacts 1013 open the original energizing circuit of relay 1130 now locked in operated position over grounded conductor 1207. Contacts 1014 disconnect grounded link conductor 1068 from link conductor 1006 to disconnect one of the multiple ground connections from common conductor 600. The common conductor 600, as previously described, is grounded by any link 1 in positions 1 to 18, inclusive, which is idle and marked available for use, and accordingly, the direct access relay 610 is maintained in operated position until the last available link 1 of positions 1 to 18 is seized. Contacts 1015 disconnect grounded link conductor 1069 from link conductor 1007 to disconnect one of the multiple ground connections from common conductor 700. The common conductor 700, as previously described, is grounded by any link 1 of any position which is idle and marked available for use, and accordingly, the link available relay 720 is maintained in operated position until the last available link 1 of any position is seized. Contacts 1017 ground link conductor 1060, terminating in multiple connections in the bank contacts of the secondary switches in secondary group SG1 to now mark this link busy to the secondary switches.

In case any secondary switch had previously preselected this link, and in case the secondary start relay 730 of this secondary group control circuit is operated, then a circuit may be traced from grounded conductor 1060, through test wipers, such as wiper 856, contacts, such as contacts 731, 813 and 831, for operating the stepping relays 820 of these secondary switches to cause such secondary switches to preselect an idle link. The secondary switches operating, in the same manner as previously described, until their wipers 856 no longer engage a grounded bank contact. Contacts 1019 remove one of the ground connections from position conductor 1075, but this conductor is now grounded by the reoperation of relay 1490 closing contacts 1491 to maintain the slow-to-release all-link-busy relay 1510 in operated position.

The resistance ground, received over supervisory lead 1005 by the operation of cut-off relay 2240 for initially operating relay 1130, is removed shortly after seizure of the link by the operation of slow-to-operate supervisory relay 2150. The timing of relay 2150 is such that relay 1130 will be locked to ground over conductor 1207 before ground is removed from conductor 1005 by the operation of relay 2150. Incidently, relay 1110 may operate momentarily, following the operation of relay 1020, but this operation merely causes a momentary flash of the rear supervisory lamp.

The operation of relay 1020 causes the release of relay 1010 in the seized link; and, very soon thereafter, position relay 1520 restores to change the condition on the common lead 1214 from direct ground to high resistance ground by opening contacts 1522. This change to high resistance ground on common lead 1214 cause the relays, similar to relays 1010, in the remaining idle links to restore. This high resistance ground circuit, includes the resistance R14 and the winding of relay 1490, which now operates in series with the marginal relays, such as 1010, in the remaining idle links. Relay 1490, at contacts 1491, maintains the slow-to-release all-links-busy relay 1510 in operated position.

When relay 1040 operates in response to the operation of position relay 1320, contacts 1041 open the line termination circuit including the condenser C10 and its associated resistance. Contacts 1043 and 1046 prepare circuits to connect the front talking conductors 1201 and 1202 to conductors 1061 and 1063. Contacts 1044 connect the rear talking conductors 1001 and 1002 to talking conductors 1062 and 1064 and to the operator's telephone circuit. Contacts 1048 connect lead 1065 to lead 1204 for use in conjunction with a reconnect front operation. Contacts 1049 prepare for a rear release operation, and contacts 1043′ prepare for a front release operation. Contacts 1042′ connect the link busy lamp BL to conductor 1072 to flash the link busy lamp to indicate the seized link to the operator. Link busy lamp BL is flashed over the following circuit: from the 60–IPM interrupted ground source (Fig. 14), contacts 1535, common conductor 1072, contacts 1042′, and busy lamp BL to battery. The operator's telephone circuit is now connected to the calling subscriber over the following circuit: from the operator's telephone circuit, including the receiver R, transmitter T, contacts 1382 and 1383 and repeat coil RC2, conductors 1398 and 1399, contacts 1421 and 1424, contacts 1453 and 1473, condensers C16 and C16′, contacts 1611 and 1618, contacts 1613 and 1616, conductors 1064 and 1062, contacts 1047 and 1044, conductors 1002 and 1001 terminating in bank contacts engaged by wipers 2272 and 2271, contacts 2242 and 2241, windings of repeat coil RC, contacts 2111 and 2114, negative and positive CLR trunk line conductors engaged by the wipers of the local office selector, and thence over the calling subscriber loop to the calling substation. In case the call was extended through a secondary switch, then the talking circuit includes the wipers 851 and 852 of the secondary switch and conductors 2291 and 2292 to the wipers 2271 and 2272 of the CLR primary switch.

It will be remembered that the operated condition of position alternating relays 1580 and 1620 determines which sender control is to be seized and, consequently, whether relay 1140 or relay 1150 in the link operate. Since, it was assumed that sender control #1 was seized, then link relay 1140 and sender control seizure relay 3330 were operated, as previously described. Relay 1140, at contacts 1142′, completes a locking circuit for itself as follows: from ground, contacts 1371′, 1328, 1585, 1627, conductor 1681, key contacts 1773, conductor 1701, sender control #1 busy key contacts 3218, contacts 3236, 3227, and 3256, winding of seizure relay 3330, conductor 1406, conductor 1506, key contacts 1876, conductor 1101, contacts 1132′, key contacts 1245, contacts 1142′, and lower winding of relay 1140 to battery. Contacts 1141′ open the circuit to relay 1150. Contacts 1143 connect ground to conductor 1203 to seize the link selector 1200 in the well-known manner. Contacts 1145 connect the EC sender control pulsing lead 1108 to the ECF link selector lead 1204. Contacts 1149 prepare a circuit to the front connect relay 1030, which circuit is completed after sending. Contacts 1141 connect the link selector lead 1201 to sender control lead 1104, and contacts 1142 connect the link selector lead 1202 to the sender control lead 1106. Contacts 1148 prepare a circuit to busy lamp BL to thereby subsequently place the busy lamp under control of the sender by way of sender control lead 1160. If the sender control #2 circuit is seized, then relay 1150 will operate and prepare circuits similar to those prepared by relay 1140. The link selector 1200 is somewhat similar to the Toll Preselector 1400, shown in Fig. 14, of the H. W. Balzer Patent 2,697,134, issued December 14, 1954. Contacts 1145 complete a circuit for operating the pulse relay (not shown) of the link selector as follows: from battery, resistance R33 (Fig. 33), contacts 3314, conductor 1108, contacts 1145 and 1154, ECF link selector lead 1204 and through the winding of the link selector pulse relay (not shown) to ground. The link selector pulse relay is operated over this circuit to prepare the selector for operation, so that the link selector may be subsequently pulsed from the sender by interrupted resistance battery pulses over conductor 1204.

Appearance of the flashing busy lamp BL and "zip-zip" tone in the operator's headset are indications to the operator that her position is connected to a link and that a call is waiting service. It will be observed that it is not necessary for the operator to operate the talk key to talk to the calling party. The talk key is used only when the operator wishes to re-engage her position on a link. If the call happens to be a paystation call, the operator receives a special paystation tone from the paystation trunk circuit immediately following the "zip-zip" tone. On paystation trunk calls, the position identity lamp IL is flashed at 30 impulses per minute; on inward and TX trunk calls, the identity lamp IL is lit steadily; and, on regular CLR trunk calls the lamp remains dark. The manner in which the paystation tone is audible to the operator, and the various operations of the identity lamp will be subsequently described for these other trunk calls.

The operator obtains the necessary information from the calling party, extends the call by keying up the necessary digits on the digit keys, and prepares the sender control to release itself and the sender, following the completion of sending. The operator has a choice of sender disconnect buttons, which allow her to disconnect the position circuit from the link immediately after keying up the digits, or to remain with the link until such time as she is ready to disconnect.

*Seizure of sender control #1*

There are normally two sender control circuits associated with each operator's position, and in normal operation the operator's position circuit automatically alternates between these two sender controls. The position circuit selects the sender control circuit to be used by connecting ground to the appropriate lead 1701 or 1702, unless the sender cut-out key at the position, or the busy key at the sender control circuit has been operated to transfer all sending operations to one sender control.

If the call is being set up in the usual manner, that is, answered on the rear of the link and extended over the front of the link, battery through link sender control relay 1140 is extended over conductors 1101, 1506 and 1406 to operate seizure relay 3330 of the sender control circuit as previously described. In the sender control circuit battery through resistance R33 is extended to the pulse relay in the link selector of the outgoing switchtrain by way of contacts 3314, EC conductor 1108, contacts 1145 of the link sender control relay 1140, contacts 1154, EC conductor 1204, and through the winding of the pulse relay, not shown, in link selector 1200 to ground. The pulse relay in the link selector is operated over this circuit to prepare it to receive resistance battery pulses over EC lead 3301 from the sender. When sender control seizure relay 3330 operates, contacts 3332 prepare a subsequent holding circuit for relay 3330, and at contacts 3331 connect conductor 1711 to the winding of relay 3310. Lead 1711 receives ground from contacts 3651 of the all-senders-busy relay 3650 as long as there is at least one idle sender in the group. The all-senders-busy relay 3650 is common to all of the senders and is normally operated when any one sender is idle. When relay 3330 closes contacts 3331 relay 3310 is operated over the following circuit: from ground contacts 3651, common conductor 1710 extending to the operator's position, contacts 1774 of the sender #1 cut-out key, conductor 1711, contacts 3356, 3348, and 3331, winding of relay 3310 and through contacts 3235 and 3225 to battery. Relay 3310, at contacts 3315, completes a circuit for maintaining the pulse relay in the link selector in operated position before contacts 3314 open. Contacts 3312 connect the winding of motor magnet 3360 of the sender finder to the finder test wiper 3379. Contacts 3313 prepare the stopping circuit for test relay 3340. If test wiper 3379 of the sender finder switch SF is standing on a bank contact associated with an idle sender, there will be an absence of ground on test conductor 3399, and the motor magnet 3360 will not be operated because no circuit is completed therefore. Relay 3340 operates in series with the motor magnet 3360 over the following circuit: contacts 3313, winding of relay 3340, contacts 3312 and 3361 and through the winding of motor magnet 3360 to battery. Relay 3340 operates over this circuit, but due to its high resistance winding, the motor magnet 3360 does not operate. Contacts 3346 of relay 3340 ground conductor 3399 by way of test wiper 3379 to make the sender busy to other sender finders. Contacts 3342 complete a circuit for operating relays 3350 and 3510 as follows: from ground, contacts 3342 through the upper winding of marginal relay 3350, wiper 3372, conductor 3392 and through the winding of sender relay 3510 to battery. Contacts 3343 complete a circuit for operating relays 3240 and 3320 in multiple as follows: ground, contacts 3343 and 3311, one branch through the upper winding of relay 3240 to battery, and the other branch extending by way of contacts 3253 to the winding of slow-to-operate relay 3320 and battery. Contacts 3349 complete a local circuit including contacts 3331, 3235 and 3225 for holding slow-to-release relay 3310 in operated position. Contacts 3341′ complete a circuit for lighting the position sender lamp PSL as follows: from battery, lamp PSL, contacts 3341′, wiper 3381, conductor 3302, wiper 3684 of the sender TS switch, contacts 3417 and 3581 to ground. Relay 3350 is marginal and is operated over the above traced circuit in series with sender relay 3510 to close only its X contacts 3351. Contacts 3351 then complete the circuit by way of contacts 3343, 3311, 3351 and 3362 through the lower winding of relay 3350 to battery to fully operate relay 3350. When relay 3350 is fully operated, contacts 3356 open a point in the original energizing circuit of relay 3310 which is now held operated in the previously described local circuit. Contacts 3355 now substitute battery through the winding of sender relay 3360 for the battery through resistance R33 to maintain the pulse relay in the link selector operated and for also operating sender relay 3330. The pulse relay in the link selector 1200 is now held operated from ground through its winding over the EC conductors 1204 and 1108 as previously described and by way of contacts 3315 and 3355, wiper 3380 and EC conductor 3301 and over two paths through the winding of relay 3630 to battery; one path extending by way of contacts 3566 and the other path by way of impulse contacts 3691 of the impulse sender. Relay 3320 is a slow-to-operate relay and an interval after its circuit is completed relay 3320 operates and at contacts 3323 completes a circuit for operating sender relay 3410 as follows: ground, contacts 3343, 3311 and 3323, wiper 3374, conductor 3394 and winding of sender relay 3410 to battery. Contacts 3325, 3326, 3327 and 3328 connect the position key set by way of code leads W2001, X2002, Y2003 and Z2004 by way of wipers 3375, 3376, 3377 and 3378 to the code conductors W3395, X3396, Y3397, and Z3398 and thence by way of contacts 3411, 3412, 3414 and 3415 to the codel sender relays WS, XS, YS and ZS. Contacts 3321 connect the position cut-in key by way of wiper 3373 to conductor 3393 and to the lower winding of sender relay 3640 to battery. Contacts 3322 connect the upper winding of relay 3250 to release conductor 1802, and contacts 3329 connect the winding of relay 3210 to release conductor 1801 for subsequent ring functions. The relay 3240 operates and prepares various circuits to be described later.

If test wiper 3379 of the sender finder switch SF is standing on a bank contact associated with a busy sender, there will be ground on the test conductor 3399 from the sender thereby shunting relay 3340 and energizing motor magnet 3360. The circuit for shunting relay 3340 may be traced from grounded conductor 3399, test wiper 3379, contacts 3345, and winding of relay 3340 and contacts 3313 to ground. The circuit for energizing a motor magnet 3360 may be traced from grounded test conductor 3399, test wiper 3379, contacts 3345, 3312 and 3361 and through the winding of magnet 3360 to battery. Motor magnet 3360 energizes and at its interrupter contacts 3361 interrupts its own circuit to cause it to restore and step the wipers to the next set of bank contacts. If the sender associated with this set of bank contacts is idle, relay 3340 is no longer shunted and consequently relay 3340 energizes in series with the motor magnet 3360 as previously described. If this next sender is busy, the ground engaged by test wiper 3379 again operates the motor magnet 3360 to continue the stepping operation until wiper 3379 engages a non-grounded bank contact indicating an idle sender. If all senders become busy while the sender finder SF is hunting, ground is removed from conductor 1711 by the restoration of the all-sender-busy relay 3650 disconnecting ground from conductor 1710 to thereby cause relay 3310 to restore. The restoration of relay 3310 opens contacts 3312 thereby opening the self-interrupted stepping circuit to motor magnet 3360 to stop unnecessary hunting of the sender finder.

Relay 3350 is marginally adjusted to prevent multiple seizures of the same sender. In case two or more sender control sender finders SF attempt to switch through to the same sender, there will not be sufficient current drawn through the upper windings of the relays 3350 in any of the sender controls to cause their relays 3350 to close their X contacts 3351. However, both sender finders SF will stop and engage the same sender and the sender control relays 3340 will operate. When slow-to-operate relay 3320 operates contacts 3321′ complete a circuit by way of contacts 3353 for energizing motor magnet 3360. Contacts 3321′ also short-circuit relay 3340 until magnet 3360 energizes and opens contacts 3361. This short-circuit may be traced from ground, contacts 3313, winding of relay 3340, contacts 3312, 3361, 3353, and 3321′ to ground. Magnet 3360 opens the circuit to relay 3340. Relay 3340 restores and at contacts 3343 opens the circuit to relay 3320. Relay 3320, at contacts 3321′ opens the circuit of magnet 3360 allowing the magnet to step the wipers of the sender finder SF one step. In this manner, the sender finders in any sender control circuit attempting multiple seizure are stepped off the sender in question. This procedure is repeated until one sender finder arrives at an idle sender sufficiently ahead of any others to permit switch-through and seizure as previously described.

The sender control finder SF has now seized an idle sender and has connected the digit keys of the operator's position over code leads to the codel register relays in the seized sender. The position sender lamp PSL is controlled from the sender by way of lead 3302 to light this lamp when sender relay 3410 closes contacts 3417.

*Sender seizure*

When the sender is seized by the sender control circuit as previously described, it will be remembered that sender relay 3510 operated in series with sender control relay 3350, that sender relay 3410 operated in response to the operation of sender control relay 3320, and that relay 3630 operates over the connected EC conductors in series with the pulse relay (not shown) in the link selector 1200.

Relay 3510, at contacts 3511, connects the interrupted ground source, 120–IPM, to the multipled bank contacts of time switch TS. Contacts 3512 prepare a circuit for the motor magnet 3420 of digit switch DS, and contacts 3513 open a point in the restoring circuit for digit switch DS. Contacts 3514 disconnect one of the multiple ground connections to the common all-sender-busy relay 3650 to cause the restoration of relay 3650 if the sender happened to be the last idle sender. Contacts 3515 ground conductor 3399 to mark this sender busy to the sender finders of the sender control circuits. Contacts 3517 open a point in the restoring circuit for the control switch CS, and contacts 3518 prepares a circuit for the motor magnet 3430 of control switch CS. Contacts 3511′ and 3512′ operate the motor M of the impulser to operate the impulsing springs 3691, 3692 and 3693 at the rate of ten pulses per second. Contacts 3516 ground the hold conductor 3501 to prepare a holding circuit for the codel relays of the digit storing groups, and to light the sender busy lamp SB. Grounded hold conductor 3501 also energizes both windings of differential relay 3530 over the following circuits: the circuit for the upper winding extending from ground, contacts 3516 and 3521′, to the upper winding and battery, and the circuit for the lower winding extending from ground, contacts 3516 and 3521′, wiper 3445 and its first bank contact, wiper 3515 and its first bank contact, to the lower winding and battery. Both windings of differential relay 3530 are energized in opposition, and, therefor, the relay does not operate.

Relay 3410, upon operating, at contacts 3411, 3412, 3414, and 3415, connect the code marking relays WS, XS, YS and ZS through the sender control to the digit keys at the operator's position. Contacts 3417 complete a circuit for operating the positive sender lamp PSL as follows: ground, interrupter contacts 3581 of sender switch motor magnet 3580, contacts 3417, multipled bank contacts and wiper 3684 of time switch TS, conductor 3302, wiper 3381 of sender finder SF, contacts 3341′, and lamp PSL to battery. The operation of relay 3630 is without effect at this time. The operation of motor M (Fig. 35) operates the impulsing springs 3691, 3692 and 3693, shown in Fig. 36; but springs 3691, which transmit outgoing pulses over EC conductor 3301 to the link selector, are ineffective at this time because these springs are short-circuited at contacts 3566. Pulsing springs 3692 for operating the send switch SS are ineffective at this time because relay 3560 is not operated, and pulsing springs 3693 for operating relay 3560 are ineffective because relay 3530 is not operated. The sender is now conditioned to receive the digits keyed at the operator's position.

*Keying up the call*

Returning now to the operator's position it will be remembered that relays 1350, 1320, 1340, 1420, 1490 and 1510 are operated and that the position circuit transmits 60–IPM ground pulses to lead 1072 to flash the link busy lamp BL to indicate the link to which the position is connected. As soon as the sender finder of the sender control circuit locates and seizes an idle sender ground is returned over sender lead 3302 from the sender to light the position sender lamp PSL. Lighting of lamp PSL advises the operator that the sender is ready to receive and register the keyed digits. It should be noted that it is not necessary for the operator to operate the link talk key to answer a call. The link talk keys are operated momentarily only when the operator wishes to reconnect her position to a link. The operator obtains the necessary information from the calling party, keys up the necessary digits on her keyset, and prepares the sender and sender control for release by depressing one of the sender disconnect buttons.

When a digit key is depressed, ground is connected to the appropriate lead or leads W, X, Y, Z in accordance with the codel code shown below, thereby operating the corresponding sender code marking relay or relays WS, XS, YS, ZS.

CODEL CHART

| Digit key operated | Leads grounded | Code marking relays operated | Codel relays operated |
|---|---|---|---|
| 1 | W, X—(3395, 3396) | WS, XS | W, X. |
| 2 | W, Y—(3395, 3397) | WS, YS | W, Y. |
| 3 | W, Z—(3395, 3398) | WS, ZS | W, Z. |
| 4 | X, Y—(3396, 3397) | XS, YS | X, Y. |
| 5 | X, Z—(3396, 3398) | XS, ZS | X, Z. |
| 6 | Y, Z—3397, 3398) | YS, ZS | Y, Z. |
| 7 | W—(3395) | WS | W. |
| 8 | X—(3396) | XS | X. |
| 9 | Y—(3397) | YS | Y. |
| 0 | Z—(3398) | ZS | Z. |

The codel relays W, X, Y and Z of digit storage group 1 are, respectively, connected to the first bank contacts engaged by wipers 3451, 3452, 3453 and 3454 of the digit switch DS, and the codel relays of digit storage groups 2 to 11, inclusive, are similarly connected in sequence to the succeeding bank contacts engaged by these wipers.

When the digit key 1 is operated, key contacts 2011 and 2012 ground both conductors W and X, thereby grounding conductors 3395 and 3396, by way of contacts 3325 and 3326, and wipers 3375 and 3376; to operate sender code marking relays WS and XS by way of contacts 3411 and 3412. The operation of code marking relay WS closes a circuit for energizing the motor magnet 3420 of the digit switch DS by way of contacts 1WS and 3512, and closes a circuit for operating codel relay W of the first digit storage group by way of grounded contacts 2WS, wiper 3451 and its first bank contact, and winding of codel relay W to battery. The operation of code marking relay XS closes another circuit for also energizing the motor magnet 3420 by way of contacts 1XS and 3512, and closes a circuit for operating codel relay X of the first digit storage group by way of grounded contacts 2XS, wiper 3452 and its first bank contact, and winding of codel relay X to battery. The motor magnet 3420, upon energizing, positions its pawl (not shown) preparatory to stepping the wipers of the digit switch to their second bank contacts. Codel relay W closes contacts 1W to complete a locking circuit for itself and to ground the first bank contact accessible to wiper 3441 of the control switch CS from grounded hold conductor 3501. This locking and marking ground may be traced from ground, contacts 3516, hold conductor 3501, contacts 3611, to contacts 1W of relay W. Codel relay X closes contacts 1X to complete a locking circuit for itself and to ground the first bank contact accessible to wiper 3442 of the control switch CS from grounded conductor 3501.

When the digit key 1 is released, key contacts 2011 and 2012 open the circuits of code marking relays WS and XS to cause these relays to restore. At contacts 1WS and 1XS relays WS and XS open the energizing circuit of motor magnet 3420 which now restores and steps the wipers of the digit switch DS to their second bank contacts in the well-known manner. The restoration of relays WS and XS also open the original energizing circuits of codel relays W and X, but these codel relays are now held operated over hold conductor 3501.

When wiper 3455 of digit switch DS stepped to its second bank contact, the circuit, previously traced, through the lower winding of differential relay 3530 is opened with the result that relay 3530 now operates over the circuit completed through its upper winding.

In a similar manner, and in accordance with the above Codel Chart, the operation of any digit key grounds one or more code leads to operate the corresponding code marking relay, or relays, to thereby operate and lock the corresponding codel relay, or relays, which in turn code mark the banks of the control switch CS. The digit switch DS advances its wipers one step after each digit has been keyed in to thereby select successive digit storage groups, and the succeeding digits keyed up by the operator are registered and stored by the operation of the codel relays in the digit storage groups in a manner apparent from the foregoing description. The operated codel relays ground the bank contacts of the control switch CS to code mark the successive keyed digits in successive banks of the control switch CS. The send switch SS and the shunt field relay 3540 translate these coded markings into decimal pulses which are subsequently transmitted over the EC3301 conductor.

When relay 3530 operates, following the storage of the first keyed digit and as a result of the digit switch DS advancing its wipers to their second positions, contacts 3531, 3532, 3535 and 3536 connect wipers 3441, 3442, 3443 and 3444 to the bank contacts of the send switch SS. Contacts 3537 complete the circuit for operating relay 3560 during the next closed period of impulse springs 3693 as follows: grounded hold conductor 3501, contacts 3633, off-normal contacts 3672 of time switch TS, impulser springs 3693, contacts 3551', 3565, 3555, 3537 and 3522', and the winding of relay 3560 to battery. Relay 3560 operates, and at contacts 3564, completes a locking circuit for itself as follows: from grounded hold conductor 3501, contacts 3564, 3555, 3537, and 3522', and winding of relay 3560 to battery. Contacts 3566 remove the short-circuit from around the impulsing springs 3691 to permit springs 3691 to transmit outgoing pulses over the EC3301 conductor. Contacts 3563 complete the pulsing circuit for motor magnet 3580 of send switch SS, and contacts 3561 prepare circuits for the differential relays 3550 and 3520. Contacts 3562 open a point in the homing circuit for sender switch SS, and contacts 3565 open a point in the original energizing circuit of relay 3560 after the locking circuit for relay 3560 is closed at contacts 3564.

*Sender pulsing*

After operation of sender relays 3530 and 3560, motor impulsing springs 3691, 3692 and 3693 are rendered effective for controlling the sender. On the next closed period of impulse springs 3692 the circuit is closed to energize motor magnet 3580 of send switch SS as follows: from ground, contacts 3516, hold conductor 3501, pulse springs 3692, contacts 3563 and winding of motor magnet 3580 to battery. Simultaneously, pulsing springs 3691 open and transmit the first interrupted pulse over EC lead 3301 to the link selector 1200. Pulsing springs 3693 are utilized for operating relay 3560 and are ineffective while relay 3650 is locked over contacts 3564.

The pulsing circuit for operating the pulse relay of the link selector 1200 extends from ground through the winding of this selector pulse relay and over the EC conductors, as previously traced, to EC conductor 3301, and thence by way of impulse springs 3691 to relay 3690 and battery. Each time pulsing springs 3691 are opened the pulse relay of the link selector is restored to operate the link selector in the well-known manner. Pulsing springs 3692 transmit corresponding pulses to operate the send switch SS as follows: ground, contacts 3516, hold conductor 3501, pulsing springs 3692, contacts 3563, and winding of motor magnet 3580 to battery. Motor magnet 3580 operates to position its stepping pawl (not shown) and to operate interrupter contacts 3581 and 3582. Contacts 3581 disconnect ground from conductor 3302 to extinguish the position sender lamp PSL. When springs 3692 open, simultaneously with the closure of pulse springs 3691, magnet 3580 restores to step its wipers, reclose contacts 3581 and 3582, and operate off-normal contacts, 3591, 3592 and 3593. Contacts 3581 reclose the circuit to position sender lamp PSL to thereby flash this lamp during the sending operation. Contacts 3582 and off-normal contacts 3591 prepare the homing circuit for send switch SS, and off-normal contacts 3592 connect a multiple ground connection to conductor 3399 to mark this sender busy until the send switch SS is restored to normal.

Shunt field relay 3540 is used to detect simultaneous ground when wipers 3571 and 3572 of send switch SS engage bank contacts marked with ground. That is, both of its windings must be energized in order for relay 3540 to operate. The bank of the send switch SS is wired in such a manner as to convert the codel code marking received over the wipers of the control switch CS into a decimal equivalent by allowing the send switch SS to count off a number of steps corresponding to the digit stored by the codel relays before relay 3540 operates. For example, if the digit "5" is the first digit stored, then codel relays X and Z in the first digit storage group are locked operated to ground the first bank contacts engaged by wipers 3442 and 3444 of control switch CS, to thereby ground the fifth bank contacts accessible to wipers 3571 and 3572 of send switch SS. It should be noted that only the fifth bank contacts of both sender switch banks are simultaneously grounded, and therefore the sender switch SS takes five steps in order to operate shunt field relay 3540. The impulse springs 3691 and 3692 continue to transmit impulses to simultaneously step the link selector 1200 and magnet 3580 of send switch SS until the sender switch SS has taken five steps at which time circuits are completed for shunt field relay 3540. These circuits may be traced as follows: the first circuit from ground, contacts 3516, hold conductor 3501, contacts 3611, conductor 3502, contacts 1X of the locked codel relay X of the first storage group, first bank contact and wiper 3442 of control switch CS, contacts 3532, fifth bank contact and wiper 3571 of send switch SS, left-hand winding of shunt field relay 3540 and associated resistance to battery; and the second circuit from grounded conductor 3502, contacts 1Z of the locked codel relay Z of the first storage group, first bank contact and wiper 3444 of the control switch CS, contacts 3536, fifth bank contact and wiper 3572 of send switch SS, and right-hand winding of shunt field relay 3540 and associated resistance to battery. The impulse springs 3691 and 3692 have transmitted five pulses to simultaneously operate the link selector 1200 and the send switch SS to take five steps at which time the shunt field relay 3540 is operated as described.

The operation of shunt field relay 3540 closes contacts 3541 to energize both windings of relay 3520 in opposition and to energize only the upper winding of differential relay 3550. The circuit for energizing both windings of differential relay 3520 and the upper winding of differential relay 3550 may be traced as follows: grounded conductor 3501, contacts 3561 and 3541 where the circuit divides, one path extending by way of contacts 3525 for the upper winding of relay 3520, and the other path by way of contacts 3554 to the lower winding of relay 3520 and to the upper winding of relay 3550. Relay 3550 operates and, at contacts 3553, completes a locking circuit for itself from grounded conductor 3501. Contacts 3557 short circuit the impulse springs 3691 to terminate the outgoing digit. Contacts 3555 open the locking circuit to relay 3560, and contacts 3556 prepare a new circuit for relay 3560. Contacts 3551 place the upper winding of differential relay 3520 under control of the off-normal contacts 3593 of send switch SS. Contacts 3558 complete a circuit for energizing motor magnet 3430 of the control switch CS as follows: ground, contacts 3516, 3521', 3558, and 3518, and winding of magnet 3430 to battery.

Relay 3560 restores and at contacts 3561 opens the original traced circuits for differential relays 3520 and 3550 after substitute circuits have been provided for these relays at contacts 3551 and 3553 by the operation of relay 3550. Contacts 3563 open the pulsing circuit to magnet 3580. Contacts 3564 prepare a new circuit for relay 3560, and contacts 3566 again short-circuit impulse springs 3691. Contacts 3562 complete the homing circuit for send switch SS as follows: ground, off-normal contacts 3591, interrupter contacts 3582, contacts 3562, and winding of motor magnet 3580 to battery. Magnet 3580 operates and interrupts its own circuit to adavnce the wipers of the send switch SS step-by-step until wipers 3571 and 3572 are advanced to their normal positions, at which time the off-normal contacts 3591 open the self-restoring circuit of send switch SS. Shunt field relay 3540 restores as soon as the wipers 3571 and 3572 step off of the contacts grounded by this coded digit.

Off-normal contacts 3593 open the circuit through the upper winding of differential relay 3520 when send switch SS is returned to normal, to thereby open the energizing circuit through the upper winding of relay 3520 to cause differential relay 3520 to operate over its lower winding alone. Relay 3520, at contacts 3521', opens the circuit to magnet 3430 of control switch CS to cause the control switch to step its wipers to engage the next set of codel storage relays. Contacts 3521' also open the circuit through the upper winding of relay 3530 to cause relay 3530 to restore. Contacts 3525' close another short-circuit around the impulse springs 3691. Contacts 3523' complete a circuit for operating relay 3560 as follows: from grounded hold conductor 3501, contacts 3559, 3565, 3556, and contacts 3523', and winding of relay 3560 to battery. Contacts 3526 prepare a circuit to differentially restore differential relay 3550, and contacts 3529 prepare stopping ground for the sixth bank contacts of send switch SS to provide an inter-digital pause between the transmission of outgoing digits.

Relay 3530 restores and connects grounds to the sixth bank contacts of send switch SS by way of contacts 3516, 3529 and 3534 and at the same time, at contacts 3531, 3532, 3535, and 3536, disconnects the bank contacts of the send switch from the marking wipers of the control switch. Relay 3560 operates and locks by way of contacts 3564, 3556, and 3523'. At contacts 3561, relay 3560 prepares a circuit for the lower winding of differential relay 3550. Contacts 3563 again complete the pulsing circuit for magnet 3580 of send switch SS to advance the wipers step-by-step during the inter-digital pause. At contacts 3566, relay 3560 removes one of the short-circuits from around the impulse contacts 3691, but these impulse contacts are still short-circuited at both contacts 3557 and 3525' to prevent the transmission of outgoing impulses during the inter-digital pause.

When send switch SS had advanced the six steps, provided for the inter-digital pause, both windings of shunt field relay 3540 are energized over wipers 3571 and 3572 from the grounded sixth bank contacts. At contacts 3541, relay 3540 completes a circuit for energizing the lower winding of differential relay 3550 in magnetic opposition to its upper winding as follows: grounded conductor 3501, contacts 3561, 3541, and 3526, and lower winding of relay 3550 to battery. Differential relay 3550 now restores, and at contacts 3556 opens the locking circuit to relay 3560 which now restores. Contacts 3555 prepare the original energizing circuit for relay 3560, and contacts 3557 remove another short-circuit from around pulsing contacts 3691, which, however, are still short-circuited at contacts 3525'. Contacts 3552 and 3554 place both windings of differential relay 3550 and the lower winding of differential relay 3520 render control of off-normal contacts 3593, which closed as soon as the send switch stepped off-normal on its inter-digital operation. The circuit for maintaining relay 3520 operated may be traced from grounded conductor 3501, off-normal contacts 3593, contacts 3524, 3552, and 3554 and lower winding of relay 3520 to battery. The circuit for the lower winding of relay 3550 extends by way of off-normal contacts 3593, contacts 3524, 3552, and 3526. The upper winding of relay 3550 is connected in multiple with the lower winding of relay 3520 and energized over the same circuit as traced for the lower winding of relay 3520.

Relay 3560 restores, and at contacts 3562 reclose the homing circuit for the send switch magnet 3580 to cause the send switch SS to restore to normal and open its off-normal contacts. Shunt field relay 3540 restores when the send switch is advanced from its sixth position. Contacts 3566 again short-circuit impulse contacts 3691. When the send switch reaches its normal position, the off-normal contacts 3593 open the circuit through the lower winding of differential relay 3520 and both windings of differential relay 3550, thereby causing relay 3520 to restore. Contacts 3525' open one of the short-circuits around impulse springs 3691, which is now shorted at contacts 3566. Contacts 3522' prepare the original operating circuit of relay 3560. Contacts 3529 remove the inter-digital ground marking from the sixth bank contacts of the send switch. Contacts 3521' energize one or both windings of differential relay 3530, depending upon the wiper positions of the digit switch DS and the control switch CS.

In case the control switch CS and the digit switch DS have advanced the same number of steps, then there are no digits waiting to be sent, and both windings of differential relay 3530 are energized in magnetic opposition to prevent operation of relay 3530. However, if digits are waiting transmission, then the digit switch DS will be advanced one or more steps ahead of the control switch CS with the result that differential relay 3530 is operated over its upper winding alone by way of contacts 3516 and 3521'. The circuit to the lower winding of differential relay 3530 is open whenever wipers 3445 and 3455 are in non-corresponding positions. Generally, the digits will be keyed in faster than they can be sent so that the digit switch DS should be advanced further than the control switch, until, of course, all keyed digits have been sent. Relay 3530 reoperates when relay 3520 restores to start another sending cycle. Contacts 3531, 3532, 3535, and 3536 now connect the second bank contacts engaged by wipers 3441, 3442, 3443, and 3444 of the control switch CS to the bank contacts of the send switch SS to ground two of the bank contacts of the send switch in accordance with the operated codel relays in the second digit storage group to control the transmission of the second outgoing digit. At contacts 3537, relay 3530 prepares a circuit for operating relay 3560, which circuit is completed during the next closed period of impulse springs 3693 by way of grounded conductor 3501, contacts 3633, 3672, 3693, 3551', 3565, 3555, 3537, and 3522'. Relay 3560 reoperates to close its locking circuit at contacts 3564 and opens the last remaining short-circuit from around the impulse contacts 3691 to permit the transmission of outgoing pulses over the EC conductor 3301. Contacts 3563 close the pulse stepping circuit from pulsing contacts 3692 to the stepping magnet 3580 of send switch SS. Contacts 3561 again prepare the circuit for operating relay 3550 and for energizing both windings of differential relay 3520. Pulsing contacts 3691 transmit outgoing battery pulses over EC conductor 3301, and pulsing contacts 3692 operate stepping magnet 3580 as previously described. Shunt field relay 3540 operates when the send switch wipers 3571 and 3572 engage grounded contacts marked by the codel relays for the second digit as previously described. Relay 3540, at contacts 3541 energized both windings of relay 3520 in opposition and reoperates relay 3550 over its upper winding. Relay 3550 reoperates and locks over contacts 3553, shorts impulse contacts 3691 at contacts 3557 to terminate the transmission of outgoing pulses for the second digit, opens the circuit to relay 3560 at contacts 3555, places the upper winding of relay 3520 under control of off-normal contacts 3693 at contacts 3551, and energizes motor magnet 3430 of the control switch CS at contacts 3558 as previously described. In the same manner as previously described, relay 3560 restores to cause the send switch SS to restore to normal at which time relay 3520 is operated. Relay 3520 opens the circuit to magnet 3430 to allow the control switch CS to advance another step, opens the circuit to relay 3530, closes the circuit to relay 3560, prepares the circuit to differentially restore relay 3550, and prepares the stopping ground for controlling the send switch SS in its interdigital operation as previously described. The send switch is again operated six steps by impulse contacts 3692, while the impulse contacts 3691 are shorted during the interdigital operation. The operation of the sender for transmitting the remaining stored digits is apparent from the foregoing description.

As will be noted in Fig. 34, the sender is provided with eleven digit storage groups of codel relays, and circuit arrangements have been provided so that the first three digit storage groups may be reused if more than eleven digits are to be stored. This is accomplished by releasing the first three digit storage groups after the first three stored digits have been sent out. After the third stored digit has been sent out and while the wipers of the control switch CS are still in their third position and before the send switch SS is fully restored to start the inter-digital pause, it will be remembered that relay 3520 is in restored position and that relay 3550 is in operated position A circuit may now be traced for operating relay 3610 as follows: ground, contacts 3516, and 3521', wiper 3445 and third bank contact of control switch CS, contacts 3552', and winding of slow-to-release relay 3610 to battery. Relay 3610, at contacts 3611, disconnects grounded hold conductor 3501 from conductor 3502 to open the locking circuits of the operated codel relays in digit storage groups 1 to 3, inclusive. These codel relays restore and are thus prepared for reuse during the storage of 12th, 13th and 14th keyed digits. The operated codel relays in the remaining digit storage groups are maintained operated over hold conductor 3501 until the sender is released. Relay 3610 releases when relay 3520 opens contacts 3521; relay 3520 operating when the send switch SS is fully restored to start the counting operation for the inter-digital pause.

*Stop-dial condition*

During the setting up of a connection one or more of the automatic switches may require an additional hunting time which is greater than the inter-digital pause between the transmission of successive outgoing digits from the sender, and it is common practice to send back to the sender a "stop-dial" signal which prevents the sending of the subsequent digit until an idle outlet has been selected by the switch. This "stop-dial" signal comprises a high-resistance ground signal which is maintained on the EC outgoing pulsing lead until the idle outlet is selected and the next switch in the train is ready to receive pulses. A system employing this "stop-dial" signal is shown and described in Patent No. 2,697,134, issued December 14, 1954, to Harvey W. Balzer. In the present application, when a "stop-dial" high-resistance ground signal is received back from the outgoing switch train, relay 3630, being marginal, restores to cause the sender to stop sending until the "stop-dial" signal is removed at which time relay 3630 is reoperated. The circuit for controlling relay 3630 extends from the switch in the switch train provided with this high-resistance ground signal over the intervening switch, or switches, to the link selector 1200, conductor 1204, then over contacts 1154 and 1145, conductor 1108, contacts 3315 and 3355, wiper 3380 and engaged bank contact, conductor 3301, impulse springs 3691, or the short-circuiting contacts 3566 of relay 3560, and winding of relay 3630 to battery. It was previously described how the initiation of outgoing impulse transmission required the operation of relay 3560, and since the circuit for operating relay 3560 includes the operated contacts 3633 of relay 3630, relay 3560 cannot reoperate as long as relay 3630 is maintained in restored position. It was previously described how the differential relay 3520 operated its contacts during pulse transmission and did not restore its contacts until at the end of the inter-digital pause when the send switch SS restored to normal. The relay 3520, therefore, has its contacts operated at the time the "stop-dial" signal is restored and when relay 3630 is restored. Under these conditions a circuit may be traced for operating the stepping magnet 3660 as follows: ground, contacts 3661, 3631, 3522, normal bank contact and wiper 3682 of time switch TS, multiplied banks accessible to wiper 3681, and winding of stepping magnet 3660 to battery. Magnet 3660, at interrupter contacts 3661, interrupts its own circuit causing the switch TS to take one step and open off-normal contacts 3672, thereby opening a further point in the circuit for reoperating relay 3560. The second to seventh bank contacts, accessible to wiper 3682, are multipled and connected by way of contacts 3511 to a pulsing lead which is grounded every one-half second at the 120-IPM source, thereby causing the stepping magnet 3660 to operate and step its wipers every one-half second until wiper 3682 engages its eighth bank contact The wipers of the time switch TS remain in this position until relay 3630 is reoperated in response to the removal of the "stop-dial" signal. That is, the high-resistance ground signal is removed and a low-resistance ground is substituted therefor and relay 3630 is reoperated. Approximately three seconds are required for time switch TS to reach its eighth position, and normally, the "stop-dial" signal is removed before the time switch TS reaches its eighth position. When relay 3630 is reoperated and with wiper 3682 in its eighth position a circuit is completed for restoring the time switch TS to its normal position as follows: ground, contacts 3661 and 3632, multipled bank contacts and wiper 3682, and winding of stepping magnet 3660 to battery. Magnet 3660 interrupts its own circuit at contacts 3661 to step its wipers back to normal and to close off-normal contacts 3672. Contacts 3672 now complete the previously traced circuit for reoperating relay 3560 whereupon impulse transmission is now resumed.

In case the "stop-dial" condition persists after time switch TS reaches its eighth position, the time switch stops in this position and closes interrupted ground from source 120-IPM to conductors 3302 and 3303. The ground pulses on conductor 3302 flash the position sender lamp PSL to indicate the "stop-dial" condition. In case all digits have been keyed in, and the position has been disengaged from the link while the link is still connected to the sender, the ground pulses on conductor 3303 cause the link busy lamp BL to flash at 120-IPM in unison with the position sender lamp PSL to indicate the particular link on which the "stop-dial" condition exits. This circuit for flashing the link busy lamp may be traced as follows: from interrupted ground 120-IPM source, eighth bank contact and wiper 3683 of time switch TS, conductor 3303, bank contact and wiper 3382 of sender finder SF, contacts 3342', conductor 1160, contacts 1148, contacts 1041' which close when the position is disconnected from the link, and link busy lamp BL to battery. If the "stop-dial" condition fails to clear itself, the operator must release the front or rear of the link, depending upon the link end on which the "stop-dial" is encountered. This causes the sender control, the sender, and the switch train to release. With a call waiting on the link, the alternate sender control automatically hunts for a new sender and the operator then re-keys the digits into the new sender and handles the call in the normal manner.

*Flash-busy*

In case any of the switches in the outgoing switch train encounter an all-trunk-busy condition, a flash-busy signal is transmitted back to the sender. This flash-busy signal comprises alternate low and high resistance pulses back from the switch train through the link selector 1200 and over conductor 1204, contacts 1154 and 1145, conductor 1108, contacts 3315 and 3355 and conductor 3301 for intermittently operating relay 3630. When relay 3630 restores in response to the high resistance pulse, the circuits for stepping magnet 3660 of the time switch TS is again completed at contacts 3631 to cause switch TS to step to its first position and open off-normal contacts 3672. Off-normal contacts 3672 prevent the reoperation of relay 3650. In the same manner as previously described, a circuit is completed through wiper 3682 to cause switch TS to step every half-second. In this case, due to the flash-busy signal alternately causing relay 3630 to restore and reoperate, the relay 3630 is reoperated before switch TS has advanced to its eighth position. Now, when relay 3630 reoperates, a circuit may be traced for energizing both windings of differential relay 3620 as follows: grounded hold conductor 3501, contacts 3633 and 3673, through the lower winding of relay 3620 to battery and also through the opposing upper winding of relay 3620, contacts 3633, and resistance 3634 to battery. Relay 3620 is of the differential type which operates its X contacts 3622 in response to an inductive surge when the circuits to relay 3620 are opened. When relay 3630 again restores in response to the high resistance pulse, the circuits through the windings of relay 3620 are opened at contacts 3633, and an inductive kick is generated in relay 3620 which is sufficient to cause X contacts 3622 to close. The closure of X contacts 3622 now complete an aiding circuit through both windings of relay 3620 in series for completely operating relay 3620. This circuit may be traced from grounded wiper 3685 in engagement with any one of its first five multipled bank contacts, X contacts 3622, and through the upper and lower windings of relay 3620 in series to battery. The upper winding now assists the lower winding to fully operate relay 3620. Relay 3620, at contacts 3623, opens the resistance battery connection to its upper winding to prevent relay 3620 from being differentially restored during the next operated period of relay 3630. Contacts 3621 close a circuit to initiate the release of the sender and sender control if all digits have been keyed in and a disconnect button has been depressed. If one of the disconnect buttons has been depressed, relay 3410 will be restored in a manner subsequently described, and contacts 3621 connect ground to conductor 3395 to initiate the release of the sender control and sender. The circuit for grounding conductor 3395 may be traced from grounded wipers 3685 and engaged bank contacts, contacts 3621 and 3413. Grounding conductor 3395 initiates the release of the sender control and sender in manner to be described later.

In case a disconnect button has not been depressed, relay 3410 will still be operated, and the closing of contacts 3621 cannot initiate a release. Under these conditions relay 3620 restores when wiper 3685 of switch TS steps from its sixth bank contact to its seventh bank contact. When time switch TS reaches its eighth position, a circuit is closed, during the operated periods of relay 3630, to self-interruptedly step the time switch to its normal position as follows: ground, contacts 3661 and 3632, eighth bank contact and wiper 3682, and winding of stepping magnet 3660 to battery. When the time switch reaches normal the next stored digit is transmitted in the same manner as previously described. The transmission of this digit and subsequent digits, after a busy condition is encountered, are without effect since no switch is conditioned to receive the transmitted pulses. During the inter-digital pause, while relay 3520 is operated, the pulsing of relay 3630 by the flash-busy signal initiates another cycle of operation of time switch TS. Time switch TS and relay 3620 operate as before. If a disconnect button has been depressed, the operation of relay 3620 initiates the release of the sender control and sender. If not, relay 3620 restores and time switch TS homes; and the next digit is transmitted, etc., until the operator finishes keying up the call and depresses a disconnect button. The next operation of relay 3620 then initiates the release. After the sender and sender control have released, the alternate sender control hunts for a sender, and the operator then re-keys the digits to handle the call in the normal manner.

*Release of sender control and sender*

After keying up the necessary digits, the operator depresses one of the sender disconnect buttons. Depressing any of the sender disconnect buttons closes ground by way of contacts 2013, 2015, or 1887 to conductor 1802 to operate relay 3250 by way of contacts 3322 and the upper winding of relay 3250. Relay 3250 operates, and, at contacts 3251, grounds conductor 1608 while the disconnect button is still depressed to control the position alternator relays 1580 and 1620 to select the alternate sender control on the next sending operation. Contacts 3252 complete a locking circuit through the lower winding of relay 3250 by way of contacts 3311 and 3343. Contacts 3253 open the circuit to the slow-to-operate relay 3320. Contacts 3257 provide a local holding circuit for seizure relay 3330 by way of contacts 3332. Relay 3320 restores after an interval and, at contacts 3322, opens the original circuit for relay 3250 and the circuit to conductor 1608. Contacts 3323 disconnect ground from the conductor 3324 to open the circuit of the sender relay 3410. Contacts 3324 prepare a circuit for relay 3220, and contacts 3325 to 3328, inclusive, open points in the code marking circuits. Contacts 3329 open a point in the circuit for operating the auto-ring relay 3210.

In the sender, relay 3410 restores when the sender control relay 3320 restores to further open the code marking circuits, and at contacts 3413 prepares a circuit to ground lead 3395 to initiate the release of the sender control and sender when sending is completed. After the last digit has been sent, the control switch CS and the digit switch DS will have advanced their wipers to corresponding bank positions, and when relay 3520 releases, following the inter-digital pause, both windings of differential relay 3530 are energized by way of contacts 3521′ in magnetic opposition to prevent reoperation of relay 3530. When relays 3530, 3520 and relay 3410 restore, ground is connected to conductor 3395 to operate relay 3220. This circuit may be traced as follows: ground, contacts 3516, 3533, 3527 and 3413, conductor 3395, wiper 3375, contacts 3344, 3324 and 3254, and lower winding of slow-to-operate relay 3220 to battery. This circuit is also completed if the sender encounters a flash busy condition as previously described. Relay 3220 operates and closes contacts 3221 to transmit an auto-ring signal only in case the auto-ring relay 3210 is operated. For the time being, it will be assumed that a disconnect key has been operated which does not cause relay 3210 to be operated. Contacts 3222 complete a circuit by way of contacts 3212 for operating slow-to-release relay 3230 if the automatic ring relay 3210 is not operated. Contacts 3224 complete a circuit from grounded contacts 3241 to the upper winding of relay 3220 to lock this relay operated, and also close a circuit through contacts 3233 to the lower winding of relay 3240 before the slow-to-operate relay 3230 operates. Contacts 3225 open the circuit to the slow-to-release relay 3310. Contacts 3226 prepare a holding circuit for relay 3330, and contacts 3227 open the original energizing circuit of relay 3330, which is now held operated over contacts 3257 and 3332. Slow-to-operate relay 3230 operates, and at contacts 3233, opens the momentarily closed circuit through the lower winding of relay 3240. Contacts 3234 prepare a circuit to ground conductor 1162. Slow-to-release relay 3310 restores after an interval, and at contacts 3311, opens the circuit relay 3240, opens the locking circuit to relay 3250 and the circuit to the lower winding of slow-to-release relay 3350. Contacts 3313 open the circuit to relay 3340, and contacts 3314 close battery through resistance R33 and contacts 3314 to the EC conductor 1108 before the contacts 3315 open the circuit extending over conductor 3301 and winding of relay 3630 to battery.

Relay 3340 restores, and at contacts 3342, opens the circuit through the upper winding of relay 3350 and the circuit of the sender relay 3510. Contacts 3344 open the original circuit of relay 3220 now held operated over contacts 3241 and 3224. Contacts 3346 disconnect one of the busy marking grounds from conductor 3399, which is still grounded until the sender is fully restored. Contacts 3347 energize motor magnet 3360 in a self-interrupted circuit including contacts 3352 and interrupter contacts 3361. Contacts 3341′ open the circuit to the position sender lamp PSL, and at contacts 3342′ open the circuit to the link busy lamp BL.

When relay 3250 restores, contacts 3254 open the original circuit through the lower winding of relay 3220. Contacts 3256 close a new holding circuit for relay 3330 by way of contacts 3332, 3226 and 3256. The motor magnet 3360 of the sender finder steps self-interrupted over contacts 3352, 3347 and interrupter contacts 3361 until relay 3350 restores. Slow-to-release relay 3240 restores, and opens the locking circuit of relay 3220 at contacts 3241. Contacts 3243 ground conductor 1162 to operate link relay 1030 as follows: ground, contacts 3255, 3243, 3322′ and 3234, conductor 1162, contacts 1149 and upper winding of differential relay 1030 to battery.

When slow-to-release relay 3350 restores, contacts 3352 open the self-interrupting circuit to motor magnet 3350 to stop the rotation of the sender finder. Slow-to-operate relay 3220 restores shortly after its circuit is opened, and at contacts 3222, opens the circuit to slow-to-operate relay 3230. Contacts 3226 open the last holding circuit for relay 3330, and removes ground from conductor 1163 to open the locking circuit of link relay 1140, thereby causing sender relay 3330 and link relay 1140 to restore. Relay 3230 restores after an interval, and at contacts 3234, removes ground from conductor 1162 to open the original operating circuit of link relay 1030. The sender control is now released to normal and is prepared for its next operation.

The release of the sender control will now be considered when the operator has operated the auto-ring relay 3210 by operating one of the sender disconnect buttons to cause contacts 1888 or 2014 to ground the automatic ring conductor 1801. The operation of the auto-ring relay 3210 introduces a time delay in the operation of the slow-to-operate relay 3230 in order to transmit an automatic ring-start signal over conductor 1106. The release of the sender control is the same as that just described, except that when relay 3220 is operated it transmits a ring signal and starts its weighted spring 3223 in motion. After a delay of approximately one or two seconds, the vibrations of the weighted spring become sufficiently damped to allow the slow-to-operate relay 3230 to fully operate. In the same manner as previously described, the operation of relay 3230 causes relays 3310, 3240, 3250 and 3340 to restore; relay 3340 causes relay 3350 to restore; relay 3240 causes relay 3220 to restore; and relay 3220 causes relay 3230 to restore. When relay 3240 restores, contacts 3241 open the locking circuit of automatic ring relay 3210. Relay 3210, at contacts 3211, disconnects the low resistance battery ring-start signal from conductor 1106. The ring-start signal has been connected to the conductor 1106 during the time both relays 3210 and 3220 were operated. The ring-start signal is transmitted over the following circuit: from battery resistance R32, contacts 3221 and 3211, conductor 1106, contacts 1142 and 1034, conductor 1202 extending to link selector 1200 and to the ring relay (not shown) in the outgoing trunk circuit, similar to that shown and explained in the Molnar Patent 2,361,313, issued October 24, 1944. This ring relay controls the ringing of the called subscriber in a well-known manner.

When the sender control releases and removes ground from conductor 3392 by the restoration of sender control relay 3340, sender relay 3510 restores. Contacts 3513 complete a self-restoring circuit for the digit switch DS. Contacts 3514 prepare a self-restoring circuit for time switch TS. Contacts 3515 disconnect one of the multiple grounds from conductor 3399. Contacts 3511′ and 3512′ open the circuit to the impulsing motor M to stop the operation of the pulsing contacts. Contacts 3517 complete a self-interrupting circuit for restoring the control switch CS. Contacts 3516 disconnect ground from hold conductors 3501 and 3502 to restore any operated codel relays and to open the circuit to relay 3530. Relay 3630 restores when the sender control relay 3310, at contacts 3315, opens its circuit. Contacts 3631 prepare the restoring circuit of the time switch TS and the circuit to operate the common all-sender-busy relay 3650.

The restoring circuit for the digit switch DS may be traced as follows: ground, off-normal contacts 3422, interrupter contacts 3421, contacts 3513 and winding of motor magnet 3420 to battery. When the wipers of the digit switch are restored to normal the off-normal contacts 3422 open the restoring circuit, and off-normal contacts 3423 disconnect one of the multiple grounds from conductor 3399.

The restoring circuit for the control switch CS may be traced as follows: from ground, off-normal contacts 3432, interrupter contacts 3431, contacts 3517 and winding of motor magnet 3430 to battery. When the wipers of the control switch are restored to normal off-normal contacts

3432 open the restoring circuit, and off-normal contacts 3433 disconnect another multiple ground from conductor 3399. The restoring circuit for the time switch TS, if operated, may be traced as follows: from ground, interrupter contacts 3661, contacts 3631, 3521 and 3514, wiper 3681 in engagement with any one of its multiple bank contacts and winding of magnet 3660 to battery. When the wiper 3681 reaches normal position, the restoring circuit for magnet 3660 is opened, and a circuit is completed for the common all-sender-busy relay 3650. When the wipers of the time switch are in normal position off-normal contacts 3671 remove the last busy ground from conductor 3399 to indicate the idle condition of the sender. Off-normal contacts 3673 open a point in the circuit to relay 3620, and off-normal contacts 3672 close to prepare the circuit for relay 3560. The sender is now fully restored and may be used on subsequent calls.

*Releasing the sender control and position from the link*

When any of the position disconnect keys AD, PSD or PD are operated in order to release the link from the position, position relay 1530 is operated, and at contacts 1531 disconnect ground from conductor 1207 to restore link relays 1130 and 1040 and position relay 1340. Relay 1040 restores, and at contacts 1043 and 1046, disconnects the operator's telephone circuit from the link selector 1200, and contacts 1044 and 1047 disconnect the operator's telephone circuit from the rear of the link. Contacts 1042 and 1045 now extend the talking circuit straight through from the rear of the link to the front of the link. This circuit may be traced from the calling subscriber over the negative and positive talking conductors to the wipers of the local office selector, through the repeating coil RC of the CLR trunk Fig. 21 to wipers 2271 and 2272 of the primary switch associated with this trunk; conductors 1001 and 1002 directly to link 1 if the primary switch selected a direct primary path, or by way of conductors 2291 and 2292 through secondary switch wipers 851 and 852 and to the link conductors 1001 and 1002 in case a secondary access through one of the secondary switches is utilized to connect to an idle link. The circuit continues from link conductors 1001 and 1002, contacts 1042 and 1045, contacts 1033 and 1035 to conductors 1201 and 1202 extending to the link selector 1200. The remainder of the circuits extend over the talking conductors of the operated switch train to the called party in a well-known manner. Contacts 1049 prepare a point in the release circuit for relay 1020. Contacts 1041′ close the busy lamp circuit to the sender control by way of contacts 1148 and conductor 1160 in case the sender has not completed sending and, when sending is completed and relay 1140 restores, contacts 1041′ close the circuit to light the busy lamp BL steadily as long as the link is engaged. This circuit for steadily lighting the busy lamp may be traced from grounded conductor 1060, contacts 1022′, 1158, 1147 and 1041′. Contacts 1042′ disconnect the busy lamp BL from the position, and contacts 1043′ prepare a point in the release circuit for relay 1030.

Relay 1130 restores, and contacts 1134 and 1136 disconnect both windings of the rear supervisory relay 1110 from the position, and at contacts 1135 connects the lower winding of relay 1110 to supervisory conductor 1005. Contacts 1131 open the original energizing circuit of relay 1020 now held over contacts 1022. Contacts 1138 open the circuit to the identity lamp IL. Contacts 1139 open the circuit to position relay 1310 which restores to extinguish the front supervisory lamp EF.

When position relay 1340 restores, in response to the operation of relay 1530, contacts 1341 open the circuit to relay 1420 which restores. Relay 1420, at contacts 1421 and 1424 disconnects the operator's telephone circuit. Contacts 1428 open the locking circuit of relay 1530 which restores. Contacts 1429 reoperate relay 1520 if relay 1480 is normal and contacts 1421′ prepare the flashing circuit to the position pilot lamp PP and the switch pilot lamp SPL. Relay 1520 reoperates and prepares the operator's position to receive subsequent calls as the position is now disconnected from the link.

When sending is completed and the sender control relay 3240, at contacts 3243, grounds conductor 1162 as previously described, link relay 1030 is operated by way of contacts 1149. Relay 1030 closes contacts 1032′ to complete a locking circuit through its upper winding as well as grounding conductor 1213 by way of contacts 1139 in case relay 1130 is still operated, for operating position relay 1310. Contacts 1031′ prepare a circuit for releasing relay 1030, and contacts 1036 ground conductor 1203 to hold the link selector and the switches in the switch train in the well-known manner. Contacts 1037 prepare to connect the resistance battery through the winding of front supervisory relay 1050 to conductor 1204 in place of the resistance battery supplied over the EC conductor 1108 from the sender or sender control. Contacts 1032 and 1034 disconnect the sender control conductors 1104 and 1106 from conductors 1201 and 1202, and at contacts 1033 and 1035 connect the link selector conductors 1201 and 1202 to position conductors 1061 and 1063 to thereby connect the operator's telephone circuit to the switch train in case the relay 1040 is operated. Contacts 1035′ open the circuit to the upper winding of relay 1140. Contacts 1033′ open the circuit to the upper winding of relay 1150, and contacts 1034′ open another point in the circuit to relay 1010.

The last function of the sender control is to open the holding circuit for the sender control relay 3330 and to disconnect ground from conductor 1163 to restore link relay 1140 as previously described. Relay 1140 restores and opens the circuit to the sender control leads 1104 and 1106 at contacts 1141 and 1142. Contacts 1143 remove one of the multiple grounds from conductor 1203 now grounded at contacts 1036. Contacts 1145 disconnect the sender control EC conductor 1108 from conductor 1204, and at contacts 1144 connect front supervisory relay 1050 to conductor 1204 to operate relay 1050. This circuit may be traced as follows: from low resistance ground extending back over the switch train to supervisory conductor 1204 of link selector 1200 and thence by way of contacts 1154 and 1144 and 1037 through the winding of front supervisory relay 1050 and the associated resistance to battery. Contacts 1147 complete a circuit to steadily light the busy lamp BL from the grounded conductor 1060 as long as the link is engaged. Contacts 1148 disconnect the busy lamp BL from the sender and sender control. Contacts 1149 open the original energizing circuit of relay 1030 now locked over contacts 1032′. The front supervisory relay 1050 operates and contacts 1051 light the front supervisory lamp FL. When the called party answers, the low resistance ground extended back over the switch train to conductor 1204 is changed to high resistance ground in the well-known manner to restore front supervisory relay 1050 and extinguish the front supervisory lamp FL.

In case the position is not disconnected from link until after sending is completed, and when relay 1030 operates with relay 1130 still operated, contacts 1032′ complete the circuit for operating relay 1310 to light the engaged front lamp EF. The circuit for operating position relay 1310 may be traced from ground contacts 1032′ and 1139, conductor 1213 and winding of relay 1310 to battery. Contacts 1315 complete a circuit for lighting the engaged front lamp EF over conductor 1391 and key contacts 1871. In a similar manner and with relays 1020 and 1120 still operated when relay 1030 is operated, the position engaged rear lamp ER is illuminated. That is, position relay 1320 is operated from ground contacts 1022 and 1131, conductor 1205 and through the upper winding of relay 1320 to battery. The engaged rear lamp ER is illuminated over the following circuit: ground, contacts 1355, 1335, 1325 and 1416′ to lamp ER and battery.

With the position and sender control completely disconnected from the link, the connection is extended directly through the link over closed contacts 1042 and 1045, and contacts 1033 and 1035. The rear supervisory relay 1110 is now connected to the supervisory conductor 1005 to control the rear supervisory lamp RL, and the front supervisory relay 1050 is connected to the front supervisory conductor 1204 to control the front supervisory lamp FL. Relays 1020 and 1030 remain operated until the operator releases the connections on the rear and front of the link. When the operator is again ready to receive a call, direct ground is again closed to conductor 1214 to operate the relays, such as relays 1010, in the remaining idle links. Succeeding calls from the call distributing switches are handled in the same manner as described.

*Use of various disconnect buttons*

The operator's position is provided with a choice of sender disconnect buttons, such as the blue disconnect button SD, Fig. 20; the red sender disconnect button SAR with automatic ring-start, Fig. 20; the red position and sender disconnect button PSD, with automatic ring-start, Fig. 18; and the grey position disconnect button PD, Fig. 20. The position grey disconnect button PD allows the operator to retire from a connection after using either the blue sender disconnect button SD, or the red sender disconnect button SAR, or after re-entering an established connection. The operator is also provided with a blue answer disconnect button AD, Fig. 18, which enables the operator to retire from a connection and simultaneously busy her position to further incoming calls. An accept call button AC, Fig. 18, is also provided to enable the operator to remove the busy condition to accept or originate a call.

When an automatic ring-start signal is not required, the blue sender disconnect button SD is used to condition the sender control to release itself and the sender after sending is completed. Operation of sender disconnect button SD, at contacts 2015 and 2016, grounds conductor 1802 extending to the sender control to operate relay 3250 by way of contacts 3322 and upper winding of relay 3250. Relay 3250 conditions the sender control to release itself and the sender in a manner subsequently described. At contacts 3251, relay 3250 extends grounded conductor 1802 by way of conductor 1608 to energize the upper windings of differential relays 1580 and 1620 by way of contacts 1623 and 1581, and to energize the lower winding of relay 1620 by way of contacts 1623 and 1622. Differential relay 1580 alone is operated in the above traced circuits, and differential relay 1620 remains unoperated because its two windings are energized in opposition. Relays 1580 and 1620 are provided in the operator position to enable the operator to alternately use its two sender control circuits. This alternate use of the two sender control circuits will be subsequently described.

The red sender disconnect with automatic ring-start button SAR is used when automatic ring-start is required and the operator wishes to remain with the call until the called party answers. Button SAR accomplishes the same functions as described above for the blue sender disconnect button SD, and, in addition to grounding conductor 1802 at contacts 2013, also grounds conductor 1801 to operate the sender control automatic ring relay 3210 by way of operated contacts 3329. Operation of relay 3210 in the sender control is provided to transmit an automatic ring-start signal immediately after sending is completed in a manner subsequently described.

In using either the sender disconnect button SD, or the sender disconnect with automatic ring-start button SAR, as above described, the position remains connected to the link after sending is completed. This allows the operator to audibly observe the completion of the call. When the operator is ready to retire from the connection, she has a choice of two buttons which will disconnect her position from the link. The routine procedure will be to use the position disconnect button PD, which releases the position in a manner to be described later. Using the PD button re-conditions her position to receive another call in the usual manner. An alternative procedure available to the operator, if she wishes to release her position and simultaneously make it busy to further calls, is to use the blue answer disconnect button AD (Fig. 18). The operations performed by the operation of button AD will be described later.

Under certain calling conditions when automatic ring-start is required, it is not necessary for the operator to remain with the connection until the called party answers. Under these circumstances, the operator uses the red position and sender disconnect with automatic ring-start button PSD (Fig. 18). This button combines both the functions of the sender disconnect with automatic ring-start button SAR and the position disconnect button PD by grounding both conductors 1801 and 1802.

*Releasing the position from the link*

If the operator uses the sender disconnect button SD, or the sender disconnect with automatic ring-start button SAR to release the sender and sender control she must use the position disconnect button PD or the answer disconnect button AD when she is ready to release her position from the link. As has been previously mentioned, the normal procedure will be for the operator to use the position disconnect button PD, which releases the position and retains the automatic answering feature. The answer disconnect button AD also releases the position, but, in addition, conditions the position to block further incoming calls until the operator depresses the accept call button AC or performs some other operation.

Depressing the position disconnect button PD, or the answer disconnect button AD completes the circuit for operating relay 1530 as follows: from ground, contacts 2066 of disconnect button PD, conductor 1803 and conductor 1504, which is grounded by contact springs 1884 in case the answer disconnect button AD is operated, and to the winding of slow-to-operate relay 1530 to battery. Contacts 1532 complete a locking circuit for relay 1530 as follows: ground, contacts 1428 and 1532 to the winding of relay 1530 and battery. Contacts 1535 disconnect the 60-IPM source from conductor 1072, and at contacts 1534 prepare to place the link busy lamp BL under control of the sender. Contacts 1531 disconnect ground from relay 1340 and from conductor 1207 to release relay 1340 and link relays 1130 and 1040.

Position relay 1340 restores and at contacts 1341 opens the circuit to slow-to-operate relay 1420. In the link circuit relay 1130, at contacts 1131, disconnects ground from conductor 1205 to release relay 1320. Relay 1320 restores and at contacts 1328 disconnects ground from conductors 1681 and sender control conductor 1701 to open the original energizing circuit of sender control seizure relay 3330. Contacts 1325 open the circuit to the engaged rear lamp ER to extinguish this lamp. Contacts 1322 prepare a point in the stopping circuit to reconnect the upper winding of stop relay 1440 to the stop conductor 1066 in order to provide stopping battery for future calls. If the position is being released after sending is completed, then when relay 1130 restores, contacts 1139 in the link circuit disconnect ground from conductor 1213 to restore position relay 1310. In this case relay 1310 restores and at contacts 1315 extinguishes the engaged front lamp EF.

Relay 1420 restores and at contacts 1428 opens the locking circuit of relay 1530 which restores slowly. Contacts 1421 and 1423 disconnect the operator's circuit. Contacts 1429 reclose the operating circuit for relay 1520 by way of ground contacts 1429, 1386 and 1373', conductor 1394, springs 1885 of answer disconnect button AD, conductor 1503, contacts 1481 and 1511 to relay 1520 and battery. Relay 1520 operates and at contacts 1521 recloses its locking circuit. Contacts 1522 again shortcircuit resistance R14 and relay 1490 to reoperate the marginal link relays 1010 in the remaining idle links. Contacts 1526 relight the position pilot lamp PP and the switch pilot lamp SPL. Contacts 1523 reconnect battery to the upper winding of relay 1440 to thereby connect stopping battery to the stopping lead 1066. In the link circuit of the remaining idle links the operation of the marginal relays 1010 at contacts 1011 connect this stopping battery over the stopping circuit to the call distribution primary and secondary switches by way of conductor 1003, contacts 1911 and conductors 800 and 2883. Relay 1530 restores after an interval and the position is now prepared to accept another call.

In the event the answer disconnect button AD had been used, or in case no links were available at this position, the circuit to relay 1520 would be opened. Relay 1520 is therefore not reoperated and stopping battery is disconnected from stopping conductor 1066 at contacts 1523. Since relay 1520 is not operated to provide stopping battery for the distribution primary and secondary switches this operator's position, is therefore made busy to incoming calls.

The use of the answer disconnect button AD for disconnecting the operator position from one of its links enables the operator to temporarily busy her position to incoming calls. If the operator observes an operator recall on an established connection through a second one of her links while she is completing a call through a first one of her links, the operator may operate her answer disconnect button AD, instead of the position disconnect button PD, to disconnect her position from this first link and then connect her position to the second link to answer the recall by operating the link talk key of the second link. After answering the recall on the second link she may disconnect her position from the second link by operating the position disconnect button PD which reconditions her position for automatic answering, or she may again operate the answer disconnect key AD if she desires to block automatic answering.

In order to explain this operation, it will be assumed that, while the operator is setting up a connection over a first one of her links, she observes an operator recall on a second of her links. The operator after setting up the desired connection over the first link, then operates the answer disconnect button AD to operate relays 1480 and 1530. The circuit for operating relay 1480 may be traced as follows: ground, key contacts 1883, 1889 and 1892, conductor 1308, contacts 1353, winding of relay 1480 and associated resistance to battery. The circuit for operating relay 1530 may be traced as follows: ground, key contacts 1884, conductor 1504, and winding of relay 1530 to battery.

Relay 1480 operates and prepares a locking circuit for itself at contacts 1483, and, at contacts 1481, opens the circuit to relay 1520 to prevent its reoperation. Relay 1530 operates and temporarily locks itself by way of contacts 1532 to ground at contacts 1428, and, at contacts 1531, opens the circuit to position relay 1340 and link relays 1130 and 1040. Relay 1340 restores and opens the circuit to relay 1420 at contacts 1341, and completes a locking circuit for relay 1480 at contacts 1342. The locking circuit for relay 1480 may be traced as follows: ground, contacts 1342, 1482, 1386, 1373′, 1483, busy key BK, conductor 1409, key contacts 1881 of the automatic answers cut-off key AACO, key contacts 1889 of the accept call button AC, key contacts 1892 of the dial rear button DR, conductor 1308, contacts 1353, and winding of relay 1480 and associated resistance to battery.

The link relays 1130 and 1040 restore to cause the position relays 1310 and 1320 to restore and extinguish the engaged rear and front lamps ER and EF in the manner previously described.

Relay 1420 restores to disconnect the operator's headset and opens the locking circuit of relay 1530 at contacts 1428. Contacts 1429 close a multiple locking circuit for relay 1480 at contacts 1342, and contacts 1421′ flash the position pilot and switch pilot lamps PP and SPL to indicate blocked automatic answering.

When the answer disconnect button AD is restored, key contacts 1884 open the circuit of relay 1530 which now restores. The operator position has now been disconnected from the first link over which the operator has been completing a connection. Relay 1480 is now locked operated and relay 1520 cannot reoperate to connect stopping battery at contacts 1523 to stop conductor 1066 thereby blocking any incoming calls to this position.

In order to answer the recall on the second link, the operator now operates the link talk key 1220 of the second link. Key contacts 1221 completes a circuit for operating link relay 1130 in series with relay 1320 as follows: ground, contacts 1352, 1443, 1426, lower winding of relay 1320, conductor 1215, talk key contacts 1221, contacts 1025 or 1038, and upper winding of link relay 1130 to battery. Relay 1130 operates and prepares circuits for operating relays 1040 and 1340 at contacts 1133, and, at contacts 1138, completes a circuit for operating front connect relay 1310 over conductor 1213 from ground at contacts 1032′.

Relay 1320 operates and completes the circuit for operating relays 1040 and 1340 at contacts 1321. Contacts 1322 open a point in the stopping circuit and contacts 1325 complete a circuit to light the engaged rear lamp ER. Relay 1310 operates, opens another point in the stopping circuit at contacts 1314 and, at contacts 1315 completes a circuit for operating the front engaged lamp EF. The circuit for operating relays 1340 and 1040 may be traced from ground, contacts 1531 and 1351, winding of relay 1340, contacts 1311 or 1321, conductor 1207, contacts 1133, and winding of relay 1040 to battery. Link relay 1040 connects the operator position to this link in the same manner as previously described. Relay 1340 operates and completes the circuit for operating relay 1420 at contacts 1341, and, at contacts 1342, disconnects one of the multiple locking grounds for relay 1480. Relay 1420 operates and connects the operator's headset to the established connection as previously described. Contacts 1429 open the locking circuit to relay 1480 which now restores, and contacts 1421′ open the flashing circuit to lamps PP and SPL.

Relay 1480 now restores and, at contacts 1481, prepares the circuit for reoperating relay 1520. The operator is now connected to the recall connection, and after taking care of this recall on the second link, the operator may disconnect her position from the second link by operating her position disconnect button PD in the same manner as previously described. In this case, since no circuit is completed to reoperate relay 1480, the position reverts back to automatic answering. It should be noted at this time that the locking circuit for relay 1480 also includes key contacts 1892 of the dial rear button DR, key contacts 1889 of the accept call button AC, and contacts 1386 of the monitor relay 1380. Therefore, a dial rear operation, a monitoring operation, or the operation of the accept call button, opens the locking circuit of relay 1480 which restores to recondition the operator position for automatic answering after one of the above mentioned operations.

The operator's position may also be released by means of the red position and sender disconnect with automatic ring-start button PSD. The use of this button PSD combines in a single operation the functions of the sender disconnect with automatic ring-start button SAR and the position disconnect button PD. The release of the position in response to the operation of button PSD is the same as described above in connection with the release of the position using buttons SAR and PD. It should be noted however, that when button PSD is used and the call is extended over the front of the link, the position releases from the link while the sender is still sending over the link and in this case the relay 1310 is not operated as previously described.

*Automatic answering cut-out*

If the operator wishes to remove the automatic answering feature and accept calls on a key answering basis, she operates the automatic answer cut-out key AACO. Relay 1480 now energizes over the following circuit from ground, contacts 1417′ conductor 1393, operated contacts 1882 of automatic answer cut-out key AACO, contacts 1889 of the accept call button AC, contacts 1892 of dial rear button DR, conductor 1308, contacts 1353 and the winding of relay 1480 to battery. Relay 1480 operates and at contacts 1481 prevents the reoperation of relay 1520. When relay 1520 restores stopping battery is withheld from the stopping lead 1066 and the position is made busy to further incoming calls. It should be noted that in case any link associated with this position is idle, in which case the all link busy relay 1510 will be operated, that the position pilot lamp PP and the switch pilot lamp SPL are flashed at the rate of 30-IPM over the following circuit from ground to the 30-IPM interrupter, contacts 1421′, 1513 and 1527 to the position pilot and switch pilot lamps PP and SPL. The flashing of these lamps indicates to the supervisor as well as the operator that the operator at this position has switched to key answering.

To accept a call, the operator depresses the accept call button AC to open the circuit of relay 1480 at contacts 1889. Relay 1480 restores and at contacts 1481 recloses the circuit relay 1520 to cause the latter relay to operate. Relay 1520, in the same manner as previously described operates, locks and causes a call to be accepted in the usual manner. As soon as the accept call button AC is released, the circuit for relay 1480 is reestablished and the latter relay reoperates. Relay 1480 again conditions the position circuit to prevent the automatic reoperation of relay 1520 so that the operator's position may answer an incoming call only in response to the reoperation of the accept call button. When the operator wishes to return the position back to automatic answering position she will restore the automatic answer cut-out key AACO to thereby release relay 1480 to enable the reoperation of relay 1520.

If the operator wishes to busy out her position to incoming calls, she depresses the answer disconnect button AD. The operator may use this button at any time while her position is idle, or she may use this button instead of the position disconnect button PD to release the position from a link and simultaneously make it busy to further incoming calls. Depressing the answer disconnect button AD at contacts 1885 opens the circuit to relay 1520. Contacts 1883 complete a circuit for operating relay 1480 by way of contacts 1889 and 1892, conductor 1308, contacts 1353 and winding of relay 1480. At contacts 1884 answer disconnect button AD completes a circuit for operating relay 1530 over conductor 1504. Relay 1530 operates and at contacts 1531 opens the circuit to position relay 1340 and link relays 1130 and 1040 to initiate the release of the position. If the answer disconnect button AD is being used instead of the position disconnect button PD, relay 1480 operates and at contacts 1481 prevents the reoperation of relay 1520. Contacts 1483 of relay 1480 complete a locking circuit for itself as follows: ground, contacts 1429, 1386, 1373' and 1483, back contacts of busy key BK, conductor 1409, closed contacts 1881 of the automatic answering cut-off key, contacts 1889 of the accept call button, contacts 1892 of the dial rear button, conductor 1308, contacts 1353 and winding of relay 1480 to battery. When relay 1520 restored, as described for automatic answering cut-off, the position is made busy to incoming calls by withholding stopping battery from the stop lead 1066 by the open condition of contacts 1523. Relay 1530 restores when the answer disconnect button AD is released to open contacts 1884, or, if relay 1420 is operated at this time, relay 1530 is restored when relay 1420 releases and opens contacts 1428. When the operator is ready to return to automatic answering, she depresses the accept call button AC which at contacts 1889 opens the locking circuit of relay 1480, thereby allowing relay 1480 to restore. Relay 1480, at contacts 1481, again closes the circuit to relay 1520 to allow relay 1520 to operate and prepare the position to accept a call in the usual manner.

If the operator does not release the position from the link before sending is completed, ground is closed over conductor 1162, during the release of the sender control to operate relay 1030 in the link. Link relay 1030 completes a locking circuit for itself at contacts 1032' and at the same time extends this locking ground by way of contacts 1139 and conductor 1213 to operate relay 1310 in the position. At contacts 1315, relay 1310 lights the engaged front lamp EF over conductor 1391 and contacts 1871 of the release front key to ground. If the release of the sender control comes after the position has been released from the link, relay 1030 in the link operates and locks as before, but this locking ground is not extended over conductor 1213 because link relay 1130 is released at this time. Under these conditions the position relay 1310 does not operate and the engaged front lamp EF is not lit.

*Alternating between sender control*

When sender control 1 is in use, position relays 1580 and 1620 are in restored position. Following the operation of one of the sender disconnect buttons, ground is received on conductor 1608 from the sender control to energize the two windings of differential relay 1620 in magnetic opposition and to energize the upper winding of relay 1580. This circuit may be traced as follows: from grounded conductor 1802, which may be grounded by springs 1887 of the position and sender disconnect button PSD, or contacts 2013 of the sender disconnect button SAR, or by contacts 2015 of the sender disconnect button SD, to contacts 3322 and 3251 of the sender control circuit, conductor 1608, contacts 1623 and 1581 to the upper winding of differential relays 1580 and 1620, and by way of contacts 1622 to the lower winding of differential relay 1620. Differential relay 1580 operates its contacts, while differential relay 1620, due to its windings being differential, does not operate. Relay 1580, at contacts 1582, completes a circuit from ground at contacts 1356 for maintaining the upper windings of relays 1580 and 1620 energized. When the sender disconnect button is released, ground is disconnected from conductors 1802 and 1608 to open the circuit through the lower winding of differential relay 1620. Differential relay 1620 now operates its contacts, and at contacts 1621 prepares a circuit for the lower winding of differential relay 1580. Contacts 1625 and 1626 transfer the control of the circuit from lead 1608 to lead 1609. With relays 1580 and 1620 both operated, ground will be closed from contacts 1371', 1328, 1586 and 1628, conductor 1682, contacts 1781 of sender No. 1 cut-out key, conductor 1702 extending to the sender control No. 2 for the next sending operation.

Following the next sending sequence and after the operation of one of the sender disconnect buttons on this next call, ground is received back from sender control No. 2 over conductor 1609 in a manner similar to that described for sender control No. 1. When conductor 1609 is grounded both windings of differential relay 1580 are energized. The circuit for energizing the lower winding of differential relay 1580 may be traced from grounded conductor 1609, contacts 1624 and 1621. The windings of differential relay 1580 are now energized in opposition and relay 1580 restores its contacts. Contacts 1581 close and now connect grounded conductor 1609 by way of contacts 1624 and 1581 to both upper windings of relays 1580 and 1620. When ground is removed from conductor 1609 both windings of differential relay 1580 and the upper winding of differential relay 1620 are de-energized allowing relay 1620 to restore. When both differential relays 1580 and 1520 restore, the circuit to conductors 1681 and 1701 are again grounded to now seize sender control one for a succeeding operation.

*Manual ring*

In case the operator sets up a connection in which she desires to manually ring the calling or called parties, the sender disconnect button SD is used to disconnect the sender control and sender from the position as previously described. In this case the sender control auto-ring relay 3210 is not operated and therefore the sender control does not transmit a ring control signal. The operator will now manually ring either subscriber by operating the position ring key (Fig. 18) to the rear or front position, dependent upon which subscriber is to be rung. Assuming that the operator desires to ring the subscriber on the rear connection, the ring key is operated to its ring rear position. Key contacts 1841 ground conductor 1605 to operate rear connect relay 1610. Contacts 1842 connect resistance battery through the rear of the link to the negative talking conductor 1001 to transmit a ring control signal through the dial rear finder to the ring relay in the rear switch train in case the rear connection has been extended through the dial rear finder. Relay 1610 operates and contacts 1613 and 1616 open the direct current bridge, including coil RT, from across conductors 1062 and 1064, and contacts 1615 complete the circuit to transmit the ring control signal. The circuit for transmitting the ring control signal may be traced from resistance battery, key contacts 1842, conductor 1502, contacts 1573, 1593, 1615, conductor 1062, contacts 1044, conductor 1001, negative line wiper of the dial rear finder and over the negative talking conductor to the ring relay, similar to that shown in Molnar Patent 2,361,313 issued October 24, 1944.

In case the operator desires to ring the subscriber on the front connection, the operator will operate the ring key to its ring front position to close key contacts 1851 and 1852. Key contacts 1851 ground conductor 1544 to operate front connect relay 1550. Relay 1550 operates and contacts 1551 and 1558 open the direct current bridge, including coil RTA, from across conductors 1601 and 1602, and 1201 and 1202; and contacts 1555 complete the circuit to transmit the ring control signal. Key contacts 1852 connect resistance battery to transmit a ring signal over the front connection by way of conductor 1502, through contacts 1555, to conductor 1602 which is connected to conductor 1063 in Fig. 20, and then through the front of the link by way of contacts 1046 and 1035 to the positive talking conductor 1202 of the link selector 1200 and to the ring relay in the operated switch train connected to the called subscriber. This circuit operates the ring relay in the same manner as described in the previously mentioned Molnar patent.

*Disconnect supervision and release*

Returning now to the CLR call and when the calling party hangs up his receiver the circuit to line relay 2120 of the CLR trunk is opened and relay 2120 releases. Contacts 2121 open the circuit to relay 2210 which restores. Contacts 2213 remove one of the multiple grounds for the C test conductor, which, however, is still grounded at contacts 2153 until the operator releases the connection. Contacts 2214 close a circuit for operating the link rear supervisory relay 1110 as follows: ground, contacts 2241′, 2115, and 2214, resistance R22, wiper 2275 and conductor 1005, contacts 1027, 1135 and 1124, and lower winding of relay 1110 to battery. In case the CLR trunk connection was established over a secondary call distribution switch, then the circuit for relay 1110 is extended by way of wiper 2275 and conductor 2295, wiper 854 of the secondary switch to conductor 1005. Rear supervisory relay 1110 operates and lights the rear supervisory lamp RL by way of contacts 1111 to advise the operator that the calling subscriber on the rear connection has hung up.

When the called party on the front connection replaces his receiver, resistance ground is placed on conductor 1204 in the well-known manner to operate the front supervisory relay 1050 by way of contacts 1037, 1144 and 1154. Relay 1050 lights the front supervisory lamp FL to advise the operator that the front subscriber has replaced his receiver.

The operator now operates the link release button 1240 to cause differential relays 1020 and 1030 to restore as previously described. Relay 1030, at contacts 1036, disconnects ground from the hold conductor 1203 to release the link selector 1200 and the front switch train, and at contacts 1037, opens the circuit to the front supervisory relay 1050 to extinguish the lamp FL. Contacts 1033 and 1035 disconnect the link selector talking leads 1201 and 1202. Relay 1020, at contacts 1027, opens the circuit to the rear supervisory relay 1110, contacts 1022′ open the circuit to the link busy lamp BL, and contacts 1025′ connect battery through resistance R11 to prepare the circuit for link relay 1010. At contacts 1023 relay 1020 disconnects ground from conductor 1003 thereby disconnecting ground from conductors 2283 and 800. In case the call was completed over a direct primary path to link 1, then the disconnection of ground from conductor 2283 opens the locking circuit of relay 2240 to cause this relay to restore. In case the call was completed over a secondary access path through a secondary switch, the removal of ground from conductor 800 opens the holding circuit of relay 810, disconnects ground from conductor 2294, and also disconnects ground from conductor 2293 in case the secondary access relay 620 is operated. The disconnection of ground from conductors 2293 and 2294 opens the locking circuit of relay 2240 to cause this relay to restore. When relay 2240 restores, contacts 2241 and 2242 open the circuit to the link talking leads 1001 and 1002, contacts 2244 open the circuit to supervisory relay 2150, and contacts 2241′ open the circuit to conductor 1005 and relay 1110. Relay 2150 restores and, at contacts 2153, disconnects ground from C conductor to release the rear switch train and to mark this CLR trunk idle.

In case the operator operates the link release button 1240 before the calling subscriber hangs up, relay 2240 is restored in the same manner as described, but in this case line relay 2120 and release relay 2210 are still operated. The trunk is disconnected from the link conductors 1001 and 1002 by contacts 2241 and 2242; relay 2150 is restored by contacts 2244; and the circuit to the link supervisory relay 1110 is opened at contacts 2241′. However, since relay 2210 is still operated, the closure of contacts 2243 reoperates relay 2220. Relay 2220, at contacts 2222, grounds conductor 601 to short circuit relay 550 if direct primary paths to idle links are available, and at contacts 2223, connects the gate relay 2140 to conductor 503 to operate relay 2140 before the call distribution gate is closed and in case no idle links are available. When relay 2150 restores, contacts 2154 reclose the start circuit to start relay 2230, and contacts 2151 connect ringback tone to the calling subscriber. If the calling party is still holding the CLR trunk and if idle links are available, the start relay 2230 is reoperated to cause the CLR primary switch to connect with an operator position over an idle link in the manner previously described.

*Re-ring*

In case the calling subscriber hangs up his receiver before the operator releases the connection, and the operator desires to re-ring the calling party, the operator will momentarily operate the ring key to its ring rear position. Ring rear contacts 1841 ground conductor 1605 to operate rear connect relay 1610, and ring rear contacts 1842 connect resistance battery through the upper winding of differential ring relay 2110, to cause differential relay 2110 to operate. During the time the CLR trunk is connected to the operator position both windings of the ring relay 2110 are energized in opposition over a direct current bridge circuit as follows: ground, upper winding of relay 2110, contacts 2152, resistance R3, upper right-hand winding of repeat coil RC, contacts 2241, wiper 2271, conductor 1001, contacts 1044, conductor 1062, contacts 1616, coil RT, contacts 1613, conductor 1064, contacts 1047, conductor 1002, wiper 2272, contacts 2242, lower right-hand winding of repeat coil RC, resistance R2, upper winding of check relay 2130, and lower winding of relay 2110 to battery. Relay 2110, being differential, will not operate in the above traced circuit. Incidentally, the check relay 2130 is also differentially wound and will not operate at this time, since its lower winding is also energized through the winding of relay 2150.

When rear connect relay 1610 operates, contacts 1613 and 1616 open the above traced direct current bridge circuit, including coil RT; while contacts 1615 connect resistance battery at key contacts 1842, over conductor 1502, contacts 1573, 1593 and 1615, conductor 1062, contacts 1044, conductor 1001 to the wiper 2271 and the upper winding of differential ring relay 2110 to ground. The operation of relay 1610 therefore opens the circuit through the lower winding of ring relay 2110, and closes the above traced circuit through the upper winding of relay 2110 to cause differential relay 2110 to operate its contacts. Contacts 2111 and 2114 momentarily open the circuit to line relay 2120, and contacts 2112 and 2113 connect ringing current back over the negative and positive wipers of the local office selector and the calling subscriber line to re-ring the calling subscriber.

It will now be assumed that a call is received on the CLR trunk at a time when the primary switch of this trunk does not have a direct primary path to the available idle link, and has access to this idle link only through a secondary switch. Under these conditions the direct primary access relay 610 is not operated, relay 550 is operated over its local circuit, and secondary access relay 620 is operated. When relay 2220 operates, contacts 2221 complete the circuit to start relay 2230 as follows: ground, contacts 536, 523 and 551, conductor 508, contacts 2141, 2154, and 2221, to start relay 2230 and battery. Contacts 2222 ground conductor 601 but, since contacts 611 of the direct access relay 610 are open, relay 550 is not shorted and is not therefore restored to open the start circuit at contacts 551. The operation of start relay 2230 causes the primary switch of this trunk to hunt for a secondary switch which has preselected the idle link in the same manner as previously described.

*Closing the gate*

It will now be assumed that a call is received on the CLR trunk at a time when the last available link was seized by a preceding trunk call and before the gate control relays in the call distribution circuit have functioned to close the gate. Under these conditions the circuits to the direct access relays 610 and the link available relays 720 are open. The last idle link, which was taken into use by the preceding call, opening the circuit to the last operated direct access relay 610 and the last operated link available relay 720 being restored by relay 1010 of this link opening contacts 1014 and 1015. With relays 610 and 720 restored, the circuit to relay 450 is closed at contacts 617, and the secondary chain circuits for operating relays 540 are closed. The circuit for operating relay 540 of primary group control circuit PG1 may be traced from ground, contacts 721 of all link available relays 720 of the seven secondary group control circuits to conductor 584 and through relay 540 to battery. Lamp NSL is illuminated over this circuit to indicate that no links are available to secondary switches. Similar circuits are closed for the relays 540 of the other primary group control circuits. Relays 540 in all primary group control circuits are therefore operated to open the circuits to their secondary access relays 620 in their respective primary sub-group control circuits at contacts 543–543$^7$. Contacts 541 open the local circuits to relay 550 to restore relays 550 or prevent the operation of relays 550. Contacts 542 ground conductors 503 by way of contacts 571 and 535 to complete circuits for the trunk gate relays, such as relay 2140 in case a call is received on a trunk at this time. When relay 2220 operates and closes contacts 2221, the start relay 2230 is not operated over start conductor 508 because contacts 614 and 551 have disconnected ground from start conductor 508. The grounding of conductor 601 by contacts 2222 are without effect at this time because contacts 611 are open. However, contacts 2223 complete a circuit for operating trunk gate relay 2140 as follows: ground, contacts 571, 542 and 535, conductor 503, contacts 2146 and 2223, to relay 2140 and battery.

Trunk gate relay 2140 operates and closes contacts 2147 to complete a locking circuit for itself from grounded conductor 504. Contacts 2141 open the trunk start circuit, which is used when the gate is not closed, to start relay 2230. Contacts 2142 prepare another trunk start circuit to start relay 2230. Contacts 2144 ground conductor 602 without effect at this time, and contacts 2145 ground conductor 501 to operate call distribution gate relay 520.

Gate relay 520 operates and contacts 521 light gate lamp GL to indicate that the gate is being closed. Contacts 522 operate relay 420, light the master gate lamp MGL, and operate all primary group gate relays 510 over conductor 402. Contacts 523 disconnect ground from start conductor 507 to prevent the grounding of start conductor 508. Relay 420 operates and, at contacts 421, opens the holding circuit maintaining relay 410 operated over its upper winding, since the contacts 431 were opened when the last operated direct access relay 610 restored and disconnected ground from conductor 403 at contacts 613 to restore relay 430.

Relays 510 in all primary group control circuits operate, and their contacts 511 operate gate relays 530 in all primary group control circuits. Each gate relay 530 operates and, at contacts 531, grounds conductor 401 in multiple with contacts 422 to hold relay 460 operated. Contacts 532 open the circuits to relays 550 in all primary group control circuits. Contacts 533 prepare the circuits for relays 560. Contacts 534 prepare circuits for grounding conductor 503 to subsequently control the trunk gate relays of waiting trunk calls in case the trunk calls inside the gate fail to clear out within a predetermined time. Contacts 535 disconnect ground from conductor 503 to close the gate and prevent the operation of any trunk gate relays for subsequent calls, thereby locking all subsequent calls outside the gate. Contacts 536 open further points in the circuit for grounding start conductors 507 and 508. Contacts 537 prepare circuits for grounding the start conductors 581, which circuits are now open at contacts 615 and 561.

The CLR trunk call now has its trunk gate relay 2140 operated, but the start relay 2230 cannot operate because the start conductor 581 is not grounded due to relays 610 and 560 being restored. This CLR trunk call is now inside the gate and waits until an idle link is available before the circuit is completed to its start relay 2230, thereby preventing rotation of the trunk primary switch when no links are available. Any further CLR trunk calls, received before the call distribution gate is fully closed, are allowed to enter inside the gate, and have their trunk gate relays operated to give these calls preference over calls which are received after the gate is closed.

Any CLR trunk calls, received after the call distribution gate is fully closed, wait outside the gate until the gate is opened. When the gate is fully closed, ground is disconnected from conductor 508 and 503 thereby preventing the operation of start relays 2230 and trunk gate relays 2140 to thereby cause these CLR trunk calls to wait outside the gate.

The CLR trunk calls waiting inside the gate are taken care of before the gate is opened, and the CLR calls waiting outside the gate are not taken care of until the gate is opened. The gate is not opened until all calls inside the gate have been taken care of.

After the gate has been closed and in response to a link becoming idle, the corresponding sub-group direct access relay 610 is operated and the corresponding secondary group link available relay 720 is operated. The operated link available relay opens all secondary chain circuits to restore all relays 540. Assuming that link #1 in position 1 is the link which now becomes idle, then relay 610 of primary sub-group control circuit PC1—S1 is operated, and link available relay 720 of secondary group control circuit SG1 is operated.

Relay 610, at contacts 612, grounds conductor 506 to short-circuit slow-to-operate relay 560 to prevent its operation when relay 540 restores. Contacts 613 ground conductor 403 to operate relay 430. Contacts 615 ground conductor 581 by way of contacts 537 to operate the start relay 2230, in case one of the calls waiting inside the gate with its trunk gate relay 2140 operated is in trunk subgroup S1 of primary group PG1, to give this trunk call preference over other calls waiting within the gate, if such other calls are in different trunk sub-groups. Contacts 616 open the circuit to secondary access relay 620 to prevent operation of relay 620 when relay 540 restores. Therefore, the operated sub-group access relay 610 determines which waiting trunk calls are given preference when they have direct primary access to the available idle link.

Relay 540 in primary group control circuit PG1 restores and, at contacts 541, completes a short-circuit for relay 560 as follows: ground, contacts 541 and 533, winding of relay 560, conductor 506, contacts 612, conductor 602, contacts 2144 of the operated trunk gate relay to ground. Conductor 506 is multipled to all contacts 612 of the direct access relays 610 in all sub-groups of primary control circuit PG1 so that the operation of any one of these direct access relays will also short-circuit relay 560 in case any trunk in primary trunk group PG1 is waiting within the gate with its trunk gate relay (2140) operated. Since relay 560 does not operate, the only circuit closed for grounding start conductors 581 for this primary group of trunks is through operated contacts 615 of the operated direct access relay. In case the direct access relay (610) of another sub-group, say sub-group 7, is operated instead of relay 610 of sub-group 1, then contacts 615 of the sub-group 7 direct access relay ground the start conductor (581) of the sub-group 7 trunks to operate the trunk start relay (2230) in the trunk sub-group waiting within the gate to give this sub-group trunk preference over other waiting calls. The operation of the trunk start relay 2230 causes the trunk primary switch to select and connect with the idle link in the same manner as previously described.

In case there are no trunk calls in primary sub-group S1 of primary trunk group PG1 waiting inside the gate when the direct access relay 610 of primary sub-group S1 of primary group control circuit PG1 is operated, then the grounding of start conductor 581 is ineffective because no relays 2220 of such trunks are operated. In other words, if the trunk calls waiting inside the gate are in trunk sub-groups which have access to the available link only through secondary switches, instead of direct primary access, then the grounding of the start circuits to these waiting trunk calls are delayed until the slow-to-operate relay 560 is operated. Trunk calls waiting within the gate are given preference only when the available link is directly accessible through the primary switch of the waiting trunk. Under this condition no trunk gate relays 2140 in trunk sub-group PG1–S1 are operated, and therefore conductor 602 is not grounded when contacts 612 close, and, accordingly, relay 560 will not be short-circuited when relay 540 restores. When slow-to-operate relay 560 operates in the manner subsequently described, contacts, such as contacts $561–561^7$, close and ground start conductors 581 for each sub-group of trunks in primary PG1 to complete the start circuits to the start relays (2230) of the trunk calls waiting inside the gate. Relays 560 are made slow-to-operate to delay the closure of the above described delayed start circuits to give preference to any trunk calls having direct primary access to the available link, and in order to prevent its operation in case relay 540 restores before 610 operates; the latter relay closing contacts 612 to short-circuit relay 560 to prevent its operation in case one of the trunk calls waiting inside the gate is in trunk sub-group PG1–S1.

When relay 720 operates, contacts 721 open the first secondary chain circuit to relay 540 of primary group control circuit PG1; contacts 724 open the second secondary chain circuit to a similar relay of primary group control circuit PG2; contacts 725 open the third secondary chain circuit to another similar relay in primary group control circuit PG3; and contacts 726 open the fourth secondary chain circuit to a similar relay in primary group control circuit PG4. All relays 540 in all primary group control circuits restore. Contacts 723 complete the circuit for operating secondary start relay 730 by way of conductor 407 which is grounded by relay 450 which is operated when any direct access relay (610) is in restored position. In the same manner as previously described the secondary start relay 730 causes the idle secondary switches in secondary group SG1 to preselect an idle link. It should be noted that if the link available relay 720 of secondary group control circuit SG1 is the only link available relay operated, then only the secondary switches of secondary group SG1 are operated to preselect idle links. The link available relay of the second secondary group control circuit SG2 is only operated when a link #2 in any position is idle to close the secondary start relay (730) of this secondary control circuit.

Relays 540 in the remaining primary group control circuits PG2, PG3 and PG4 also restore and close similar circuits for their respective trunk groups dependent upon the operated condition of their direct access relays and dependent upon whether any trunk calls in primary trunk groups PG2, PG3 and PG4 are waiting within the gate with their trunk gate relays operated. Since direct primary paths to the links for trunk sub-groups 1 of both primary trunk groups PG1 and PG2 are multipled, then the corresponding direct access relays for these sub-groups are also multipled, and the operation of these direct access relays perform the same functions as described above. However, the direct access relays (610) for primary group control circuits PG3 and PG4 are controlled from different links than the links that control the direct access relays for the primary group control circuits PG1 and PG2. In this case with link 1 of position 1 being the only available link, then no direct access relays of primary group control circuits PG3 and PG4 are operated and no circuits will be completed to short-circuit relays 560 in primary group control circuits PG3 and PG4 when relays 540 restore and close contacts 541 because contacts 612 of the direct access relays are open. When relays 540 of the primary group control circuit PG3 and PG4 restore, contacts 541 of these relays close local operating circuits through contacts 533, the winding of relays 560 in these group control circuits, and resistance R51 for operating relays 560. Contacts, such as contacts $543–543^7$ of relays 540 in primary group control circuits PG3 and PG4, close circuits to operate their secondary access relays 620 by way of the normally closed contacts 616 of their direct access relays. Relays 620 of the sub-group control circuits for primary group control circuits PG3 and PG4 operate to connect the secondary access bank contacts of the primary switches in primary trunk groups PG3 and PG4 to the marking wipers (855) of the secondary switches 9 to 16, inclusive, in all secondary groups SG1 to SG7. When relays 560 in primary group control circuits PG3 and PG4 operate, contacts, such as contacts $561–561^7$, ground start conductors 581, by way of contacts 537 of all trunk sub-groups of primary trunk groups PG3 and PG4, to operate any start relay (2230) of any waiting trunk in these primary trunk groups having their trunk gate relays (2140) operated. In this manner, when link 1 of position 1 is the only available link and trunk calls are waiting inside the gate in trunk groups PG3 and PG4, the start circuit to operate the start relays of these trunks are completed to enable the waiting call to be completed through a secondary switch to the idle link.

It will now be assumed that after the gate has been closed, that some link in positions 19 to 28 becomes idle, and that the only trunk call waiting inside the gate with its trunk gate relay 2140 operated is in primary trunk group PG1–S1, shown in Fig. 21. In this case when relay 540 restores, no circuit is completed to short-circuit relay 560, with the result that relay 560 operates in its local circuit over contacts 541 and 533. Relay 560 operates after an interval and, at contacts 561, grounds start conductor 581 by way of contacts 537 to operate start relay 2230. Relay 620 is operated over contacts 543 and 616 when relay 540 restores to connect the test stopping circuits extending from the secondary access bank contacts of the trunk primary switches to the secondary switches 1 to 4, inclusive, in all secondary groups SG1 to SG7 so that the trunk primary switch may connect with the idle link which has been preselected by one of these secondary switches.

Numerous other calling conditions, not specifically described, may take place under varied call conditions dependent upon the idle condition of the links and whether the initiated trunk calls have direct primary access or only secondary access to the idle links. In order to assist in a further understanding of this call distribution arrangement, the following primary and secondary call distribution chart is provided.

PRIMARY AND SECONDARY CALL DISTRIBUTION CHART—LINKS 1, 2, AND 7 OF POSITION 1 ASSUMED IDLE

| Calls arrive in primary trunk sub-groups | | Primary sub-group control circuits having their direct primary access relays 610 operated | | Primary sub-group control circuits having their secondary access relays 620 operated | | Idle links that cannot be reached | Idle links selected | Path call is completed over | Link preference | Secondary switches used to completed calls: For link 1 | | For link 2 | | For link 7 | |
|---|---|---|---|---|---|---|---|---|---|---|---|---|---|---|---|
| | | Pri. grp. | Sub. grp. | Pri. grp. | Sub. grp. | | | | | Sec. grp. | Sec. sws. | Sec. grp. | Sec. sws. | Sec. grp. | Sec. sws. |
| PG1 | S1 | 1, 2 | 1, 2, 7 | 1, 2 | 3, 4, 5, 6 | 2, 7 | 1 | Pri | 1 | None | None | None | None | None | None |
| PG1 | S2 | 1, 2 | 1, 2, 7 | 1, 2 | 3, 4, 5, 6 | 1, 7 | 2 | Pri | 2 | None | None | None | None | None | None |
| PG1 | S3 | 1, 2 | 1, 2, 7 | 1, 2 | 3, 4, 5, 6 | ---- | 1, 2, 7 | Sec | Random | SG1 | 1-4 | SG2 | 1-4 | SG7 | 1-4 |
| PG1 | S4 | 1, 2 | 1, 2, 7 | 1, 2 | 3, 4, 5, 6 | ---- | 1, 2, 7 | Sec | do | SG1 | 1-4 | SG2 | 1-4 | SG7 | 1-4 |
| PG1 | S5 | 1, 2 | 1, 2, 7 | 1, 2 | 3, 4, 5, 6 | ---- | 1, 2, 7 | Sec | do | SG1 | 1-4 | SG2 | 1-4 | SG7 | 1-4 |
| PG1 | S6 | 1, 2 | 1, 2, 7 | 1, 2 | 3, 4, 5, 6 | ---- | 1, 2, 7 | Sec | do | SG1 | 1-4 | SG2 | 1-4 | SG7 | 1-4 |
| PG1 | S7 | 1, 2 | 1, 2, 7 | 1, 2 | 3, 4, 5, 6 | 1, 2 | 7 | Pri | 7 | None | None | None | None | None | None |
| PG2 | S1 | 1, 2 | 1, 2, 7 | 1, 2 | 3, 4, 5, 6 | 2, 7 | 1 | Pri | 1 | None | None | None | None | None | None |
| PG2 | S2 | 1, 2 | 1, 2, 7 | 1, 2 | 3, 4, 5, 6 | 1, 7 | 2 | Pri | 2 | None | None | None | None | None | None |
| PG2 | S3 | 1, 2 | 1, 2, 7 | 1, 2 | 3, 4, 5, 6 | ---- | 1, 2, 7 | Sec | Random | SG1 | 5-8 | SG2 | 5-8 | SG7 | 5-8 |
| PG2 | S4 | 1, 2 | 1, 2, 7 | 1, 2 | 3, 4, 5, 6 | ---- | 1, 2, 7 | Sec | do | SG1 | 5-8 | SG2 | 5-8 | SG7 | 5-8 |
| PG2 | S5 | 1, 2 | 1, 2, 7 | 1, 2 | 3, 4, 5, 6 | ---- | 1, 2, 7 | Sec | do | SG1 | 5-8 | SG2 | 5-8 | SG7 | 5-8 |
| PG2 | S6 | 1, 2 | 1, 2, 7 | 1, 2 | 3, 4, 5, 6 | ---- | 1, 2, 7 | Sec | do | SG1 | 5-8 | SG2 | 5-8 | SG7 | 5-8 |
| PG2 | S7 | 1, 2 | 1, 2, 7 | 1, 2 | 3, 4, 5, 6 | 1, 2 | 7 | Pri | 7 | None | None | None | None | None | None |
| PG3 | S1 | None | None | 3 | 1 to 7 | ---- | 1, 2, 7 | Sec | Random | SG1 | 9-12 | SG2 | 9-12 | SG7 | 9-12 |
| PG3 | S2 | None | None | 3 | 1 to 7 | ---- | 1, 2, 7 | Sec | do | SG1 | 9-12 | SG2 | 9-12 | SG7 | 9-12 |
| PG3 | S3 | None | None | 3 | 1 to 7 | ---- | 1, 2, 7 | Sec | do | SG1 | 9-12 | SG2 | 9-12 | SG7 | 9-12 |
| PG3 | S4 | None | None | 3 | 1 to 7 | ---- | 1, 2, 7 | Sec | do | SG1 | 9-12 | SG2 | 9-12 | SG7 | 9-12 |
| PG3 | S5 | None | None | 3 | 1 to 7 | ---- | 1, 2, 7 | Sec | do | SG1 | 9-12 | SG2 | 9-12 | SG7 | 9-12 |
| PG3 | S6 | None | None | 3 | 1 to 7 | ---- | 1, 2, 7 | Sec | do | SG1 | 9-12 | SG2 | 9-12 | SG7 | 9-12 |
| PG3 | S7 | None | None | 3 | 1 to 7 | ---- | 1, 2, 7 | Sec | do | SG1 | 9-12 | SG2 | 9-12 | SG7 | 9-12 |
| PG4 | S1 | None | None | 4 | 1 to 7 | ---- | 1, 2, 7 | Sec | do | SG1 | 13-16 | SG2 | 13-16 | SG7 | 13-16 |
| PG4 | S2 | None | None | 4 | 1 to 7 | ---- | 1, 2, 7 | Sec | do | SG1 | 13-16 | SG2 | 13-16 | SG7 | 13-16 |
| PG4 | S3 | None | None | 4 | 1 to 7 | ---- | 1, 2, 7 | Sec | do | SG1 | 13-16 | SG2 | 13-16 | SG7 | 13-16 |
| PG4 | S4 | None | None | 4 | 1 to 7 | ---- | 1, 2, 7 | Sec | do | SG1 | 13-16 | SG2 | 13-16 | SG7 | 13-16 |
| PG4 | S5 | None | None | 4 | 1 to 7 | ---- | 1, 2, 7 | Sec | do | SG1 | 13-16 | SG2 | 13-16 | SG7 | 13-16 |
| PG4 | S6 | None | None | 4 | 1 to 7 | ---- | 1, 2, 7 | Sec | do | SG1 | 13-16 | SG2 | 13-16 | SG7 | 13-16 |
| PG4 | S7 | None | None | 4 | 1 to 7 | ---- | 1, 2, 7 | Sec | do | SG1 | 13-16 | SG2 | 13-16 | SG7 | 13-16 |

In this chart is assumed that links 1, 2 and 7 of position 1 are idle. The first vertical column designates the primary trunk group and its sub-group of calling trunk lines. The second vertical column designates the primary group control circuit and its sub-group control circuits which have their sub-group direct access relays 610 operated. The third vertical column designates the primary group control circuits and its sub-group control circuits which have their sub-group secondary access relays 620 operated. The fourth vertical column designates the links which cannot be reached under the assumed trunk calling condition and the assumed idle links. The fifth vertical column designates the idle link which is selected under these assumed conditions. The sixth vertical column designates whether a direct primary path or a secondary path is used to extend the trunk call. The seventh vertical column designates the link preference for the calling trunk, such preference being dependent upon whether it has a direct primary path or only a secondary path. The eighth, ninth and tenth vertical columns designate the secondary switches of the secondary groups which are used to extend the trunk calls to the respective idle links.

For example, assuming a trunk call in primary group PG1 and sub-group S1 with links 1, 2, and 7 of position 1 idle, as indicated in the first horizontal line; the direct access relays 610 of sub-groups 1, 2 and 7 of both primary group control circuits PG1 and PG2 are operated (col. 2) because links 1, 2 and 7 are the idle links; and the secondary access relays 620 of sub-groups 3, 4, 5 and 6 of both primary group control circuits PG1 and PG2 are operated (col. 3) because these corresponding trunk sub-groups do not have direct primary access to links 1, 2 and 7. Links 2 and 7 (col. 4) cannot be reached because a trunk call in sub-group 1 of primary trunk group PG1 has direct primary access to links 1 and is given preferential primary service to link 1 as indicated in columns 5, 6 and 7. No secondary switches are used, as indicated in columns 8, 9 and 10 because the trunk call from the primary sub-group is given preferential service over its direct primary path.

In another example it will be assumed that a trunk call is initiated in sub-group 3 of primary group PG1 when links 1, 2 and 7 are idle as indicated in the third horizontal line. In this case the same direct access relays 610 and the same secondary access relays 620 are operated as in the above first example. However, as indicated in the fourth and fifth columns, any one of these links can be reached, after calling preference is given to trunk calls in sub-groups 1, 2 and 7 of this primary trunk group, but the access to these links is through secondary switches (col. 6) in a random manner (col. 7). Any one of the secondary switches 1 to 4 in secondary group SG1 (col. 8) may be used to extend the trunk call to idle link 1; any one of the secondary switches 1 to 4 in secondary group SG2 (col. 9) may be used to extend the trunk call to idle link 2; and any one of the secondary switches 1 to 4 in secondary group SG7 (col. 10) may be used to extend the link call to idle link 7.

In case a trunk call in primary trunk group PG3 or PG4 is initiated when only links 1, 2 and 7 of position 1 are idle, then no direct access relays 610 are operated in their corresponding sub-group control circuits, as indicated in column 2, horizontal lines 15 to 28. However, all secondary access relays 620 for the sub-group control circuits of these trunk groups are operated so that secondary switches may be used in a random manner to select these idle links through the secondary switches designated in vertical columns 8, 9 and 10.

From the foregoing description it will be observed that trunk calls are first extended over direct primary paths to idle links when they are available upon seizure of such trunks; that the trunk calls are extended over secondary paths, including a secondary switch, only after no direct primary paths are available to the seized trunks; that when no links are idle and a trunk call is received, circuits are completed to initiate the closing of a gate and to allow this trunk call to be included inside the gate; that other trunk calls, which are received before the gate is fully closed, are also allowed to enter into the gate; that trunk calls, which are received after the gate is fully closed, wait outside the gate until the gate is opened; and that the trunk calls inside the gate are first disposed of before the gate is opened to take care of the trunk calls waiting outside the gate.

Gate time out

The gate is provided with a timing circuit arranged to admit all the trunk calls waiting outside the gate into the gate in case the gate remains closed for a period of approximately six seconds while the link is available. Relay 420 is operated as long as there is one or more trunk calls in the gate, and relay 430 is operated as long as one or more links are idled. With both these relays operated, contacts 421 and 431 open the holding circuit through the upper winding of differential relay 410. When this hold circuit is opened and the charged condenser C1 discharges through the two windings of relay 410 in series, relay 410 is maintained in operated position for approximately six seconds. During the discharge time of condenser C1 all available links should be seized, or all calls within the gate should be processed in order to reestablish the holding circuit for relay 410. If all links have been seized before the release time of relay 410, no direct access relays are operated to close the circuit of relay 430, and relay 430, at contacts 431, reestablishes the circuit to hold relay 410 operated. In addition, if the operated gate relay 520 restores before the release time of relay 410 because all waiting calls have selected idle links, then contacts 522 open the circuit of relay 420 to restore relay 420 and this latter relay, at contacts 421, reestablishes the hold circuit for maintaining relay 410 operated. However, if both relays 420 and 430 are held operated for a time period of approximately six seconds because all waiting calls have not been able to select an idle link, then when condenser C1 is discharged relay 410 restores and closes contacts 411 to operate relay 440. Relay 440 at contacts 442, 443, 444 and 445, grounds conductors 471, 474, 473 and 472 to in turn ground conductors, such as conductor 503, by way of contacts 534 to operate all the trunk gate relays (2140) of the trunk calls waiting outside the gate in order to admit these waiting trunk calls into the gate. This circuit arrangement is necessary to prevent any single defective trunk, which could not find a link, from maintaining the gate closed indefinitely to trunk calls waiting outside the gate. Relay 440, at contacts 441, recloses the energizing circuit for relay 410. Both windings of relay 410 are energized in opposition while the condenser C1 is being charged to provide a delay period before relay 410 operates its contacts. When condenser C1 is fully charged, no current flows through the lower winding of relay 410 with the result that relay 410 operates its contacts 411 to open the circuit of relay 440. Relay 440 restores and, at contacts 442, 443, 444 and 445, disconnects ground from conductors 503 to again close the gate to lock subsequent trunk calls outside the gate. The operation from here on is the same as previously described.

The emergency key EPK (Fig. 5) is provided for enabling the supervisory operator to nullify the gate after an undue amount of traffic is in the gate and traffic continues to increase outside the gate. Key EPK is common to all primary group control circuits and when the supervisory operator operates key EPK relays 570 in all primary control circuits operate. Relays 570 of all primary group control circuits operate and, at contacts 571 disconnect ground from conductors 504 to restore the operated trunk gate relays. Contacts 572 ground start conductors 508 to provide start circuits to the trunk start relays 2230, and contacts 573 likewise ground conductors 581 to provide start circuits for the trunk start relay. Contacts 574 complete circuits for operating the secondary access relays 620 of all sub-group control circuits. All start relays of all waiting trunk calls are now operated to start their primary hunting for an idle link. Emergency start key ESK (Fig. 7) is closed at the same time as key EPK to operate relays 740 in all secondary group control circuits. Relays 740 in all secondary group control circuits operate their associated secondary start relays 730 to cause all idle secondary switches to preselect an idle link. The emergency start keys are provided so that if any trouble develops in any control circuit, service may be restored on an emergency basis. However, since the gate is inoperative during the time the emergency key is operated, the service is on a random basis and no preference is given to any trunk call.

Release front

Under certain calling conditions it may be necessary for the operator to release one end of a connection while retaining the other. It will first be assumed that the front connection is to be released by the operation of the position release key (Fig. 18) to its release front position after sending has been completed, and in this case position relay 1310 and link relay 1030 are operated. Operation of the release key to its front position opens key contacts 1871 to disconnect ground from conductor 1391 to extinguish the engaged front lamp EF. Key contacts 1872 ground conductor 1544 to operate relay 1550, and key contacts 1875 ground conductor 1074 to differentially restore ring relay 1030 by way of contacts 1043' and 1031' and the lower winding of relay 1030 to battery. Relay 1550 operates and disconnects the operator's telephone circuit from the front connection.

Differential link relay 1030 restores when its two windings are energized in opposition and at contacts 1033 and 1035 open the talking circuit. Contacts 1036 disconnect ground from the holding conductor 1203 to release the link selector 1200 and the remainder of the switch train on the front connection. Contacts 1037 open a circuit to the front supervisory relay 1050. Contacts 1032' open the circuit to position relay 1310 which now restores. Contacts 1033' and 1035' close the seizure circuit for seizing the alternate sender control through the winding of the sender control seizure relay and the winding of either relay 1140 or 1150 as previously described, to enable the operator to key up the new connection as soon as the new sender control seizes an idle sender.

There exist special conditions under which it may be necessary to release the front connection before sending is completed. For example, when a "stop dial" condition, encountered by a switch train, fails to clear itself the operator will operate the release key to its front position. The operation of key contacts 1871, 1872 and 1875 performs the same functions as just described above, the key contacts 1873 and 1876 open the seizure loop including the seizure relay of the sender control in use and either relay 1140 or 1150 to cause the release of the sender control and the restoration of either relay 1140 or 1150 whichever is operated. As soon as relay 1140 or 1150 restores, the seizure loop to the alternate sender control is closed to operate the seizure relay of the alternate sender control in series with the other relay 1150 or 1140, in the manner previously described. After a sender is seized by the alternate sender control, the operator may key up the new connection over the front of the link.

Release rear

It will now be assumed that the rear connection is to be released by the operation of the release key to its rear position after sending has been completed. Operation of the release key to its rear position causes key contacts 1861 to ground conductor 1303 to operate the position rear release relay 1330 by way of its lower winding; and key contacts 1862 ground conductors 1307 and 1070 to differentially restore link relay 1020 by way of contacts 1049 and 1028 and the lower winding of relay 1020 to battery. Differential relay 1020 restores when both of its windings are energized in opposition and at contacts 1022 opens a circuit to position relay 1320 which restores. Contacts 1023 disconnect ground from conductor 1003 and the call distribution conductors 800 and 2283 to remove the holding ground from the call distribution switches to cause the release of the rear switch train in case the rear connection had been extended through the call distribution switches. Contacts 1024 disconnect ground from conductor 1004 and the TXCR conductor if the call on the rear is from a TX trunk. Contacts 1027 open the circuit to the rear supervisory relay 1110, and contacts 1029 disconnect ground from conductor 1008 to remove the holding ground from the dial rear finder and the rear switch train in case the rear connection had been set up through the dial rear finder. Contacts 1021′ prepare a circuit for marking conductor 1008 with stopping battery for the dial rear finder to locate this link if the operator operates the dial rear key to set up a new rear connection. Contacts 1023′ open a circuit to relay 1150. Contacts 1024′ open a circuit to relay 1140. Contacts 1025′ prepare a point in the circuit to relay 1010.

When position relay 1330 operates, contacts 1332 complete a circuit for operating relay 1360 through its upper winding. Contacts 1333 complete a circuit for operating relay 1610. Contacts 1334 close a multiple ground to release conductor 1070, and contacts 1335 open the circuit to the engaged rear lamp ER and the circuit to the upper winding of relay 1410, if operated. Relay 1320 restores, and at contacts 1324 prepares the circuit to the lower winding of relay 1410 for dial rear operation. Contacts 1326 prepare a circuit to ground the dial rear finder start lead 1407, and at contacts 1327 prepare a circuit to ground the dial rear finder vertical bank contact. Relay 1360 operates, and contacts 1361 operate relay 1370. Relay 1610, upon operating, at contacts 1613 and 1616, disconnects the operator's telephone circuit from the rear of the link. Relay 1370, upon operating, at contacts 1375, opens a point in the circuit to the lower winding of relay 1430. Contacts 1378 close a local circuit to the differential alternator relays 1580 and 1620 to operate relay 1580. Contacts 1371′ disconnect ground from conductors 1681 or 1682 and 1701 or 1702 to prevent seizure of the sender control until the release key is restored. Contacts 1372′ open the start circuit to the dial rear finder, and contacts 1373′ unlock relay 1480 if operated. The circuit for energizing the upper winding of relay 1580 and both windings of relay 1620 may be traced as follows: ground contacts 1378, one branch extending through contacts 1581 to the upper windings of differential relays 1580 and 1620, and the other branch extending by way of contacts 1622 through the lower winding of differential relay 1620. Relay 1580 alone is operated and relay 1620 is not operated at this time because both of its windings are energized in magnetic opposition. Relay 1580 operates and, at contacts 1582, completes a circuit from contacts 1356 for maintaining the upper windings of relays 1580 and 1620 energized before contacts 1581 open.

When the release key is restored, relay 1330 restores and, at contacts 1332, opens the circuit to relay 1360 which restores. Contacts 1333 open the circuit to relay 1610 which restores. Contacts 1335 close to prepare the circuit for the dial rear relay 1410. Relay 1360 restores and, at contacts 1361, opens the circuit to relay 1370. Relay 1370 restores and, at contacts 1378, disconnects ground from the lower winding of relay 1620 to allow relay 1620 to operate, since only its upper winding is now energized. Contacts 1375 prepare a circuit for relay 1410, contacts 1371′ prepare the seizure circuit for the alternate sender control, and contacts 1372′ prepare the finder start circuit. Relay 1620 operates when the circuit through its lower winding is opened and, at contacts 1628, prepares the seizure circuit for the alternate sender control #2. The rear switch train has now been released and the position is conditioned to perform a dial rear operation. Operation of the dial rear button DR operates relay 1410 and the dial rear operation is performed in the same manner as previously described.

In the event it becomes necessary to release the rear connection before sending is completed over the rear of the link; it will be remembered that relays 1410, 1590 or 1570, 1610 and 1460 are operated for the dial rear operation. When the position release key is operated to its release rear position, relays 1330, 1360 and 1370 are operated as described above and in addition thereto perform the following functions. The operation of relay 1330, at contacts 1333, closes a multiple ground to relay 1610 instead of an operating ground, and contacts 1335 open the circuit to relay 1410. Relay 1360, in addition to operating relay 1370, also locks itself through its lower winding and contacts 1362 to sender control conductor 1403 which is grounded by way of sender control contacts 3255 and 3242 during the sending operation and before the sender control is released. When relay 1370 operates, contacts 1376 and 1377 open the circuits to relays 1570 and 1590 to restore whichever relay is operated, as well as opening the circuit of the seizure relay in the sender control. Contacts 1371 open the circuit to relay 1320 to allow relay 1320 to restore as well as remove ground from conductor 1205 to prevent link relay 1020 from reoperating. Contacts 1373 open the locking circuit of relay 1460, and contacts 1371′ and 1372′ prevent ground from being reclosed to the finder leads 1408 and 1407 should relay 1460 restore before relay 1410. Relays 1410, 1460 and 1590 or 1570 restore, and the opening of the seizure sender control circuit causes the sender control to release itself and the sender. When the sender control releases, ground is removed from conductor 1403 to open the locking circuit of relay 1360 which now restores. Except for the delay in the release of relay 1360, relays 1330, 1610, 1360 and 1370 restore in the same manner as previously described.

The operator may release an entire connection by operating the position release key to its front position to release the front connection and then operate the release key to its rear position to release the rear connection in a manner apparent from the foregoing description. When the front and rear connections are released, relays 1310 and 1320 are restored as described, thereby causing relays 1340 and 1420 to restore; and ground is removed from conductor 1207 to restore link relays 1130 and 1040. Relay 1520 is again operated, unless relay 1480 is locked operated, to recondition the position to accept incoming calls over idle links which have their relays, such as relay 1010, operated by relay 1520 as previously described.

The usual method of releasing an entire connection is for the operator to operate the link release button 1240 (Fig. 12). When link release button 1240 is operated contacts 1241 complete a circuit by way of contacts 1031′ to the lower winding of differential relay 1030 to cause relay 1030 to restore. Contacts 1242 complete a circuit by way of contacts 1028 for the lower winding of differential relay 1020 to cause relay 1020 to restore. Contacts 1244 close a short circuit around the winding of relay 1010 to prevent its operation until the link release button is restored. Contacts 1243 open the locking circuit to relay 1150 if operated, and contacts 1245 open a locking circuit to relay 1150 if operated to release the sender control in the event the operator releases the link without sending any digits.

Differential relay 1030 restores when both of its windings are energized in opposition, and contacts 1036 disconnect ground from the holding conductor 1203 to release the front switch train including the link selector 1200. Contacts 1037 open the circuit to the front supervisory relay 1050, and contacts 1039 open the circuit to the busy lamp BL. Differential relay 1020 restores when both of its windings are energized in opposition, and contacts 1023 disconnect ground from conductor 1003 to release the rear switch train in case the call was completed over the call distribution switches. Contacts 1024 disconnect ground from conductor 1004 to release the rear switch train in case the call was completed over a TX trunk. Contacts 1029 disconnect ground from conductor 1008 to release the rear switch train in case the call was completed over a dial rear finder or a training trunk. Contacts 1027 open the circuit to the rear supervisory relay 1110. Contacts 1022' open the circuit to the busy lamp BL. Contacts 1023' open the circuit to relay 1150, and contacts 1024' open a circuit to relay 1150. Contacts 1025' prepare a circuit for reoperating relay 1010.

In case the position is connected to the line at a time when the link release button 1240 is operated then battery through the windings of relay 1140 or 1150 is disconnected from the seizure relay 3330 of the sender control to release the sender control in the event the operator releases a connection without sending any digits. In addition, contacts 1022 remove ground from conductor 1205 to restore relay 1320, and contacts 1032' disconnect ground from conductor 1213 to restore relay 1310. When relays 1310 and 1320 restore, ground is removed from conductor 1207 to restore relays 1130 and 1040 to complete the release of the link. When the link release button 1240 is restored, contacts 1244 remove the short from around relay 1010 to enable this relay to reoperate when the position is idle and conditioned to receive calls in the manner previously described.

When the link release button 1240 is depressed while the position is connected to the link, position release relay 1330 is operated over the following circuit: ground contacts 1241 and contacts 1043', conductor 1074, key contacts 1874 and 1762, conductor 1302 and the upper winding of relay 1330 to battery. Position release relay 1330, in the same manner as previously described, operates relays 1360 and 1610; relay 1360 operates relay 1370; and relay 1370 energizes the upper winding of relay 1580 and both windings of relay 1620 to cause relay 1580 to operate. When the link release button 1240 is restored, release relay 1330 restores to release relays 1360 and 1610; relay 1360 restores relay 1370; and relay 1370 causes relay 1620 to operate and prepare a seizure circuit for the alternate sender control as previously described. In addition, the restoration of link relays 1020 and 1030 cause the position relays 1310 and 1320 to restore, thereby opening the circuit of position relay 1340 and the circuit to link relays 1130 and 1040; relay 1340 restores causing relay 1420 to restore and complete the circuit to reoperate relay 1520 as previously described to recondition the position to receive incoming calls.

*Re-entering a connection*

In case the operator wishes to re-enter a connection, the operator momentarily operates the talk key, associated with the link she wishes to re-enter, at the time when her position is idle. Relays 1350, 1510, 1520, 1580 and 1620 will be operated when the position is idle. With connections existing on the front and rear of this link, relays 1020 and 1030 will be operated. Operation of the talk key 1220 closes contacts 1221 to operate link relay 1130 and position relay 1320 in series as follows: ground, contacts 1352, 1443 and 1326, lower winding of relay 1320, conductor 1215, key contacts 1221, contacts 1038 or 1025 and through the upper winding of relay 1130 to battery. Position relay 1320 operates, and contacts 1322 open the stopping circuit to mark this position busy to the call distribution switches. Contacts 1321 complete a circuit to operate position relay 1340 and link relay 1040, as well as completing a locking circuit for the lower winding of relay 1130. This circuit may be traced from ground contacts 1531 and 1351, winding of relay 1340, contacts 1321, conductor 1207, contacts 1133 and through the winding of relay 1040 to battery and through the lower locking winding of relay 1130. At contacts 1325, relay 1320 again completes a circuit for lighting the engaged rear lamp ER, and contacts 1328 connect ground to the sender control lead 1702, but since link relay 1030 is operated the contacts 1033' and 1035' prevent seizure of the sender control.

Relay 1340 operates, and contact 1341 again operates relay 1420. Relay 1420, at contacts 1421 and 1424, again connects the operator's telephone circuit to the established connection. Contacts 1429 open the circuit to relay 1520 which now restores. Relay 1520 restores and, at contacts 1522, opens the short circuit from around resistance R14 and relay 1490 to busy remaining idle links and to operate relay 1490 as previously described. Contacts 1523 open a further point in the stopping circuit for the call distributor switches. When the link relay 1130 operates, it connects the link to the position as previously described. Contacts 1131 connect ground from contacts 1022 to conductor 1205 to hold relay 1320 operated over its upper winding. Contacts 1139 connect ground from contacts 1032' to conductor 1213 to operate relay 1310, and contacts 1138 reconnect the identity lamp. The closure of contacts 1132' and 1134' are ineffective at this time to seize a sender control because the contacts 1035' and 1033' of relay 1030 are opened. When link relay 1040 operates, contacts 1043 and 1046 connect the operator's telephone circuit to the front of the link over conductors 1061 and 1063, and contacts 1044 and 1047 connect the operator's telephone circuit to the rear of the link over conductors 1062 and 1064 as previously described. Contacts 1042' complete a circuit for flashing the busy lamp BL as follows: from the interrupted 60 IPM source, contacts 1535, conductor 1072 and contacts 1042' to the busy lamp BL and battery. From the foregoing it will be seen that when a connection exists on both the front and rear of the link and when the operator re-enters this link, the circuits to the link sender control relays 1140 and 1150 are opened at contacts 1035' and 1033' by relay 1030 to prevent the seizure of a sender control.

In the event the operator re-enters a connection from which she had been previously released at a time when no connection exists on the front of the line, then link relay 1030 would not be operated, and when position relay 1320 operates, as previously described, contacts 1328 complete a circuit for the sender control seizure relay, such as relay 3330, in series with one of the link sender control relays 1140 or 1150, depending upon the operative condition of position relays 1580 and 1620. With position relays 1580 and 1620 at normal the circuit for operating the sender control seizure relay 3330 and link relay 1140 may be traced as follows: ground, contacts 1371', 1328, 1585, and 1627, conductor 1681, key contacts 1773, conductor 1701, busy key of the sender control, contacts 3236, 3227 and 3256, winding of relay 3330, conductors 1405 and 1506, key contacts 1876, conductor 1101, contacts 1132', key contacts 1245, contacts 1035' and 1024', through the upper winding of relay 1140, and contacts 1152' to battery. A similar circuit is completed through contacts 1586 and 1628, conductor 1682, key contacts 1781, conductor 1702 to sender control No. 2, if relays 1580 and 1620 are operated, to the seizure relay of sender control No. 2 and then back over conductors 1504 and 1507, key contacts 1873, conductor 1102, contacts 1134', key contacts 1243, 1033', 1023' and 1141' through the upper winding of relay 1150 to battery.

In the event the operator re-enters a connection when no connection exists on the rear of the link, then link relay 1020 and position relay 1320 would not be operated, and the engaged rear lamp ER would be extinguished to signify the vacancy on the rear of the line. If desired, the operator may depress the dial rear key to set up a connection over the rear of the link in a manner to be subsequently described.

*Monitoring*

The operator can monitor a connection at any time when her position is idle. Operation of the link monitoring key 1230 closes contacts 1232 and 1235 to connect the monitoring conductors 1216 and 1218 to the established connection over the link to enable the operator to monitor this connection. Contacts 1234 ground conductor 1217 to operate the position monitor relay 1380 by way of contacts 1425. Contacts 1381 and 1384 of relay 1380 connect the operator's receiver to the left-hand winding of repeating coil RC1 to thereby inductively connect the operator's receiver to the eestablished connection. This inductive connection may be traced from the right-hand winding of repeat coil RC1 over contacts 1422 and 1423, contacts 1453 and 1473 to conductor 1401, contacts 1423 to conductor 1402; position monitor keys 1724, 1727 and 1722, 1725 to conductors 1218 and 1216; link monitor key contacts 1235 and 1232, conductors 1201 and 1202 to the front of the link; and thence by way of contacts 1033 and 1042 to conductor 1001, and contacts 1035 and 1045 to conductor 1002 to the rear of the link. Contacts 1386 of the monitor relay 1380 open the circuit through relay 1520 which now restores. Relay 1520, at contacts 1523, opens the stopping circuit for the call distribution switches to thereby mark this position busy to incoming calls. Contacts 1522 remove the short-circuit from resistance R14 and relay 1490 thereby permitting relay 1490 to operate and release the link relays, corresponding to relay 1010, in the idle links as previously described. Contacts 1527 complete a circuit for flashing the position pilot lamp PL and the switch pilot lamp SPL at 30 IPM to indicate that the operator is now monitoring.

In case the operator wishes to talk to parties on two or more links, she engages one of the links by operating the link talk key 1220 unless the position is already connected to this link, and then operates the link monitoring key 1230 of the second link. The operation of the link talk key contacts 1221 of the first link causes the operator's telephone circuit to be connected through the first link to the connection as previously described. The operation of the link monitor key 1230 of the second link is ineffective to operate the position monitor relay 1380 when monitor key contacts 1234 ground conductor 1217, because relay 1420 has opened the circuit to monitor relay 1380 at contacts 1425. The closure of contacts 1232 and 1235 of the link monitor key of the second link, directly connect the talking conductors of the second link over conductors 1216 and 1218, normal closed contacts of the position monitor key to the position talking conductors 1402 and 1401; thereby connecting the operator's telephone circuit in multiple with the second link.

Assuming that the operator has her position connected to a link and has operated the monitor key at another, or second link, thereby permitting her to converse with the four parties on both established connections as previously described, and now wishes to talk in private to one of the parties on the link to which her position is connected. To do this the operator has two alternatives, one is that she can restore the link monitor key of the second link, thereby cutting off the two parties connected to the second link, and then operate the cut-off key to cut-off one of the parties on the first link which is connected to her position. For the second alternative the operator can operate the position monitor key to cut off the two parties on the second link, and then use the cut-off key to cut off one of the remaining parties. When the link monitor key 1230 of the second link is restored, contacts 1232 and 1235 disconnect the operator's telephone circuit from the second link. Operation of the position cut-off key to rear position, operates key contacts 1822 to ground conductor 1606 to operate relay 1630, and key contacts 1821 ground conductor 1605 to operate slow-to-operate relay 1610 to split the connection and disconnect the operator's circuit from the rear of the connection. Relay 1630 operates, and contacts 1631 and 1634 close the operator's telephone circuit to conductors 1061 and 1063 and to the front of the link by way of conductors 1601 and 1602. Contacts 1631 and 1634 also connect the retard coil RTA in bridge in the front of the link to thereby provide a direct current bridge for controlling the ring control relay (not shown) in one of the switches in the switch train. Contacts 1632 and 1633 close a similar direct current bridge including the retard coil RT across the conductors 1062 and 1064 for the rear of the link. Slow-to-operate relay 1610 operates after an interval and at contacts 1611 and 1618 disconnects the operator's telephone circuit from the rear of the link. Contacts 1619 complete an obvious locking circuit for relay 1630. The operation of the position cut-off key to its front position operates key contacts 1832 to operate relay 1630 as before, and operated key contacts 1831 ground conductor 1544 to operate slow-to-operate relay 1550 to split the connection and disconnect the operator's telephone circuit from the front of the connection. Relay 1630 performs the same functions as before and relay 1550, at contacts 1552 and 1557, opens the talking circuit to the front of the link.

For the second alternative, the operation of the position monitor key to its front position opens key contacts 1727 and 1725 to disconnect the operator's telephone circuit from the second link. The operation of the cut-off key then performs the same functions as above described. Another use of the position monitor key is in the event that a "stop-dial" condition is encountered on the rear of the link during the dial rear operation. Such a condition can occur in the event simultaneous seizure of two-way inter-toll trunks by two operators dialling in opposite directions. Under such conditions, the operator may wish to connect her telephone circuit on the connection to determine the nature of the delay before releasing the connection. During a dial rear operation, relay 1610 is operated by way of contacts 1413 and 1452. Contacts 1613 and 1616 disconnect the operator's telephone circuit from the rear of the link while the sender control is connected to the rear of the link over contacts 1614 and 1615. If the operator desires to talk on the rear of the link while relay 1610 is operated, she must operate the position monitor key to its rear position to connect the operator's telephone circuit to the rear of the link. Operation of the position monitor key to its rear position closes key contacts 1723 and 1721 to connect the operator's telephone circuit to the rear link conductors 1062 and 1064 by way of conductors 1401 and 1402.

*Reconnect front and rear*

Under certain calling conditions, the operator may wish to dial up a portion of a connection, release the associated sender and sender control, and return to the connection at a later time to complete the necessary dialling. An example of this occurs when a TX operator, in setting up a connection in both directions, withholds the last digit to delay bringing of the called line on a rear connection, and then uses the front of the link to obtain the other party before returning to the rear of the link and sending the omitted digit.

In order to re-seize a sender control for use on the front of a link, it is necessary to first restore link relay 1030 without releasing the front switch train. This is done by operating the reconnect front key (Fig. 17). Operation of this key energizes the lower winding of differential relay 1030 from ground, key contacts 1763 and 1874, conductor 1074, contacts 1043' and 1031'. Key contacts 1761 ground conductor 1206 to ground the holding conductor 1203 by way of contacts 1132 to hold the link selector 1200 and the front switch train. Key contacts 1764 connect resistance battery by way of conductor 1065 and contacts 1048 to the EC lead 1204 to replace the resistance battery through the front supervisory relay 1050 until one of the link sender control relays 1140 or 1150 is subsequently operated.

Differential relay 1030 restores when both of its windings are energized in opposition. Contacts 1032 and 1034 prepare to connect a sender control to conductors 1201 and 1202. Contacts 1033 and 1035 disconnect the front conductors 1201 and 1202 from the rear link conductors 1001 and 1002. Contacts 1036 removes one of the grounds from hold conductor 1203 now grounded by the reconnect front key contacts 1761 over conductor 1206 and contacts 1132. Contacts 1037 disconnect supervisory relay 1050 from the EC conductor 1204 which is now connected to resistance battery through key contacts 1764. Contacts 1031' and 1032' open both windings of relay 1030, and contacts 1032' open the circuit to relay 1310. Contacts 1033' and 1035' close circuits through the upper windings of relays 1150 and 1140 to conductors 1102 and 1101, and to both sender control seizure relays to operate one of the seizure sender control relays dependent upon the operated position of the position alternator relays 1580 and 1620 as previously described.

Assuming that the first sender control is seized, then relay 1140 is operated and locked. Relay 1140, at contacts 1141 and 1142, connects the negative and positive sender control leads 1104 and 1106 over contacts 1032 and 1034 to the negative and positive leads 1201 and 1202 extending to the link selector 1200 and front switch train. Contacts 1143 ground the hold conductor 1203 to hold the front switch train in operated position. Contacts 1145 connect resistance battery on the sender control conductor 1108 to conductor 1204 in place of the resistance battery through the front supervisory relay 1050 to enable the sender to transmit one or more digits over conductor 1204 to complete the call over the front connection and link to the desired party. Contacts 1148 prepare a circuit from the sender control for the link busy lamp. Contacts 1149 prepare a circuit for reoperating relay 1030 when sending is completed. Contacts 1142' and 1144' prepare a locking circuit for relay 1140 when relay 1130 restores. Contacts 1143' open the circuit to relay 1010. If relay 1150 is operated in series with the seizure relay of the second sender control, then relay 1150 closes circuits similar to that described for relay 1140. When the sender finder SF of the seized sender control seizes an idler sender, the position sender lamp PSL (Fig. 33) is illuminated and the operator may release the reconnect front key and proceed to send the remaining digit or digits necessary to ring the desired party over the front connection. When the sender has completed sending, conductor 1162 is grounded by the seized sender control to operate relay 1030 over its upper winding by way of contacts 1149. Relay 1030 operates, reconnects the front supervisory relay 1050, releases either relay 1140 or 1150, and maintains the front connection as previously described.

In order to re-seize a sender control for use on the rear of the link, the reconnect rear key (Fig. 17) is operated. The reconnect operations are accomplished entirely within the position circuit. Operation of the reconnect rear key causes contacts 1751 to prepare a circuit for operating relay 1460, and contacts 1752 complete a circuit for operating relay 1410. The circuit for operating relay 1410 may be traced from ground contacts 1355, 1335, 1325 and 1312, conductor 1304, key contacts 1752, conductor 1305, via contacts 1313 or 1512, contacts 1444 and lower winding of relay 1410 to battery. When relay 1410 operates contacts 1413 cause ground from contacts 1352 to operate relay 1610. Contacts 1415 close a circuit to operate relay 1460 as follows: ground, key contacts 1751 of the reconnect rear key, conductor 1306, contacts 1323 and 1415 and through the lower winding of relay 1460 to battery. Contacts 1418 connect the lower winding of relay 1570 over the previously traced circuit to the seizure relay 3330 of the second sender control to operate this sender control seizure relay in series with relay 1570 in case the alternator relays 1620 and 1580 are operated. Contacts 1419 connect the lower winding of relay 1590 over the previously traced circuit to seizure relay 3330 of the first sender control to operate relay 3330 in series with relay 1590 in case the alternator relays 1620 and 1580 are restored.

Relays 1460 and 1610, and relay 1570 or 1590, operate and a sender control is seized in the same manner as described for the dial rear operation. As soon as a sender is seized, the operator will release the reconnect rear key, and send the necessary digit, or digits, to complete the connection over the rear and ring the desired party.

*Error button*

In case the operator makes an error in keying up a call, she depresses the error button ERR (Fig. 20) to effect the release of the switch train being set up. The operation of this error button is effective only in case the operator operates the error button prior to depressing one of the sender disconnect buttons. In case the operator becomes aware of an error made in keying up the call after she has operated one of the sender disconnect buttons, she must then use the release front or release rear key to release the connection at fault.

Operation of the error button ERR closes contacts 2063 and 2064 to ground conductor 1301 to complete a circuit by way of contacts 1331 for the upper winding of relay 1360. Relay 1360 operates, closes contacts 1361 to operate relay 3170, and closes contacts 1362 to complete a locking circuit for itself through its lower winding to sender control conductor 1403 which is grounded during the sending operation. Relay 1370, at contacts 1378, energizes the upper windings of differential alternator relays 1580 and 1620 and the lower winding of relay 1620 to operate relay 1580 as previously described. Contacts 1379 and 1375 open to prevent the ground at contacts 1378 from operating relay 1430 when relay 1580 operates. Contacts 1371' disconnect ground from the seizure loop of the sender control thereby releasing the sender control seizure relay, such as 3330, to initiate the release of the sender control and sender, as well as restoring either relay link 1140 or 1150, whichever is operated, in the manner previously described. When relay 1140 or 1150 restore, ground at contacts 1143 or 1153 is disconnected from the hold conductor 1203 to release the front switch train.

During the release of the sender control, ground is removed from sender control conductor 1403 to open the locking circuit of relay 1380. When the error button ERR is restored, relay 1360 restores or waits until the locking circuit is opened at the sender control. When relay 1360 restores, contacts 1361 cause relay 1370 to restore. When relay 1370 restores, contacts 1378 disconnect ground from the lower winding of relay 1620 to permit differential relay 1620 to operate. Contacts 1371' again connect ground to the alternate sender control, dependent upon the operated conditions of alternator relays 1580 and 1620, to operate the sender control seizure relay, such as 3330, in series with either link relay 1140 or 1150. Relay 1140 operating over contacts 1585 and 1627 when sender control #1 is seized, and relay 1150 operating over contacts 1586 and 1628 when sender control #2 is seized in the manner previously described. Relay 1140 or 1150 then connects the sender control leads to the link selector 1200 to enable the operator to establish a new front connection in a manner similar to that previously described.

If sending is in progress over the rear of the link when the error button ERR and relay 1370 are operated, the operation of contacts 1371' opens the circuit to the sender control seizure relay, such as relay 3330, and opens a circuit to either relay 1590 or 1570, dependent upon the operated condition of the alternator relays 1580 and 1620. Relays 1590 and 1570 are used instead of link relays 1140 and 1150, because in sending over the rear of the link, the dial rear key DR is used to operate relay 1410 and to condition the position and link for dialling over the rear. The sender control seizure relay restores to cause the release of the seized sender control and sender in the manner previously described. Contacts 1373 of relay 1370 open the locking circuit of relay 1460 which restores. Relay 1370 completes a circuit for differentially restoring link relay 1020 as follows: ground contacts 1427, 1417, 1436 and 1374, conductor 1070, contacts 1049 and 1028 and the lower winding of relay 1020 to battery.

Relay 1020 restores, and, at contacts 1029, disconnects ground from conductor 1008 to restore the dial rear finder and the rear switchtrain. Contacts 1022 of relay 1020 disconnect ground from conductor 1205 to restore relay 1320. Contacts 1329 opens the flashing circuit to the engaged rear lamp ER. Contacts 1321 open the circuit to relay 1340 and link relays 1130 and 1040 providing there is no connection on the front of the link, in which case relay 1310 is operated to maintain relays 1340, 1130 and 1040 operated. Contacts 1324 complete a locking circuit to maintain relay 1410 operated after the release of relay 1460. This locking circuit may be traced from ground contacts 1355, 1335, 1324, 1431, 1561 and 1411 and the upper winding of relay 1410 to battery. Assuming that there is no connection on the front of the link then relays 1340, 1130 and 1040 restores when relay 1320 operates. When 1340 restores, contacts 1341 cause relay 1420 to restore. The restoration of link relays 1130 and 1040 completes the release of the link, and following the operation of relay 1520, allows the link relays 1010 of all idle links to operate in the manner previously described.

Relay 1360 restores when the operator restores the error button ERR, or after the sender control opens the locking circuit of relay 1360 by disconnecting ground from conductor 1403. Either the restoration of relay 1360 at contacts 1361, or the restoration of relay 1460 at contacts 1464, whichever occurs last, opens the circuit of relay 1370. When relay 1370 restores, contacts 1373' operate relay 1520 over the following circuit: ground contacts 1429, 1386 and 1373', conductor 1394, key contacts 1885, conductor 1503, contacts 1481 and 1511 and relay 1520 to battery. Contacts 1371' of relay 1370 ground finder lead 1408, and contacts 1372' ground finder lead 1407. Contacts 1371' also ground one of the sender control seizure leads, dependent upon the operated condition of relays 1580 and 1620, to complete a circuit through the alternate sender control seizure relay to either relay 1590 or 1570 as previously described.

Stopping battery for the dial rear finder extends from battery through the lower winding of relay 1460 over contacts 1415 and 1642, conductor 1210, and through contacts 1016 of link relays 1010 of the idle links, conductors 1008 of these idle links and to the rotary level bank contacts in the level marked by grounded conductor 1408. The grounding of the finder conductors 1407 and 1408 causes a dial rear finder to hunt for and connect with an idle one of the links marked with stopping battery to the winding of relay 1460. It should be noted that, since relay 1410 if operated, contacts 1414 open to disconnect stopping battery at the upper winding of relay 1440 from the call distribution stopping circuit conductor 1066 to prevent seizure of any of these idle links at this position by the call distribution switches. When the finder locates an idle one of the links at this position and switches through to an inter-toll selector, relays 1460, 1320, 1340 and 1420 operate and relay 1520 restores as previously described for the dial rear operation. When an idle sender is found by the sender finder, the operator may proceed to re-key the call.

It will now be assumed that there is a connection on the front of the link when relay 1020 is restored, and in this case relays 1310, 1340, 1420, 1030, 1040 and 1130 remain operated. When relay 1020 restores, contacts 1022 disconnects ground from conductor 1205 to open the circuit of relay 1320 which restores. Contacts 1029 disconnects ground from conductor 1008 to release the rear switch train and dial rear finder. Contacts 1027 open the pulsing circuit to the sender control. Contacts 1021' connects stopping battery through the lower winding of relay 1460 to mark only this link in the banks of the dial rear finder. Contacts 1023' open the circuit to relay 1150 and contacts 1024' open the circuit to relay 1140.

When relay 1320 restores, contacts 1320 are ineffective to release relays 1340, 1130, 1040 and 1429 because contacts 1311 of relay 1310 maintain relay 1340 operated. Contacts 1324 complete the previously traced locking circuit for relay 1410. Relays 1360 and 1370 restore after the release of the sender control and after restoration of the error button. When relay 1370 restores and closes contacts 1373', relay 1520 is not operated in this case since relay 1420 is held operated to open contacts 1429 to prevent reoperation of relay 1520. Contacts 1371' and 1372' ground finder leads 1408 and 1407 to cause the dial rear finder to operate as previously described. Contacts 1371' also ground one of the sender control leads to cause a sender to be connected to the rear of the link as previously described. In this case stopping battery for the finder conductor 1008 extends over contacts 1201' and 1137 to conductor 1210 and through the lower winding of relay 1460 instead of over contacts 1016, since relay 1010 of this link is not operated. In this case this particular link, instead of any idle link, is searched for and found by the dial rear finder. When the finder finds this particular link relay 1460 is operated over its lower winding as previously described and at contacts 1464 completes a circuit for operating relays 1320 and 1020 as follows: ground contacts 1464 and 1371, upper winding of relay 1320 to battery for energizing relay 1320 and over conductor 1205 and contacts 1131 through the upper winding of relay 1020 to battery. The operation of relays 1320 and 1020 perform the same functions as previously described and the operator may then complete the new connection over the rear of the link.

*Dial rear operation*

In case the operator is required to originate a call, she depresses the dial rear button DR to gain access to an idle link and to seize the necessary equipment. The operator then sets up one end of the connection over the rear of the link, after which the other end of the connection is set up over the front of the link. When the operator depresses the dial rear button DR (Fig. 18), the closure of contacts 1891 complete a circuit for operating the dial rear relay 1410 as follows: ground contacts 1355, 1335, 1324, conductor 1309, contacts 1891 of the dial rear button DR, conductor 1392, contacts 1385, 1641, 1512 and 1444, and through the lower winding of relay 1410 to battery. Dial rear contacts 1892 open a circuit to relay 1480 in case relay 1480 is operated. Dial rear relay 1410 operates and locks over the following circuit: ground, contacts 1355, 1335, 1324, 1431, 1516 and 1411 to the upper winding of relay 1410 and battery. Contacts 1413 complete a circuit from grounded contacts 1352 for operating slow-to-operate relay 1610. Contacts 1414 open the stopping circuit to the call distribution switches to mark the links of this position busy to the call distribution switches. Contacts 1415 connect stopping battery through the lower winding of relay 1460 to the stopping conductor 1008 terminating in the bank contacts of the dial rear finder to thereby mark link 1 of this position as the link requiring a finder for a dial rear operation. This circuit may be traced from battery through lower winding of relay 1460, contacts 1415 and 1642, conductor 1210, contacts 1016, to stopping conductor 1008 multipled in the rotary switch banks of the dial rear finders. Contacts 1411' grounds the dial rear finder start conductor 1407 to initiate the operation of the dial rear finder (Fig. 31) in the well known manner. This circuit may be traced from ground contacts 1141', 1326, 1372', 1439 and 1467, finder start conductor 1407 extending to the finder distributor and to the finder start relay (not shown). Contacts 1412' ground the vertical bank marking conductor 1408 to mark the vertical bank contact of the finder corresponding to the level of bank contacts in which link #1 terminates. The circuit for grounding the finder vertical bank contacts may be traced from ground contacts 1371', 1327, 1412', 1431' and 1468 to the marking conductor 1408. Contacts 1415' prepare a circuit for flashing the engaged rear lamp ER, and contacts 1416' open another circuit to the engaged rear lamp ER. Contacts 1414' connect ground to either conductor 1681 or 1682, depending upon the operated condition of the position sender control alternator relays 1580 and 1620, to complete a circuit for operating the seizure sender control relays 3330 in series with the position relay 1590, or to complete a circuit for operating the seizure sender control relay of sender control #2 in series with position relay 1570. The circuit for operating seizure relay 3330 and relay 1590 in series may be traced from ground contacts 1371', 1414', 1585 and 1627, conductor 1681, key contacts 1773, conductor 1701 extending to sender control #1, busy key contacts 3219, contacts 3236, 3227 and 3256 through the winding of seizure relay 3330, conductor 1406, contacts 1419, 1377 and 1578 and the lower winding of relay 1590 to battery. In case the position sender control alternator relays 1580 and 1620 are operated, then the circuit for operating seizure relay of sender control #2 and the position relay 1570 may be traced from ground contacts 1371', 1414', 1586 and 1628, conductor 1682, key contacts 1781, conductor 1702 of sender control #2 and over a circuit through the seizure relay of sender control #2, similar to that traced for seizure relay 3330 back to conductor 1404, contacts 1418, 1376 and 1598 and the lower winding of relay 1570 to battery.

If relay 1590 operates in series with the seizure sender control relay 3330, then relay 1590, at contacts 1596, locks itself over its upper winding, and at contacts 1598, opens a circuit to relay 1570. Contacts 1597 prepare a holding circuit for relay 1590 independent of contacts 1419 and 1377. Contacts 1595 prepare a circuit for relay 1560. Contacts 1599 prepare a point in the circuit for connecting the sender signalling conductor 1546 to the link busy lamp. Contacts 1591 and 1594 prepare to connect the link conductors 1064 and 1062 to the sender control circuits by way of conductors 1508 and 1509. Contacts 1592' prepare the pulsing circuit from the seized sender for operating the inter-toll selector and subsequent switches accessible through the dial rear finder.

In case relay 1570 operates in series with the seizure relay of sender control #2, then relay 1570, at contacts 1576, locks itself, and contacts 1578 open the circuit to relay 1590. Contacts 1577 prepare a holding circuit for relay 1570 by way of contacts 1562. Contacts 1575 prepare a circuit for relay 1560. Contacts 1579 prepare a point in the circuit to connect the signalling conductor 1547 of sender control #2 to the link busy lamp. Contacts 1571 and 1574 prepare to connect the line conductors 1064 and 1062 to sender control #2 by way of conductors 1542 and 1543. Contacts 1572' prepare a point in the pulsing circuit from sender control #2 for pulsing the inter-toll selector and subsequent switches through the dial rear finder. When slow-to-operate relay 1610 operates contacts 1614 and 1615 connect the link conductors 1064 and 1062 to the sender control conductors 1508 and 1509, or 1542 and 1543, dependent upon whether relay 1590 or 1570 is operated.

The dial rear finder is operated in the well known manner when start conductor 1407 is grounded to first operate the finder in a vertical direction until the vertical wiper VW engages the vertical bank contact grounded over conductor 1408, after which the wipers of the finder are rotated in this selected level until the C test wiper encounters the rotary bank contact marked with battery by way of conductor 1008 through the winding of position relay 1460. When the finder finds this marked bank contact, the finder switches through and completes the circuit for operating relay 1460 as follows: ground in the dial rear finder, C test wiper and bank contacts of link #1, conductor 1008, contacts 1016, conductor 1210, contacts 1642 and 1415 through the lower winding of relay 1460 to battery. When the finder switches through low resistance supervisory ground is also connected through the finder EC wiper and bank contact to ground conductor 1005 to thereby operate link relay 1130 by way of contacts 1026 and 1013.

Relay 1460, at contacts 1461, completes a holding circuit for relay 1410 independent of contacts 1324. Contacts 146 prepare a circuit for subsequently holding position relay 1340 and link relays 1130 and 1040 operated. Contacts 1463 prepare a locking circuit for relay 1460. Contacts 1464 complete a circuit by way of contacts 1371 for operating position relay 1320 and for grounding conductor 1205 to operate link relay 1020 when link relay 1130 operates. Contacts 1467 disconnect ground from finder start conductor 1407, and contacts 1468 disconnect ground from the finder vertical level marking conductor 1408. Relay 1320 operates, and at contacts 1321, completes the circuit for operating relay 1340, for locking link relay 1130, and for operating link relay 1040 from ground at contacts 1462. Contacts 1322 open another point in the stopping circuit for the call distributing switches to additionally mark this position and its links busy to such switches. Contacts 1328 connect ground to conductor 1681 or 1682 and by way of key contacts 1773 or 1781 to sender control conductors 1701 or 1702 to seize the alternate sender control as soon as the operator finishes keying up the call on the rear of the link to cause the alternator relays 1580 and 1620 to function as previously described. Contacts 1329 complete a circuit for flashing the engaged rear lamp ER during sending over the rear of the link as follows: from interrupted ground at the 60-IPM source, contacts 1329 and 1415'. Relay 1340 operates, and at contacts 1341, completes the circuit to the slow-to-operate relay 1420. Relay 1420, at contacts 1421 and 1424, closes the operator's telephone circuit to the talking conductors. Contacts 1427 close a locking circuit to the upper winding of relay 1460 as follows: ground contacts 1427, 1417, 1436 and 1373, upper winding of relay 1460 and contacts 1463 to battery. Contacts 1429 open a circuit of relay 1520 which now restores. Relay 1520 restores, and at contacts 1522, removes the short from around resistance R14 and relay 1490 to restore the link relays, such as relays 1010, of the remaining idle links and operates relay 1490 as previously described. Contacts 1523 open another point in the stopping circuit for the call distributing switches, and contacts 1526 extinguish the position pilot lamp PP and the switch pilot lamp SPL.

In the link, relay 1130 operates when the finder switches through and connects low resistance ground to the ECR conductor 1005. Contacts 1131 complete a circuit for operating relay 1020 by way of ground contacts 1464, 1371, conductor 1205, contacts 1131 and upper winding of relay 1020 to battery. Contacts 1133 lock relay 1130 through its lower winding from grounded conductor 1207, and completes the circuit for operating relay 1040. Contacts 1134 prepare a circuit to the rear supervisory relay 1110. Contacts 1132' and 1134' prepare circuits for either position sender control relays 1140 or 1150 dependent upon the sender control being used. Contacts 1136 prepare a point in the pulsing circuit extending from the sender to the dial rear finder.

Relay 1020, at contacts 1022, locks itself and grounds conductor 1205 by way of contacts 1131 for maintaining position relay 1320 operated. Contacts 1023 ground conductor 1003 to mark this line busy to the call distribution switches. Contacts 1024 ground conductor 1004 to mark this link busy to the TX distribution switches. Contacts 1026 open the original energizing circuit of relay 1130, now held operated over its lower winding. Contacts 1027 now complete the pulsing circuit from the sender to the dial rear finder. Contacts 1029 ground conductor 1008 to mark this link busy to other dial rear finders and to the training trunks. Contacts 1023' prepare the circuit for relay 1150, and contacts 1024' prepare the circuit for relay 1140. Contacts 1025' open the circuit to relay 1010 which restores. The pulsing circuit for operating the inter-toll selector and the subsequent switches in the switch train from the sender may now be traced as follows: from battery through the winding of relay 3630, impulse contacts 3691, pulsing conductor 3301, bank contact and wiper 3380 of the sender finder, contacts 3355 and 3315, conductor 1683, contacts 1592', conductor 1209, contacts 1136 and 1027, conductor 1005, EC wiper and bank contact of the dial rear finder to the pulsing relay in the inter-toll selector.

When link relay 1040 operates, contacts 1044 and 1047 connect link conductors 1001 and 1002 extending to the dial rear finder by way of conductors 1062 and 1064, contacts 1615 and 1614, contacts 1594 and 1591 to sender control conductors 1509 and 1508. Relay 1010 restores when its circuit is opened by relay 1020, and at contacts 1014, disconnects grounded conductor 1068 from conductors 1006 and 600 to remove one of the multiple grounds to the call distribution direct access relay 610. Contacts 1015 disconnect grounded conductor 1069 from conductors 1007 and conductor 700 to remove one of the multipled grounds from the call distribution link available relay 720. Contacts 1017 ground conductor 1060 to mark this link busy to the secondary call distribution switches.

When the operator keys up the digits and depresses either the sender disconnect button SD, or the sender disconnect with automatic ring-start button SAR, the keyed digits are registered in the sender and sent out in the same manner as previously described to operate the switches through the rear of the link and the dial rear finder to the called line. The operation of either disconnect button grounds conductor 1802 to cause the connected sender control to ground conductor 1608 or 1609, dependent upon whether sender control #1 or sender control #2 is being used, to cause alternator relays 1620 and 1580 to operate, or to restore if operated, in the manner previously described. The operation, or restoration, of relays 1620 and 1580 causes the other sender control to be seized to enable the operator to begin keying up on the front of the link while sending is still in progress over the rear of the link. In case sender control #1 is being used for the dial rear operation, then relays 1580 and 1620 were in restored position and when conductor 1608 is grounded by sender control #1, relays 1620 and 1580 operate as previously described, and at contacts 1586 and 1628 seize sender control #2. If sender control #2 had been used for the dial rear operation, and when conductor 1609 is grounded by sender control #2, relays 1620 and 1580 restore, and contacts 1585 and 1627 seize sender control #1. When sender control #1 is seized link relay 1140 is operated in series with the sender control #1 seizure relay 3330, or if sender control #2 is seized, link relay 1150 is energized in series with the seizure relay of sender control #2. The operation of either relay 1140 or 1150 connects the last seized sender control to the front of the link and to the link selector 1200 as previously described.

The operation of any one of the sender disconnect buttons grounds conductors 1802 and 1390 to complete a circuit for operating relay 1430 as follows: ground contacts 1887, 2015 or 2013, conductors 1802 and 1390, contacts 1375 and lower winding of relay 1430 to battery. Relay 1430 operates and, at contacts 1432, completes a locking circuit for itself in series with relay 1410 as follows: ground contacts 1355, 1335 and 1325, through the upper winding of relay 1430, contacts 1432, 1561 and 1411 through the upper winding of relay 1140 to battery. Contacts 1433 connect multiple ground to hold relays 1340, 1130 and 1040. Contacts 1436 open the locking circuit of relay 1460 which now slowly restores. Contacts 1439 open a further point in the start circuit to the dial rear finder, and contacts 1431' open a further point in a circuit to the dial rear finder vertical marking conductor 1408. Relay 1460 restores and contacts 1464 open the original operating circuit for relay 1320 now held operated over grounded conductor 1205 from the link. Contacts 1462 disconnect one of the multiple grounds from the right hand terminal of relay 1340.

When the sender, which is sending over the rear of the link finishes sending, ground is returned over either conductor 1548 or 1545, dependent upon whether sender control #1 or sender control #2 is being used, for operating relay 1560. One circuit may be traced from ground, contacts 3255, 3243, 3322' and 3234, conductor 1548, contacts 1595 and relay 1560 to battery. The other similar circuit extends from ground in sender control #2 to conductor 1545 and by way of contacts 1575 to relay 1560. Relay 1560, at contacts 1561, opens the holding circuit to relays 1416 and 1430 which now restore. Contacts 1562 close a multiple locking circuit for relay 1570 if operated, and contacts 1563 close a multiple locking circuit for relay 1590 if operated. Relay 1410 restores, and at contacts 1413 open the circuit to relay 1610 which now restores. Contacts 1415 open a point in the stopping circuit for the dial rear finders. Contacts 1415' disconnect the flashing ground from the engaged rear lamp ER, and contacts 1416' close the circuit to steadily light engaged rear lamp ER over contacts 1355, 1335 and 1325. Relay 1610 restores and at contacts 1611, 1613 and 1616 and 1618 connect the operator's telephone circuit by way of conductors 1062 and 1064, contacts 1044 and 1047 through the rear of the link and over the dial rear finder and switch train to the called line.

When the sender control used for the dial rear operation is released, ground is removed from sender control leads 1545 or 1548 to release relay 1560. Relay 1560 restores, and at contacts 1562 opens the holding circuit to relay 1570 if operated, or at contacts 1563 opens the holding circuit to relay 1590 if operated. Whichever one of these two latter relays restore, now completes the circuit for the link rear supervisory relay 1110 as follows: from rear supervisory conductor ECR 1005, contacts 1027 and 1136, conductor 1209, contacts 1591' and 1571', conductor 1208, contacts 1134 and through the windings of relay 1110 to battery. A low resistance ground is connected through the rear switch train to the supervisory conductor 1005 until the called party answers, and this low resistance ground on conductor 1005 operates the rear supervisory relay 1110 which at contacts 1111 lights the rear supervisory lamp RL.

After establishing the connection over the rear of the link, the operator completes the connection over the front of the link and through the link selector 1200 in the same manner as previously described for a regular call.

After completing conversation, and if one of the parties on the connection requests further service, such party will flash his hookswitch to cause the link supervisory lamp to flash and call the operator's attention to the link. The operator answers the flashing request by momentarily operating the talk key of the link. The operation of the talk key re-engages the operator's position with the link. If it is the party connected to the rear of the link who requests further service, the flashing of his switchhook intermittently changes the ground potential on the ECR supervisory conductor 1005 in the well known manner to intermittently operate rear supervisory relay 1110. The rear supervisory relay 1110 due to its intermittent operation, flashes the supervisory lamp RL by way of contacts 1111. The circuit for intermittently operating the rear supervisory relay may be traced from conductor 1005, contacts 1027 and 1136, conductor 1209, contacts 1591' and 1571', conductor 1208, contacts 1134 and the winding of relay 1110 to battery. If the party on the rear of the link desires another party, the operator releases the front connection by operating the release front key, and keys up the new connection as soon as a sender is located. Use of the release front key will be described subsequently.

If, however, the party on the front of the link requires further service, then the flashing of his switchhook intermittently changes the ground potential on the front supervisory conductor 1204 in the well known manner to intermittently operate the front supervisory relay 1050 to flash the front supervisory lamp FL by way of contacts 1051. The circuit for operating the front supervisory relay 1050 includes the supervisory conductor 1204, contacts 1154, 1144 and 1037. If the party on the front of the link desires a different party, the operator releases the rear connection by operating the rear release key to release the rear connection in a manner subsequently described. After release of the rear connection, the operator then operates the dial rear button DR to cause the dial rear finder to engage the rear of this link before keying up the digits. With the position connected to this link, relay 1520 will be restored and the relays 1010 of the other links associated with this position cannot operate because contacts 1522 are open to include the resistance R14 and the winding of relay 1490 in their circuits. The relays 1010 of these other links open the stopping circuit for the dial rear finders at their contacts 1016 to prevent any dial rear finder finding these links. The relay 1010 of this link, which is connected to the operator's position, is also restored, but in this link, it will be remembered that relay 1130 is operated and that relay 1020 is restored. Under this condition the stopping circuit for the finder extends from the bank contacts of the dial rear finder over conductor 1008, contacts 1021′ and 1137, conductor 1210, contacts 1642 and 1415 to the lower winding of 1460 to battery. The dial rear finder finds this particular marked link and the connection to the called party is established over the rear of the link in the same manner as previously described, except that, since the front of the link has an established connection, a sender control will not be seized for sending over the front of the link. The sender control is prevented from being seized because link relay 1030 is operated to open the seizure circuits to the sender control circuits at contacts 1033′ and 1035′. The operator may now disconnect her position from this link.

In case the position sender disconnect with automatic ring-start button PSD was used by the operator, the position will not be disconnected from the link until after sending is completed. This is because relay 1430, at contacts 1433 maintains relay 1340 operated until relay 1430 restores. Since relay 1430 restores only after sending is completed, the position is not disconnected from the link until after sending is completed. It is necessary for the operator to operate some sender disconnect button, such as PSD, SAR or SD, in order for the sender to complete sending and disconnect the sender control and sender from the position and link. The operation of any sender disconnect button operates relay 1430 which locks until the sender has completed sending. In case the sender disconnect button SAR or SD was operated to disconnect the sender, then the operation of position disconnect button PD, or the operation of the answer disconnect button AD, immediately after the operation of the sender disconnect button, will not release the position from the link until after sending is completed. This is because relay 1430 is held operated until sending is completed and because relay 1430, at contacts 1433 holds relay 1340 operated.

*Paystation calls*

Toll calls from paystation telephones are routed through the local office selectors in the usual manner to a CLR paystation trunk, such as shown in Figs. 23 and 24. These trunks are marked idle by an absence of ground over test conductors 2303. When a local office selector seizes the paystation trunk the calling subscriber's loop is closed over conductors 2301 and 2302, right hand windings of repeating coil RC24, and both windings of line relay 2380 to ground and battery. Relay 2380 operates slow-to-release relay 2320 at contacts 2481. Relay 2320 connects ring back tone to the calling subscriber as follows: from ring back tone source, contacts 2321, 2423, 2372, 2361, 2331, conductor 2301 through the operated local office selector and over the calling subscriber's loop back to conductor 2302, contacts 2334, 2363, 2373, upper left hand winding of repeating coil RC24 and through the upper winding of line relay 2380 to ground. Contacts 2322 complete a circuit for operating relay 2350 by way of contacts 2471′. Contacts 2325 ground conductor 2303 to mark this trunk busy and to hold the operated switchtrain. When relay 2350 operates, contacts 2351 close a circuit to trunk gate relay 2340 over conductor 503 in case the gate is not closed and no links are available. Contacts 2352 close a start circuit to the slow-to-release start relay 2430 over conductor 508 in case the gate is not closed and links are available. Contacts 2353 ground conductor 601 to short circuit relay 550 if the direct access relay 610 is operated. Contacts 2354 ground common conductor 3792 through the resistance R246 to control the call waiting circuit of Fig. 37.

In case the gate is closed when this trunk is seized, then neither conductor 508 or 581 is grounded and the call waits outside the gate until the gate is opened. In case the gate is not yet closed and no links are available, then conductor 503 is grounded to complete a circuit for operating trunk gate relay 2340 by way of contacts 2343 and 2351 to admit this trunk call into the gate. In case the gate is not closed and idle links are available then conductor 508 is grounded to operate trunk start relay 2430 by way of contacts 2342, 2352 and 2425; it being remembered that conductor 508 is first grounded by the direct access relay 610 at contacts 614 when direct primary paths are available to idle links from this trunk group, and that subsequently conductor 508 is grounded by relay 550 closing contacts 551 after all existing trunk calls which have direct primary paths are disposed of, to enable the trunk calls to be extended over secondary switches to idle links.

In case this trunk call is admitted into the gate and its trunk gate to relay 2340 is operated, the call will remain in this condition until a link becomes idle. When a link becomes idle, conductor 581 is grounded in the manner previously described to operate start relay 2430 by way of contacts 2341, 2352 and 2425. When the start relay 2430 operates, "X" contacts 2432 close first to complete a circuit through the upper winding of marginal cutoff relay 2470 in case the test wiper is in engagement with a bank contact marked with stopping battery. Contacts 2433 later complete a circuit to operate motor magnet 2490 in case relay 2470 does not operate, and contacts 2434 ground conductor 502 to operate relay 460.

In case test wiper 2404 is not in engagement with a bank contact marked with stopping battery, then motor magnet 2490 is operated and contacts 2491 complete a circuit to operate interrupter relay 2480 from grounded contacts 2432, and contacts 2492 open the circuit through the upper winding of relay 2470. Interrupter relay 2480 operates and opens the circuit to magnet 2490 at contacts 2481. Magnet 2490 restores to step the wipers one step and opens the circuit to interrupter relay 2480 at contacts 2491 and recloses the circuit to relay 2470 at contacts 2492. Relay 2480 restores to reestablish the circuit to magnet 2490 in case the test wiper 2404 does not find stopping battery. Interrupter relay 2480 and magnet 2490 interact as described until the test wiper 2404 engages a bank contact marked with stopping battery. Cutoff relay 2470 operates from ground through contacts 2432 and 2492 when test wiper 2404 finds stopping battery on its bank contacts. Stopping battery, as previously described, extends from the upper winding of position stop relay 1440, contacts 1314, 1322, 1414, 1523, 1644 and 1663, stop conductor 1066, contacts 1011, conductor 1003, contacts 1911 to conductor 2283 if the call is extended over the primary path, and by way of conductor 800 marking wiper 855, conductor 750, contacts 711 and 619 to conductor 2293 if the call is extended over a secondary path through a secondary switch. Relay 2470 first closes its "X" contacts 2477 to energize the lower winding of relay 2470 by way of contacts 2433, 2477 and 2493 to fully operate relay 2470. Contacts 2471 and 2472 connect the talking conductors of this trunk to the link talking conductors 1002 and 1001. Contacts 2473 operate the slow-to-operate relay 2420 in series with the upper winding of differential check relay 2390, but relay 2390 is marginal and will not operate in series with the high resistance winding of relay 2420. Contacts 2474 connect interrupted ground from the 30 IPM source over wiper 2403 and identity conductor 1009 to flash the position identity lamp IL at the rate of 30 pulses per minute to indicate to the operator that the trunk call is from a paystation. Contacts 2475, 2476 and 2477 complete a locking circuit for relay 2470 and for grounding conductors 2283 or conductors 2293 and 2294, first from contacts 2433 and later from contacts 1023 when link relay 1020 operates as previously described. Contacts 2478 disconnect ground from conductor 601 and contacts 2479 open the circuit to magnet 2490 before it can fully operate. Contacts 2471' open the circuit to relay 2350 which restores, and contacts 2472' momentarily ground supervisory conductor 1005 during the operate time of slow-to-operate relay 2420 to operate the link relay 1130 as previously described.

Relay 2350 restores and contacts 2351 open the circuit to gate relay 2340 which restores, if operated. Contacts 2352 open the circuit to the slow-to-release start relay 2430 and contacts 2354 disconnect ground from conductor 3792. Relay 2340 restores, if it is operated, and disconnects ground from conductors 501 and 602 to control the gate relay 520 and possibly remove the short from relay 560 as previously described. Slow to operate relay 2420 operates before the slow-to-release relay 2430 restores to operate relay 2440 by way of contacts 2424, 2431 and 2411. Relay 2420 is made slow to operate in order to apply the paystation tone immediately after the operator hears the "zip-zip" tone. Contacts 2426 operate the slow-to-operate relay 2370 and contacts 2428 disconnect ground from conductor 1005 after the link relay 1130 has operated and completed its locking circuit as previously described. Contacts 2429 complete a circuit to operate relay 2310 by way of contacts 2376 and 2331. Contacts 2423 disconnect ring back tone from the calling subscriber. Contacts 2421 and 2422 close a direct current bridge including coil RT in the connected position through both windings of differential ring relay 2450 and the lower winding of differential check relay 2390 to thereby prepare circuits for subsequently operating either the link relay 2450 or check relay 2390 in case the operator desires to ring the calling subscriber or desires to check the number of the paystation trunk circuit.

Relay 2440 operates and closes a locking circuit for itself by way of contacts 2445 and 2411. Contacts 2447 cause the weighted spring 2446 to start vibrating to intermittently close the circuit to slow-to-operate relay 2410. Contacts 2443 connect paystation tone to the operator's headset after the application of the "zip-zip" tone, to advise the operator that the calling subscriber is at a paystation. This tone circuit may be traced from the paystation tone source, contacts 2443 and 2472, wiper 2402, conductor 1001, contacts 1044, conductor 1062, contacts 1611 and 1618, condenser C16', contacts 1424, right hand winding of repeating coil RC2, contacts 1421, 1453 and 1473, condenser C16, contacts 1611 and 1613, conductor 1064, contacts 1047, conductor 1002, wiper 2401, contacts 2471 and 2442 to ground. Paystation tone is transmitted through repeat coil RC2 to the operator in a well-known manner.

Start relay 2430 restores and, at contacts 2432, disconnects ground from the upper winding of relay 2470 and open contacts 2433 after ground is supplied from the link to hold relay 2470 operated through its lower winding. Relay 2410 is slow to operate and does not operate until the vibrations of the weighted spring 2446 are sufficiently damped to maintain the circuit to relay 2410 closed for the operate time of relay 2410. When relay 2410 operates contacts 2412 close a temporary locking circuit for relay 2410 from contacts 2445, and contacts 2411 open a circuit to relay 2440 which restores. Relay 2440 restores to disconnect paystation tone from the operator at contacts 2443 and 2442, and contacts 2441 and 2444 complete the talking circuit between the calling subscriber and the operator. Contacts 2445 and 2447 open to restore 2410. The paystation tone and the flashing of the position identity lamp IL inform the operator that the call is from a paystation.

Relay 2310 operates in response to the operation of relay 2420 and locks itself at contacts 2314 independent of contacts 2376. Contacts 2313 hold relay 2320 operated independent of line relay 2380, and contacts 2312 prepare a circuit to connect refund battery to conductors 2301 and 2302. When slow-to-operate relay 2370 operates it completes a locking circuit for itself at contacts 2375. Contacts 2377 complete a circuit to operate slow-to-operate relay 2330 by way of contacts 2316. Contacts 2371 and 2374 reverse battery from the windings of line relay 2380 to control the paystation repeater in the well known manner. Relay 2330 operates, and, at contacts 2331 and 2334 disconnects conductors 2301 and 2302 from line relay 2380 while contacts 2332 and 2336 connect refund negative battery 110V to conductors 2301 and 2302 to cause the refund of the deposited coin at the paystation in the well known manner. Contacts 2336 open the circuit through the lower winding of check relay 2390. Contacts 2337 open the circuit through the lower winding of ring relay 2450. Contacts 2338 remove the short from the high resistance R244. Contacts 2339 complete another temporary holding circuit for relay 2320 and contacts 2331' open the circuit to relay 2310 which now restores. Relay 2310 restores after an interval and at contacts 2312 disconnects the refund battery. Contacts 2316 open the circuit of relay 2330 which now restores and reconnects the calling line at contacts 2331 and 2334, shorts the resistance R244, and recloses the circuits to relays 2390 and 2450. During this coin refund operation line relay 2380 restores but relay 2320 is held operated by contacts 2313 and 2339. Line relay 2380 reoperates when relay 2330 restores. The operator may now converse with the calling subscriber and extend the call to the called party in the same manner as previously described for the regular CLR trunk call.

In case the calling subscriber wishes to signal the operator, the calling subscriber will depress the switch hook to open the circuit to line relay 2380. Relay 2380 releases when relay 2380 opens contacts 2381 and relay 2320, at contacts 2324 grounds the supervisory ECR conductor 1005 to operate the link rear supervisory relay 1110 and light the rear supervisory lamp RL. The circuit for operating link relay 1110 may be traced as follows: ground contacts 2472', contacts 2451 and 2324, resistance R245, wiper 2406, supervisory conductor 1005, contacts 1027, 1135 and 1124 and the lower winding of rear supervisory relay 1110 to battery. Relay 1110 operates and contacts 1111 light the rear supervisory lamp RL. When the switch hook is released, relays 2380 and 2320 reoperate and the latter relay, at contacts 2324, opens the circuit to the supervisory relay 1110 which now restores and extinguishes lamp RL. Flashing the switchhook will cause the rear supervisory lamp RL to flash and signal the operator.

In case the operator desires to ring the calling party after he has replaced his receiver, the operation of the ring key to its ring rear position opens a circuit to lead 1002 and connects resistance battery to lead 1101 as previously described. The opening of the circuit to lead 1002 opens the circuit through the upper winding of ring relay 2450 while the lower winding of this relay is energized from ground, contacts 2337, 2422, lower winding of relay 2450, resistance R242, lower right hand winding of coil RC24, contacts 2444 and 2472, wiper 2402 to conductor 1001 which is connected to resistance battery through key contacts 1842 of the ring rear key. Ring relay 2450 operates over the above traced circuit and contacts 2452 complete a circuit to operate relay 2360. Contacts 2451 open a circuit to the ring supervisory relay 1110 through contacts 2324 which closed when the calling party hung up. Relay 2360, at contacts 2361 and 2363, opens the circuit to the repeating coil RC24, and contacts 2362 and 2364 connect ground and generator current to conductors 2301 and 2302 to ring the calling subscriber. When the ring key is restored, the direct current bridge is again closed through both windings of differential relay 2450 to cause relay 2450 to restore its operated contacts and release relay 2360. Contacts 2451 reclose the supervisory circuits to rear supervisory relay 1110 to control the rear supervisory lamp RL. When relay 2360 restores, contacts 2362 and 2364 disconnect ringing current from the calling line and contacts 2361 and 2363 reconnect the line relay 2380 to the conductors 2301 and 2302. When the calling subscriber answers, relays 2380 and 2320 reoperate, the latter relay, at contacts 2324 opening the circuit to supervisory relay 1110 which restores to extinguish lamp RL thereby indicating that the calling party has answered.

*Coin control*

After completing the toll connection between the calling paystation and the called party, the operator may collect or refund the deposited coins by operation of the collect or refund keys shown in Fig. 19. In case the operator desires to collect the deposited coins, the coin collect rear key is actuated. Key contacts 1932 ground conductor 1605 to operate position rear connect relay 1610 and key contacts 1931 and 1933 connect positive 110 volt collect battery to conductor 1505. A circuit may now be traced for operating coin relay 2460 in series with marginal position coin relay 1540 as follows: from the coin collect battery positive 110 volts, key contacts 1931, conductor 1505, winding of marginal relay 1540, contacts 1615, conductor 1062, contacts 1044, conductor 1001, wiper 2402, contacts 2472 and 2444, lower right hand winding of repeating coil RC24, winding of relay 2460, resistance R243 to ground at contacts 2338. Relay 2460 operates over this circuit but relay 1540, being marginal, will not operate through the winding of relay 2460 and high resistance R243. Contacts 2461 open to prevent the operation of relay 2360 in case the ring relay 2450 should operate at this time, and contacts 2462 close to operate slow-to-operate relay 2330. Relay 2330 operates and at contacts 2337 opens the circuit through the lower winding of ring relay 2450 to prevent its operation. Contacts 2338 remove the short from the high resistance R244 to increase the resistance of the circuit through the marginal position relay 1540 to prevent its operation in case no coins are on deposit. Contacts 2331 and 2334 disconnect the line relay 2380 and repeat coil RC24. Contacts 2332 and 2335 connect the collect battery to line conductors 2301 and 2302 by way of closed contacts 2311 to collect battery at the position circuit to collect the deposited coins in the well known manner. If coins have been deposited then conductors 2301 and 2303 are grounded through a resistance at the paystation in a well-known manner and marginal position relay 1540 now operates in series with this low paystation resistance to light the coin lamp CL. The circuit for operating position relay 1430 may be traced from the low resistance ground at the paystation over conductors 2301 and 2302, contacts 2332, 2335, 2311, 2444 and 2472, wiper 2402 and over conductor 1001, contacts 1044, conductor 1062, contacts 1615, 1593, 1573, winding of relay 1540, conductor 1505, to the positive 110 volt collect battery at the coin collect key. Relay 1540, at contacts 1541, completes a circuit for lighting the coin lamp CL. The application of collect battery to the paystation mechanism, causes the coins to be deposited in the well-known manner. When the coins are deposited, ground through the paystation resistance is removed and position relay 1540 restores due to the high resistance ground fed through resistance R244, R243 and the winding of relay 2460. Relay 1540 restores and extinguishes the coin lamp CL thereby advising the operator that the coins have been deposited.

In case the operator wishes to refund the deposited coins, the coin return key is operated to its rear position to close key contacts 1911, 1912 and 1913. Key contacts 1912 ground conductor 1605 to operate rear connect relay 1610 and key contacts 1911 and 1913, connect negative 110 volt refund battery to conductor 1505. Relay 2460 is operated over the same circuit as traced above through relay 1540 and the operation from here on is the same as previously described except that refund battery causes the paystation mechanism to refund the deposited coins.

When the coin control key is restored, relay 2460 restores when the coin collect or coin refund battery is disconnected, since relay 2460 will not hold over the normal exchange battery due to resistances R243 and R244 reducing the current flow through this relay. Contacts 2462 open and release relay 2330. Relay 2330 restores, reconnects the repeat coil and line relay 2380 again shorts resistance R244 to enable the reoperation of relay 2460, if required, and recloses a circuit to ring relay 2450.

In case the operator desires to collect or refund over the front connection, then the collect front or refund key in Fig. 19 is operated. The closure of either key contacts 1921 or 1941 ground conductor 1544 to operate the position front connect relay 1550 and the closure of key contacts 1922 connect negative 110 volt refund battery to conductor 1505, while the closure of key contacts 1942 connect positive 110 volt collect battery to conductor 1505. The operation of the front connect key 1550 now connects either refund or collect battery to positive conductor 1202 and over the front switchtrain to refund or collect the deposited coins. This circuit may be traced from the refund or collect battery, through the refund or collect front keys, conductor 1505, coin relay 1540, contacts 1555, conductors 1602 and 1603, contacts 1046 and 1035, conductor 1202 to link selector 1200 and over the front switchtrain to the resistance ground at the paystation line. In a manner similar to that previously described for coin control over the rear connection, coin relay 1540 is operated over this circuit if coins have been deposited, to light the coin lamp CL and when the coins are refunded or collected, the paystation ground is removed to cause relay 1540 to restore and extinguish the coin lamp CL.

*Release*

The paystation CLR trunk is held under control of both the operator and the calling party. If the operator depresses the release key before the calling party disconnects, ground is removed from conductors 2283 and 2293 to open the locking circuit of relay 2470. Relay 2470 restores and disconnects the link from this trunk. Contacts 2473 open the circuit to relay 2420, contacts 2474 disconnect ground from identity conductor 1009, and contacts 2471' reclose the circuit to relay 2350. Relay 2350 reoperates and at contacts 2353 grounds conductor 601. Contacts 2351 connect trunk gate relay 2340 to conductor 503. Relay 2420 restores and, at contacts 2421 and 2422, opens the circuit to relay 2450. Contacts 2425 close the gate circuit from conductor 508 to start relay 2430, and contacts 2423 reconnect ring back tone to the calling party. If the calling party is still holding the trunk, then the call now enters the gate and eventually the start relay operates to step the primary trunk switch to an idle link as previously described to thereby find an operator to render further assistance.

When the calling party restores first, then the loop circuit to line relay 2380 is opened and relay 2380 restores and opens the circuit to release relay 2320 at contacts 2381. Relay 2320 restores and, at contacts 2324, grounds the ECR conductor 1005 through resistance R245 to operate the position rear supervisory relay 1110 and light lamp RL, as previously described. When the operator releases and removes ground from conductors 2283 and 2293, relay 2470 restores. Relay 2350 does not operate at this time because relay 2320 is restored. Relay 2420 restores and opens a circuit to relay 2370. Relay 2370 restores and, at contacts 2372 and 2373, restores the normal battery potential to leads 2301 and 2302. Contacts 2377 disconnect ground from conductor 2303 to release the switchtrain and to mark this trunk idle to local office selectors. The trunk circuit is now released and may be used on other paystation calls.

*Ring down toll trunk*

Incoming calls from the distance manual exchange are extended to the ring down toll trunk 2500 shown in Figs. 25 and 26. When an incoming call is initiated at the distant manual exchange, ringing current is transmitted over conductors 2601 and 2602 to operate relay 2650. Relay 2650 operates and opens contacts 2561 to release the normally operated relay 2660. Relay 2660 restores and opens the circuit to relay 2680 at contacts 2662, and contacts 2661 close a circuit through the resistance R262 for operating relay 2620 over its upper winding to close its X contacts 2623. The lower winding of relay 2620 is now energized to fully operate relay 2620 over the following circuit: ground, contacts 2545 and 2623, lower winding of relay 2620, resistance R26 to battery. Contacts 2621 complete a circuit for operating trunk gate relay 2610 as follows: ground, jumper J2, contacts 2611 and 2621, winding of gate relay 2610 to battery at contacts 2544. It should be noted at this point that the circuit for operating trunk gate relay 2610 is extended over jumper J2 to ground instead of to the call distribution conductor 503 as is done in the CLR trunks previously described. By connecting the jumper J2 directly to ground instead of to conductor 503, the trunk gate relay 2610 is always operated irrespective of whether the call distribution gate is closed or not, thereby always permitting initiated ring-down toll call to be immediately entered into the gate instead of locking such calls outside the gate as is done for CLR trunk calls which were received after the gate was closed. This jumper connection therefore gives preference to calls on ring-down toll trunks even though the gate may be closed. Contacts 2625 open one of the multiple circuits to the ATB relay 2690. Contacts 2626 momentarily ground conductor 601 to short relay 550 if the gate is not closed, if an idle link is available from the primary trunk subgroup in which case the direct access relay 610 will be operated to ground conductor 505 to short relay 550. Conductor 505 is also grounded from other subgroup control circuits of this primary group control circuit in case any one of their direct access relays is operated and conductor 601 of that subgroup of trunks is grounded to prevent relay 550 from operating and closing contacts 551 and $551^7$. Contacts 2627 light the busy lamp BL. Contacts 2628 disconnect battery potential at 2350 from conductor 2504 to busy this trunk to the intertoll selectors having access thereto. Relay 2650 restores when ringing current is disconnected from conductors 2601 and 2602 and relay 2660 now reoperates to open the initial energizing circuit of relay 2620.

Gate relay 2610 operates and locks itself through contacts 2621 and 2612 to ground over jumper J1. Contacts 2613 ground conductor 501 to operate distribution gate relay 520 to initiate the closing of the gate, if not already closed, in the manner previously described. Contacts 2614 connects start relay 2550 to start conductor 581. Contacts 2615 disconnect ground from conductor 601 to remove the short from relay 550 to permit its operation in its local circuit only in case conductor 505 is not grounded from some other subgroup control circuit, in case the gate is not closed, and in case some link is available. Contacts 2616 ground conductor 602 to ground conductor 506 and short circuit relay 560 if the gate is closed and if contacts 612 of direct access relay 610 are closed. Conductor 506 may also be grounded from other subgroup control circuits of this primary group control circuit if any one of their direct access relays is operated and conductor 602 of that subgroup of trunks is grounded to prevent relay 560 from operating and closing contacts 561 to $561^7$ to thereby prevent grounding of conductor 581 by way of contacts 561 to $561^7$, so that the trunk call which has direct primary access to the idle link is given preference over those which have only secondary access.

When relay 520 operates, if not already operated, contacts 522 operate relays 510 in all primary group control circuits. Relays 510 operate and contacts 511 operate relays 530 in all primary group control circuits. Relays 530 open the circuits to all relays 550 at contacts 532. Contacts 533 ground the left hand terminal of relay 560 by way of contacts 541 if some link is available, to operate relay 560 or to short relay 560, dependent upon whether conductor 506 is not grounded or is grounded by way of some contacts 612 and some conductors 602. Contacts 535 open the gate to the CLR trunks to lock subsequent CLR calls outside the gate. Contacts 536 open a further point in the start circuit for the CLR trunks. Contacts 537 ground conductor 509 to thereby ground start conductors 581 through operated contacts 615 of the operated direct access relays (610) and also to ground start conductors 581 by way of operated contacts 561 and $561^7$ if relay 560 is operated. As previously described relay 560 is operated only after all trunk calls which have direct primary access to available links are disposed of, and therefore the start circuits for the trunk calls waiting inside the gate are completed through contacts 561 to $561^7$ when only secondary paths are available to the idle links.

From the foregoing it will be seen that as soon as a ring down trunk call arrives, its gate 2610 operates and closes the call distribution gate even though there may be links available, thereby locking subsequent CLR trunk calls outside the gate until all calls within the gate have switched through. In case any trunk call, which is waiting inside the gate with its trunk gate relay operated, and a link, which is accessible over a direct primary path to any one of the waiting calls, becomes idle; then this one trunk call, even though it is a CLR call, is taken care of before any other trunk calls which must be completed through secondaries. This is because relay 560 is shorted by the direct access relay 610 as soon as a direct primary path to an idle link is available to a waiting trunk call inside the gate. Therefore, any waiting trunk call inside the gate with direct primary access to an idle link is given preference over the other waiting trunk calls which can only be completed through secondaries. Both CLR and ring down trunk calls waiting inside the gate, and which can only be completed through secondaries, have no preference over each other.

When start conductor 581 is grounded, start relay 2550 is operated by way of contacts 2614, 2624 and 2546. Relay 2550 first closes its X contacts 2553 to complete a circuit for the upper winding of cut-off relay 2520 if test wiper 2509 is resting on a bank contact marked with stopping battery at an operator's position and through an idle link. Contacts 2554 later complete a circuit for motor magnet 2512 in case relay 2520 does not operate. Contacts 2551 ground conductor 502 to operate relay 460. Contacts 2552 prepare a temporary locking circuit for relay 2520. Contacts 2555 open the circuit to the identity wiper 2519. In case test wiper 2509 is not in engagement with a bank contact marked with stopping battery then magnet 2512 is operated and contacts 2513 complete a circuit to the interrupter relay 2510 from grounded contacts 2553 while contacts 2514 open the circuit to the cut-off relay 2520. Interrupter relay 2510 operates and opens the circuit to magnet 2512 at contacts 2511. Magnet 2512 restores to step the wipers of the primary switch one step and opens the circuit to interrupter relay 2510 at contacts 2513, while contacts 2514 reclose the circuit to cut-off relay 2520. Relay 2520 restores to reestablish the circuit to magnet 2512 in case the test wiper 2509 does not find stopping battery. Interrupter relay 2510 and magnet 2512 interact as described until wiper 2509 engages a bank contact marked with stopping battery. Cut-off relay 2520 operates from ground through contacts 2553 and 2514 when wiper 2509 finds battery on its engaged bank contact. Stopping battery, as previously described, extends from the upper winding of position stop relay 1440 to conductor 2283 if the call is extended over a direct primary path, or by way of conductor 2293 if the call is extended over the secondary path through a secondary switch.

Cut-off relay 2520 first closes its X contacts 2523' to energize its lower winding by way of contacts 2551 and 2515 to fully operate relay 2520. Contacts 2521 and 2522 prepare circuits to the ring relay 2560. Contacts 2523 complete a circuit for operating slow-to-operate relay 2540 in series with the check relay 2590, but relay 2590, being marginal, does not operate in series with the high resistance winding of relay 2540. Contacts 2524 ground conductor 1005 through the low resistance windings of relays 2570 and 2580 to operate the link relay 1130 and trunk relay 2580. Contacts 2527 complete a locking circuit for relay 2520 from conductor 2294 if the call was completed over a secondary switch. Contacts 2528 open a circuit to magnet 2512. Contacts 2529 connect conductor 2294 to conductor 2293 by way of wipers 2508 and 2509 and completes a locking circuit for relay 2520 by way of contacts 2527 when conductor 2294 is grounded to mark this link busy if the call was completed over a secondary switch. Contacts 2521' ground conductor 2504 to mark this trunk busy to the inter-toll selectors. Contacts 2523' momentarily holds relay 2520 operated over contacts 2552 and 2515 and grounds wipers 2508 and 2509 until the holding ground is fed back from the seized link.

Relay 2570 is marginally adjusted to operate in series with the lower low resistance winding of link rear supervisory relay 1110 but not in series with the upper winding of link relay 1130 or the lower high resistance winding of relay 1110. In case relay 2570 should operate in series with the upper winding of link relay 1130, relay 2570 will restore when its winding is energized in series with both windings of link relay 1110 at a time when link relay 1130 is operated. Relay 2570, however, is operated only in series with the lower low resistance winding of rear supervisory link relay 1110 after the operator has extended the call and has been disconnected from the engaged link.

Relay 2580 operates over the above-traced circuit and completes a circuit for operating relay 2640 as follows: ground, contacts 2581, 2643 and 2526, lower winding of relay 2640 to battery. Relay 2640 operates and locks itself over contacts 2644 and 2581, and contacts 2641 disconnect one of the multipled grounds from the right hand terminals of relay 2580. Slow-to-operate relay 2540 operates, connects battery potential to link conductor 1002 by way of upper windings of relays 2590 and 2560, contacts 2541, upper winding of coil RT, contacts 2534 and 2522 to wiper 2506; and connects ground potential to ring conductor 1001 by way of contacts 2543, resistance R25, lower winding of relay 2560, lower winding of coil RT, contacts 2531 and 2521 to wiper 2505. Relays 2560 and 2590 are differentially wound and since their windings are energized in opposition over the direct current branch in the position circuit these relays do not operate. Contacts 2542 open the line termination, contacts 2544 open the circuit of trunk gate relay 2610 which restores, and contacts 2545 open the locking circuit of relay 2620 which restores. Contacts 2546 open the circuit to the slow-to-release start relay 2550, contacts 2547 maintain the busy lamp BL illuminated, and contacts 2541' disconnects ground from conductor 3792. Contacts 2548 disconnect ground from conductor 601 to permit operation of relay 550 under conditions previously described.

Relay 2620 restores and removes the short from the high resistance lower winding of relay 2580 and includes this high resistance winding in series with relay 2570 and link rear supervisory relay 1110 to cause the line 1110 to restore and extinguish the rear supervisory lamp RL. Trunk gate relay 2610 restores and disconnects ground from conductor 501 at contacts 2613 to restore distribution gate relay 520. Contacts 2616 disconnect ground from conductor 602 to control relay 560 as previously described. Start relay 2550 restores and disconnects ground from conductor 502 at contacts 2551. Contacts 2552 disconnect one of the grounds from the lower winding of relay 2520 which is now held operated by ground from the link over conductor 2283 or 2294. Contacts 2553 open the circuit through the upper winding of relay 2520. Contacts 2555 grounds identity lead 1009 by way of contacts 2523' and wiper 2519 to steadily light the link identity IL to inform the operator that the call originated from an operator. In the same manner as previously described the operator answers and extends the call to the desired called party after which she retires from the connection.

If the distant calling operator wishes to recall the local operator and rings while the call is established, relay 2650 is operated by ringing current over conductors 2601 and 2602 and relay 2660 restores to reoperate relay 2620 as previously described. Relay 2620 shorts the lower high resistance winding of relay 2580 and now operates relay 2570 in series with the lower low resistance winding of link supervisory relay 1110 as follows: ground, contacts 2622, upper winding of relay 2560, winding of relay 2570, contacts 2524, wiper 2507, supervisory conductor 1005, contacts 1027, 1135 and 1124 and lower low resistance winding of supervisory relay 1110 to battery. Link relay 1110 operates and lights the rear supervisory lamp RL to signal the operator. Relay 2570 operates and locks relay 2620 operated from contacts 2571. When the ring signal ceases relay 2650 restores and relay 2660 reoperates. When the local operator reenters the connection to talk to the distant operator, relay 1130 is reoperated in the same manner as previously described to include both windings of rear supervisory relay 1110 in series with relays 2570 and 2580. The inclusion of the upper high resistance winding of relay 1110 in this circuit causes marginal relay 2570 to restore and open the locking circuit of relay 2620 which now restores. Relay 2620 restores and opens contacts 2622 to again include the high resistance lower winding of relay 2580 in the supervisory circuit to restore link supervisory relay 1110 to extinguish the rear supervisory lamp RL.

The local operator may recall the distant operator by momentarily operating the ring key to its ring rear position to connect negative battery potential to conductor 1001 and to open the circuit to conductor 1002 as previously described. Opening the circuit to conductor 1002 opens the circuit through the upper winding of ring relay 2560 while the lower winding is energized from the battery potential applied at the ring key. Differential ring relay 2560 now operates since only one of its windings is now energized. Contacts 2562 operate relay 2630. Relay 2630 operates relay 2680 by way of contacts 2662 and 2632 and resistance R26. Relay 2680 operates and connects ringing current to conductors 2601 and 2602 by way of contacts 2682 and 2683 to signal the distant operator. Contacts 2685 operate relay 2670. Relay 2670 closes a line termination for the negative and positive talking conductors at contacts 2674. When the ring key is restored both windings of the ring relay 2560 are energized in opposition over the direct current branch at the local operator's position and differential relay 2560 restores. When relay 2560 restores contacts 2562 open the circuit to relay 2630 which also restores to open the circuit of relay 2680 at contacts 2632. Relay 2680 restores to disconnect ringing current and to open the circuit of relay 2670 which also restores to remove the line termination and to reestablish the connection.

*Release*

Release of the trunk is under control of the local operator. When the distant calling operator rings up on disconnect, ringing current again operates relay 2650 to release relay 2660 and operate relay 2620. In the same manner as previously described, relay 2620, at contacts 2622 shorts the high resistance winding of relay 2580 to reoperate relay 2570 and link rear supervisory relay 1110 to light the rear supervisory lamp RL for disconnect supervision. When the ring signal ceases relay 2650 restores and relay 2660 reoperates. When the local operator disconnects, ground is removed from conductor 2283, 2293 or 2294, dependent upon the paths the link was seized over, to open the locking circuit of cut-off relay 2520 which now restores. When relay 2520 restores the link is disconnected from the trunk. Contacts 2523 open the circuit of relay 2540, contacts 2524 open the circuit including relays 2570, 2580 and 1110, contacts 2521' disconnect ground from conductor 2504 to remove the busy marking ground, and contacts 2523' disconnect ground from the identity conductor 1009 to open a circuit for the identity lamp IL. Relay 2580 restores and opens the locking circuit of relay 2640 at contacts 2581. Relay 2570 restores and opens the locking circuit of relay 2620 at contacts 2571. Relay 2620 restores and removes the short from relay 2580. The slow-to-operate relay 2540 now restores and closes the line termination at contacts 2542, and extinguishes the busy lamp BL at contacts 2547. Contacts 2649 close to prepare a circuit for seizing this trunk from the intertoll selectors, and contacts 2548 reclose one of the circuits to the common ATB relay 2690. Relay 1110 restores to extinguish lamp BL when the cut-off relay 2520 restores. The trunk circuit is now normal and may be used on subsequent calls.

*Outgoing calls*

The two-way ring down toll trunks are seized by way of intertoll selectors to establish toll connections to the operator at the distant manual exchange. This trunk circuit is marked idle to intertoll selectors by the application of battery potential through the upper winding of relay 2530 to conductor 2504. When an intertoll selector seizes this trunk, ground from this selector is extended over the selector test wiper T, conductor 2405, contacts 2522', 2549 and 2628 through the upper lower resistance winding of relay 2530 to battery; negative battery from this selector is also extended over the EC wiper, conductor 2503 and also low resistance winding of relay 2580 to ground at contacts 2641 to operate relay 2580. Relay 2530 operates, and at contacts 2532 and 2533, prepare circuits to the ring relay 2560 and check relay 2590. Contacts 2535 complete a circuit for operating relay 2540 through the lower winding of check relay 2690 which does not operate in this circuit. Contacts 2536 complete a locking circuit including both windings of relay 2530 in series from grounded conductor 2504. Relay 2540 operates and, at contacts 2541 and 2543, connects the ring relay 2560 and check relay 2590 to conductors 2501 and 2502. Contacts 2544 open the circuit to trunk gate relay 2610, contacts 2545 open a circuit to relay 2620, and contacts 2546 open the circuit to start relay 2550. Contacts 2547 light the busy lamp BL, contacts 2548 open one of the circuits to the common relay 2690, and at contacts 2549 opens the circuit to the upper winding of relay 2530.

Relay 2580 operates to initiate a splash ring over conductors 2601 and 2602. Contacts 2581 operate relay 2630 by way of contacts 2643 and 2525. Relay 2360 operates and contacts 2631 open the circuit to relay 2620. Contacts 2632 closes a circuit from battery over resistance R26 and contacts 2662 to operate relay 2680. Contacts 2633 strike the weighted spring 2634 to cause spring 2634 to vibrate and intermittently close the circuit to relay 2640. Relay 2640 has its upper winding shorted by contacts 2642 to make this relay slow to operate so that relay 2640 does not operate until the vibrations of weighted spring 2634 have practically stopped. Relay 2680 operates to connect ringing current to conductors 2601 and 2602 at contacts 2682 and 2683, and operates relay 2670 at contacts 2685. When the vibrations of weighted spring 2634 cease, slow-to-operate relay 2640 is operated from ground at contacts 2561, and locks itself over contacts 2644 to ground at contacts 2581. Contacts 2642 remove the short from the upper winding of relay 2640 to enable relay 2640 to quickly release when its locking circuit is opened. Contacts 2641 removes the short from the high resistance lower winding of relay 2580 to increase the resistance in the supervisory circuit to conductor 2503. Contacts 2643 open the circuit to relay 2630 which now restores. At contacts 2632, relay 2630 opens a circuit to relay 2680 which now restores to open the circuit to relay 2670 and to disconnect ringing current from conductors 2601 and 2602 to terminate the splashing of ringing current. When the high resistance lower winding of relay 2580 is included in the supervisory circuit over conductor 2503, the supervisory relay in the link circuit restores to extinguish the supervisory lamp in a manner apparent from the foregoing description to thereby advise the calling operator that the distant operator has been signalled.

*Release*

Release of outgoing trunk calls over this ring-down trunk circuit is under control of the calling operator, and in order to release the connection the calling operator first operates the ring key to open the circuit over conductor 2501 and the upper winding of differential ring relay 2560, while applying battery potential to conductor 2502 to maintain only the lower winding of ring relay 2650 energized. Differential ring relay 2560 now operates contacts 2562 to operate relay 2630. Relay 2630, at contacts 2632, again operates relay 2680 to ring the distant operator for disconnect. The calling operator now releases the connection over the intertoll selector to this ring-down trunk in the well-known manner, thereby opening the supervisory circuit over conductors 2503 to cause relay 2580 to restore, and also disconnects ground from conductor 2504 to open the locking circuit of relay 2530 which now restores. Relay 2580 restores and opens the locking circuit of relay 2640 at contacts 2581. Relay 2530 restores and opens the circuit of relay 2540 at contacts 2535. Relay 2540 restores and opens the busy lamp BL at contacts 2547. Contacts 2548 complete a multiple circuit for the common ATB relay 2690. Contacts 2549 connect the upper low resistance winding of relay 2530 to conductor 2504 to mark this trunk idle to intertoll selectors. The trunk circuit is now normal and may be used for other trunk calls.

*Inward operator trunk calls*

The trunk circuit shown in Figs. 27 and 28 represent two different toll trunks, namely an inward operator trunk 2700 and a TX trunk 2700–A as shown in Fig. 1. When this trunk circuit is used as an inward operator's trunk, the distribution of incoming trunk calls is given preference over the CLR trunk calls and is controlled by the call distribution circuits shown in Figs. 4 to 8 over conductors 581, 602, 501 and 502 in the same manner as described for ring-down toll trunks of Figs. 25 and 26; and the trunk primary switch has both direct primary and secondary access to idle links at the operator positions. When this trunk circuit is used as a TX trunk, the distribution of incoming calls is controlled by the TX call distribution circuits shown in Fig. 9 over conductors TX501, TX503 and TX581; and the trunk primary switch has only direct primary access to the operator link and does not have access to any secondary switches. When this trunk is used as an inward operator trunk the conductors TX503, TX581 and TX501 are disconnected from terminals T1, T2 and T3. When this trunk is used as a TX trunk conductor TX503 is connected to terminal T1 and the thermistor R271 is disconnected from terminal T1, conductor TX581 is connected to terminal T2 and conductor 581 is disconnected from terminal T2, and conductor TX501 is connected to terminal T3 while conductor 501 is disconnected from terminal T3. The primary switch in the TX trunk has access to conductors 1001, 1002, 1005, 1009 and TXCR; conductors TXCR being accessible to wiper 2875 instead of conductor 2283.

It will now be assumed that the trunk circuit shown in Figs. 27 and 28 is used as an inward operator trunk and is selectable over intertoll selectors. When this trunk is idle, battery through the lower resistance winding of relay 2720 is connected to conductor 2703. When an intertoll selector seizes this trunk in a well-known manner, ground is connected over the CL wiper of the intertoll selector, conductor 2703, contacts 2731 and through the lower winding of relay 2720 to battery to operate 2720. Relay 2720 completes a circuit for operating the trunk gate relay 2710 by way of contacts 2721, 2732 and 2711, terminal T1 and thermistor R271. Thermistor R271 delays the operation of relay 2710 in a well-known manner to enable an additional digit to be dialed by the calling operator after this trunk is seized. It is customary for calling operators to dial the operator code 121 to reach another operator, and since only the first two digits 1 and 2 are needed in this instance to route the call to another operator, the last digit is of no utility and is absorbed. The thermistor R271 is therefore provided to delay the operation of the gate relay 2710 so that the called operator will not answer during the dialling of the last absorbed digit. Contacts 2722 prepare the circuit for start relay 2810, contacts 2724 ground conductor 601 to control gate relay 550 as previously described. Contacts 2726 ground conductor 3792 through resistance R272 to indicate a waiting call to the call waiting circuit.

Trunk gate relay 2710 operates after a delay regardless of whether the call distribution gate is closed or not closed to thereby admit this trunk call into the gate. Contact 2712 completes a locking circuit for relay 2710. Contact 2713 connects start relay 2810 to start conductor 581 by way of terminal T2. Contacts 2715 ground conductor 602 to control gate relay 560 in the manner previously described. Contacts 2717 disconnect ground from conductor 601, and contacts 2718 ground conductor 501 by way of terminal T3 to operate the distribution gate relay 520 to initiate the closing of the gate, if not already closed. The call distribution circuits operate in the same manner as described for trunk calls received over ring-down trunks when relay 520 operates. That is, relay 520 operates to cause all relays 510 in all primary group control circuits to operate and the latter relays cause all relays 530 to operate. Relays 530 close the gate to subsequent CLR calls and control relays 560, dependent upon whether any waiting trunk calls inside the gate have direct primary access to available links. As previously described relays 560 are shorted if the direct access relays (610) is operated and if a direct primary path is available to a waiting trunk call inside the gate, thereby giving preference to the trunk calls which have direct primary paths to available links. Start conductor 581 is grounded by way of contacts 615 when the waiting trunk call has direct primary access to an idle link. When all waiting trunk calls which had primary paths to idle links have switched through, then the short-circuits for relays 560 are opened to permit relays 560 to operate as previously described and ground start conductor 581 by way of contacts 561.

When start conductor 581 is grounded, start relay 2810 is operated over contacts 2713, 2722 and 2734. Start relay 2810 first closes its X contacts 2815 to complete a circuit through the upper winding of cut-off relay 2830 if test wiper 2875 is resting on a bank contact marked with stopping battery. Contacts 2813 later ground conductor 502 to operate relay 460, and contacts 2814 later complete a circuit for motor magnet 2850 in case cut-off relay 2830 does not operate.

In case test wiper 2875 is not in engagement with a bank contact marked with stopping battery, then magnet 2850 is operated by way of contacts 2814, 2833′ and 2841. Motor magnet 2850 completes a circuit for interrupter relay 2840 at contacts 2853 and opens circuits to both windings of relay 2830 at contacts 2851 and 2852. Interrupter relay 2840 operates and opens the circuit of magnet 2850 at contacts 2841. Magnet 2850 restores to step the primary switch wipers one step, opens the circuit to interrupter relay 2840 at contacts 2853 and recloses the test circuit through the upper winding of cut-off relay 2830 at contacts 2852. Interrupter relay 2840 restores to re-establish the circuit to magnet 2850 in case wiper 2875 does not find stopping battery. Interrupter relay 2840 and magnet 2850 interact as described until wiper 2875 finds stopping battery. Cut-off relay 2830 operates from ground contacts 2815 and 2852 when wiper 2875 finds stopping battery. Stopping battery, as previously described extends from the upper winding of position stop relay 1440 to conductor 2283 if the call is extended over a direct primary path, or by way of conductor 2293 if the call is extended over a secondary path through a secondary switch.

Cut-off relay 2830 first closes its X contacts 2832′ to energize its lower winding by way of contacts 2851 and 2814 to fully operate cut-off relay 2830. Contacts 2831 open the line termination circuit, and contacts 2832 and 2833 connect conductors 2701 and 2702 to link conductors 1001 and 1002 over wipers 2871 and 2872. Contacts 2834 connect ground from contacts 2811 through resistance R281 and over wiper 2873 to supervisory conductor 1005 to operate link relay 1130. Contacts 2835 connect ground through high resistance R28 to supervisory conductor 2704, while contacts 2836 disconnect ground through low resistance R27 from conductor 2704, and contacts 2837 connect battery through upper high resistance winding of relay 2740 to conductor 2704 and to ground through resistance R28. The disconnection of low resistance ground from conductor 2704 extinguishes the calling operator's supervisory lamp. However, at this time battery potential is extended over conductor 2704 from the calling operator's link to effectively shunt relay 2740 to prevent its operation at this time. Contacts 2838 complete a circuit for operating relay 2730 as follows: ground, contacts 2723, upper winding of relay 2730, contacts 2838 and through the lower winding of relay 2730 to battery. Contacts 2839 connect wiper 2875 to wiper 2876, and contacts 2831′ prepare a holding circuit for relay 2830 from ground which is returned later from the seized trunk before relay 2810 restores. Contacts 2832′ temporarily holds relay 2830 and grounds wiper 2875 and 2876. The link is seized in the manner previously described and when the link rear connect relay 1020 operates, ground is forwarded from the link to hold cut-off relay 2830 operated.

Relay 2730 operates, opens the locking circuit to the trunk gate relay 2710 at contacts 2732, and opens the circuit of start relay 2810 at contacts 2734. Contacts 2737 complete a locking circuit for relay 2730 independent of contacts 2723 thereby placing the release of this trunk under control of both the calling and called operators. Contacts 2738 open to prevent the grounding of conductor 601 when the trunk gate relay restores. Contacts 2731 open to connect both the high and low resistance windings of relay 2720 to conductor 2703 to mark this trunk busy.

Trunk gate relay 2710 restores, disconnects ground from conductor 602 at contacts 2715, and disconnects ground from conductor 501 at contacts 2718 to restore the distribution gate relay 520. Start relay 2810 restores and contacts 2811 disconnect ground through resistance R281 from supervisory conductor 1005 to release the link rear supervisory relay 1110 and extinguish the rear supervisory lamp RL. Contacts 2812 close ground from contacts 2723 to identify conductor 1009 by way of wiper 2874 to light the link identity lamp IL steadily to inform the answering operator that the call is from another operator. Contacts 2814 disconnect ground from relay 2830 after ground is fed back from the link to hold relay 2830 operated. In the same manner as previously described the operator answers and extends the call after which she retires from the connection. If the calling operator wishes to recall the local operator, she momentarily operates the ring key at her calling position to cause the supervisory lead to be opened thereby removing the low resistance battery feed from the supervisory conductor and conductor 2704 which has been shunting the upper winding of relay 2740 to prevent its operation. When this low resistance battery feed is removed from conductor 2704, relay 2740 operates over the following circuit: ground, high resistance R28, contacts 2835 and 2837 and upper winding of relay 2740 to battery. Relay 2740 operates and completes a circuit for operating relay 2760 by way of contacts 2742 and 2754. Relay 2760 operates and connects ground at contacts 2753 by way of contacts 2762, low resistance winding of relay 2820, resistance R281, contacts 2834 and wiper 2873 to supervisory conductor 1005 to operate the rear supervisory link relay 1110 to light the rear supervisory lamp RL. Relay 2820 operates over this circuit and short-circuits the upper winding of relay 2750 from ground, contacts 2733, 2812, 2821, 2757, upper winding of relay 2750, contacts 2754 and 2742 to ground. When the calling operator restores the ring key the low resistance battery feed is again connected to conductor 2704 to shunt down relay 2740. Relay 2740 restores and removes the short-circuit from relay 2750 at contacts 2742, and also opens the initial operating circuit of the slow-to-release relay 2760. Relay 2750 now operates in series with relay 2760 and first closes a circuit through its lower winding at contacts 2755 from grounded contacts 2763 to fully operate relay 2750. Contacts 2751 complete a circuit through the upper winding of relay 2820, contacts 2753 disconnects ground from supervisory conductor 1005 to cause the rear supervisory link relay 1110 to restore and extinguish lamp RL. Contacts 2756 close a locking circuit through the lower winding of relay 2760, and contacts 2757 open the initial operating circuit of relay 2750. Contacts 2758 connect interrupted ground from 120 IPM source to intermittently operate relay 2740. Contacts 2742 are intermittently operated to transmit ground pulses through the lower winding of relay 2820 and resistance R281 to intermittently operate the rear supervisory link relay 1110 to flash the supervisory lamp RL. Relay 2820 is also intermittently operated over the above-traced circuit and at contacts 2821 intermittently energizes and deenergizes the lower winding of slow-to-release relay 2760. Relay 2760, due to its slow release characteristics, remains operated during pulsing by relay 2740.

When the local operator re-enters the connection, a high resistance battery feed is connected to conductor 1005 to cause relay 2820 to restore or prevent its operation. When relay 2820 restores, the circuit to relay 2760 is opened and relay 2760 restores after a slight delay to open the supervisory circuit over conductor 1005 at contacts 2762. Contacts 2761 open the circuit for the upper winding of relay 2820 and contacts 2763 open the holding circuit of relay 2750 which now restores. When relay 2750 restores, contacts 2758 opens the pulsing circuit to relay 2740 which now remains restored.

The local operator may recall the calling, or originating operator by momentarily operating the ring key to its ring rear position. Operation of the ring key open conductor 1001 and connects resistance battery to conductor 1002 in the manner previously described to open conductor 2701 and connect resistance battery to conductor 2702 to cause a differential ring relay in the intertoll trunk circuit to operate and signal the calling operator.

*Release*

This operator trunk circuit is held under control of both the calling and local operators. If the local operator depresses the release key before the calling party disconnects, ground is removed from conductor 2283, 2293 or 2294 by the restoration of the link rear connect relay 1020 disconnecting ground from conductor 1003 at contacts 1023. When ground is removed from conductor 2283, 2293 or 2294, the locking circuit of cut-off relay 2830 is opened and relay 2830 restores to open the circuits of the link. Contacts 2838 open the circuit through the lower winding of relay 2730. Contacts 2837 open the circuit of relay 2740, contacts 2836 connect ground through the upper low resistance winding of relay 2730 by way of contacts 2723, 2736 and 2836 to conductor 2704 to light the calling operator's supervisory lamp for disconnect supervision. When the calling operator disconnects, the calling switch train is released and relays 2720 and 2730 restore.

In case the calling operator releases the connection before the local operator, relay 2720 restores when the hold circuit over conductor 2703 is opened, and relay 2740 operates when the low resistance battery feed is disconnected from conductor 2704. Relay 2740 now operates in its local circuit including resistance R28 and contacts 2835 and 2837. Relay 2740 closes a circuit through the upper winding of relay 2760 by way of contacts 2742 and 2754. Relay 2760 operates and, at contacts 2762 closes a low resistance ground through the lower winding of relay 2820 and resistance R281 to supervisory conductor 1005 to operate the link supervisory relay 1110 to light lamp RL. Relay 2820 operates over this circuit and shorts the upper winding of relay 2750 at contacts 2821.

In response to the operation of the rear supervisory lamp RL, the local operator releases the connection by operating the release key thereby causing the link rear connect relay 1020 to restore as previously described. When link relay 1020 restores, contacts 1023 disconnect the locking ground from cut-off relay 2830 which now restores. In the same manner as previously described, the restoration of relay 2830 opens the supervisory circuits at contacts 2834, opens the circuit to relay 2730 at contacts 2838, and opens the circuit to relay 2740 at contacts 2837. Relay 2820 restores when the supervisory circuit is opened. Relay 2740 restores and opens the circuit of relay 2760 at contacts 2742. Relay 2730 restores and connects ground through resistance R27 to conductor 2704. Contacts 2731 shorts the upper high resistance winding of relay 2720 to connect a low resistance idle battery potential to conductor 2703, and contacts 2733 disconnect ground from identity conductor 1009. The trunk circuit is now at normal and may be used on subsequent calls.

*TX positions*

The TX operators are arranged in teams of three operators each, with each team working at three adjacent positions. Each team is referred to as a TX station, and each station is assigned a TX code number, such as 112, 113 or 114, which the local or distant operators dial to reach these respective teams of TX operators by means of the selector switches shown in Fig. 1. Associated with each TX station is a TX distribution group control circuit, such as TX–1 shown in Fig. 9, which controls the distribution of the incoming TX calls to the idle links at the TX operator positions The TX positions are normally arranged to give preferential answering to TX calls. However, in case there are no TX calls awaiting distribution, then the position circuits of these TX positions are arranged to answer CLR calls.

When a position is arranged to normally answer TX calls, both the TX cut-off key TXCO and the combined line and recording cut-off key CLRCO are at normal with the result that relays 1650, 1660 and 1670 are not operated. As long as traffic is waiting to be distributed to a TX position TX conductor 1548 will not be grounded by the TX group control circuit and relays 1660 and 1670 remain at normal. Contacts 1661 and 1662, being open, prevent the grounding of conductors, such as conductor 1068, thereby preventing the links at the TX positions from controlling the direct access relay 610 in the primary sub-group control circuits of the call distribution circuits. Contacts 1663, also being open, open the stopping circuit to stop relay 1440 to prevent stopping battery to be extended over conductors 1066, 1003, 800 and 2283 thereby denying access to any of the secondary or primary switches in the call distribution switches of the CLR, inward operator, or ringdown trunks. Contacts 1671 and 1673 ground conductors, such as conductor 1060, to prevent any secondary switch from preselecting any of the links at this TX position. Contacts 1672 and 1674, remaining open, prevent this position and the links thereat from grounding conductors 1069, 1007 and 700 to thereby disassociate control of the link available relay 720 from this position. When a TX operator is prepared to accept a call the link relays 1010 of her idle links are operated and stopping battery from her position is extended to the TX distribution switches as follows: from battery, upper winding of stop relay 1440, contacts 1314, 1322, 1414, 1523, 1644 and 1653 to stop conductors 1067 of all links at her position, over link contacts 1012 of her links which are idle and available for use to conductor 1004, which is connected through contacts 1946 to the TXCR conductor which is multipled in the bank contacts of the TX distribution switches (Fig. 28) and accessible to the test wipers, such as wiper 2875, of these switches. When a TX distribution switch of a TX trunk finds a link marked with stopping battery over the link TXCR conductor, the TX cut-off trunk relay, such as relay 2830, energizes in series with position stop relay 1440 to switch the TX call through this link to the TX position in a manner more fully described hereinafter. The operation of the relays in the links and this TX position operate in the same manner as previously described for a CLR call.

When no TX trunk calls are awaiting distribution to a particular TX station, the positions at this TX station are permitted to answer CLR calls. When no TX calls are awaiting service, contacts 1018 ground TX conductor 1690, by way of conductor 1073 and contacts 1654, to operate TX relay 960, by way of rectifier R92 and contacts 985 and 952. The link available lamp TXLA is lighted by way of grounded conductor 1690. Relay 960, at contacts 961, grounds conductor 1548 by way of contacts 912, 951, 961 and 981, and rectifier R9, and over contacts 1525, and 1611′, CLRCO key, contacts 1652 to the windings of both relays 1660 and 1670. Relays 1660 and 1670 operate to condition the position to receive calls over the CLR call distribution switches in the same manner as previously described by closing stopping battery to stop conductor 1066 at contacts 1663 and by removing ground from conductors, such as conductor 1060, at contacts 1671 and 1673. Contacts 1661 and 1672 close ground to conductors 1068 and 1069 to control the direct access relay 610 and the link available relay 720 in the call distribution circuits for the CLR trunks. As soon as a TX call is received on a TX trunk, ground is removed from conductor 1548 to restore relays 1660 and 1670 thereby cancelling the availability of this TX position to CLR calls.

*TX trunk calls and TX call distribution*

It will now be assumed that the trunk circuit shown in Figs. 27 and 28 is used in a TX trunk call and that a calling operator dials the TX code call number 112, 113 or 114 to seize this trunk over the selector switches shown in Fig. 1. The operation of this trunk is the same as that described for an inward operator trunk call except that the TX group control circuits of Fig. 9 controls the call distribution and that the trunk primary switches do not have access to secondaries. When this trunk circuit is seized on a TX trunk call relay 2720 is operated from ground forwarded over conductor 2703. Contacts 2721 connect trunk gate relay 2710 to conductor TX503 by way of contacts 2732 and 2711 and terminal T1 to complete an operating circuit for the trunk gate relay 2710 in case the TX gate is not closed. Call distribution conductors 581, 602, 601, 501 and 502 are used only on operator trunk circuits and are not wired to these TX trunk circuits. Only the TX call distribution leads TX503, TX581 and TX501 are wired to the TX trunks. The operation of the trunk gate relay 2710 depends upon whether conductor TX503 is grounded or not grounded. In case the TX trunk gate is closed when TX gate relay 930 is operated and contacts 931 have disconnected ground from conductor TX503 and gate relay 2710 does not operate until relay 930 restores.

Assuming now that no TX trunk calls are waiting inside the TX gate, then relay 930 is normal and conductor TX503 is grounded at contacts 931 to operate trunk gate relay 2710 over contacts 2711, 2732 and 2721. Relay 2710 operates and locks itself at contacts 2712. Contacts 2713 connect the start relay 2810 to start conductor TX581 to prepare a circuit for start relay 2810, and contacts 2718 grounds conductor TX501 to operate TX gate relay 940. Relay 940 operates relay 950 at contacts 941, operates relay 930 at contacts 942, and lights the TX gate lamp TXGL at contacts 943. Any TX trunk calls, arriving before the slow-to-operate TX gate relay 930 operates and disconnects ground from conductor TX503, operate and lock their trunk gate relay (2710) to allow such trunk calls to enter into the TX trunk gate; while those TX trunk calls, which arrive after relay 930 has operated and contacts 931 have disconnected ground from conductor TX503, are locked outside the TX trunk gate since their trunk gate relays cannot operate. Contacts 932 prepare a circuit to ground start conductor TX581, and contacts 933 close to circuit to operate the TX answer pilot lamp TXPL as follows: battery contacts 933, resistance R9, contacts 983, conductor 1691 and lamp TXPL to ground. When relay 950 operates, contacts 951 disconnect ground from conductor 1548 if relay 960 is operated, and contacts 952 disconnect relay 960 from conductor 1690. The disconnection of ground from conductor 1548 opens the circuit to the position relays 1660 and 1670 to prevent their operation and to prevent the TX operator's positions and links being used to answer CLR trunk calls as previously described. The disconnection of relay 960 from conductor 1690 prevents relay 960 from operating when an idle link and a TX operator position grounds conductor 1690 over contacts 1018, conductor 1073, and contacts 1654; or, if relay 960 is operated at this time, then contacts 952 open the circuit to relay 960 which restores. As long as a link is idle at the TX operator's position conductor 1690 is grounded and the link available lamp TXLA is lighted. When relay 960 is restored, contacts 962 complete a circuit from grounded conductor 1690 to operate slow-to-operate relay 970. Relay 970 operates and grounds start conductor TX581 at contacts 971 to complete the circuit for operating the trunk start relays 2810 in all TX trunk circuits in this TX trunk group having their trunk gate relays 2710 operated. When the trunk start relays 2810 operate, their associated primary trunk switches are operated in the manner previously described to find an idle link at the TX operator position. The only difference being that the cut-off relay 2830 is operated over the TXCR conductor marked with stopping battery. Stopping battery for the cut-off relay 2830 extends from battery through the upper winding of stop relay 1440, contacts 1314, 1322, 1414, 1523, 1644 and 1653, conductor 1067, contacts 1012, conductor 1004, contacts 1946, conductor TXCR, wiper 2875, upper winding of relay 2830, contacts 2852 and 2815 to ground.

Needless hunting by the TX trunk switches inside the TX gate is prevented if no idle TX links are available. For example, if no TX links are available then conductor 1690 is not grounded and relay 970 restores. When relay 970 restores contacts 971 disconnect ground from start conductor TX581 to restore any operated TX trunk start relays 2810. These TX trunk calls inside the gate, with their trunk gate relays 2710 operated, wait inside the gate until a TX link is again available. When a TX link is available conductor 1690 is again grounded to operate relay 970 which, at contacts 971 again grounds the start lead TX581 to operate the trunk start relays of the waiting trunk calls in this TX trunk group. This process is repeated until all TX trunk calls inside the gate have been switched through to TX links.

When the TX trunk switch connects with an idle TX link, cut-off relay 2830 operates and closes the circuit to operate relay 2730 at contacts 2838. Relay 2730, at contacts 2732 and 2734, opens the circuits of relays 2710 and 2810. When the last operated trunk gate relay 2710 restores in this TX trunk group, contacts 2718 disconnect ground from conductor TX501 to cause the TX gate relay 940 to restore. When relay 940 restores the circuits to relays 950 and 930 and the circuit to the gate lamp TXGL are opened. Relay 930 restores and grounds conductor TX503 by way of contacts 931 to operate the trunk gate relays 2710 in any trunk circuit in this TX trunk group which is waiting outside the gate with its relay 2720 operated. Contacts 933 open to extinguish the TX answer pilot lamp TXPL, and contacts 932 open to disconnect ground from start conductor TX581 if relay 970 is operated. If there are calls waiting outside the gate then their trunk gate relays 2710 operate and reclose the circuit over conductor TX501 from grounded contacts 2718 to reoperate relay 940. Relay 940 recloses the circuits to relays 930 and 950, and relay 930 reoperates while relay 950, being slow-to-release, is reenergized before it has had time to restore. Reoperation of relay 930 again removes ground at contacts 931 from conductor TX503 to again close the TX gate and lock subsequent TX calls outside the gate. Contacts 932 ground start conductor TX581 if links are available, in which case relay 970 is operated, and contacts 933 relights the lamp TXPL. These TX trunk calls which were brought into the gate during the release time of relay 930 are then processed in the same manner as previously described.

After all the TX trunk calls inside the gate have been processed and if no further TX calls are waiting outside the gate, then relays 940 and 930 restore as previously described, and since relay 940 is not reoperated, then relay 950 restores and at contacts 952 connects relay 960 to conductor 1690. If a TX link is available, conductor 1690 will be grounded and relay 960 operates. Relay 960 opens the circuit of relay 970 at contacts 962, and grounds conductor 1548 by way of contacts 912, 951, 961 and 981. When conductor 1548 is grounded position relays 1660 and 1670 are operated over contacts 1525, 1611′, CLR–CO key, contacts 1652 and windings of relays 1660 and 1670. Relays 1660 and 1670 operate to condition the TX position to receive CLR trunk calls by closing stopping battery to stop conductor 1066 at contacts 1663, and by removing ground from conductors 1060 at contacts 1671 and 1673. Contacts 1661 and 1672 close ground to conductors 1068 and 1069 to control the direct access relay 610 and the link available relay 720 in the call distribution circuits for the CLR trunks. However, as soon as a TX trunk call is received, ground is removed from conductor 1548 by the operation of relay 950 to restore relays 1660 and 1670 thereby disabling the availability of this TX position to CLR calls.

During light load periods, it may become desirable to shut down, one or more of the TX stations and the traffic destined for such stations can be transferred to the universal TX position. If it is desired to allow these TX trunk circuits to have access to the links at the universal TX position, the universal TX trunk night transfer key NTF is operated to operate the night transfer relays 980 in each of the TX group control circuits. Operation of the night transfer relays 980 in each group control circuit connect the stopping test conductors, such as TXCR, to the test bank contacts of the TX trunk switches for each of the TX trunk groups. This allows the TX trunk switches in any TX trunk group to search for an idle link at the universal TX position. In addition, the operation of relays 980, at contacts 983 opens the circuit to conductor 1691 to disable lamp TXPL in all positions but the universal position. Contacts 981 open the circuits over conductors 1548 to prevent operation of relays 1660 and 1670 at these shut down TX positions. Contacts 985 disables the control of relays 960 and 970 from these shut down positions. Contacts 982 prepare circuits to ground conductor 1548 extending to the universal TX position for the purpose of controlling relays 1660 and 1670 at this position. Contacts 984 prepare an alternate circuit for the lamp TXPL at the universal TX position. Contacts 986 prepare circuits for relays 960 and 970, and contacts 987 prepares a circuit for relay 920.

Whenever the universal TX position is ready to receive a call, conductor 1690 is grounded by the idle TX link to operate relay 920. Relay 920, at contacts 921, 921′ and 921², completes circuits by way of contacts 986 to light lamp TXLA and to operate relay 960 in each trunk group control circuit in case the TX gate is not closed and no TX trunk calls are waiting inside the gate. In case the gate is closed, then relays 930, 940 and 950 are operated, and relay 970 is operated by way of contacts 921, 986 and 962 when relay 920 operates from ground applied to conductor 1690. The universal TX position, after the universal transfer key is operated, handles all TX trunk calls and may also handle CLR trunk calls, if no TX trunk calls are waiting in the same manner as previously described. The rectifiers R9, R91 and R92 serve to isolate the universal TX position from the other positions when the night transfer key NTF is operated.

Normally TX trunk calls outside the gate must wait to be processed until all calls inside the gate have been answered. However, control operator can override this TX gate answering arrangement by operating an emergency TXEK to operate relay 910. Contacts 911, 911' and 911² ground their respective TX503 conductors to complete circuits for the trunk gate relay 2710 as soon as a call is received on any TX trunk, regardless of the number of TX trunk calls being processed. Contacts 912, 912' and 912² open circuits to their respective conductors 1548 to prevent any of the staffed TX operator positions being used to answer CLR trunk calls. Contacts 913, 913' and 913² ground their respective start conductors TX581 to close circuits to the TX trunk start relays 2810 when their trunk gate relays are operated. The trunk switches of the calling TX trunks are now operated to hunt for an idle TX position link to complete the TX calls in the same manner as previously described.

*Training circuits*

In order to train new operators, several of the regular positions will be used, with slight modifications to exclude them from regular traffic when occupied for training. Before commencing to work at these training positions, the trainees are instructed in toll operating practice ticket work and in manipulating the key sets. At the training positions only the simpler types of calls will be demonstrated, such as: regular and paystation CLR calls, inward operator calls, and TX calls. More complex operations, such as delayed calls, point to point operation, etc., will be deferred until after they have obtained operating experience under actual traffic conditions.

Training will be conducted by teams of three operators, one instructor, or teacher, being seated between two trainees. Calls will be originated by the instructor and received on the adjacent positions, and such calls will be, in general extended by the trainee to the instructor position. Due to the close association of the three adjacent positions, the instructor can supervise visually all actions of her students. Besides direct observation, the correctness of key pulsing will be ascertained by the receipt of the call at the instructor's position.

Two training trunks 2900, such as shown in Figs. 29 and 30, are assigned to each training position and the rotary switches associated therewith have direct access to the links at such position. Two similar trunks are also assigned to the instructor position and the rotary switches of these two trunks have direct access to the links at the instructor position. One of these two trunks for each position will also serve as the regular interposition trunk to that position when not in use for training. These trunks are accessible from the bank contacts of two-digit selectors, while one of the two trunks are accessible from the regular interposition selectors for regular interposition calls. The two-digit selectors are of the well-known Strowger type selectors in which the wipers are operated vertically in response to the first digit to select a level of bank contacts which is assigned to a particular operator position, and then the wipers are directively rotated into the selected level to engage a bank contact corresponding to the second dialled digit. Each trunk circuit has several points of access, as illustrated in Fig. 29 wherein the line conductors —L and +L and the test conductor CL is multipled to four successive bank contacts, while the pulse and supervisory control conductors, such as EC1, EC2, EC3 and EC4 are individually connected to only one bank contact. The different EC leads are used to simulate the different types of toll calls for training purposes.

Each trainee's position and the instructor position is equipped with a training key TK and a gang relay 1910 shown in Fig. 19. The training key when operated, as shown, completes a circuit for relay 1910 when the position is prepared for use to handle regular traffic as previously described. When this position is to be used as a trainee, or instructor, position, the key TK is restored to prevent operation of relay 1910 thereby disabling the use of this position for regular traffic calls. In addition, each of these positions has a relay 1640 which, when operated, opens the circuit to stop conductors 1066 and 1067 at contacts 1644 to disable the stopping circuits for the regular call distribution traffic, while contacts 1643 prepare another stopping circuit for use by this position and the training trunk circuits, such as shown in Figs. 29 and 30. These positions, at contacts 1524 ground conductor 3092, when the position is conditioned to receive a call, in order to provide a starting circuit for the start relays 3060 of the training trunks. The instructor's position is also provided with a transmission loss key TLK which enables the instructor to insert a five of fifteen decibel loss in the transmission circuit to enable the instructor to demonstrate to a trainee the effect of various degrees of loss on a transmission circuit.

It will now be assumed that a trainee operator has been told by the instructor to simulate a ring-down toll call and the trainee operator accordingly operates the dial rear key to cause the dial rear finder to find her position and connect such position to the selector FS in the same manner as described for regular calls. The trainee operator then keys up the digits 118 to route the call to the two digit selector 2DS after which the digit corresponding to the instructor position is keyed up to operate the wipers of selector 2DS to the level assigned to the instructor position. Since the trainee is simulating a ring-down toll call, and in order to connect with the training trunk 2900 shown in Figs. 29 and 30, the trainee keys up the digit 5 to rotate the selector wipers five steps to engage the fifth bank contacts and complete a circuit for operating relay 2930. The circuit for operating relay 2930 extends from ground, contacts 2933, upper winding of relay 2930, EC1 conductor and fifth bank contact, EC selector wiper to resistance battery (not shown) forwarded from the selector. Relay 2930 first closes its X contacts 2934 to fully operate relay 2930 from ground contacts 2913, lower winding of relay 2930, X contacts 2934 to resistance battery through resistance R296. The selector also forwards ground over the selector test wiper CL to the multipled CL bank contacts, and over contacts 3054 to the lower low resistance winding of relay 2910 to operate relay 2910. Ring front relay 2970 and check front relay 2980 are differential relays and a direct current bridge including the coil RT at the trainee calling position is closed over the negative and positive talking conductors to, at this time, prevent the operation of these differential relays. The energizing circuits for these relays extend from ground contacts 2911, one path through resistance R291 and upper winding of relay 2980 to battery, the other path extending through the lower winding of relay 2970, resistance R293, lower left-hand winding of repeat coil RC29, conductor +L through the selectors and over the direct current bridge at the calling operator's position back over the negative line conductor of the selectors to —L conductor, upper left-hand winding of repeat coil RC29, lower winding of relay 2980, resistance R292, upper winding of relay 2970 to battery. Contacts 2915 prepare a circuit to start relay 3060. Relay 2930 operates and locks as described and, at contacts 2938, prepares a circuit to signal the instructor operator.

On simulated ring-down calls from the trainee to the instructor, the instructor operator places her position in key answering position and therefore position relay 1520 is not operated and contacts 1524 have not grounded the start conductor 3092; and the trainee operator is instructed to use automatic ringing or key ringing. Either type of ringing used by the trainee will open the circuit to the negative line conductor —L while resistance battery is connected to the positive line conductor +L thereby opening the circuit through the upper winding of relay 2970 while energizing only the lower winding of relay 2970. Differential ring front relay 2970 now operates its contacts 2972 to operate ring relay 2950. Relay 2950 completes a circuit for lighting the instructor's training lamp TL as follows: ground, contacts 2938 and 2954, conductor 3093, training key contacts 1952, and lamp TL to battery. When lamp TL is lighted the instructor will check to see if the correct procedure was used by the trainee. The instructor operator will now accept the call by operating the accept call key AC thereby restoring position relay 1480 to cause the operation of relay 1520 as previously described. Relay 1520 operates and prepares the stopping circuit for positive stop relay 1440 at contacts 1523, and contacts 1524 grounds conductor 3092 to complete the circuit for start relay 3060. When the ring signal terminates, the direct current bridge through the calling operator position is restored and differential relay 2970 restores to cause relay 2950 to restore and extinguish lamp TL. In case the instructor position is in automatic answering condition and one of her links is idle then relay 1520 is operated and start conductor 3092 is grounded to complete the operating circuit for start relay 3060. In case the instructor calls one of the trainee positions the operations are the same as just described except that the trainee's position would be in automatic answering condition.

When start relay 3060 operates, contacts 3064 ground conductor 3094 to operate position relay 1640, contacts 3063 prepare the test circuit through the lower winding of cut-off relay 3070, and contacts 3062 closes the circuit for motor magnet 3000 by way of contacts 3077 and 3021. Relay 1640 operates and opens the circuit to the dial rear button DR at contacts 1641, contacts 1642 opens the stopping circuit which is used on dial rear operations, contacts 1644 opens the stopping circuit which is used on regular trunk calls, and contacts 1643 closes the stopping circuit for use with the training trunk by connecting the upper winding of position stop relay 1440 to stop conductor 1210 which is connected to stop conductor 1008 by contacts 1016 when the link is idle at this position. Magnet 3000 operates and opens the circuit to relay 3070 at contacts 3002 and contacts 3003 close the circuit to interrupter relay 3020. Relay 3020 operates and opens the circuit to magnet 3000 at contacts 3021. Magnet 3000 restores and steps the wiper of the trunk switch one step, recloses the test circuit for relay 3070 at contacts 3002, and opens the circuit to relay 3020 at contacts 3003. Magnet 3000 and interrupter relay 3020 interact in the well-known manner to step the wipers of the trunk switch until test wiper 3084 finds a bank contact marked with stopping battery to operate the cut-off relay 3070. The circuit for operating relay 3070 may be traced as follows: from ground, contacts 3063, 3002, lower winding of relay 3070, wiper 3084, conductor 1008, contacts 1016 of an idle link, conductor 1210, contacts 1643, 1523, 1414, 1322, 1314, and upper winding of position stop relay 1440 to battery.

Relay 3070 operates and first closes its X contacts 3078 to fully operate relay 3070 from ground at contacts 3062 by way of contacts 3001 and upper winding of relay 3070 to battery. Relay 3070 now locks itself over the following circuit: ground, contacts 3063 and 3002, lower winding of relay 3070, contacts 3079 and 3001 and upper winding of relay 3070 to battery. Contacts 3071 and 3073 connect the right-hand winding of repeat coil RC29 to the link talking conductors 1001 and 1002, and contacts 3072 complete a circuit for operating relay 3050 in series with check rear relay 3030. Relay 3030 does not operate in series with the upper high resistance winding of relay 3050. Contacts 3062, 3078 and 3079 ground wiper 3084 and conductor 1008 to mark this link busy to other training trunk switches. Contacts 3077 open the circuit to magnet 3000, and contacts 3072' connect ground from contacts 3065 through resistance R30 and wiper 3085 to supervisory conductor 1005 to operate link relay 1130 for the same purposes previously described for CLR calls. Contacts 3076 connect ground at contacts 2931 over wiper 3083 to identify conductor 1009 to steadily light identity lamp IL.

Relay 3050 operates and locks through its lower winding by way of contacts 3053 and 2912. Contacts 3051 and 3052 complete circuits through the windings of differential relays 3030 and 3040 which do not operate at this time. Contacts 3054 remove the short from around the upper high resistance winding of relay 2910 thereby removing idle battery potential. Contacts 3056 connect a multiple ground to hold relay 2930 independent of contacts 2913, and contacts 3057 opens the circuit of start relay 3060 which now restores. Start relay 3060 restores and disconnects ground, at contacts 3062 and 3063, from relay 3070 after the link rear connect relay 1020 has operated as previously described to ground conductor 1008 at contacts 1029 to hold relay 3070 operated over its upper winding. Contacts 3064 disconnect ground from conductor 3094 to restore position relay 1640, and contacts 3065 disconnect ground from supervisory conductor 1005.

If the calling operator wishes to recall the called operator, the calling operator momentarily operates the ring key to operate relay 2970 as previously described. Relay 2970 operates ring relay 2950 at contacts 2972. Relay 2950, at contacts 2954, grounds conductor 3093 to light lamp TL, and, at contacts 2953, grounds supervisory conductor 1005 through the winding of relay 2920 and over contacts 2937 and 3072', resistance R30 and wiper 3085 to operate rear supervisory relay 1110 and relay 2920. Relay 1110 lights the rear supervisory lamp RL and relay 2920 locks itself in series with relay 1110 at contacts 2920. When the ring signal is terminated relays 2970 and 2950 restore, the latter relay, at contacts 2954, opening the circuit to lamp TL. Relay 2920 holds the supervision locked in on lead 1005 until the called operator answers. When the called operator answers high resistance battery, as previously described, is connected to conductor 1005 to cause the marginal relay 2920 to restore and open the circuit to conductor 1005.

If the called operator wishes to recall the calling operator, the ring key at the called operator position is operated to open the positive talking conductor 1002 and connect resistance battery to negative talking conductor 1001 to cause the operation of differential ring rear relay 3040 in a manner apparent from the foregoing description. At contacts 3041, relay 3040 connects ground through contacts 2932 and upper low resistance winding of relay 2930 over EC1 conductor and EC selector wiper to operate the rear supervisory relay 1110 in the link at the calling operator's position to light the rear supervisory lamp RL. When the ring key is restored relay 3040 restores and opens the ground circuit to the rear supervisory relay to extinguish the rear supervisory lamp at the calling operator's position. The operation, as above described, is the same when the instructor operator calls a trainer's position, since both positions are similar.

In case either the instructor operator or a trainee operator desires to simulate a TX or a local incoming call, the operation is the same as that previously described except, in this case, a different last digit is dialled, digit 6, for example, and then resistance battery is forwarded over conductor EC2 to operate relay 2940 from ground at contacts 3075. Relay 2940 closes a locking circuit for itself through its lower winding at contacts 2942 from ground at contacts 2913 and battery at resistance R296. Contacts 2941 ground identity conductor 1009 by way of contacts 3076 and wiper 3083 to steadily light identity lamp IL. Contacts 2943 prepare a locking circuit for ring relay 2950, and contacts 2944 prepare a circuit to signal the called operator. When the ring signal is received from the calling operator ring front relay 2970 and ring relay 2950 operate as previously described. Relay 2950, at contacts 2954, signals the called operator by lighting lamp TL over conductor 3093, and, since relay 2940 has closed contacts 2943, relay 2950 is locked operated over contacts 2952 and 3071' until the cut-off relay 3070 is operated. When the ring signal is terminated, relay 2970 restores and opens the original energizing circuit of ring relay 2950 but relay 2950 remains operated over its locking circuit. Contacts 2954 are held closed to continuously light lamp TL to indicate a TX call or a local call. In the simulated ring-down call, it will be remembered that the ring relay 2950 restores as soon as the ring signal is terminated to open the circuit to lamp TL at contacts 2954, thereby lighting lamp TL only for the duration of the ring signal, while in the simulated TX call, relay 2950 is locked operated to continuously light lamp TL. The called operator, by observing the duration of the lighted condition of lamp TL, is able to determine whether the received call is a simulated ring-down or a simulated TX call. Contacts 2977 close when the ring signal is terminated to connect ring-back tone from the Int. Gen. source and through the repeat coil RC29 to the calling operator to advise the calling operator that the called operator is being signalled. The called operator answers by operating the accept call button AC thereby restoring position relay 1480 and operating relay 1520. Relay 1520, at contacts 1524, grounds conductor 3092 to complete the circuit for start relay 3060 which now operates to complete the circuit for position relay 1640 at contacts 3064. The operation from here on is the same as that described for a simulated ring-down call except that when cut-off relay operates contacts 3071' open the locking circuit of ring relay 2950 which now restores to open the circuit to lamp TL and to disconnect ring-back tone at contacts 2951.

The calling operator may recall the called operator in the same manner as previously described by reoperating relays 2970 and 2950. Relay 2950, at contacts 2954, grounds conductor 3093 to light the called operator's lamp TL, and contacts 2953 connect ground by way of contacts 2936 and 3072', resistance R30, and wiper 3085 to supervisory conductor 1005 to light the called operator's supervisory lamp RL. When the ring key at the calling operator position is restored relays 2970 and 2950 restore to remove ground from conductors 3093 and 1005 to extinguish lamps TL and RL.

The called operator may re-ring the calling operator by momentarily operating the ring key to operate ring rear relay 3040 as previously described. A circuit may now be traced for grounding supervisory conductor EC2 to light the calling operator's supervisory lamp as follows: ground, contacts 3041, 3074, upper winding of relay 2940, supervisory conductor EC2, through the switch train to the calling operator link supervisory relay. When the ring key is restored, relay 3040 restores to open the circuit of the calling operator's supervisory relay thereby restoring the supervisory relay to extinguish the supervisory lamp.

In case either the instructor operator or the trainee operator desires to simulate a regular CLR trunk call, the training trunk is seized over the seventh set of bank contacts by selector 2DS. The seizure, the hunting for an idle link, and recall are the same as previously described except that no relay in the training trunk is operated when resistance battery is forwarded over conductor EC3, and on recall to the calling operator, ground is extended over resistance R297 and conductor E3 to control the calling operator's supervisory lamp when ring rear relay 3040 is operated and restored.

In case either the instructor operator or the trainee operator desires to simulate a paystation call, then the two digit selector 2DS is operated to seize the training trunk over its eighth set of bank contacts and forwards resistance battery over conductor EC4 to operate relay 2960 over its upper winding and contacts 3075. Relay 2960 operates and locks itself from grounded contacts 2913, lower winding, contacts 2963, resistance R296 and battery. The operation is the same as that previously described except that when cut-off relay 3060 operates, in response to finding an idle link, interrupted ground from the 30IPM source is transmitted over contacts 2962 and 3076, and wiper 3083 to identity conductor 1009 to flash the link identity lamp IL; and when relay 3050 operates a circuit is completed for operating relay 3010 as follows: ground, contacts 3061, 3055, 2961, 2991 and winding of relay 3010 to battery. Relay 3010 operates and locks itself over contacts 3015 and 2991. Contacts 3011 connect paystation tone by way of contacts 3071 and wiper 3081 to conductor 1001 and ground to conductor 1002 by way of contacts 3013, 3073 and wiper 3082 to transmit paystation tone to the called operator. Contacts 3016 cause the weighted spring 3017 to vibrate to intermittently open and close the circuit to slow-to-operate relay 2990. When the vibrations of the weighted spring 3017 have stopped, relay 2990 operates and opens the locking circuit of relay 3010, and locks itself to ground at contacts 3015. Relay 3010 restores, disconnects paystation tone at contacts 3011 and 3013, and reconnects the repeat coil RC294 to the called link. By this time start relay 3060 has restored, and contacts 3015 open the locking circuit of relay 2990 which restores. Paystation tone is thereby transmitted to the called operator for a short period of time. The calling and called operators may recall each other in a manner similar to that previously described.

*Release*

This trunk circuit is held under control of both operators. If the called operator releases first by depressing her release key, ground is removed from conductor 1008 by link relay 1020 restoring and opening contacts 1029. When ground is removed from conductor 1008, cut-off relay 3070 restores. Relay 3070 restores and disconnects the trunk circuit from the called link, and closes ground from contacts 3075 over the EC2, EC3, or EC4 lead to signal the calling operator, dependent upon the type of the simulated call. However, on a simulated ring-down trunk call it is necessary for the called operator to operate her ring key to signal the calling operator by grounding conductor EC1 as previously described.

If the calling operator is the first to restore, the leads from selector 2DS are opened and relay 2910 restores. Relay 2910 restores and opens the locking circuit of relay 3050 at contacts 2912, and contacts 2913 open the locking circuits of relays 2930, 2940, or 2960, causing whichever relay is operated to restore. Contacts 2914 close ground through contacts 2935, 2936 and 3072' and over resistance R30 and wiper 3085 to supervisory conductor 1005 to signal the called operator. When the called operator releases, ground is removed from conductor 1008 to release relay 3070 as previously described. Relay 3070, at contacts 3072, opens the circuit through the upper winding of relay 3050 which restores since its locking circuit is opened at contacts 2912. Relay 3050 restores and, at contacts 3054, shorts the high resistance upper winding of relay 2910 to connect idle battery potential through the lower low resistance winding of relay 2910 to bank contacts CL to mark this trunk idle. The trunk circuit is now normal and may be seized for other calls.

*Call waiting*

The call waiting circuit 3700 provides an automatic warning signal to the supervisory operator and to the various operators on duty that there are an undue number of trunk calls waiting to be answered. If this warning signal persists over an extended period, the supervisory operator should then have additional operator positions staffed to handle the excessive traffic. This call waiting circuit includes an interrupter INT which operates start relay 3720 for approximately one and one-half seconds at approximately ten minute intervals, a well-known type of rotary step-by-step switch CW, a polarized relay 3750, a bi-metal relay 3730, and relay 3710 which is operated over common conductor 3701 when any operator position is staffed. Common position conductor 3791 is multipled to all positions and is grounded through a resistance when the operator at that position is on duty. Common trunk conductor 3792 is multipled to all trunk circuits and is grounded through a resistance when that trunk circuit is waiting service. The call waiting circuit relay 3710 is operated over common conductor 3701 and contacts 1351' from each operator position when such position is staffed and its relay 1350 is operated.

The chart shown in Fig. 37A shows in the first vertical column the number of steps taken by switch CW in accordance with the number of operators on duty as indicated in the second vertical column. The third vertical column indicates the external network, or the overall resistance in the ground fed over common conductor 3791 extending to all positions.

The fourth and fifth columns indicate the resistance values of the RA resistors connected to the A switch bank. The sixth column indicates the number of trunk calls waiting service, while the seventh column indicates the external network, or the overall resistance in the ground fed over common conductor 3792 extending to all trunk circuits. The ninth and tenth columns indicate the resistance values of the RB resistors connected to the B switch bank.

In order to explain the operation of the call waiting circuit it will be assumed that start relay 3770 is operated by interrupter INT at a time when switch CW is off normal and off-normal contacts 3786 are closed. Start relay 3770 operates and opens the circuit to polar relay 3750 at contacts 3771. Contacts 3772 open the pulsing circuit to motor magnet 3780, and contacts 3773 close a self-interrupting circuit to motor magnet 3780 by way of contacts 3786 and 3781. Magnet 3780 interrupts its own circuit at contacts 3781 to step the A and B wipers to normal at which time off-normal contacts ON 3786 open the circuit to magnet 3780, and off-normal contacts complete a circuit through the upper winding of slow-to-release relay 3740.

Relay 3740 operates and connects polar relay 3750 to common conductor 3791 which is grounded through a 10,000 ohms resistance at each staffed operator position at contacts 3741. Contacts 3743 disconnect polar relay 3750 from common conductor 3792 which is grounded through 10,000 ohms resistance at each trunk circuit which is seized on an incoming call and is waiting to be connected to an operator position. Contacts 3745 disconnect wiper B from polar relay 3750, and contacts 3746 connect wiper A to polar relay 3750. Contacts 3747 prepare a circuit for magnet 3780, and contacts 3749 prepare a holding circuit for the lower winding of slow-to-release relay 3740. Start relay 3770 restores when interrupter INT opens its circuit and, at contacts 3771, completes the circuit for polar relay 3750. Contacts 3772 prepares the pulsing circuit to magnet 3780 and the hold circuit to relay 3740. Contacts 3773 opens the circuit to relay 3740 which is slow-to-release.

In case one or more positions are staffed and have idle links available for use then polar relay 3750 is operated over the following circuit: ground, contacts 1359, 1514, resistance R15 (10,000 ohms), contacts 1655, conductor 3791 common to all operator positions, contacts 3741, winding of polar relay 3750, contacts 3771, interrupter contacts 3782, to the midpoint of the voltage divider and through resistance R371 to battery. If the circuit flow in this circuit is of sufficient value and is in the proper direction the polar relay 3750 is operated. Relay 3750 operates and operates slow-to-release relay 3760. Relay 3760 operates and operates magnet 3780 by way of contacts 3772, 3761 and 3747. Contacts 3761 also completes a circuit through the lower winding of relay 3740 by way of contacts 3747 and 3749 to maintain relay 3740 in operated position.

Magnet 3780 operates and opens the circuit of polar relay 3750 at contacts 3782. Polar relay 3750 restores and opens the circuit of relay 3760. Relay 3760 restores after an interval and opens the circuits to magnet 3780 and relay 3740 at contacts 3761. Magnet 3780 restores and steps wipers A and B to engage their first bank contacts and recloses contacts 3782 to reestablish the circuit to polar relay 3750.

If a plurality of operator positions are conditioned to receive calls, then the ground potential on conductor 3791 is increased by the multiple connections through the resistances R15 at each operator's position to reduce the resistance in the circuit to polar relay 3750 to the value shown in the third vertical column under the heading Ext. Network of Fig. 37A. That is, if only one operator position is conditioned to receive a call then conductor 3791 is grounded through one resistance R15 (10,000 ohms), if two operator positions are conditioned to receive calls then conductor 3791 is grounded through two resistances R15 in multiple to increase the ground potential by reducing the overall resistance to one-half of resistance of R15, or 5,000 ohms. As shown in Fig. 37A, the resistance drops in the third vertical column in accordance with the number of positions conditioned to receive calls and the switch CW steps accordingly. Wiper A has successive access to resistors RA1 to RA22 which have resistance values indicated in the fifth vertical column of Fig. 37A. When wiper A engages its first bank contact, battery through resistance RA1 (10,000 ohms) is also connected to polar relay 3750, and if this resistance equals the overall resistance feeding ground over conductor 3791 then polar relay 3750 does not operate. For example, if only one position is conditioned to receive calls then ground is fed to conductor 3791 through 10,000 ohms resistance R15, and with wiper A in position one, battery is fed through the 10,000 ohms resistor RA1, thereby effectively stopping current flow through polar relay 3750. However, there is usually a number of operator positions staffed and available for use with the result that the overall resistance feeding ground over conductor 3791 is less than the resistance value of RA1 and therefore current flows through polar relay 3750 when its circuit is reclosed at interrupter contacts 3782. Polar relay 3750 again operates and again operates relay 3760 to again operate magnet 3780 and maintain relay 3740 operated. Magnet 3780 again opens the circuit of polar relay 3750 at contacts 3782 and steps wipers A and B another step. This interaction continues until the ground feed on conductor 3791 substantially matches the battery feed over wiper A at which time insufficient current flows through polar relay 3750 to reoperate it, and the switch CW has stepped a number of steps corresponding to the number of operator positions which are staffed and available for use. When polar relay 3750 fails to operate after the last stepping operation, relay 3760 does not operate and slow-to-release relay 3740 now restores.

When relay 3740 restores, contacts 3741 open the circuit to common conductor 3791, contacts 3746 open the circuit to wiper A, and contacts 3748 prepare a circuit to the call waiting lamp CWL, to relay 3720, and to bimetal relay 3730. In addition relay 3740, at contacts 3743, connects polar relay 3750 to the common trunk conductor 3792 which is multipled to all trunk circuits in a group, and contacts 3745 connect the polar relay 3750 to wiper B. A similar combination resistance network, representing the simultaneous number of trunk calls waiting service is now connected to polar relay 3750. The value of this network will change each time new trunk calls arrive or existing trunk calls are answered.

Each of the trunk circuits when taken into use on an incoming call grounds common trunk 3792 through a 10,000 ohm resistor until such call is accepted by an operator. For example, when the CLR trunk 2100 is seized relay 2220 closes contacts 2224 to ground conductor 3792 through resistance R21, and when this trunk call has been extended to an operator, relay 2150 operates and disconnects ground from conductor 3792 at contacts 2156. In a similar manner, the other trunk circuits ground common conductor 3792 through their respective resistors. Since conductor 3792 is multipled to all trunk circuits, the overall resistance feeding ground to conductor 3792 is dependent upon the number of multiple ground connections, or the number of waiting trunk calls. The overall resistance decreases as the number of waiting calls increase to increase the ground potential on conductor 3792, and the overall resistance increases as the number of waiting trunk calls decrease to reduce the ground potential on conductor 3792. The resistors RB1 to RB22 connected to the bank contacts of wiper B are so chosen that they correspond to the permissible number of calls waiting for the number of operators on duty at that time, as indicated in Fig. 37A. If the number of waiting trunk calls exceeds the predetermined number permissible for the number of operators on duty, then conductor 3792 will be grounded through a lower resistance than the connected RB resistance to unbalance the bridge and cause the operation of polar relay 3750. If the number of waiting calls is less than the permissible number for the number of operators on duty then the resistance value feeding ground over conductor 3792 is greater than the connected RB resistance, and while the bridge is unbalanced the current flow is in a reverse direction and polar relay 3750 does not operate. If polar relay 3750 does not operate, then no warning signal is given to the supervisory operator.

When polar relay 3750 operates because the number of waiting trunk calls exceeds the number permissible for the number of operators on duty, relay 3750 reoperates relay 3760. Relay 3760 operates, and instead of operating motor magnet 3780, now lights lamp CWL and energizes relays 3720 and 3730. Relay 3720 operates but relay 3730 is a bi-metal relay and does not operate until after a predetermined time. Relay 3720, at contacts such as contacts 3721, completes circuits for lighting the position answer pilot lamps at the staffed positions to advise the operators thereat that a large number of trunk calls are waiting service. The lighting of lamp CWL advises the supervisory operator that an excessive number of trunk calls are waiting service. When the number of waiting trunk calls is reduced, the ground potential on conductor 3792 is also reduced and if it is equal to or below the battery potential through the connected RB resistance then polar relay 3750 restores to open the circuit to call waiting lamp CWL and to open the circuit to relays 3730 and 3720. The latter relay opening the circuits to the position answer pilot lamps at the staffed positions.

In case the excessive number of calls persists for the operate time of bi-metal relay 3730, then relay 3730 operates to flash lamp CWL and intermittently operate relay 3720 over contacts 3731 from the 120 IPM source. Relay 3720 now flashes the position answer pilot lamp to advise the operator on duty that an excessive number of trunk calls are still waiting. If the flashing of the supervisory lamp CWL continues, the supervisor will staff additional operator positions.

The above described operations take place at approximately ten minute intervals by the interrupter INT reoperating start relay 3770 to restore switch CW as previously described. When relay 3770 is restored the CW switch takes a new setting in the same manner as previously described to first determine the number of operators on duty and then to compare the number of waiting trunk calls to see if the number of waiting trunk calls is not excessive for the number of operators on duty.

*Trunk checking*

Figs. 38 and 39 illustrate the checking circuits used in this system to enable the operator to check the group and number of each trunk circuit used in an established connection. The operator positions, for checking purposes, are divided into groups of a certain number. In this instance each checking group comprises eight adjacent positions, but the number in each group could be increased for larger systems. A group selecting switch CKG, of the well-known rotary step-by-step switch is shown in Fig. 38 for selecting the group of positions. The group selecting operation is controlled over conductors, such as conductor 1704, which are chained through the respective positions in each group and are normally grounded until one of these positions desires to check the group and trunk number of some trunk circuit in an established connection. The group selecting switch has access to a plurality of position selecting switches CKP of the same rotary step-by-step type. Each position selecting switch CKP has access to twenty-four positions. A common start conductor 1707 is multipled to all positions for starting the hunting operation of the group and position selecting switches.

The set of check lamps, shown in Fig. 39, are provided for two adjacent positions in the group comprising positions 17 to 24; it being understood that a similar set is provided for each of the paired positions in each group of eight positions. Each set of check lamps include a group of group check lamps, such as PC, RC, RD1, RD2, DT3, DT4, and TR, for indicating the trunk group number as well as the type of trunk circuit in such group; a group of ten tens check lamps, such as TL1 to TL0, for indicating the tens number of the trunk circuit; and a group of ten units check lamps, such as UL1 to UL0, for indicating the units number of the trunk circuit. The trunk group check relays, such as 3930 to 3990, inclusive, are each wired over group conductors, such as conductors 3901 to 3907, inclusive, to their respective trunk groups, each group conductor being common to all trunk circuits in its own group. The ten tens relays, such as T3910 to 3900, are connected over tens conductors, such as conductor T3910, to all trunk circuits which have the same tens designation in all trunk groups. The ten units relays, such as U3910 to U3900, are connected over units conductors, such as conductor U3901, to all trunk circuits which have the same units designation in all trunk groups.

Each trunk circuit; such as regular and paystation CLR trunks, ring-down trunks, dial trunks, and training trunks; is provided with a check relay which is operated by the operator to control the trunk group, tens, and units check relays, to cause the check lamps to light and indicate the group and number of such trunk circuit. In addition to these check lamps, each operator position is provided with a position check pilot lamp CL (Fig.. 15 and Fig. 39) which lights at the same time as the check lamps to indicate to the checking operator that the group and number displayed on the check lamps is the group and number of the trunk circuit she is checking. In case some other operator may also be checking at this time, it is possible that the check lamps may be lighted for this other operator, and the group and trunk number displayed is for the other operator, and not for the first-mentioned checking operator. In this latter case, the individual position check pilot lamp CL at the checking operator position is dark and this informs the checking operator that the lamp display is for the other operator. It is only when the individual position lamp CL is simultaneously lighted with the check lamps that the lamp display is for the operator position having its lamp CL lighted. The lamp CL is the same lamp which informs the operator that the coins have been deposited by a collect operation for a paystation call.

In order to describe the method of checking the particular group and trunk number of a trunk circuit over which a connection has been extended, it will be assumed that the operator position shown in Figs. 13 to 20, inclusive, is included in a connection including the CLR trunk shown in Figs. 21 and 22. It will also be assumed that relays 2120, 2150, 2210 and 2240 are operated and that group conductor 3902 of this trunk circuit is connected to group check relay 3940. It will further be assumed that this operator position is position #17 and that the conductors 1569, 1709, 1708, 1705 and 1706 of this position terminate in the 17th bank contact of position selecting switch CKP (Fig. 38), and that conductor 1704 of this position terminates in the 3rd bank contact of group selecting switch CKG (Fig. 38).

In order to determine the group and number of this CLR trunk, the operator will operate the check rear key (Fig. 17) to start the checking switches hunting for this operator position. Key contacts 1731 prepares a circuit for the position rear connect relay 1610. Key contacts 1732 prepare a circuit for connecting a low resistance battery feed to the upper winding of differential ring relay 2110, and contacts 1735 prepare a circuit for connecting a low resistance ground feed to the lower winding of ring relay 2110 and to the upper winding of differential check relay 2130. Key contacts 1736 disconnect ground from conductor 1704 and the third bank contact accessible to wiper 3878 of switch CKG to mark this group of eight positions by an absence of ground marking. This marking ground includes a chain circuit through these eight positions, so that if any check key in any one of these eight positions is operated ground is disconnected from conductor 1704. Key contacts 1734 disconnect ground from conductor 1706, which is individual to this one position, to thereby remove ground from the seventeenth bank contact accessible to wiper 3885 of switch CKP to mark this position as the call checking position. Key contacts 1733 ground start conductor 1707, which is common to all positions to operate start relay 3830 over contacts 3819 of the transfer key TFK. The call checking position is now marked, by an absence of ground marking, in the banks of switches CKG and CKP.

When start relay 3830 operates, contacts 3831 complete a circuit for operating relay 3810, and contacts 3832 complete a circuit for operating motor magnet 3850 and for short circuiting relay 3820 if test wiper 3878 is in engagement with a grounded bank contact. Contacts 3834 complete the short circuit for relay 3820 when wiper 3878 is grounded and prepares a circuit for operating test relay 3820 in series with magnet 3850 when wiper 3878 loses ground.

In case none of the first eight positions have operated their check keys, then the first bank contact groups wiper 3878 to operate motor magnet 3850 over contacts 3832, 3823 and 3851. Magnet 3850 operates its interrupter contacts 3851 to open the circuit to magnet 3850 which now restores and steps the wipers of switch CKG to their second bank contacts. When contacts 3851 close a circuit for operating magnet 3850 and a circuit for short circulating test relay 3820 are again closed to cause the switch wipers to engage their third bank contacts if the second bank contact is grounded. In this position ground has been removed from conductor 1704 by the operation of the check key at position 17 and no circuit is now completed for reoperating magnet 3850. Instead, test relay 3820 now operates in series with magnet 3850 over the following circuit: ground contacts 3834 winding of test relay 3820, contacts 3823, interrupter contacts 3851 and winding of magnet 3850 to battery. Due to the high resistance winding of test relay 3820, magnet 3850 does not operate in this circuit.

Relay 3820 operates and, at contacts 3821, closes a circuit for shorting the common test relay 3840 if test wiper 3885 is in engagement with a grounded bank contact. Contacts 3822 complete a circuit for operating motor magnet 3860 of switch CKP if wiper 3885 is grounded, or complete a circuit for operating common test relay 3840 if wiper 3885 is not grounded. Contacts 3823 disconnect magnet 3850 while contacts 3824 complete a locking circuit for relay 3820 to ground at contacts 3834. The circuit for operating magnet 3860 may be traced from the grounded bank contact and wiper 3885, interrupter contacts 3861, multipled bank contacts and wiper 3876, contacts 3822, wiper 3877, and winding of magnet 3860 to battery. Magnet 3860 opens contacts 3861 to interrupt its own circuit and magnet 3860 restores to step the wipers of switch CKP one step and recloses contacts 3861. The wipers of switch CKP continue to step as described until the wiper 3885 finds the bank contact which is not grounded. Since ground was removed from conductor 1706 by the operation of the check key at position 17, the wipers of switch CKP come to test on their seventeenth bank contact which are individually connected to this position. When wiper 3885 loses ground no circuit is completed for operating motor magnet 3860 and the short circuit is removed from common test relay 3840. Test relay 3840 now operates in series with magnet 3860 over the following circuit: ground contacts 3821, winding of relay 3840, wiper 3875, contacts 3861, wiper 3876, contacts 3822, wiper 3877, and winding of magnet 3860 to battery. Magnet 3860 does not operate in series with the high resistance winding of test relay 3840. Test relay 3840 is common to all CKP switches and is operated in the manner described when the switch CKG selects any of the other CKP switches (not shown). When relay 3840 operates contacts 3841 lights the check pilot lamp CL from ground resistance R38, contacts 3841, wiper 3871, wiper 3881, conductor 1569, and lamp CL to battery. The lighting of this lamp indicates to the operator that her position has been selected and that the check lamp display is for her. Contacts 3842 ground conductor 1709 to operate the position rear connect relay 1610 as follows: ground resistance R38, contacts 3842, wiper 3872, wiper 3882, conductor 1709, check key contacts 1731, conductor 1605 and winding of rear connect relay 1610 to battery. Contacts 3845 and 3846 connect retard coil RTC in bridge of conductors 1708 and 1705 to prepare a circuit for the trunk ring relay 2110 and the trunk check relay 2130 when the rear connect relay 1610 operates and disconnects retard coil RT at the position circuit. Contacts 3847 opens the circuit to slow-to-release relay 3810. Contacts 3848 completes a locking circuit for relay 3840 independent of interrupter contacts 3861. Contacts 3848 are also provided to force the restoration of common test relay 3840 after the first checking operator restores her check key in case a second operator position in this group of positions is attempting to check a trunk at the same time as the first checking operator. Contacts 3849, 3841′ and 3842′ connect battery to group conductor G3, tens conductor T3 and units conductor U3 for controlling the group, tens and units check lamps associated with the third position group comprising positions 17–24.

Position rear connect relay 1610 operates the disconnect the position retard coil RT at contacts 1613 and 1616 from the trunk ring relay 2110 and trunk check relay 2130 while contacts 1614 and 1615 substitute the retard coil RTC (Fig. 38) for coil RT (Fig. 16) before the slow-to-release relay 3810 restores. Contacts 1611 and 1618 disconnects the operator's headset. The circuit for the trunk ring relay 2110 and the trunk check relay 2130 may now be traced as follows: from ground upper winding of relay 2110, contacts 2152, resistance R3, upper right hand winding of repeat coil RC21, contacts 2241, wiper 2271, conductor 1001, contacts 1044, conductor 1062, contacts 1615, 1593, 1573, conductor 1502, contacts 1732, conductor 1708, wipers 3883 and 3873, contacts 3845, upper windings of repeat coil RC38, contacts 3812, retard coil RTC, lower windings of repeat coil RC38, contacts 3846, wipers 3874 and 3884, conductor 1705, key contacts 1735, conductor 1501, contacts 1572, 1592 and 1614, conductor 1064, contacts 1047, conductor 1002, wiper 2272, contacts 2242, lower right hand winding of repeat coil RC21, resistance R2, upper winding of check relay 2130 and lower winding of ring relay 2110 to battery. The windings of ring relay 2110 and check relay 2130 are still energized in magnetic opposition and these relays do not operate at this time.

When slow-to-release relay 3810 restores, contacts 3811 connects battery at contacts 3844 through low resistance R382, upper windings of repeat coil RC38, contacts 3845, wipers 3873 and 3883 to conductor 1708 and thence over the previously traced circuit through the upper winding of ring relay 2110 to ground; and contacts 3813 connects ground at contacts 3843 through low resistance R381, lower windings of repeat coil RC38, contacts 3846, wipers 3874 and 3884 to conductor 1705 and thenece over the previously traced circuit through the upper winding of check relay 2130 and the lower winding of ring relay 2110 to battery. Differential ring relay 2110 has both its windings equally energized in opposition with the result that ring relay 2110 does not operate. However, the battery potential in the circuit just traced through the upper winding of check relay 2130 has been increased so that sufficient current now flows through the upper winding of check relay 2130 to overcome the opposing magnetic flux created by the lower winding to cause check relay 2130 to operate and close contacts 2131, 2132 and 2133. This CLR trunk is trunk number 11 in a CLR or RC trunk group. Contacts 2131 ground conductor 3902 to operate group check relay 3940, contacts 2132 ground conductor T3901 to operate tens check relay T3910, and contacts 2133 ground conductor U3901 to operate units check relay U3910.

Group check relay 3940 operates and closes contacts for each set of group checking lamps for the respective grouped positions. The first and second set of check lamps and the contacts for controlling these lamps for positions 1 to 8, and 9 to 16 are not shown and are similar to the third set shown for positions 17 to 24. Contacts 3943 complete a circuit for lighting the group check lamp for this CLR trunk group as follows: from ground lamp RC, contacts 3943, conductor G3, wiper 3879, and contacts 3849 to battery. Tens relay T3910 operates and closes contacts for each set of tens checking lamps for the respective grouped positions, only one set of tens checking lamps being shown. Contacts T3913 complete a circuit for lighting the tens lamp TL1 in this third set of check lamps as follows: ground tens lamp TL1, contacts T3913, tens conductor T3, wiper 3871', contacts 3841' to battery. Units check relay U3910 operates and closes similar circuits to the sets of units check lamps. In this case contacts U3913 is the only contact which is effective to light a units check lamp and the circuit for lighting units check lamp UL1 may be traced from ground lamp UL1, contacts U3913, conductor U3, wiper 3872', contacts 3842' to battery. The operated check relays and the position of the check switch CKG light the check lamps to indicate the trunk group and the number of the trunk in the group, while the lighted condition of the position check pilot lamp CL advises the operator that the group and number lamp display designates the trunk group and trunk number of the trunk she is checking.

A click suppressor circuit, comprising the repeat coil RC38, electrolytic condensers C38 and C381, rectifiers MR38 and MR381, and retard coil RTC, is provided for reducing or smoothing out the click to the calling or called subscriber, or the calling or called operator, when a trunk checking operation is performed by the local operator. As previously described, the trunk check relay 2130 and trunk ring relay 2110 are energized through the right hand windings of repeat coil RC21 in a bridge circuit including the retard coil RT at the local operator's position and condenser C21 is charged to approximately five volts. When the local operator operates her rear check key to check the group and number of this CLR trunk, test relay 3840 is operated and prepares a circuit to substitute the click suppressor circuit of Fig. 38 for the operator retard coil RT (Fig. 16) when the checking circuit is connected to the local operator position. Relay 3840 operates the position rear connect relay 1610 which completes the prepared connection to the click suppressor circuit and also disconnects the operator's headset. It is well-known that the sudden opening of a current flow through the windings of a repeat coil produces an inductive kick which is induced into the other windings of the repeat coil to create an annoying click in the transmission circuit unless some provision is made to reduce the same. The circuit through the right hand windings of repeat coil RC21 is momentarily broken during the transient operate time of contacts 1613, 1614, 1615 and 1616 of the rear connect relay 1610 when the coil RT is disconnected and the click suppressor circuit is substituted therefor. During this short transient time the condenser C21 will increase its charge and when the substitution is completed the click is first smoothed out and reduced by the condensers in the suppressor circuit and then by the retard coil RTC. Another transient period occurs when the slow-to-release relay 3810 restores to disconnect the retard coil RTC from in bridge of the right hand windings of repeat coil RC21, but during this short transient period the charged condensers in the suppressor circuit control the flow of current in the repeat coil RC21 to smooth out the click. When relay 3810 is fully restored contacts 3811 and 3813 connect low resistance battery and ground feed circuits through the right hand windings of repeat coil RC21 to operate check relay 2130 as previously described, and the condensers and rectifiers in the suppressor circuit are bridged across these feed circuits and the repeat coil to delay and control the flow of current through repeat coil RC21 to smooth out the click. From the foregoing description it will be seen that the suppressor condensers and rectifiers smooth out the clicks when the current flow through the windings of the repeat coil is momentarily opened or increased in different steps by the operation of position rear connect relay 1610 and the release of check relay 3810.

*Release*

When the operator restores the check key, key contacts 1731 open a circuit to the position rear connect relay 1610 which restores, key contacts 1732 disconnects the low resistance battery feed at the check circuit from the upper winding of ring relay 2110, and contacts 1735 disconnect the low resistance ground feed at the check circuit from the lower windings of ring relay 2110 and the upper winding of differential check relay 2130 to cause relay 2130 to restore. Key contacts 1736 grounds conductor 1704 to mark this group of positions non-selectable to check switch CKG if no other operator in this same group of positions has her check key operated. Key contacts 1734 grounds conductor 1706 to mark this position non-selectable to check switch CKP, and completes a circuit for shorting test relay 3840 before the test relay 3820 restores. Contacts 1733 disconnect ground from start conductor 1707 to open the circuit to start relay 3820 if no other operator has her check key operated.

When the trunk check relay 2130 restores, contacts 2131, 2132 and 2133 disconnect ground from conductors 3902, T3901 and U3901 to restore check lamp relays 3941, T3910 and U3910 which open the circuits to the group check lamp RC, the tens lamp TL1 and the units lamp UL1.

In case no other operator is checking at this time the check start relay 3830 restores when ground is disconnected from start conductor 1707. Relay 3830 restores and opens the circuit to test relay 3820 at contacts 3834. Relay 3820 restores and opens the holding circuit to test relay 3840 at contacts 3821 and 3822. Relay 3840 restores and disconnects battery from the group tens and units lamp conductors G3, T3 and U3. Contacts 3841 disconnects ground from conductor 1569 to extinguish the position check pilot lamp CL, and contacts 3842 disconnect ground from conductor 1709. Contacts 3843, 3844, 3845 and 3846 disconnect ground and battery from conductors 1705 and 1708. The position rear connect relay 1610 restores shortly after its circuit is opened by the check key and reconnects the operator's headset and retard coil RT to the transmission conductors of this CLR trunk. The checking circuit is now fully restored and may be used for another checking operation.

The release of the checking circuit will now be considered when some other operator has her check key operated during the time the first checking operator is checking as previously described. When two or more operators are attempting to check the group and number of trunk circuit included in connections that have been established, then after the first operator has checked and restored her check key, the common start conductor 1707 is still grounded by the operation of the check key at the second operator position. Under this condition start relay 3830 does not restore and the operation of the check switches CKG and CKP is dependent upon the group the second checking operator position is in. In case the second checking operator position is in the same group as the first checking operator position, then when the check key at the first position is restored to ground conductor 1706, common test relay 3840 is shorted over the following circuit: ground contacts 3821, winding of relay 3840, wipers 3875 and 3885 to grounded conductor 1706. In addition magnet 3860 is operated from grounded wiper 3875 over contacts 3848 and 3822 and wiper 3877. Magnet 3860 operates in this circuit and opens contacts 3861 which are shorted by contacts 3848 over wipers 3875 and 3876 with the result that the wipers of switch CKP remain in their positions until relay 3840 is restored. Relay 3840 restores shortly after it is short circuited to accomplish the same disconnections as previously described, and in addition opens contacts 3848 to cause magnet 3860 to restore and step the switch wipers one step. Interrupter contacts 3861 are now effective to intermittently operate magnet 3860 until the test wiper 3885 loses ground to reoperate test relay 3840 in the manner previously described. In this manner the second checking operator position is found and the reoperation of test relay 3840 accomplishes the same functions as previously described.

In case another check key at another operator's position, which is not included in the same group as the first checking operator, is operated then start relay 3830 is maintained operated and test relay 3820 is shorted when conductor 1704 is grounded by the first operator restoring her check key. This short circuit may be traced from grounded conductor 1704, wiper 3878, contacts 3832, winding of relay 3820 and contacts 3834 to ground. Test relay 3820 restores and opens the circuit to test relay 3840 at contacts 3821 to cause the latter relay to restore. Contacts 3822 opens the circuit to magnet 3860 which restores and steps the wipers of switch CKP one step. Contacts 3823 recloses the stepping circuit for magnet 3850 which is now energized from grounded conductor 1704, wiper 3878, contacts 3832, 3823 and 3851. Magnet 3850 interrupts its own circuit at interrupter contacts 3851 to step the wipers of the switch CKG to the group containing this other checking position at which time test wiper 3878 loses ground. At this time test relay 3820 is no longer short circuited and is now reoperated in series with magnet 3850 as previously described. Switch CKG has now selected the group of positions which includes the other position having its check key operated. Another CKP switch (not shown) has now been selected by switch CKG and a motor magnet of this CKP switch is operated in this same manner as 3860 until its test wiper loses ground which is removed by the operation of the check key at this other operator's position. Common test relay 3840 is no longer short circuited and now operates in series with the motor magnet of this CKP switch as previously described. The reoperation of relay 3840 causes the check lamps to display the group and trunk number of the trunk being checked by this other operator in a manner apparent from the foregoing description.

*Checking front*

It will now be assumed that the operator at position 17 desires to know the group and trunk number of a trunk circuit included in a connection established over the front of one of her links. It will further be assumed that the ring down trunk 2500 shown in Figs. 25 and 26 is the trunk circuit she wishes to identify in the front connection. The operator now operates her check front key to ground start conductor 1707 at key contacts 1742, to remove ground from conductor 1704 to mark this group of positions at key contacts 1745, and to remove ground from conductor 1706 to mark this position at key contacts 1741 as the checking position. Key contacts 1744 prepare a circuit for operating position front connect relay 1550. Key contacts 1743 connect conductor 1708 to conductor 1502, and key contacts 1746 connect conductor 1705 to conductor 1501 to prepare a circuit to maintain ring relay 2560 unoperated and to operate check relay 2590 in the ring down trunk. When start conductor 1707 is grounded start relay 3830 operates causing the switches CKG and CKP and relays 3810, 3820 and 3840 to operate as previously described to connect the checking circuit to this operator position. In this case, since the check front key is operated, instead of the check rear key, the closure of contacts 3842 by relay 3840 completes a circuit for operating the position front connect relay 1550 as follows: ground, resistor R38, contacts 3842, wipers 3872 and 3882, conductor 1709, key contacts 1744, conductor 1544 and winding of front connect relay 1550 to battery.

Relay 1550, at contacts 1552 and 1557, disconnects the local operator's headset, and contacts 1551 and 1558 disconnect the position retard coil RTA from in bridge of trunk relays 2560 and 2590. Contacts 1554 and 1555 now connect the checking retard coil RTC in bridge of relays 2560 and 2590 as follows: retard coil RTC and contacts 3812, upper and lower windings of repeat coil RC38, contacts 3845 and 3846, wipers 3873 and 3874, wipers 3883 and 3884, conductors 1708 and 1705, key contacts 1743 and 1746, conductors 1502 and 1501, contacts 1555 and 1554, conductors 1602 and 1601, conductor 1063 and contacts 2026 and 2027 and conductor 1061, contacts 1046 and 1043, contacts 1035 and 1033, conductors 1202 and 1201, through the link selector 1200 and the inter-toll selector IS to the ring down trunk 2500, conductors 2502 and 2501, contacts 2533 and 2532, windings of retard coil RTR, lower winding of differential ring relay 2560 and contacts 2541 and upper winding of relay 2560, resistance R25 and contacts 2543 to ground, and upper winding of differential check relay 2590 to battery. Relays 2560 and 2590, being differential, do not operate in this circuit. However, when relay 3810 restores and retard coil RTC is disconnected from in bridge of relays 2560 and 2590 at contacts 3812, and ground and battery through low resistances R381 and R382 is substituted for coil RTC at contacts 3813 and 3811, the check relay 2590 alone is operated from the low resistance ground circuit through resistance R381 while ring relay 2560 is unoperated.

Check relay 2590 operates and contacts 2591 ground conductor 3904 to operate group check relay 3960, contacts 2592 ground conductor T3901 to operate tens relay T3910 since it is being assumed that this ring down trunk is trunk number 11 in this group of trunks, and contacts 2593 ground conductor U3901 to operate units relay U3910. Group check relay 3960 operates and completes a circuit for lighting group check lamp RD2 from ground, lamp RD2, contacts 3963, group conductor G3, wiper 3879, and contacts 3849 to battery. Relays T3910 and U3910 light lamps TL1 and UL1 over wipers 3871' and 3872' as previously described. Check pilot lamp CL is also illuminated from ground through resistance R38, contacts 3841, wipers 3871 and 3881 and conductor 1569. These lamps now advise the operator of the group and trunk number of this ring down trunk circuit. When the checking operator restores her check front key, position front connect relay 1550 restores and the checking circuit is restored in the manner previously described. When relay 1550 restores the operator's headset is again connected to the transmission circuit.

In case ring down trunk 2500 is used on an incoming call to the local operator, then this trunk is included in the rear connection and is connected over the rear of a link to the operator position. In this case relay 2530 is not operated if the operator desires to check the group and number of this trunk, she will operate the check rear key to cause the checking circuit, in the manner previously described, to connect low resistance ground over conductors 1705, 1501, 1064 and 1002, over normal contacts 2533 to operate check relay 2590 and accomplish the checking operation. Checking operations for the other trunk circuits are similar to that described for the CLR and ring down trunks and will be apparent from the foregoing description.

What is claimed is:

1. In a telephone system, a plurality of operator positions, a plurality of links individual to each said operator position, a plurality of trunks for receiving incoming calls, a primary switch individual to each said trunk, said primary switches divided into as many sub-groups as there are links in any one operator position, a direct primary access path individual to each said link, said direct primary access paths arranged in groups corresponding to said primary switch sub-groups and each group of primary access paths being accessible from its corresponding sub-group of primary switches, secondary switches divided into as many groups as there are links in any one operator position, a secondary access path also individual to each said link, said secondary access paths arranged in groups corresponding to said secondary switch groups and each group of secondary access paths being accessible to its corresponding secondary group, another access path individual to each said secondary switch, said other access paths arranged in groups corresponding to said secondary switch groups and at least one of said other access paths in each said other access groups being accessible to each of said primary switches in all said sub-groups, means responsive to any one of said trunks receiving an incoming call for operating its individual primary switch to seize an idle one of said links over a direct primary access path or over a secondary access path, said seizure being accomplished over the individual direct primary access path of said one idle link in case such individual primary access path is accessible to said individual primary switch and said link is idle, and said seizure being accomplished over one of said other access paths and its individual secondary switch and over the individual secondary access path of said one idle link in case the individual direct access path of said one idle link is unaccessible to said individual primary switch.

2. A telephone system as claimed in claim 1 including means for blocking access to said secondary switches over said other access paths as long as a direct primary access path to an idle link is accessible to one of said primary switches of a trunk having an incoming call thereon.

3. A telephone system as claimed in claim 1 including means for blocking access to said secondary switches over said other access paths as long as a direct primary access path to an idle link is accessible to one of said primary switches of a trunk having an incoming call thereon, said blocking means including a first and a second relay common to a plurality of predetermined links, means for operating said first relay in response to any one of said plurality of predetermined links becoming idle and available for use, contacts controlled by said second relay for conditioning said other access paths to the secondary switches which have access over said secondary access paths to said plurality of predetermined links, and a circuit for said second relay including contacts operated by said first relay for preventing the operation of said second relay to prevent the conditioning of said other access paths.

4. A telephone system as claimed in claim 1 including means for blocking access to said secondary switches over said other access paths as long as a direct primary access path to an idle link is accessible to one of said primary switches of a trunk having an incoming call thereon, said blocking means including a first and a second relay common to a plurality of predetermined links, means for operating said first relay in response to any one of said plurality of predetermined links becoming idle and available for use, contacts controlled by said second relay for conditioning said other access to the secondary switches which have access over said secondary access paths to said plurality of predetermined links, a circuit for said second relay controlled by said first relay, a third relay, means for operating said third relay in response to all said links included in said predetermined plurality becoming busy, and contacts controlled by said third relay included in said circuit for said second relay.

5. A telephone system as claimed in claim 1 including a secondary start relay individual to each said secondary switch group, means responsive to any one of said links which is accessible over one of said secondary switch groups becoming idle for operating the start relay individual to said one secondary switch group, and means responsive to the operation of said start relay for operating all idle secondary switches in said one secondary switch group to preselect said one idle link.

6. In a telephone system, a plurality of operator positions, a plurality of links individual to each said position, said links arranged in a plurality of link groups with as many link groups as there are links in any one position and wherein each position has one link included in each link group, a direct primary access path individual to each said link, a plurality of trunks for receiving incoming calls, a primary switch individual to each said trunk, said primary switches divided into as many trunk sub-groups as there are link groups, said primary access paths arranged in groups corresponding to said link groups and each group of primary access paths being accessible from a different trunk sub-group of primary switches, secondary switches divided into as many groups as there are link groups, a secondary access path individual to each said link, said secondary access paths arranged in groups corresponding to said secondary switch groups with each group of secondary access paths being accessible from its corresponding secondary switch group, another access path individual to each said secondary switch, and said other access paths arranged in groups corresponding to said secondary switch groups and at least one of said other access paths in each of said other access groups being accessible to each of said primary switches in all said trunk sub-groups.

7. A telephone system as claimed in claim 6 including a secondary group control relay individual to each said secondary group of switches, means responsive to any one link in any one link group becoming idle and available for use for operating the individual secondary group control relay of the one of said secondary groups of switches having access to said one link over its secondary access path, a start relay individual to each said secondary group of switches for operating the secondary switches of its secondary group to preselect idle ones of said links, and means for operating the start relay of the corresponding secondary switch group in response to its secondary group control relay being operated.

8. A telephone system as claimed in claim 6 including a secondary group control relay individual to each said secondary group of switches, means responsive to any one link in any one link group becoming idle and available for use for operating the individual secondary group control relay of the one of said secondary groups of switches having access to said one link over its secondary access path, a start relay individual to each said secondary group of switches for operating the secondary switches of its secondary group to preselect idle ones of said links, a circuit for operating the start relay of the corresponding secondary switch group completed in response to its secondary group control relay being operated, a sub-group control relay individual to each said link group, means for operating the individual sub-group control relays of corresponding ones of said link groups in response to at least one of said links in each said link group becoming idle and available for use, and means for preventing the completion of any one of said circuits of said start relays in the event all said sub-group control relays are operated.

9. In a telephone system, an operator position, a plurality of links individual to said position, a single source of marking potential in said position, a plurality of call distributing switches having access to said links, means for conditioning said position to receive incoming calls over said call distributing switches responsive to said position being staffed, marking means in each of said links operated responsive to said position being conditioned to receive incoming calls for connecting said marking potential at said position through all said links to mark all said links idle and selectable to said call distributing switches, means for operating said call distributing switches to hunt for and connect with any idle one of said links marked with said marking potential responsive to incoming calls being received on said switches from calling lines of the system, a test relay individual to each said switch, each said test relay individually operated to seize said position responsive to its individual switch completing a connection over a marked one of said links to said marking potential at said position, means operated responsive to said seizure of said position for operatively connecting said position to said one connected link, for isolating said position from the remaining ones of said links, and for restoring said marking means in said remaining links to make said remaining links busy and non-selectable to said call distributing switches by removing said marking potential from said remaining links.

10. In a telephone system, a plurality of operator positions, a plurality of links individual to each said operator position, a plurality of toll trunks for receiving incoming toll calls, a primary switch individual to each said trunk, secondary switches accessible to said primary switches, each said link having an individual direct primary access path from only predetermined ones of said primary switches and also having an individual secondary access path from only predetermined ones of said secondary switches, and means responsive to any one of said trunks receiving an incoming call for operating its individual primary switch to seize an idle one of one of said links over the direct primary access path individual to one idle link in case such individual direct primary access path is accessible to said individual primary switch, or for operating said individual primary switch to seize said one idle link over one of said predetermined secondary switches and over the individual secondary access path of said one idle link in case no individual direct primary path of said one idle link is accessible to said individual primary switch.

11. In a telephone system, a plurality of operator positions, a plurality of consecutively numbered links in each operator position, a group of trunks divided into consecutively numbered trunk sub-groups corresponding in number to the number of links at any one operator position, a primary switch individual to each trunk included in the respective trunk sub-groups, a plurality of consecutively numbered groups of secondary switches corresponding in number to the number of links at any one operator position, each said link being accessible over two paths, one path being a direct primary path and the other path being a secondary path, the direct primary paths of the correspondingly numbered links at each operator position extend from said links and terminate in bank contacts of the primary switches in the correspondingly numbered trunk sub-groups, the secondary paths of the correspondingly numbered links at each operator position extend from said links and terminate in bank contacts of the secondary switches in the correspondingly numbered secondary switch groups, other paths extend from other bank contacts of each said primary switch and terminate in secondary switches in each said secondary switch group, and means responsive to any one of said trunks receiving an incoming toll call for operating its individual primary switch to seize an idle one of said links over a direct primary path or over a secondary path by way of one of said other paths and one of said secondary switches.

12. In a telephone system, a plurality of operator positions, a plurality of consecutively numbered links individual to each operator position, a plurality of consecutively numbered groups of secondary switches corresponding in number to the number of links in any one operator position, each numbered group of secondary switches having secondary access paths to only the correspondingly numbered link in successive ones of said operator positions, a group of trunks divided into consecutively numbered trunk sub-group corresponding in number to the number of links in any one operator position, a primary switch individual to each said trunk and included in its respective trunk sub-group, each primary switch in each numbered trunk sub-group having direct primary access paths to only one correspondingly numbered link in successive ones of said operator positions, each primary switch also having other access paths to a plurality of secondary switches in each secondary group, means for operating said secondary switches to preselect idle ones of said links, means responsive to incoming trunk calls received on a plurality of said trunks for operating only those primary switches of said plurality of calling trunks which have direct primary access paths to available idle trunks to seize said idle links over said direct primary access paths, means for delaying the operation of the primary switches in the remaining calling trunks of said plurality of calling trunks until after all available direct primary access paths of the idle links extending from the primary switches of all said calling trunks have been taken into use, said delayed primary switches thereafter operated to select secondary switches which have preselected idle ones of said links to thereby seize idle links over said other access paths, said secondary switches, and said secondary access paths.

13. In a telephone system, a plurality of operator positions, a plurality of consecutively numbered links individual to each operator position, a plurality of consecutively numbered groups of secondary switches corresponding in number to the number of links in any one operator position, each numbered group of secondary switches having secondary access paths to only the correspondingly numbered link in successive ones of said operator positions, a group of trunks divided into consecutively numbered trunk sub-groups corresponding in number to the number of links in any one operator position, a primary switch individual to each said trunk and included in its respective trunk sub-group, each primary switch in each numbered trunk sub-group having direct primary access paths to only one correspondingly numbered link in successive ones of said operator positions, each primary switch also having other access paths to a plurality of secondary switches in each secondary group, means for operating said secondary switches to preselect idle ones of said links, means responsive to any one of said trunks receiving an incoming call for operating its individual primary switch to seize an idle one of said links over its direct primary access path if an idle link is available over its direct primary access path, and means responsive to said incoming call on said one trunk in case no direct primary access paths to idle links are available to said individual primary switch for operating said primary switch to seize an idle one of said links over one of said other access paths and over one of said secondary access paths preselected by one of said operated secondary switches.

14. A telephone system as claimed in claim 13 including means for giving preference to said trunk primary switches having direct primary access paths to idle links in response to a plurality of incoming calls on said trunks by initially operating only the primary switches of such trunks which have available direct primary access paths to idle ones of said links.

15. In a telephone system, a plurality of operator positions, a plurality of links individual to each said operator position, a plurality of toll trunks for receiving incoming toll calls, a primary switch individual to each said trunk, secondary switches accessible to said primary switches, each said link having an individual direct primary access path from predetermined ones of said primary switches and also having an individual secondary access path from predetermined ones of said secondary switches, starting means in each said trunk for operating its individual primary switch to hunt for an idle link in response to the receipt of an incoming call on such trunk, a first and a second start circuit for controlling said starting means, said first start circuit being effective to operate said starting means in case the primary switch individual to the trunk with the incoming call has access to said idle link over its individual direct primary access path, and said second start circuit being effective to operate said starting means in case the primary switch individual to the trunk with the incoming call has access to said idle link only through a secondary switch and over the individual secondary access path of said idle link.

16. A telephone system as claimed in claim 15 including means for disabling said second start circuit as long as a direct primary access path to an idle link is accessible to one of said primary switches of a trunk having an incoming call therein.

17. A telephone system as claimed in claim 15 including a gate relay in each said trunk, another start circuit for controlling said starting means, means for operating the gate relay of one of said trunks having an incoming call thereon in response to all said links becoming busy, means controlled by the operation of said gate relay for opening said first and second start circuits, and means for completing said other start circuit responsive to any one of said links becoming idle.

18. A telephone system as claimed in claim 15 including gate means operated responsive to all said links becoming busy for disabling said first and second start circuits, third and fourth start circuits for controlling said starting means after operation of said gate means, said third start circuit being effective during the operation of said gate means to operate said starting means responsive to any one of said links becoming idle in case the primary switch individual to the trunk with the incoming call has access to said one idle link over its individual direct primary access path, and said fourth start circuit being effective during the operation of said gate means to operate said starting means responsive to said one link becoming idle in case the primary switch individual to the trunk with the incoming call has access to said one idle link only through a secondary switch and over the individual secondary access path of said one idle link.

19. A telephone system as claimed in claim 15 including gate means operated responsive to all said links becoming busy for disabling said first and second start circuits, third and fourth start circuits for controlling said starting means after operation of said gate means, said third start circuit being effective during the operation of said gate means to operate said starting means responsive to any one of said links becoming idle in case the primary switch individual to the trunk with the incoming call has access to said one idle link over its individual direct primary access path, said fourth start circuit being effective during the operation of said gate means to operate said starting means responsive to said one link becoming idle in case the primary switch individual to the trunk with the incoming call has access to said one idle link only through a secondary switch and over the individual secondary access path of said one idle link, and means for disabling said second and fourth start circuits as long as a direct primary access path to an idle link is accessible to one of said primary switches of a trunk having an incoming call thereon.

20. In a telephone system, a plurality of operator positions, a plurality of links at each operator position, a direct and a secondary path for each link, secondary switches having access to all said links over said secondary paths, a primary switch having direct access to predetermined ones of said links over said direct paths and having access to said secondary switches, a first start circuit closed in case a direct path to an idle link is available to said primary switch, a second start circuit closed in case no direct paths to an idle link are available to said primary switch and an idle link is available to said primary switch through one of said secondary switches and a secondary path, gating means operated in response to all said links becoming busy for opening said first and second start circuits, a third start circuit closed in response to a link becoming idle after operation of said gating means in case said primary switch has a direct path to said last mentioned idle link, a fourth start circuit closed in response to said last mentioned link becoming idle after operation of said gating means in case no direct path to said last mentioned idle link is available to said primary switch and said last mentioned link is available to said primary switch through one of said secondaries over a secondary path, and a start relay in said primary switch operated over any one of said start circuits for causing said primary switch to hunt for an idle link.

21. A telephone system as claimed in claim 20 including a link available relay operated responsive to any one of said predetermined links being idle and third and fourth relays controlled jointly by said link available relay and said gating means for controlling said start circuits.

22. A telephone system as claimed in claim 20 including means for operating said secondary switches to preselect idle ones of said links at a time when idle links are available to said secondary switches over said secondary paths and at a time when no direct paths to an idle link in said predetermined links is available to primary switch.

23. In a telephone system, a plurality of operator positions, a plurality of links individual to each position, means for marking said links idle and selectable when said operator position is staffed and is not operatively associated with any one of its individual links, means for busying all of said links at an operator position in response to said position being operatively associated with any one of its individual links, means for busying all links at unstaffed operator positions, a plurality of trunks for receiving incoming calls, a switch individual to each said trunk, starting means individual to each trunk for operating its individual switch to hunt for any marked idle link in response to the receipt of an incoming call on such trunk, gate control means including a gate for blocking the operation of said starting means, means responsive to all said links becoming busy for operating said gating means to close said gate to disable said starting means; said trunks having calling conditions thereon prior to the closing of said gate being admitted into said gate, and said trunks having calling conditions thereon subsequent to the closing of said gate being locked outside said gate; means operative in response to one or more of said links being marked idle and selectable for operating all said starting means of the trunk calls waiting in said gate until all waiting trunk calls within said gate have selected marked idle links, and means responsive to all said trunk calls within said gate having selected idle marked links for restoring said gating means to open said gate to allow all said trunk calls locked outside said gate to operate their respective starting means to cause their switches to hunt for idle marked links in case at least one of said links is marked idle.

24. A telephone system as claimed in claim 23 including means responsive to any one of said switches selecting an idle marked link for operatively associating said selected link to its operator position and for operating said link busying means to busy all said links at said operator position.

25. A telephone system as claimed in claim 23 including gate timing means, means for operating said gate timing means after a predetermined elapsed time in case all the trunk calls waiting inside said gate have not selected an idle link, and means responsive to the operation of said gate timing means for operating said gating means to open said gate to admit all said trunk calls locked outside said gate to enter into said gate.

26. In a telephone system, a plurality of operator positions, a plurality of links individual to each position, means for busying each operator position in response to said position being operatively associated with any one of its individual links and when said position is not staffed, means for marking each operator position idle through all its individual non-busy links when said operator position is staffed and is not operatively associated with any one of its individual links, a plurality of trunks for receiving incoming calls, a switch individual to each said trunk, starting means individual to each trunk for operating its individual switch to hunt for any non-busy link of a marked idle operator position in response to the receipt of an incoming call on such trunk, gate control means including a gate for blocking the operation of said starting means, means responsive to all said positions becoming busy for operating said gating means to close said gate to disable said starting means, said trunks having calling conditions thereon prior to the closing of said gate being admitted into said gate, and said trunks having calling conditions thereon subsequent to the closing of said gate being locked outside said gate, means operative in response to one or more of said positions being marked idle for operating all said starting means of the waiting trunk calls in said gate until the switches of all waiting trunk calls within said gate have selected non-busy links in marked idle operator positions, and means responsive to the switches of all said waiting trunk calls within said gate having selected non-busy links in the marked idle positions for restoring said gating means to open said gate to allow all said trunk calls locked outside said gate to operate their respective starting means to cause their switches to hunt for non-busy links in marked idle operator positions in case at least one of said positions is marked idle.

27. A telephone system as claimed in claim 26 including means operated responsive to any one of said switches selecting a non-busy link of a marked idle operator position for operatively associating said operator position with said selected non-busy link and for operating said position busying means to busy said position and make all said links at said position non-selectable to said switches.

28. In a telephone system, an operator's position including an operator circuit, a plurality of links individual to said position, means for marking all said links idle and selectable when said position is staffed, a plurality of trunks for receiving incoming calls, a switch individual to each said trunk, starting means individual to each trunk for operating its individual switch to hunt for any marked idle link in response to the receipt of an incoming call on such trunk, means responsive to any one of said switches selecting any idle one of said marked links for operatively connecting said selected link to said operator circuit, means responsive to the said connection of said operator circuit with said selected link for busying all said links by removing said idle marking therefrom, gate control means including a gate for blocking the operation of said starting means, means responsive to all said links becoming busy for operating said gate control means to close said gate to disable said starting means, said trunks having calling conditions thereon prior to the closing of said gate being admitted into said gate, and said trunks having calling conditions thereon subsequent to the closing of said gate being locked outside said gate, means for disconnecting said operator circuit from said selected link after completion of the trunk call over said selected link, means for operating said idle link marking means in response to the disconnection of said operator circuit from said selected link to mark the remaining links at said position idle, means operative in response to said remaining links being marked idle for operating all said starting means of the trunk calls waiting within said gate until any one of said waiting trunk calls within said gate has selected an idle one of said remaining links; said disconnecting means, said link marking means, and said last-mentioned means reoperating for all waiting trunk calls within said gate until all waiting trunk calls within said gate have selected idle links; and means responsive to all said trunk calls within said gate having selected marked idle links and said disconnecting means has operated said link marking means for restoring said gate control means to open said gate to allow all said trunk calls waiting outside said gate to operate their respective starting means to cause their switches to hunt for idle marked links at said position.

29. In a telephone system, an operator's position including an operator circuit, a plurality of links individual to said position, means for marking all said links idle and selectable when said position is staffed, a plurality of preferred trunks for receiving incoming calls, a switch individual to each said trunk, starting means individual to each trunk for operating its individual switch to hunt for any marked idle link, gate control means including a gate, means responsive to an incoming call received on any one of said preferred trunks for operating said gate control means to close said gate, means responsive to the operation of gate control means for operating the starting means individual to said one calling preferred trunk to operate the switch individual to said one preferred trunk to select an idle marked one of said links, means responsive to said selection for connecting said operator circuit to said selected link, means responsive to said selection for busying all said links by removing said idle marking therefrom, a plurality of other trunks for receiving incoming calls, another switch individual to each of said other trunks, other starting means individual to each of said other trunks for operating its individual other switch to hunt for any marked idle link, means controlled by the closing of said gate for preventing the operation of said other starting means when incoming calls are received on said other trunks for locking said other trunk calls outside said gate, means for disconnecting said operator circuit from said selected link after completion of said one preferred trunk call, means for operating said idle link marking means in response to the disconnection of said operator circuit from said selected link to mark the remaining links at said position idle, and means for restoring said gate control means to open said gate to allow all said other trunk calls locked outside said gate to operate their respective starting means to cause their switches to hunt for idle marked links at said position in response to said remaining links being marked idle.

30. In a call distributing arrangement for use in a telephone system wherein incoming trunks calls from different classes of trunk lines are extended by call distributing switches to idle marked links at a plurality of operator positions, in combination with a gate for blocking the extension of trunk calls to links at said operator positions, means controlled by trunk calls on the first of said different classes of trunk lines for closing said gate only when all said marked idle links have been taken into use to extend the trunk calls, means controlled by a trunk call on one of said trunk lines of a different class for closing said gate regardless of the number of links marked idle and available for use, said first class trunk lines having calling conditions thereon prior to the closure of said gate being admitted into said gate, said first class trunk lines having calling conditions thereon subsequent to the closing of said gate being locked outside said gate, and said different class trunk lines having a calling condition thereon overriding said gate in case said gate is closed to admit such different class trunk calls into said gate, means operative in the event one or more links are marked idle and selectable for use while said gate is closed for extending the trunk calls waiting inside said gate, and means responsive to all said trunk calls within said gate having been extended to idle marked links for restoring said gate to allow all said trunk calls locked outside said gate to extend connections to idle marked links at said operator positions.

31. A telephone system as claimed in claim 30 including an operator circuit individual to each operator position, means responsive to any one of said call distributing switches seizing an idle marked link at any one operator position for connecting said operator circuit at said one operator position to said seized link, and means responsive to the connection of said one operator circuit to said seized link for removing the idle marking from the remaining links at said one position to thereby busy all links at said one position to said call distributing switches.

32. A telephone circuit as claimed in claim 30 including gate timing means, means for operating said gate timing means after a predetermined elapsed time in case all said trunk calls waiting inside said gate have not been extended to an idle link, and means responsive to the operation of said gate timing means for opening said gate to admit all said trunk calls locked outside said gate to enter into said gate.

33. In a telephone system, a plurality of operator positions, a plurality of links individual to each position, a group of trunks divided into a plurality of trunk subgroups corresponding in number to the number of links in any one position, a primary switch individual to each trunk and arranged in switch sub-groups corresponding to said trunk sub-groups, secondary switches arranged in a plurality of secondary groups corresponding in number to the number of links in any one operator position, each sub-group of primary switches having direct access to one link in each operator position and different primary switch sub-groups having access to different links in said positions, each said primary switch having access to predetermined ones of said secondary switches in each of said secondary groups, each group of secondary switches having access to one link in each operator position and the secondary switches in different secondary groups having access to different links in said position, a chain relay individual to said group of trunks, a chain circuit individual to said chain relay, said chain circuit including said predetermined ones of said secondary switches of each secondary group, means for operating said chain relay when no idle links are available to said predetermined secondary switches, gate control means individual to said group of trunks for preventing the operation of all the primary switches in all said primary switch subgroups when no links are available, and means responsive to the operation of said chain relay for operating said gate control means to thereby prevent the operation of any of said primary switches in any primary switch subgroup.

34. In a telephone system, an operator position, a plurality of links individual to said position, a single source of marking potential in said position, a plurality of call distributing switches having access to said links, means for conditioning said position to receive incoming calls over said call distributing switches responsive to said position being staffed, marking means in each of said links operated responsive to said position being conditioned for connecting said marking potential through all of said links to mark all said links idle and selectable to said call distributing switches, means for operating said call distributing switches to hunt for and connect with any idle ones of said links marked with said marking potential responsive to incoming calls being received on said switches from calling lines of the system, a marginal test relay individual to each said switch, each said test relay individually operated to seize said position responsive to its individual switch alone completing a single connection to said marking means at said position over any marked one of said links, and means effective in case two of said switches simultaneously connect with said marking potential at said position over the same or two different ones of said links for reducing said marking potential to prevent the operation of the two test relays in said two switches thereby preventing double seizure of said position.

35. In a telephone system, a plurality of trunks for receiving incoming trunk calls, a plurality of operator positions accessible to said trunks for servicing and extending trunk calls received on said trunks, means for periodically comparing the number of trunk calls on said trunks waiting service with the number of operators on duty at their respective positions, an indicating device, and means controlled by said comparing means for operating said device in case the number of trunk calls waiting service are in excess of the permissible number for the number of operators on duty.

36. A telephone system as claimed in claim 35 wherein said comparing means includes an automatic step-by-step switch having successive positions progressively corresponding to a greater number of operator positions, and means for automatically operating said switch to the position corresponding to the number of operators on duty.

37. A telephone system as claimed in claim 35 wherein said comparing means includes a first balancing network and a second balancing network, and a polarized relay operated by an unbalanced first network condition to initially determine the number of operators on duty and subsequently operated by an unbalanced second network condition to operate said second indicating device.

38. A telephone system as claimed in claim 37 wherein said first balancing network includes a resistance at each staffed operator position connected in multiple and a plurality of variable predetermined resistors, and said second balancing network includes a resistance at each trunk waiting service connected in multiple and a plurality of other variable predetermined resistors.

39. A telephone system as claimed in claim 35 wherein said comparing means includes a stepping switch, a first group of bank contacts in said switch, each succeeding bank contact in said first group progressively corresponding to a greater number of staffed operator positions, a second group of bank contacts in said switch, each succeeding bank contact in said second group progressively corresponding to a greater number of trunk calls waiting service, corresponding ones of said bank contacts in said first and second groups indicating the permissible number of trunk calls waiting service for the number of operators on duty, means for determining the number of operators on duty, means controlled by said determining means for operating said switch to engage the bank contact corresponding to the number of operators on duty, a second determining means for determining the number of trunk calls waiting service, and said indicating device controlled jointly by said second determining means and the said engaged bank contact for operating said device only in case said second determining means indicates a greater number of waiting trunk calls than the permissible number.

40. In a telephone system, a plurality of operator positions divided into groups, a group hunting switch, a group marking conductor individual to each said group of positions terminating in the bank contacts of said group hunting switch, a position hunting switch individual to each said group marking conductor and to each group of positions and accessible from the bank contacts of said group hunting switch, a position marking conductor individual to each said position and accessible from the bank contacts of said position hunting switches, a start conductor common to all said positions, key means individual to each said position manually operated to ground said start conductor and for removing ground from its group and position marking conductors, means including a start relay operated responsive to the grounding of said common start conductor to cause said group hunting switch to operate and hunt for an ungrounded group marking conductor, a test relay in said group hunting switch operated responsive to said group hunting switch engaging an ungrounded one of said group marking conductors to stop the hunting operation of said group hunting switch and connect with the one of said position hunting switches individual to said one engaged group marking conductor, means for operating said one connected position hunting switch to hunt for an ungrounded position marking conductor responsive to the operation of said test relay, a second test relay common to all said position hunting switches operated responsive to said one position hunting switch engaging an ungrounded one of said position marking conductors to stop the hunting operation of said one position hunting switch and connect with the one of said positions having its key means operated, (and) indicating means at said one position operated to indicate the selection of said one position by said hunting switches responsive to the operation of said common second test relay.

41. A telephone system as claimed in claim 40 wherein said key means at said one position and its individual marking conductor causes only the restoration of said second test relay and only the reoperation of said one position hunting switch in response to the restoration of said key means at said one position in case another key means in another position in the same group is operated at the time said one key means at said one position is restored, and said key means at said one position and its individual and group marking conductors causing the restoration of both said first and second test relays, the reoperation of said group hunting switch and the operation of another position hunting switch in response to the restoration of said key means at said one position in case a third key means in another position in a different group is operated at the time said key means at said one position is restored.

42. A telephone system as claimed in claim 40 including means for reoperating only said one position hunting switch to select another position responsive to restoration of said key means at said one position in case the key means at said other position is in the same group as said one position and is operated at the time said first mentioned key means is restored.

43. In a telephone system, a toll board comprising a plurality of operator positions, a plurality of toll trunks divided into groups, operator controlled means at each said operator position for engaging any one of said toll trunks to extend a connection, a position identity lamp individual to each said position, a group check lamp for each group of toll trunks, a group of tens check lamps for indicating the tens designations of each of said toll trunks in all said trunk groups, a group of units check lamps for indicating the units designations of each of said toll trunks in all said trunk groups, said lamps being arranged so that said lamps are visible to said operator positions, hunting switches for selecting and connecting with said operator positions, circuit means controlled from any one of said positions for operating said hunting switches to select and connect with said one position, and means controlled responsive to the connection of said switches with said one position for illuminating the position identity lamp individual to said one position and for illuminating the group check lamp, the tens check lamp, and the units check lamp corresponding to any one of said toll trunks engaged in an extended connection by said one operator position.

44. In a telephone system, a plurality of stations divided into groups, a station hunting switch individual to each said group of stations, each station hunting switch having access to the stations in the associated individual groups, a stepping magnet individual to each said station hunting switch for operating said switch to select and connect with any one of said stations in its associated group, a test wiper individual to each station hunting switch, a group hunting switch common to all said stations and having access to all of said station hunting switches, a test relay common to all said station hunting switches, means for operating said group hunting switch to select and connect with any one of said station hunting switches; a first, a second, and a third wiper in said group hunting switch; a stepping circuit for each said stepping magnet including both said second and third wipers of said group hunting switch and the individual test wiper of said connected one of said station hunting switches, and a test circuit for said common test relay including said first wiper of said group hunting switch and the individual test wiper of said connected one of said station hunting switches.

45. In a telephone system, a plurality of stations divided into groups, a station hunting switch individual to each said group of stations, each station hunting switch having access to the stations in the associated individual groups, a stepping magnet individual to each said station hunting switch for operating said switch to select and connect with any one of said stations in its associated group, a test wiper individual to each station hunting switch, a group hunting switch common to all said stations and having access to all of said station hunting switches, a test relay common to all said station hunting switches, means for operating said group hunting switch to select and connect with any one of said station hunting switches; a first, a second, and a third wiper in said group hunting switch; a stepping circuit for each said stepping magnet including both said second and third wipers of said group hunting switch and the individual test wiper of said connected one of said station hunting switches, a test circuit for said common test relay including said first wiper of said group hunting switch and the individual test wiper of said connected one of said station hunting switches, interrupter contacts on each stepping magnet included in its said stepping circuit, contacts on said common test relay closed responsive to the operation of said common test relay, and a short-circuit including said first and second wipers of said group hunting switch and said contacts on said common test relay for short circuiting said interrupter contacts to disable the stepping circuit of said connected one of said station hunting switches.

46. In a telephone system, a plurality of operator positions divided into groups, a position hunting switch individual to each said group of positions, each position hunting switch having a plurality of wipers having access to the positions in the associated individual groups, an individual stepping magnet for operating said wipers of said position hunting switch to select and connect with any one of said positions in its associated group, a group hunting switch common to all said positions and having a plurality of wipers having access to all of said position hunting switches a test relay in said group hunting switch common to all said position hunting switches, means for operating said wipers of said group hunting switch to select and connect with any one of said position hunting switches; a stepping circuit for each position hunting switch stepping magnet including at least two wipers of said group hunting switch and at least one wiper of said connected one of said position hunting switches, and a test circuit for said common test relay including a third wiper of said group hunting switch and at least one wiper of said connected one of said position hunting switches.

47. In a telephone system, a plurality of operator positions each having a plurality of links, a dial rear finder having a plurality of levels of bank contacts, each level being individual to an operator position and each bank contact being individual to a link, a start conductor common to all said positions, an individual position marking conductor for each said level, a link marking conductor individual to each said link, a dial rear key at each said position; means responsive to the operation of said key at any one of said positions for grounding said start conductor, for grounding said individual position marking conductor of said one operator position to mark the level individual to said one operator position, and for marking the individual link marking conductors of all idle links of said one operator position to mark the individual bank contacts of such idle links in said marked level; means responsive to the grounding of said start conductor for operating said finder to said marked level, and means for thereafter operating said finder to find and connect with the first idle one of said links in said one position responsive to said finder connecting with the first marked one of said bank contacts in said marked level.

48. In a telephone system, an operator position for receiving incoming calls of different classes of service, means for blocking said position from receiving said different classes of service and for converting said position to an operator training position, a training trunk having access to said position, a plurality of different paths directively selectable for seizing said training trunk, each said path corresponding to a different class of incoming service, means for seizing said trunk over any one of said paths, means for connecting said trunk to said position responsive to said seizure, and means in said trunk for simulating the class of service dependent upon the path over which said trunk is seized.

49. In a telephone system, an operator position normally arranged to receive a plurality of incoming calls of different classes of service, means for blocking said position from receiving said different classes of incoming calls and for converting said position to receive any one of a plurality of different types of special service calls, a trunk having access to said position, a plurality of different paths directively selectable for seizing said trunk, each said path corresponding to a different type of special service call, means for seizing said trunk over any one of said paths, means for connecting said trunk to said position responsive to said seizure, and means dependent upon the path over which said trunk is seized for indicating to the operator at said position the type of special service call received.

50. In a telephone system, a plurality of operator positions, a plurality of links individual to each said position, a trunk individual to each position, a selecting switch individual to each trunk for selecting idle ones of said links in its individual position, a directively controlled switch having a plurality of levels of bank contacts, each said level being individual to a position and its individual trunk, a plurality of different paths extending from each said trunk, each said path individually terminating in a bank contact in the level individual to such trunk, each different path of each trunk designating a different class of incoming call, means for extending an incoming call by directively operating said directively controlled switch to select one of said levels and a particular one of said bank contacts in said selected level, means for seizing the trunk individual to said selected level responsive to said selection, means responsive to the seizure of said trunk for operating its individual selecting switch to automatically select an idle one of said links in the position individual to said seized trunk, means for operatively connecting said selected link to its associated position, and means dependent upon the path over which said directively controlled switch connects with said trunk for indicating to the operator at the connected position the class of the incoming call.

51. In a telephone system, a plurality of senders, a plurality of finders having access to said senders, means for operating said finders step-by-step to hunt for and connect with idle ones of said senders, a first test relay individual to each finder, means for operating the first test relay of any one of said finders to stop the hunting operation of said one finder responsive to said one finder connecting with an idle one of said senders, a second test relay individual to each finder operated responsive to the operation of the first test relay of its individual finder only in case said one finder alone connects with said one sender, means effective in case another one of said finders and said one finder simultaneously connect with the same idle sender for preventing the operation of said second test relays in said one and said other finders, and means operative in said one and said other finder only in case their second test relays are prevented from operating after the operation of their first test relays for restarting the hunting operation of said one and said other finder to hunt for another idle sender.

52. In a telephone system, a plurality of senders, a plurality of finders having access to said senders, means for operating said finders step-by-step to hunt for and connect with idle ones of said senders, a first test relay individual to each finder, means for operating the first test relay of any one of said finders to stop the hunting operation of said one finder responsive to said one finder connecting with an idle one of said senders, a second test relay individual to each finder operated responsive to the operation of the first test relay of its individual finder only in case said one finder alone connects with said one sender, means effective in case another one of said finders and said one finder simultaneously connect with the same idle sender for preventing the operation of said second test relays in said one and said other finders, a slow-to-operate relay individual to each finder operated responsive to the operation of the first test relay of its individual finder, and means for restarting the hunting operation of said one and said other finder to hunt for another idle sender responsive to the operation of the said third relays in said one and said other finder only in case the said second test relays in said one and said other finders are prevented from operating when said first test relays in said one and said other finders are operated.

53. In combination, a plurality of automatic switches, a first and a second test wiper individual to each switch, contacts accessible to said wipers, a stepping magnet individual to each switch for operating their respective switches step-by-step in a hunting operation, said stepping magnets operated over their respective first test wipers responsive to said first test wipers engaging grounded ones of said contacts, a switching relay individual to each switch shunted by the engagement of said grounded contacts by its said first test wiper, said switching relay in each switch operating in series with its respective magnet responsive to its first test wiper engaging an ungrounded contact to stop the hunting operation, a test relay individual to each switch, each test relay operated over its individual second test wiper responsive to its second test wiper engaging one of said contacts having a predetermined battery potential thereon, means for reducing said predetermined battery potential on said one contact in the event two of said switches simultaneously engage said one contact to prevent the operation of said test relays in said two switches, a third relay individual to each switch operated responsive to the operation of its switching relay, and means for restarting the hunting operation of said two switches responsive to the operation of the third relays in said two switches in the event said test relays of said two switches are prevented from operating when said switching relays in said two switches are operated.

54. In an automatic hunting switch, a first and a second test wiper, a first set of bank contacts accessible to said first test wiper, a second set of bank contacts accessible to said second test wiper, means for grounding each bank contact of said first set when said bank contact is engaged by another similar switch, a predetermined battery potential normally connected to each bank contact of said second set, means for reducing the battery potential on each bank contact of said second set when said bank contact is engaged by another similar switch, a stepping magnet for operating said test wipers step-by-step in a hunting operation; a stepping circuit including said magnet, said first test wiper, and said first set of bank contacts for operating said magnet responsive to said first test wiper engaging successive grounded ones of said first set bank contacts; a switching relay, a shunt circuit including said first test wiper for shunting said switching relay responsive to said first test wiper engaging grounded bank contacts, a circuit for operating said switching relay effective responsive to said first test wiper engaging a non-grounded bank contact, contacts included in said stepping circuit and operated by said switching relay for opening said stepping circuit to stop the hunting operation of said switch, a test relay; a circuit for said test relay including said test relay, said second test wiper, and successive ones of said second set of bank contacts, other contacts included in said test circuit and operated by said switching relay for completing said test circuit to operate said test relay in case said second test wiper engages a bank contact of said second set having said predetermined battery potential thereon, a slow-to-operate relay, a circuit including further contacts operated by said switching relay for operating said slow relay, a circuit including normal unoperated contacts of said test relay and contacts closed by the operation of said slow relay for reoperating said stepping magnet in case said test relay remains unoperated after the operation of said switching relay, means for restoring said switching relay responsive to the reoperation of said stepping magnet, and the restoration of said operated contacts of said switching relay causing the restoration of said slow relay and the reclosure of said stepping circuit to restart said switch in its hunting operation.

55. In a telephone system, an operator position, a plurality of links individual to said position, a sender having storage means, means responsive to an incoming call from a calling line of the system for seizing said position over any idle one of said links, position connect means operated responsive to said seizure for operatively connecting said position to said one link, sender connect means operated responsive to said seizure for connecting said position and said one link to said sender, means controlled from said position for storing digits in said storage means of said sender, sending means in said sender operated responsive to the storage of said digits for automatically retransmitting said stored digits to extend a connection over said one link, signalling means for transmitting an automatic ring signal, a plurality of operator disconnect means for giving the operator a choice for disconnecting said sender from her position and from the connected one of said links by selectively and momentarily operating one of said disconnect means; a first sender disconnect means operated by the momentary operation of the first of said operator disconnect means after storage of said digits for disconnecting said sender from said position, for maintaining said position connected to said one link, and for disconnecting said sender from said one link after retransmission of said stored digits; a combined automatic ring and sender disconnect means operated by the momentary operation of the second of said operator disconnect means for disconnecting said sender from said position, for maintaining said position connected to said line link, for conditioning said signalling means to transmit an automatic ring signal over said one link and the extended connection after retransmission of said stored digits, and for disconnecting said sender from said one link after transmission of said automatic ring signal; and a combined automatic ring and position and sender disconnect means operated by the momentary operation of the third of said operator disconnect means for disconnecting said position from said sender and from said one link, for conditioning said signalling means to transmit an automatic ring signal over said one link and the extended connection after retransmission of said stored digits, and for disconnecting said sender from said one link after transmission of said automatic ring signal.

56. In a telephone system, an operator position, a plurality of links individual to said position, call distributing switches having access to said links, busying means operative in case said position is operatively connected to any one of said links for busying said position to incoming calls, conditioning means operative in case said position is operatively disconnected from said links for conditioning said position to automatically answer incoming calls, means responsive to an incoming call from a calling line of the system for automatically operating one or more of said call distributing switches to seize said position conditioned for automatic answering over any idle one of said links, means operated automatically responsive to the seizure of said position over said one link for operatively connecting said position to said one link thereby operating said busying means and disabling said conditioning means, automatic answer disabling means for disabling said position for automatically answering incoming calls, a first and a second operator disconnect means for disconnecting said position from any one of said links, means operated in case said first disconnect means is operated for disconnecting said position from said one link and for reoperating said conditioning means to recondition said position for automatic answering on any idle one of said links, means operated in case said second disconnect means is operated for disconnecting said position from said one link and for operating said automatic answer disabling means to disable said position for automatic answering on any idle link, a plurality of manual control means for operatively connecting said position to another one of said links, and means responsive to the operation of any one of said manual control means for operatively connecting said position to another one of said links and for automatically restoring said automatic answer disabling means to thereby permit the reoperation of said first disconnect means to disconnect said position from said other link and to reoperate said conditioning means to return said position to automatic answering condition.

57. A telephone system as claimed in claim 56 wherein said automatic answer disabling means comprises a relay having a locking circuit controlled by any one of said plurality of manually controlled means.

58. In a telephone system wherein an operator position includes position equipment common to a plurality of links individual to said position and arranged to automatically receive incoming calls over any idle one of said links at a time said position is idle and said position equipment is operatively disassociated from all said links, and wherein said position equipment is automatically and operatively connected to said one link upon the receipt of an incoming call over one of said links; the combination of an operator disconnect means, control means responsive to a momentary operation of said disconnect means for operatively disassociating said position equipment from said one link, disabling means also operated responsive to the momentary operation of said disconnect means for making said position and idle ones of said links non-selectable to incoming calls received after disconnection of said position equipment from said one link, a plurality of manual control means, and means responsive to the operation of any one of said manual control means for operatively connecting said position equipment to one of said links and for automatically restoring said disabling means to render said position and idle ones of said links automatically selectable after said position equipment is subsequently disconnected from said last mentioned link.

59. A telephone system as claimed in claim 58 including a second operator disconnect means and circuit means effective responsive to a momentary operation of said second operator disconnect means for operating only said control means, and said control means being operated to operatively disconnect said position equipment from said last mentioned link to make said position and idle ones of said links again automatically selectable to incoming calls.

No references cited.